(12) United States Patent
Ryan et al.

(10) Patent No.: US 6,649,888 B2
(45) Date of Patent: *Nov. 18, 2003

(54) RADIO FREQUENCY (RF) HEATING SYSTEM

(75) Inventors: William J. Ryan, Avon, NY (US); Francisco Chiarilli, Spencerport, NY (US); Gary C. Adishian, Scottsville, NY (US); Jonathan M. Gorbold, Pittsford, NY (US)

(73) Assignee: Codaco, Inc., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/983,582

(22) Filed: Oct. 25, 2001

(65) Prior Publication Data

US 2002/0079121 A1 Jun. 27, 2002

Related U.S. Application Data

(60) Division of application No. 09/667,720, filed on Sep. 22, 2000, which is a continuation-in-part of application No. 09/482,553, filed on Jan. 13, 2000, which is a continuation-in-part of application No. 09/404,200, filed on Sep. 23, 1999, now abandoned.

(51) Int. Cl.[7] .................................................. H05B 6/06
(52) U.S. Cl. ...................................... 219/634; 219/661
(58) Field of Search ............................... 219/634, 660, 219/661, 663, 666, 764, 765, 770, 777, 778–780, 773; 156/272.4, 345, 274.8; 428/210; 438/729; 455/115; 330/302

(56) References Cited

U.S. PATENT DOCUMENTS

| | | |
|---|---|---|
| 913,058 A | 2/1909 | Saunders |
| 1,061,111 A | 5/1913 | Olsson |
| 2,181,129 A | 11/1939 | Heberer ..................... 134/23.1 |
| 2,433,067 A | * 12/1947 | Russell ....................... 219/765 |

(List continued on next page.)

FOREIGN PATENT DOCUMENTS

| | | |
|---|---|---|
| DE | 1745464 | 9/1971 |
| EP | 0 963 760 A1 | 12/1999 |
| FR | 1407582 | 6/1965 |
| FR | 2248311 | 6/1975 |
| GB | 988414 | 4/1965 |
| WO | WO 86/07034 | 12/1986 |
| WO | WO 93/11926 | 6/1993 |
| WO | WO 95/05413 | 2/1995 |
| WO | WO 95/18191 | 7/1995 |
| WO | WO 96/07540 | 3/1996 |
| WO | WO 99/47621 | 9/1999 |

OTHER PUBLICATIONS

Application No. 10/076,647—Pending Claims, pp. 1–4.
Bansal, P., "Development of an ISM Harmonic RF Attenuation Model for Combating Interference Generated by 13 MHz and 27 MHz Industrial RF Processing Machines", Progress Report on Task A, ERA Report 97–1015, ERA Project 33–01–0510, Nov., 1997, 29 pages.
"Advanced Automation for Space Missions", Appendix 5C, Jun. 25, 1999.

(List continued on next page.)

Primary Examiner—Quang T. Van
(74) Attorney, Agent, or Firm—Rothwell, Figg, Ernst & Manbeck

(57) ABSTRACT

An RF heating system for bonding a first element to a second element. In one embodiment, the RF heating system includes: (a) a composition, which functions as an adhesive, interposed between the first and second elements, the composition including an ionomer and a polar carrier, wherein the ionomer and/or the carrier are present in amounts effective to allow the composition to be headed by a fringe RF field; and (b) a radio frequency (RF) heating apparatus for producing the fringe RF field.

46 Claims, 66 Drawing Sheets

U.S. PATENT DOCUMENTS

| | | | |
|---|---|---|---|
| 2,457,498 A | * 12/1948 | Russell et al. | 156/274.8 |
| 2,465,319 A | 3/1949 | Whinfield et al. | 260/75 |
| 2,570,921 A | 10/1951 | Collins | |
| 2,667,437 A | 1/1954 | Zoubek | |
| 2,769,804 A | 11/1956 | Hanson | 260/86.7 |
| 2,821,611 A | * 1/1958 | Mann et al. | 219/773 |
| 2,901,466 A | 8/1959 | Kibler et al. | 260/75 |
| 2,971,939 A | 2/1961 | Baer | 260/45.5 |
| 2,989,517 A | 6/1961 | Hanson et al. | 260/93.5 |
| 3,018,272 A | 1/1962 | Griffing et al. | 260/75 |
| 3,033,822 A | 5/1962 | Kibler et al. | 260/47 |
| 3,033,826 A | 5/1962 | Kibler et al. | 260/76 |
| 3,033,827 A | 5/1962 | Kibler et al. | 260/77 |
| 3,075,952 A | 1/1963 | Coover et al. | 260/75 |
| 3,232,810 A | 2/1966 | Reesen | |
| 3,323,929 A | 6/1967 | Salzberg et al. | 106/148 |
| 3,436,239 A | 4/1969 | Feld | 106/300 |
| 3,502,602 A | 3/1970 | Helm et al. | 260/22 |
| 3,532,848 A | * 10/1970 | Loring, Jr. et al. | 219/773 |
| 3,546,008 A | 12/1970 | Shields et al. | 117/138.8 |
| 3,560,290 A | 2/1971 | Sendor et al. | |
| 3,563,942 A | 2/1971 | Heiberger | 260/29.2 |
| 3,574,031 A | 4/1971 | Heller et al. | 156/273 |
| 3,607,554 A | 9/1971 | Heffernan | 156/380 |
| 3,635,811 A | 1/1972 | Lane | 204/192 |
| 3,657,038 A | 4/1972 | Lightfoot | |
| 3,701,760 A | 10/1972 | Hagemeyer, Jr. et al. | 260/82 |
| 3,701,875 A | 10/1972 | Witsey et al. | 219/10.81 |
| 3,725,189 A | 4/1973 | Gidge | 161/146 |
| 3,734,874 A | 5/1973 | Kibler et al. | 260/29.2 E |
| 3,779,993 A | 12/1973 | Kibler et al. | 260/75 S |
| 3,850,858 A | 11/1974 | Park | 260/27 BB |
| 3,879,450 A | 4/1975 | Velker et al. | 260/513 R |
| 3,919,176 A | 11/1975 | Meyer, Jr. et al. | 260/78.4 D |
| 3,936,412 A | 2/1976 | Rocholl | 260/37 R |
| 3,943,024 A | 3/1976 | Sendor et al. | 156/380 |
| 3,952,421 A | 4/1976 | Wilson et al. | 34/1 |
| 4,020,049 A | 4/1977 | Rinehart | 260/75 M |
| 4,035,547 A | 7/1977 | Heller, Jr. et al. | 428/329 |
| 4,052,368 A | 10/1977 | Larson | 260/75 S |
| 4,061,523 A | 12/1977 | Sendor et al. | |
| 4,073,777 A | 2/1978 | O'Neill et al. | 260/75 S |
| 4,083,901 A | 4/1978 | Schonfeld et al. | 264/25 |
| 4,104,262 A | 8/1978 | Schade | 528/295 |
| 4,110,284 A | 8/1978 | Violland et al. | 260/29.5 TN |
| 4,111,460 A | 9/1978 | Roberts | |
| 4,127,619 A | 11/1978 | Godfrey | 260/889 |
| 4,131,581 A | 12/1978 | Coker | |
| 4,133,731 A | 1/1979 | Hansen et al. | 204/159.17 |
| 4,146,521 A | 3/1979 | Godfrey | 260/27 R |
| 4,233,196 A | 11/1980 | Sublett | 260/29.2 N |
| 4,253,898 A | 3/1981 | Rinker et al. | 156/272 |
| 4,257,928 A | 3/1981 | Vachon et al. | 260/33.4 R |
| 4,268,338 A | 5/1981 | Peterson | |
| 4,296,294 A | 10/1981 | Beckert et al. | 219/10.41 |
| 4,304,901 A | 12/1981 | O'Neill et al. | 528/290 |
| 4,311,655 A | 1/1982 | Siadat | 264/22 |
| 4,331,547 A | 5/1982 | Stotts et al. | 252/62 |
| 4,335,220 A | 6/1982 | Coney | 523/414 |
| 4,360,607 A | 11/1982 | Thorsrud et al. | 523/137 |
| 4,374,963 A | 2/1983 | Morgan et al. | |
| 4,396,739 A | 8/1983 | Sirota et al. | 524/394 |
| 4,408,532 A | 10/1983 | Incremona | 101/456 |
| 4,423,191 A | 12/1983 | Haven et al. | 525/169 |
| 4,444,806 A | 4/1984 | Morgan et al. | |
| 4,449,631 A | * 5/1984 | Levenberg et al. | |
| 4,460,728 A | 7/1984 | Schmidt, Jr. et al. | 524/271 |
| 4,471,086 A | 9/1984 | Foster | 524/489 |
| 4,476,578 A | 10/1984 | Gaudin et al. | 455/115 |
| 4,477,501 A | * 10/1984 | Kojima et al. | |
| 4,489,193 A | * 12/1984 | Goswami | |
| 4,491,646 A | * 1/1985 | Gruber et al. | |
| 4,499,262 A | 2/1985 | Fagerburg et al. | 528/279 |
| 4,510,324 A | 4/1985 | Rossi et al. | 564/82 |
| 4,523,528 A | * 6/1985 | Hastings et al. | |
| 4,525,524 A | 6/1985 | Tung et al. | 524/601 |
| 4,560,579 A | * 12/1985 | Siadat et al. | |
| 4,576,715 A | * 3/1986 | Michaels et al. | |
| 4,588,099 A | * 5/1986 | Diez | |
| 4,595,611 A | 6/1986 | Quick et al. | 428/35 |
| 4,598,142 A | 7/1986 | Hilbert et al. | 528/295 |
| 4,600,346 A | * 7/1986 | Podosek | |
| 4,600,614 A | 7/1986 | Lancaster et al. | 428/35 |
| 4,601,948 A | 7/1986 | Lancaster et al. | 428/349 |
| 4,609,690 A | * 9/1986 | Gruber et al. | |
| 4,635,797 A | * 1/1987 | Bankier | |
| 4,640,865 A | 2/1987 | Lancaster et al. | 428/421 |
| 4,659,595 A | 4/1987 | Walker et al. | 427/391 |
| 4,660,354 A | 4/1987 | Lancaster et al. | 53/469 |
| 4,661,299 A | 4/1987 | Thorsrud | 264/25 |
| 4,669,610 A | * 6/1987 | Lindsey et al. | |
| 4,670,634 A | 6/1987 | Bridges et al. | 219/10.41 |
| 4,705,706 A | * 11/1987 | Avery | |
| 4,707,389 A | 11/1987 | Ward | |
| 4,707,402 A | 11/1987 | Thorsrud | |
| 4,710,539 A | 12/1987 | Siadat et al. | |
| 4,718,898 A | 1/1988 | Puletti et al. | 604/366 |
| 4,728,572 A | 3/1988 | Davis | 428/355 |
| 4,735,843 A | 4/1988 | Noda | 428/137 |
| 4,749,833 A | 6/1988 | Novorsky et al. | |
| 4,753,846 A | 6/1988 | Mudge | 428/343 |
| 4,761,198 A | 8/1988 | Salerno | 156/334 |
| 4,762,731 A | 8/1988 | Lancaster et al. | 427/40 |
| 4,762,864 A | 8/1988 | Goel et al. | |
| 4,766,035 A | 8/1988 | Lancaster et al. | |
| 4,767,799 A | 8/1988 | Thorsrud | 523/137 |
| 4,786,534 A | 11/1988 | Aiken | |
| 4,787,194 A | 11/1988 | Lancaster et al. | 53/469 |
| 4,790,965 A | 12/1988 | Thorsrud | 264/25 |
| 4,803,022 A | 2/1989 | Barrell et al. | |
| 4,840,758 A | 6/1989 | Thorsrud | 264/26 |
| 4,847,155 A | 7/1989 | Lancaster et al. | 428/421 |
| 4,853,420 A | 8/1989 | Pham et al. | 521/50.5 |
| 4,857,129 A | 8/1989 | Jensen et al. | 156/273.7 |
| 4,858,342 A | 8/1989 | Nicholson et al. | |
| 4,877,679 A | 10/1989 | Leatherman et al. | |
| 4,886,853 A | 12/1989 | Foster et al. | 524/477 |
| 4,892,779 A | 1/1990 | Leatherman et al. | |
| 4,895,457 A | 1/1990 | Lancaster et al. | 383/94 |
| 4,909,261 A | 3/1990 | Rothenberg | 128/734 |
| 4,910,066 A | 3/1990 | Foisie | |
| 4,910,292 A | 3/1990 | Blount | 528/272 |
| 4,918,754 A | 4/1990 | Leatherman et al. | |
| 4,937,115 A | 6/1990 | Leatherman | |
| 4,941,936 A | 7/1990 | Wilkinson et al. | 156/274.8 |
| 4,943,475 A | 7/1990 | Baker et al. | |
| 4,950,499 A | 8/1990 | Martin et al. | |
| 4,958,450 A | 9/1990 | Roberg | |
| 4,973,656 A | 11/1990 | Blount | 528/272 |
| 4,990,593 A | 2/1991 | Blount | 528/272 |
| 5,002,051 A | 3/1991 | Dew et al. | 128/395 |
| 5,015,677 A | 5/1991 | Benedict et al. | 524/17 |
| 5,024,594 A | 6/1991 | Athayde et al. | |
| 5,075,034 A | 12/1991 | Wanthal | |
| 5,079,047 A | 1/1992 | Bogaert et al. | 428/41 |
| 5,098,962 A | 3/1992 | Bozich | 525/437 |
| 5,129,977 A | 7/1992 | Leatherman | 156/272.4 |
| 5,132,108 A | 7/1992 | Narayanan et al. | 424/78.17 |
| 5,156,613 A | 10/1992 | Sawyer | 606/213 |
| 5,158,767 A | 10/1992 | Cohen et al. | |
| 5,182,134 A | 1/1993 | Sato | 427/543 |

| | | | | | | |
|---|---|---|---|---|---|---|
| 5,182,357 A | 1/1993 | Linden | | 5,645,904 A | 7/1997 | Woo et al. .................. 428/35.7 |
| 5,209,776 A | 5/1993 | Bass et al. .................. 106/124 | | 5,646,076 A | 7/1997 | Bortz |
| 5,217,788 A | 6/1993 | Rye | | 5,661,201 A | 8/1997 | Degrand ..................... 524/233 |
| 5,217,798 A | 6/1993 | Brady et al. ................. 428/246 | | 5,667,621 A | 9/1997 | Dougherty et al. |
| 5,218,042 A | 6/1993 | Kuo et al. .................. 524/601 | | 5,669,934 A | 9/1997 | Sawyer ....................... 606/213 |
| 5,219,895 A | 6/1993 | Kelman et al. ............... 522/68 | | 5,670,566 A | 9/1997 | Liedermooy et al. ....... 524/271 |
| 5,220,141 A | 6/1993 | Quick et al. .......... 219/10.55 E | | 5,679,423 A | 10/1997 | Shah |
| 5,223,684 A | 6/1993 | Li et al. | | 5,688,845 A | 11/1997 | Eden et al. ................... 524/48 |
| 5,240,780 A | 8/1993 | Tiers et al. ................. 428/483 | | 5,693,412 A | 12/1997 | Walters |
| 5,277,737 A | 1/1994 | Li et al. | | 5,698,061 A | 12/1997 | Maag |
| 5,281,630 A | 1/1994 | Salsman ..................... 521/48.5 | | 5,698,062 A | 12/1997 | Sakamoto et al. ........... 156/345 |
| 5,286,504 A | 2/1994 | Sheen et al. ................. 426/243 | | 5,712,044 A | 1/1998 | Fanselow et al. |
| 5,287,081 A | 2/1994 | Kinard et al. | | 5,712,469 A | 1/1998 | Chaffin et al. |
| 5,292,362 A | 3/1994 | Bass et al. .................. 106/124 | | 5,716,441 A | 2/1998 | Nguyen et al. .......... 106/207.1 |
| 5,300,749 A | 4/1994 | Kotikangas ................. 219/779 | | 5,717,015 A | 2/1998 | Dust et al. ................... 524/236 |
| 5,318,650 A | 6/1994 | Kerawalla ................... 156/245 | | 5,719,244 A | 2/1998 | Farwaha et al. ......... 526/238.2 |
| 5,328,539 A | 7/1994 | Sato ........................ 156/275.5 | | 5,732,413 A | 3/1998 | Williams |
| 5,329,004 A | 7/1994 | Eden et al. ................. 536/109 | | 5,749,895 A | 5/1998 | Sawyer et al. ............... 606/214 |
| 5,336,346 A | 8/1994 | Meltzer et al. | | 5,750,605 A | 5/1998 | Blumenthal et al. ........ 524/230 |
| 5,336,518 A | 8/1994 | Narayanan et al. ............ 623/1 | | 5,760,111 A | 6/1998 | Birbaum et al. ............ 524/100 |
| 5,354,336 A | 10/1994 | Kelman et al. ................. 623/6 | | 5,766,400 A | 6/1998 | Gallagher, Jr. |
| 5,356,963 A | 10/1994 | Kauffman et al. ............ 524/43 | | 5,766,744 A | 6/1998 | Fanselow et al. |
| 5,360,845 A | 11/1994 | Billmers et al. .............. 524/51 | | 5,770,706 A | 6/1998 | Wu et al. ..................... 523/429 |
| 5,369,211 A | 11/1994 | George et al. ............... 528/293 | | 5,795,397 A | 8/1998 | Shi et al. ....................... 127/29 |
| 5,371,133 A | 12/1994 | Stanley ....................... 524/457 | | 5,804,021 A | 9/1998 | Abuto et al. |
| 5,373,682 A | 12/1994 | Hatfield et al. ............... 53/440 | | 5,806,983 A | 9/1998 | Millon et al. |
| 5,378,879 A | 1/1995 | Monovoukas ............... 219/634 | | 5,821,294 A | 10/1998 | Perlinski ..................... 524/507 |
| 5,382,652 A | 1/1995 | Fukuda et al. ........... 528/308.6 | | 5,824,015 A | 10/1998 | Sawyer ....................... 606/214 |
| 5,387,623 A | 2/1995 | Ryan et al. .................. 523/124 | | 5,824,606 A | 10/1998 | Dible et al. ................. 438/729 |
| 5,391,406 A | 2/1995 | Ramharack et al. ......... 427/516 | | 5,833,915 A | 11/1998 | Shah |
| 5,393,351 A | 2/1995 | Kinard et al. | | 5,837,088 A | 11/1998 | Palmgren et al. |
| 5,403,123 A | 4/1995 | Walters | | 5,840,146 A | 11/1998 | Woo et al. ................ 156/272.4 |
| 5,403,312 A | 4/1995 | Yates et al. ................... 606/50 | | 5,840,405 A | 11/1998 | Shusta et al. |
| 5,403,998 A | 4/1995 | Sheen et al. ................. 219/730 | | 5,846,620 A | 12/1998 | Compton |
| 5,413,837 A | 5/1995 | Rock et al. | | 5,856,060 A | 1/1999 | Kawamura et al. ......... 430/201 |
| 5,416,127 A | 5/1995 | Chandran et al. ........... 522/149 | | 5,858,553 A | 1/1999 | Wu |
| 5,429,702 A | 7/1995 | Grooms et al. | | 5,859,152 A | 1/1999 | Miller et al. ................. 525/444 |
| 5,447,592 A | 9/1995 | Berce et al. | | 5,861,211 A | 1/1999 | Thakkar et al. |
| 5,453,144 A | 9/1995 | Kauffman et al. .......... 156/213 | | 5,882,789 A | 3/1999 | Jones et al. |
| 5,458,233 A | 10/1995 | Herrin | | 5,893,219 A | 4/1999 | Smith et al. |
| 5,469,863 A | 11/1995 | Shah | | 5,912,317 A | 6/1999 | Wu |
| 5,475,038 A | 12/1995 | Skoultchi ..................... 522/96 | | 5,945,486 A | 8/1999 | Vargo et al. |
| 5,499,484 A | 3/1996 | Herrin | | 5,989,375 A | 11/1999 | Bortz |
| D368,918 S | 4/1996 | DeBiasse ................... D15/145 | | 6,023,856 A | 2/2000 | Brunson et al. |
| 5,506,298 A | 4/1996 | Paul et al. ..................... 525/66 | | 6,025,287 A | 2/2000 | Hermann |
| 5,519,072 A | 5/1996 | Wieczorek, Jr. et al. ...... 524/48 | | 6,030,490 A | 2/2000 | Francisco et al. |
| 5,523,344 A | 6/1996 | Maksymkiw et al. ........ 524/507 | | 6,042,673 A | 3/2000 | Johnson et al. |
| 5,527,655 A | 6/1996 | Bonham et al. ............. 430/175 | | 6,045,648 A | 4/2000 | Palmgren et al. |
| 5,529,708 A | 6/1996 | Palmgren et al. | | 6,048,599 A | 4/2000 | Chu et al. ................... 428/114 |
| 5,530,056 A | 6/1996 | Farwaha et al. ............. 524/558 | | 6,052,033 A | 4/2000 | Schneider ................... 330/302 |
| 5,532,300 A | 7/1996 | Koubek et al. ............... 524/47 | | 6,060,145 A | 5/2000 | Smith et al. |
| 5,532,306 A | 7/1996 | Kauffman et al. ........... 524/274 | | 6,072,362 A | 6/2000 | Lincoln ........................ 330/10 |
| 5,534,097 A | 7/1996 | Fasano et al. | | 6,074,704 A | 6/2000 | Le Riche et al. |
| 5,536,759 A | 7/1996 | Ramharack et al. .......... 522/35 | | 6,082,025 A | 7/2000 | Bonk et al. |
| 5,541,482 A * | 7/1996 | Siao ............................ 315/248 | | 6,083,587 A | 7/2000 | Smith et al. |
| 5,543,488 A | 8/1996 | Miller et al. ................. 528/277 | | 6,121,356 A | 9/2000 | Lundberg et al. ............ 524/297 |
| 5,545,472 A | 8/1996 | Koubek et al. ............. 428/261 | | 6,138,861 A | 10/2000 | Palazzo |
| 5,548,056 A | 8/1996 | Chung | | 6,157,258 A | 12/2000 | Adishian et al. ............. 330/295 |
| 5,552,495 A | 9/1996 | Miller et al. ................. 525/437 | | 6,231,985 B1 | 5/2001 | Chen et al. |
| 5,567,489 A | 10/1996 | Allen et al. | | 6,238,787 B1 | 5/2001 | Giles et al. |
| 5,574,076 A | 11/1996 | Sharak et al. ................ 523/128 | | 6,244,441 B1 | 6/2001 | Ahlgren |
| 5,587,226 A * | 12/1996 | Leung et al. ................ 428/210 | | 6,255,635 B1 | 7/2001 | Thompson et al. .......... 219/663 |
| 5,591,850 A | 1/1997 | Birbaum et al. ............. 544/216 | | 6,302,988 B1 | 10/2001 | Miller, Sr. |
| 5,608,000 A | 3/1997 | Duan et al. .................. 524/591 | | 6,316,756 B1 | 11/2001 | Thompson et al. .......... 219/666 |
| 5,609,941 A | 3/1997 | Cawthon | | 6,323,468 B1 | 11/2001 | Dabelstein et al. |
| 5,611,882 A | 3/1997 | Riebel et al. | | 6,323,659 B1 | 11/2001 | Krahn ......................... 324/554 |
| 5,616,625 A | 4/1997 | Hung et al. ................... 521/79 | | 6,339,888 B1 | 1/2002 | Brunson et al. |
| 5,618,876 A | 4/1997 | Farwaha et al. ............. 524/548 | | 6,344,254 B1 | 2/2002 | Smith et al. |
| 5,620,656 A | 4/1997 | Wensky et al. | | 6,345,865 B1 | 2/2002 | Ashida et al. |
| 5,644,798 A | 7/1997 | Shah | | 6,348,679 B1 | 2/2002 | Ryan et al. .................. 219/634 |
| 5,645,886 A | 7/1997 | Schueler, II et al. ........ 427/140 | | 6,352,077 B1 | 3/2002 | Shah |

| | | |
|---|---|---|
| 6,352,779 B1 | 3/2002 | Edwards et al. |
| 6,361,843 B1 | 3/2002 | Smith et al. |
| 6,365,650 B1 | 4/2002 | Chen et al. |
| 2001/0035406 A1 * | 11/2001 | Ryan et al. ................ 219/634 |

OTHER PUBLICATIONS

Derwent World Patent Index, English language abstract of Japanese Patent No. 60–20 adhesive lining cloth to woven fabric by applying hot–melt adhesive to fabric, imp aq. soln. of ethylene glycol, sodium nitirte and surfactant, drying and bonding, 002109917, Oct. 21, 1985.

Derwent World Patent Index, English language abstract of Japanese Patent No. 56–05 compsn. curable by HF induction heating—prepd. by blending thermosetting resin w and ferro–magnetic substance having high dielectric hysteresis loss in HF field, 002109916, May 16, 1981.

Derwent World Patent Index, English language abstract of DE 1745464 (Document AN1) unsaturated polyesteramide resin, WPI Acc No.: 68–07243Q/196800, Sep. 9, 197.

Derwent WPI, English language abstract of FR 2248311 (Document AO1), "Thermosettin contg. non conductive particles—having accelerated cure by application of high f field", WPI Acc No.: 75–27432W/197517, Jun. 20, 1975.

English language translation of Document AM1, French Patent No. FR 1407582, "Proce frequency welding of difficult–to–weld synthetic foams", Jun. 21, 1965.

International Search Report for International Application No. PCT/US99/05688, mail 1999.

International Search Report for International Application No. PCT/US00/26214, mail 2001.

Natural Organic Products, *Gelatin's Production* (visited Jun. 12, 2000) <http://www.tessenderlo.com/c/p030000.htm>.

Natural Organic Products, *Solugel®* (visited Jun. 12, 2000) <http://www.tessenderlo.com/c/p030201.htm>.

Eastman, *Eastman AQ 38S Polymer* (visited May 8, 2000) <http://www.eastman.com/Product_Information/ProductHome.asp?EastmanDotComxTrue&pro.

Eastman, *Eastman AQ 48 Ultra Polymer* (visited May 8, 2000) <http://www.eastman.com/Product_Information/ProductHome.asp?EastmanDotComxTrue&pro.

Eastman, *Eastman AQ 55s Polymer* (visited May 4, 2000) <http://www.eastman.com/Product_Information/ProductHome.asp?EastmanDotComxTrue&pro.

Eastman, *Eastman AQ 1045 Copolyester* (visited May 8, 2000) <http://www.eastman.com/Product_Information/ProductHome.asp?EastmanDotComxTrue&pro.

Eastman, *Eastman AQ 1350 Copolyester* (visited May 8, 2000) <http://www.eastman.com/Product_Information/ProductHome.asp?EastmanDotComxTrue&pro.

Eastman, *Eastman AQ Copolyester 1950 (visited May 8, 2000)* <http://www.eastman.com/Product_Information/ProductHome.asp?EastmanDotComxTrue&pro.

Eastman, *Eastman AQ 14000 Copolyester* (visited May 8, 2000) <http://www.eastman.com/Product_Information/ProductHome.asp?EastmanDotComxTrue&pro.

Eastman, *Eastek 1300 Polymer Dispersion* (visited May 8, 2000) <http://www.eastman.com/Product_Information/ProductHome.asp?EastmanDotComxTrue&pro.

Eastman, *Eastek 1300 Polymer Pellets* (visited May 8, 2000) <http://www.eastman.com/Product_Information/ProductHome.asp?EastmanDotComxTrue&pro.

Lide, D.R., ed., "Permitivity (Dielectric Constant) of Pure Liquids," in *CRC Handb Chemistry and Physics*, CRC Press, Inc., Ann Arbor, MI, pp. 9–27, 9–28, 9–30 (1991.

Miller, R. A. and Althen, G., "Water–Dispersible Hot Melt Adhesive Formulations," 40:63–66, Chemical Week Associates (Nov., 1997).

Co–Pending U.S. patent application No. 09/482,553, Ryan et al., filed Jan. 13.

*Preliminary Amendment and Statement Under 37 C.F.R. § 163 (d) (2) Deleting Inventors* co–pending Divisional U.S. patent application No. 09/867,983, Ryan et al., filed M.

* cited by examiner

"PRIOR ART"

"PRIOR ART"

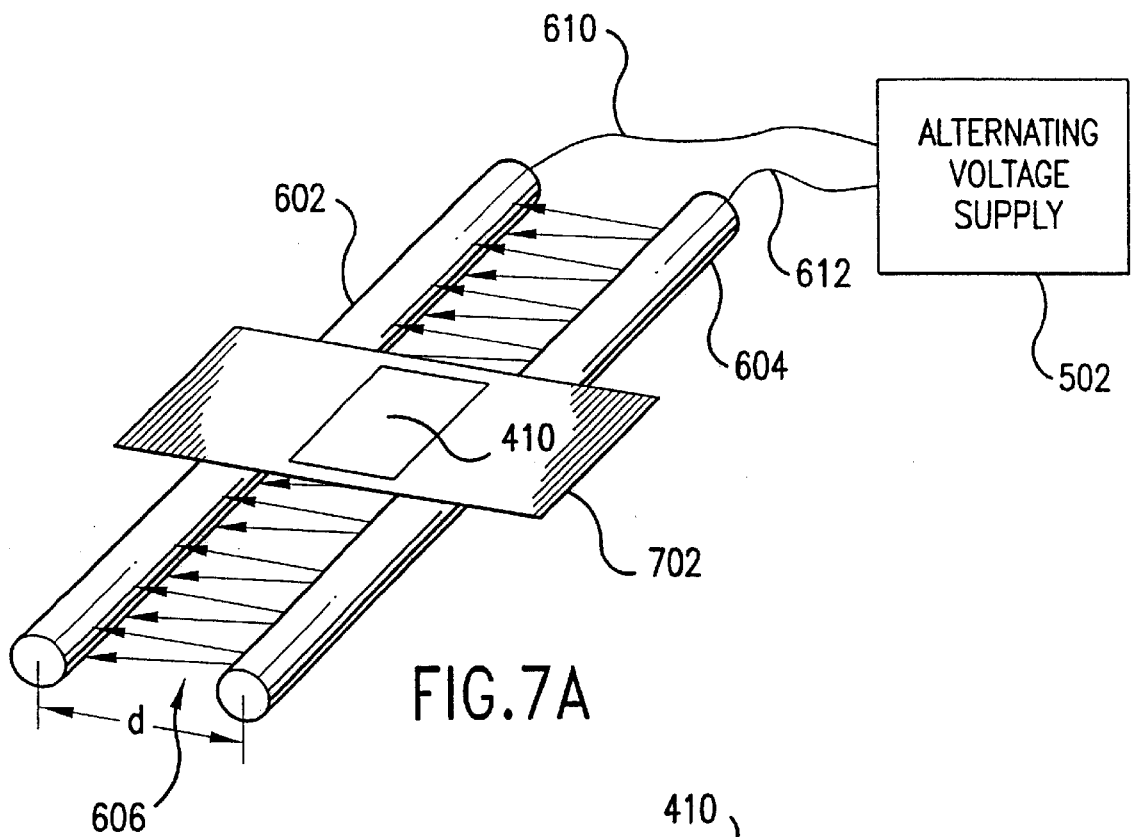
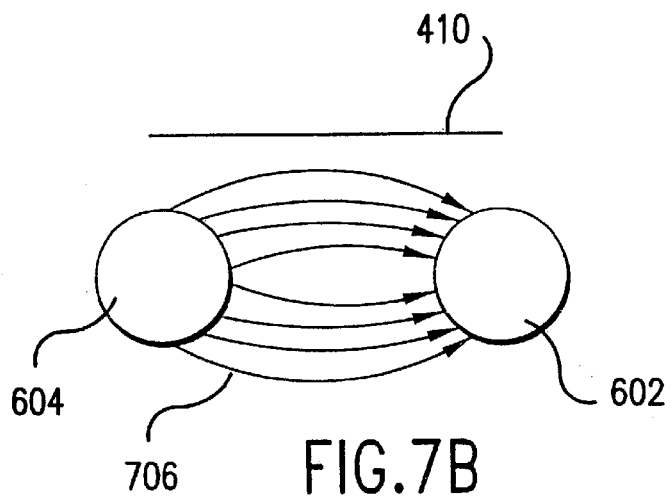
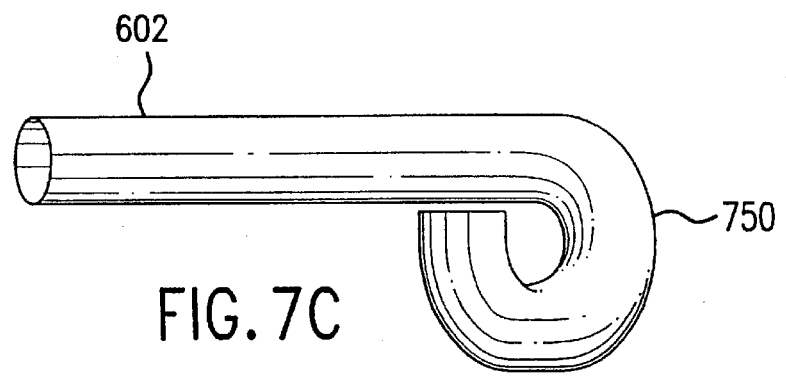

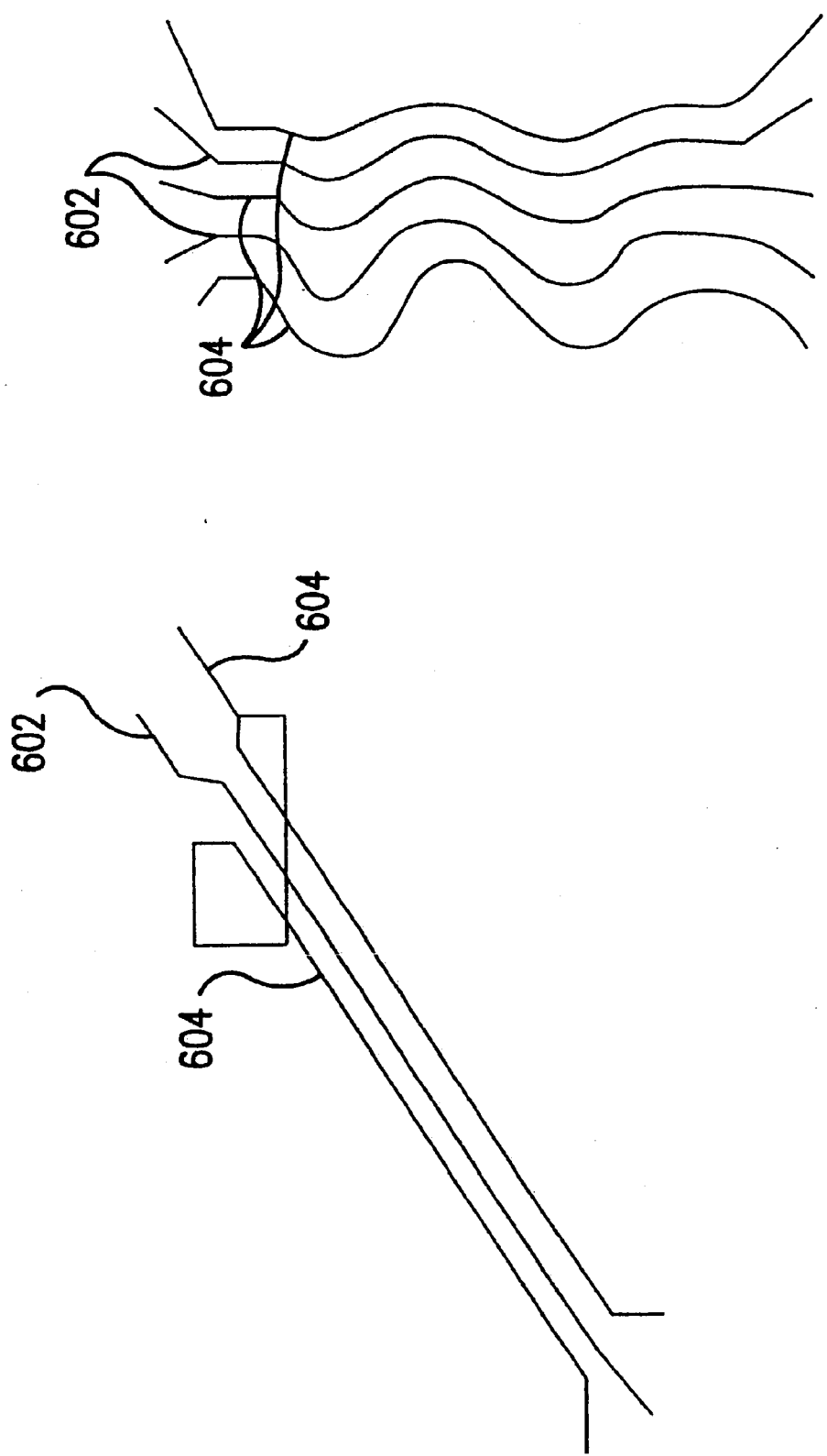

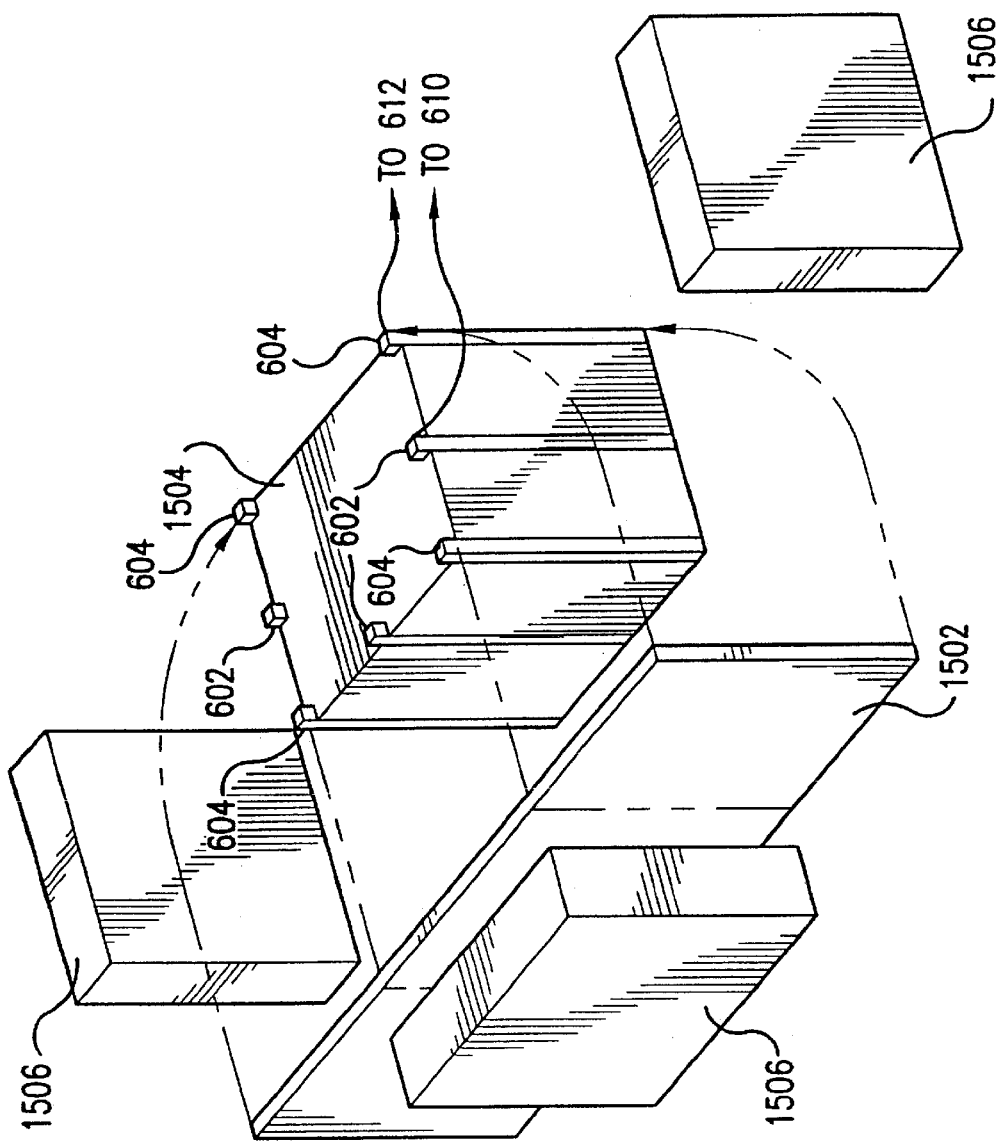

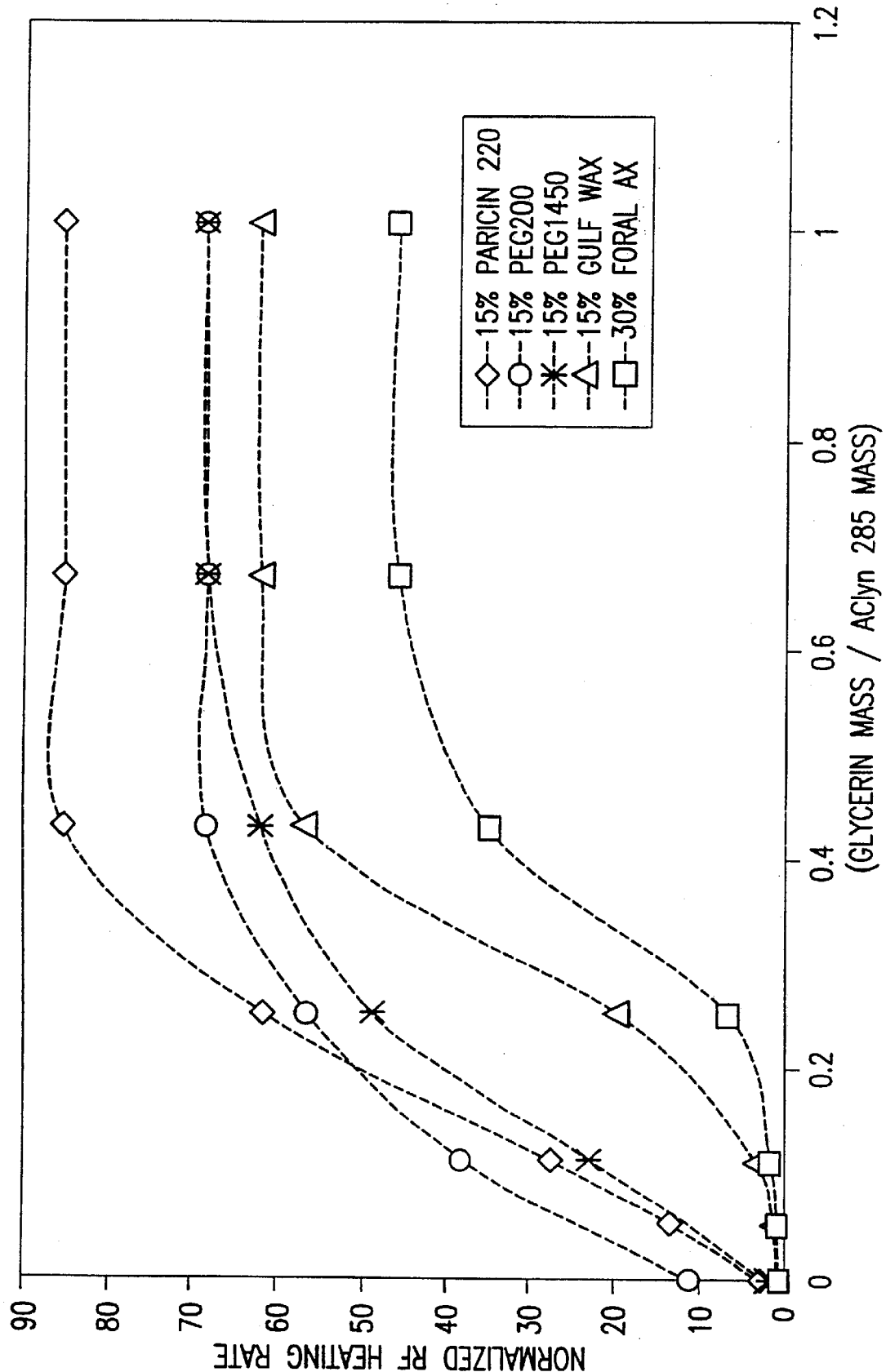

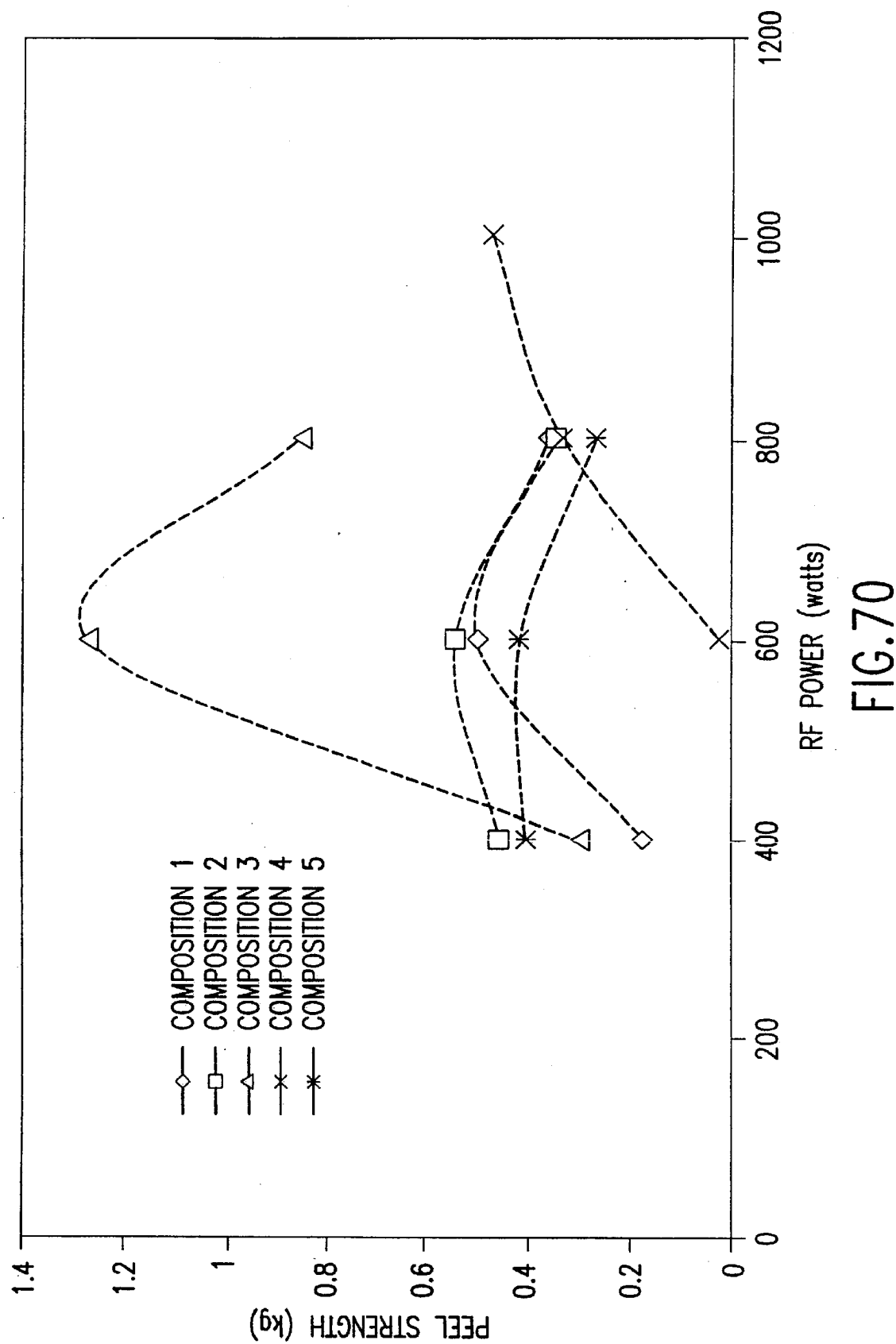

RADIO FREQUENCY (RF) HEATING SYSTEM

This application is a Divisional of application Ser. No. 09/667,720, filed Sep. 22, 2000; which is a Continuation-in-Part of appl. Ser. No. 09/482,553, filed Jan. 13, 2000; which is a Continuation-in-Part of appl. Ser. No. 09/404,200, filed Sep. 23, 1999 now abandoned.

BACKGROUND OF THE INVENTION

1. Field of the Invention

This invention relates generally to the use of media containing ionomers and polar carriers as radio frequency (RF) susceptors in RF activated systems.

2. Related Art

Radio frequency (RF) heating is a well established non-contact precision heating method that is used to generate heat directly within RF susceptors, and indirectly within materials that are in thermally conductive contact with RF susceptors. RF susceptors are materials that have the ability to couple and convert RF energy into heat energy within the material.

Conventional adhesives are not suitable RF susceptors that can be directly heated and activated by RF heating. Rather, these conventional adhesives are typically heated indirectly through thermally conductive contact with an RF susceptor material. FIG. 1 illustrates two conventional methods that are currently used in industry for indirect RF heating of conventional adhesives: The first method is illustrated in FIG. 1A, where susceptor material 102 exists as a bulk macroscopic layer. RF susceptor material 102 is directly heated by RF energy, and adhesive layer 104 is indirectly heated through thermally conductive contact with RF susceptor material 102. For example, adhesive layer 104 may be applied to a continuous surface of susceptor material 102, such as steel or aluminum. The second method is illustrated in FIG. 1B, where susceptor material 112 consists of discrete macroscopic particles. Adhesive layer 114 is loaded with macroscopic particles of a RF susceptor material 112, such as macroscopic particles or flakes of metal oxides, metallic alloys, or aluminum. With this conventional method, each RF susceptor particle 112 acts as a discrete RF susceptor, generating heat throughout adhesive layer 114.

An example of a conventional RF energy activated composition, such as that shown in FIG. 1B, is described in U.S. Pat. No. 5,378,879, issued to Monovoukas ("Monovoukas"). Monovoukas utilizes macroscopic "loading particles" as discrete RF susceptors. The particles are heated by RF energy and in turn conduct heat to the surroundings. These macroscopic loading particles are thin flakes (i.e. in thin disk-like configuration) that are designed to be admixed to relatively thick extruded materials. However, these flakes are not well suited for use as susceptors in thin film bonding applications in which physical distortions, discolorations in the surface, or opacity of the bonded films would result from the flakes.

Another example of a conventional inductively activated adhesive is described in U.S. Pat. No. 3,574,031, issued to Heller et al. ("Heller"). Heller describes a method of heat welding thermoplastic bodies using an adhesive layer that contains uniformly dispersed macroscopic RF susceptors, typically iron oxide particles. These discrete RF susceptor particles are ferromagnetic in nature. A disadvantage of this type of method is that a tradeoff must be made between the size of the particle employed versus the power level and duration of the inductive heating process. For example, if susceptor particles are kept small in size, the mechanical strength of the bond tends to increase. However, as the size of these discrete susceptors is reduced, the power levels and dwell times required to heat the RF susceptor material and achieve acceptable bonds tend to increase. Another disadvantage of this type of method is the high levels of loading of the medium with RF susceptor particles that is required for efficient activation. Such high loading levels detract from the physical properties and rheology of the adhesive composition. Still another disadvantage is the dark color and opacity of the composition, which renders the composition undesirable for many applications.

An example of adhesive activated by a dielectric process is described in U.S. Pat. No. 5,661,201, issued to Degrand ("Degrand"). Degrand describes a thermoplastic film including at least one ethylene copolymer and a sufficient quantity of N,N-ethylene-bisstearamide that is capable of being sealed utilizing a current at a frequency of about 27.12 megahertz (MHZ). A disadvantage of this type of film and sealing process is the inherent tendency to also heat the adherand.

U.S. Pat. No. 5,182,134, issued to Sato, discloses methods of curing a thermoset composition by applying an RF signal having a frequency of about 1 to 100 MHZ to a composition comprising a major portion of a thermoset and a receptor. The receptor is described as being one of the alkali or alkaline earth metal sulfate salts (e.g. calcium sulfate), aluminum trihydrate, quaternary ammonium salts, phosphonate compounds, phosphate compounds, polystyrene sulfonate sodium salts or mixtures thereof. According to this patent, all of the exemplified compositions took longer than one second to heat.

U.S. Pat. No. 5,328,539, issued to Sato, discloses methods of heating thermoplastic susceptor compositions by applying an RF signal having a frequency of about 1 to 100 MHZ. The susceptors are described as being one of the alkali or alkaline earth metal sulfate salts (e.g. calcium sulfate), aluminum trihydrate, quaternary ammonium salts, phosphonate compounds, phosphate compounds, polystyrene sulfonate sodium salts or mixtures thereof. According to this patent, all of the exemplified compositions took longer than one second to heat.

U.S. Pat. No. 4,360,607, issued to Thorsrud, discloses a composition suitable for sensitizing thermoplastic compositions to the heating effects of microwave energy comprising (1) an alcohol amine or derivative thereof, (2) a simple or polymeric alkylene glycol or derivative thereof, (3) silica and, optionally, (4) a plasticizer.

U.S. Pat. No. 5,098,962, issued to Bozich, discloses a water dispersible hot melt adhesive composition comprising:

(a) from about 40% to 95% by weight of a water dispersible ionically substituted polyester resin having a molecular weight from about 10,000 to about 20,000 daltons;

(b) from about 60% to about 5% by weight of one or more compatible plasticizers; and (c) from about 0.1% to about 1.5% of one or more compatible stabilizers of the anti-oxidant type.

Examples of plasticizers that may be used according to this patent include one or more low molecular weight polyethylene glycols, one or more low molecular weight glycol ethers, glycerin, butyl benzyl phthalate and mixtures thereof.

U.S. Pat. No. 5,750,605, issued to Blumenthal et al., discloses a hot melt adhesive composition comprising:

(i) 10 to 90% by weight of a sulfonated polyester condensation polymer;
(ii) 0 to 80% by weight of a compatible tackifier;
(iii) 0 to 40% by weight of a compatible plasticizer;
(iv) 5 to 40% by weight of a compatible wax diluent with a molecular weight below 500 g/mole containing at least one polar functional group, said group being present at a concentration greater than $3 \times 10^{-3}$ equivalents per gram;
(v) 0 to 60% by weight of a compatible crystalline thermoplastic polymer; and
(vi) 0 to 3% by weight of a stabilizer.

What is needed is a composition (e.g. adhesive composition or coating) containing either dissolved or finely dispersed susceptor constituents that are preferably colorless or of low color. Further, the composition should be transparent or translucent throughout an adhesive matrix or plastic layer. This type of RF susceptor will result in more direct and uniform heating throughout an adhesive matrix or plastic layer. Further, it is desirable that such a composition will allow bonding with no physical distortion or discoloration in the bonded region of thin films. A further desirable feature is that the composition can be activated or melted in less than one second and that it exhibit acceptable shear strength. It is also desirable to have a formulation which may be optimized for a particular application, such as cutting, coating, or bonding substrates.

SUMMARY OF THE INVENTION

The present invention generally relates to the creation and use of a composition (also referred to as a "susceptor composition") that can bond two or more layers or substrates to one another and that can be used to coat or cut a substrate. The susceptor composition is activated in the presence of RF energy.

In one embodiment, the susceptor composition of the present invention comprises at least one ionomer and at least one polar carrier. The ionomer and polar carrier are blended with one another and form a mixture, preferably a substantially uniform mixture. The ionomer and polar carrier are present in amounts effective to allow the susceptor composition to be heated by RF energy.

In another embodiment of the present invention, the susceptor composition further comprises at least one of a thermoplastic polymer, thermoset resin, elastomer, plasticizer, filler or other additive. The additive and susceptor composition are blended with one another to form a mixture that is activated in the presence of RF energy.

In yet another embodiment of the present invention, the composition can further comprise a second carrier that is an insoluble porous carrier that is saturated with the composition.

Surprisingly, it has been discovered that when an ionomer is combined with a polar carrier, much more heating occurs when exposed to RF energy than when the ionomer or polar carrier are exposed separately to RF energy. Also surprisingly, it has been discovered that when the polar carrier is present at about 13–30% weight percent, more preferably, about 15–25 weight percent, most preferably, about 20–23 weight percent, very short heating times are possible while retaining acceptable shear strength of the bond.

According to another embodiment of the present invention, a method of bonding a first material or substrate to a second material or substrate comprises interposing a susceptor composition according to the invention between the first and second materials and applying RF energy to the composition to heat the composition, thereby causing the first and second materials to become bonded. In one embodiment, the composition comprises at least one ionomer and at least one carrier that are distributed in one another to form a mixture, preferably, a substantially uniform mixture. Optionally, the composition may further comprise other compounds and additives as described herein. The ionomer and polar carrier are present in the composition in amounts effective to allow the composition to be heated by RF energy.

According to another embodiment of the present invention, a method of bonding or adhering a first substrate to a second substrate includes: applying a first composition onto the first substrate; applying a second composition onto the second substrate; contacting the first composition with the second composition; applying RF energy to the first and second compositions to heat the compositions, thereby causing the first and second substrates to become adhered or bonded; wherein one of the compositions comprises at least one ionomer and the other of the compositions comprises at least one polar carrier, and the ionomer and/or the polar carrier are present in amounts effective to allow the first and second compositions to be heated by RF energy.

According to yet another embodiment of the present invention, a method of bonding or adhering a first substrate to a second substrate includes: applying a first composition onto the first substrate; applying a second composition onto the first composition; contacting the second substrate with the second composition; and applying RF energy to the first and second compositions to heat the compositions, thereby causing the first and second substrates to become adhered or bonded, wherein one of the compositions comprises at least one ionomer and the other of the compositions comprises at least one polar carrier, and the ionomer and/or the carrier are present in amounts effective to allow the first and second compositions to be heated by RF energy.

According to another embodiment of the present invention, a method of making a susceptor composition of the invention comprises admixing at least one ionomer and at least one polar carrier, wherein, preferably, the polar carrier and ionomer are substantially uniformly dispersed in one another and form a uniform mixture. Where the ionomer and polar carrier form an aqueous dispersion, the uniform mixture may be dried. The invention also relates to such susceptor compositions made according to the methods of the invention.

According to a further embodiment of the present invention, an adhered or a bonded composition can be obtained according to the disclosed methods.

According to a further embodiment of the present invention, a kit for bonding a first material to a second material comprises one or more containers, wherein a first container contains a susceptor composition comprising at least one ionomer and at least one polar carrier that are dispersed in one another and form a mixture. The kit may also contain an elastomeric compound or other additives as disclosed herein.

According to a further embodiment of the present invention, a kit for adhering or bonding a first substrate to a second substrate, comprises at least two containers, wherein one of the containers comprises at least one ionomer and another of the containers comprises at least one polar carrier, wherein when the ionomer and the carrier are applied to substrates and the ionomer and carrier are interfaced, a composition is formed that is heatable by RF energy.

The invention relates to an apparatus, having: a first portion having a first mating surface; a second portion, having a second mating surface; a susceptor composition of the invention disposed between the first mating surface and the second mating surface, wherein the susceptor composition adheres the first mating surface to the second mating surface such that application of a force to separate the first mating surface and the second mating surface results in breakage of the apparatus unless the composition is in a melted state.

The invention also relates to a method of applying a protective film or printed image/ink on a substrate with a susceptor composition of the invention.

The invention also relates to a method for dynamically bonding a first adherand to a second adherand. The method includes: (1) creating an article of manufacture comprising the first adherand, the second adherand, and a susceptor composition of the invention, the composition being between the first adherand and the second adherand; (2) moving the article of manufacture along a predetermined path; (3) generating along a portion of the predetermined path an RF field having sufficient energy to activate the composition, wherein the composition is activated by its less than one second exposure to the RF field.

The invention also relates to a method for applying a susceptor composition of the invention to a substrate. In one embodiment, the method includes: (1) formulating the susceptor composition as a liquid dispersion; (2) applying the liquid dispersion of the susceptor composition to the substrate; (3) drying the susceptor composition, wherein the drying step includes the step of applying RF energy across the composition, thereby generating heat within the liquid dispersion. In a preferred embodiment, one may roll up the substrate after the susceptor composition has dried.

The invention also relates to a method for cutting a substrate. The method includes: (1) applying a susceptor composition of the invention to a portion of the substrate, wherein the portion of the substrate defines a first section of the substrate and a second section of the substrate; (2) melting the portion of the substrate by heating the composition via RF energy; and (3) after the portion of the substrate has begun to melt, applying a force to the substrate to separate the first section from the second section.

The method also relates to a method of dynamically bonding a first substrate to a second substrate. The method including: applying a susceptor composition of the invention onto the first substrate; after applying the susceptor composition onto the first substrate, forming a roll of the first substrate; storing the roll; unrolling the roll; and while unrolling the roll: joining an unrolled portion of the first substrate with a portion of the second substrate such that the portion of the second substrate is in contact with a portion of the susceptor composition applied onto the first substrate; and applying RF energy to the portion of the susceptor composition, wherein the portion of the susceptor composition heats and melts as a result of the RF energy being applied thereto.

The invention also relates to a radio frequency (RF) induction heating system, comprising:
a power supply; and
an antenna electrically connected to said power supply, wherein
said power supply comprises an amplifier and an impedance matching circuit connected to an output of said amplifier, the amplifier being operable to amplify a radio frequency (RF) signal; and
said antenna consists essentially of a first electrically conductive element substantially in the shape of a rod and a second electrically conductive element substantially in the shape of a rod, wherein a first end of said first electrically conductive element is electrically connected to said impedance matching circuit and a first end of said second conductive element is electrically connected to said impedance matching circuit. In a preferred embodiment, the first conductive element and the second conductive element are positioned such that they are substantially parallel with each other.

The invention also relates to a radio frequency (RF) induction heating system, comprising:
a power supply; and
an antenna electrically connected to said power supply, wherein
said power supply comprises an amplifier and an impedance matching circuit connected to an output of said amplifier, the amplifier being operable to amplify a radio frequency (RF) signal; and
said antenna comprises a first electrically conductive element substantially in the shape of a rod, a second electrically conductive element substantially in the shape of a rod, and an electrically conductive coil, wherein a first end of said first electrically conductive element is electrically connected to said impedance matching circuit, a first end of said second conductive element is electrically connected to said impedance matching circuit, and said coil is connected between said first and said second conductive elements.

The invention also relates to a radio frequency (RF) induction heating system, comprising:
a power supply; and
an antenna electrically connected to said power supply, wherein
said power supply comprises an amplifier and an impedance matching circuit connected to an output of said amplifier, the amplifier being operable to amplify a radio frequency (RF) signal; and
said antenna comprises a first electrically conductive element substantially in the shape of a rod, a second electrically conductive element substantially in the shape of a rod, a first electrically conductive coil, and a second electrically conductive coil;
a first connector connects said impedance matching circuit to a point on said first element that is midway between the ends of said first element,
a second connector connects said impedance matching circuit to a point on said second element that is midway between the ends of said second element, and
said first coil and said second coil are connected in parallel by said first and second elements.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIGS. 7A and 7B further illustrate the two probe heating system.

FIG. 7C illustrates a probe having a curled end to reduce corona effects.

FIGS. 12 to 17 illustrate additional embodiments of probes 602 and 604.

FIG. 43 illustrates a process for assembling a book, magazine, or periodical, or the like.

FIG. 69 depicts a graph showing the normalized RF heating rates vs. (glycerin mass/AClyn 285 mass) with various additives in the composition.

FIG. 70 depicts a graph showing the peel strength vs. RF power for 6 compositions.

DETAILED DESCRIPTION OF THE PREFERRED EMBODIMENTS

Figure 1A:
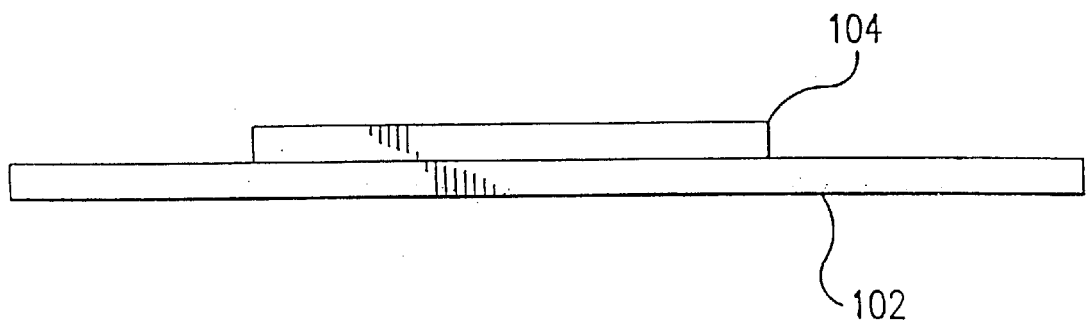
FIGS. 1A and 1B illustrate conventional schemes for inductively heating adhesives.
Figure 1B:
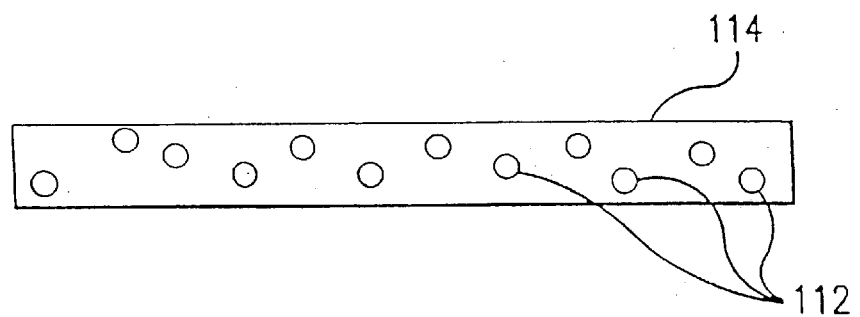
Figure 2A:
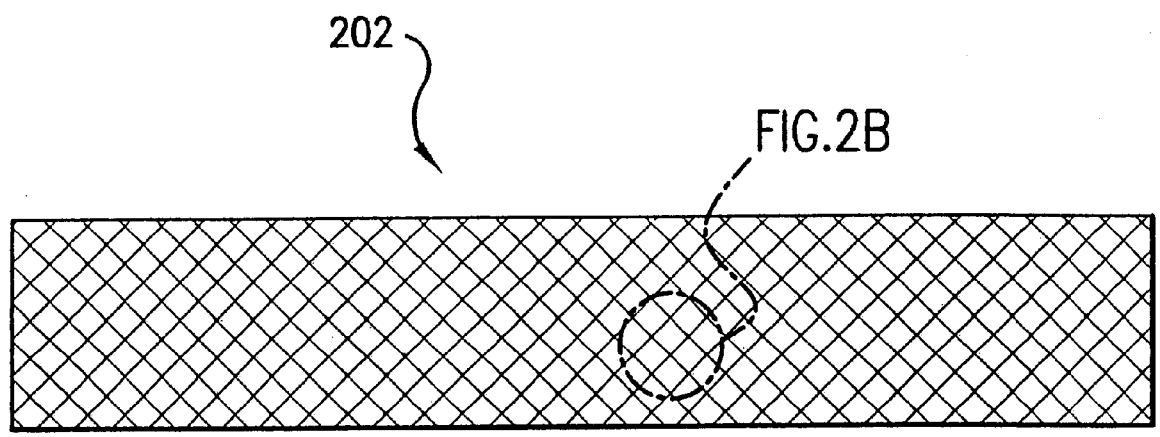
FIG. 2 shows an RF active composition according to the present invention.
Figure 2B:
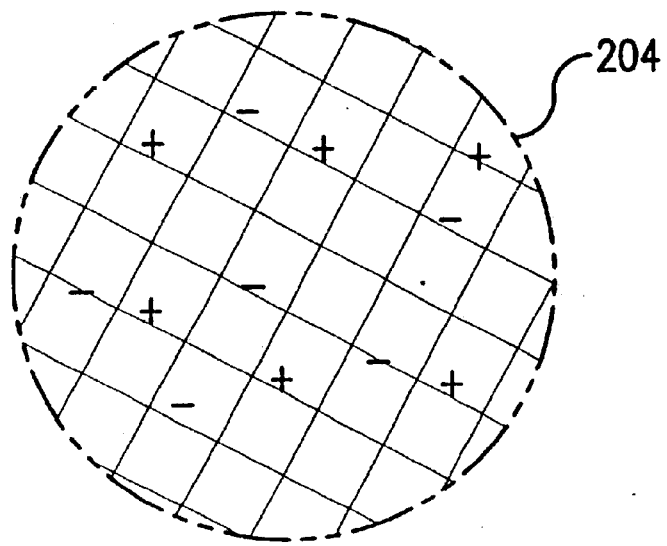
Figure 3:
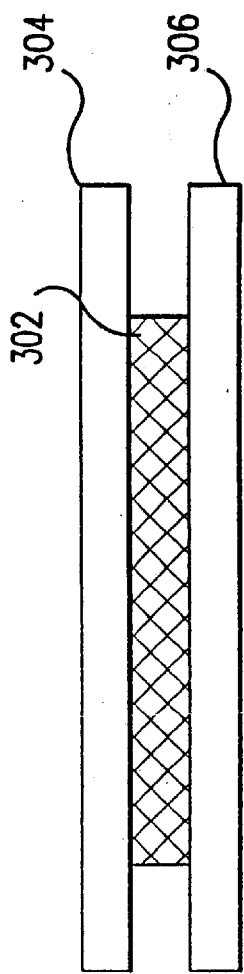
FIG. 3 shows a susceptor composition placed between two polyolefin layers to be attached according to the present invention.

I. Overview and Discussion of the Invention
II. Terminology
III. Ionomers
  A. Sulfonated Polymers
  B. Acrylic Acid and Maleic Anhydride Polymers and Copolymers
  C. Starch/Polysaccharide Derivatives
  D. Proteins
  E. Others
IV. The Polar Carrier
V. Further Additives to the Susceptor Compositions
  A. Adhesive/Thermoplastic Additives
  B. Adhesive/Coating Thermoset Additives
  C. Surfactant Additives
  D. Plasticizer Additives
  E. Tackifiers
  F. Fillers
  G. Stabilizers and Antioxidants
  H. Other Additives
VI. Applying the Susceptor Compositions to Substrates
VII. Apparatus For Activating the Various Compositions of the Present Invention
VIII. Method of Bonding Substrates
IX. Additional Probe Embodiments
X. Applicator System for Applying a Composition of the Present Invention to a Substrate/Adherand
XI. Systems for Adhering or Bonding two Adherand s.
XII. Exemplary Specific Applications of the Present Invention
  A. Manufacture of Flexible Packaging
  B. Food Packaging and Cap Sealing
  C. Printing Applications
    D. Bookbinding and Mailers
  E. Security Devices
  F. Thermal Destruction
  G. Seam Sealing
XIII Kits
XIV. Experimental Set-up
XV. Examples

I. OVERVIEW AND DISCUSSION OF THE INVENTION

The present invention is directed towards RF susceptor compositions and methods and systems of bonding, cutting, and/or coating substrates and surfaces using the susceptor composition. The susceptor composition is a mixture of one or more ionomers, polar carriers and, optionally, one or more additives dissolved or finely dispersed in a matrix. Preferably, the components of the susceptor composition are uniformly dissolved or finely dispersed in the matrix. The susceptor composition is capable of coupling efficiently in an RF field having a frequency of about 15 MHz or below; it is also capable of coupling at frequencies above 15 MHz. In order to be useful in industry and commercial products, a susceptor composition preferably has the following characteristics: (1) an activation time in the presence of a low power RF field on the order of 1 second or less, (2) adequate bond or adhesive strength for the intended use, (3) transparency or translucency and only slight coloration (if any), (4) minimal distortion of the substrates being attached, and (5) on demand bonding of preapplied adhesive. Further, it is desirable that the susceptor composition have coupling ability in the absence of volatile solvents, although the presence of nonvolatile liquids (such as plasticizers) may be desirable. These characteristics are important in providing sufficient heat transfer to the substrates or layers to be bonded to one another, or for adhesion to take place at the interface. Additionally, the susceptor composition should not interfere with the thermal bonding or inherent adhesive properties of the substrates or layers to be bonded or adhered to one another.

According to the present invention, a susceptor composition used to bond or adhere substrates or layers can be directly heated by exposure to an RF field having frequencies ranging from 1 kHz–5 GHz, most preferably about 60 MHz. The susceptor composition comprises an ionomer and a carrier blended with one another to form a mixture. In addition, the susceptor composition can further comprise one or more adhesive compounds blended with the susceptor and carrier to form the mixture.

II. TERMINOLOGY

"RF Energy" means an alternating electromagnetic field having a frequency within the radio frequency spectrum.

A "susceptor composition" comprises at least one ionomer and at least one polar carrier interfaced with one another and/or mixed or blended together. Preferably, the ionomer and polar carrier are mixed together. More preferably, the ionomer and polar carrier are substantially uniformly mixed together. In another embodiment, the ionomer and polar carrier are interfaced together by disposing a layer of the ionomer onto a layer of the polar carrier or visa versa. In this embodiment, the ionomer may be coated onto a first substrate and the polar carrier, with or without added ingredients such as a wax or other additives that prevent the carrier from evaporating substantially, may be coated onto a second substrate. The first and second substrates containing the ionomer and polar carrier layers, respectively, may then be brought into contact or interfaced and activated then or at a later time.

The susceptor compositions of the invention may further comprise one or more adhesive compounds or other additives mixed, preferably substantially uniformly mixed, together with the ionomer and the polar carrier. The susceptor composition is activated in the presence of RF energy. The susceptor composition can be used to bond two or more layers or substrates to one another, can be used as a coating, and can be used to thermally cut substrates.

A "polar carrier" provides the mobile medium in which the ionomers are dissolved, distributed, or dispersed. Polar carriers (also referred to as mobile media) can be liquids, such as solvents and plastisizers, or polymers that are utilized for their polar functionality and for their ability to be heated by RF energy.

An "adhesive compound" refers to polymers, copolymers and/or ionomers as described herein that are blended into the susceptor composition to enhance its adhesive properties.

"Bonding" is defined as the joining of one substrate to another substrate to cause a physical joining process to occur.

"Adhesion" is an interaction between two adherands at their interface such that they become attached or joined.

A "substantially transparent" mixture refers to a mixture that transmits greater than about 50% of incident visible light.

"Thermal bonding" or "welding" is defined as the reflowing of one substrate into another substrate to cause a physical joining process to occur.

"Mechanical bonding" occurs between adherands when a susceptor composition holds the adherands together by a mechanical interlocking action.

III. IONOMERS

"Ionomers" are copolymers containing iononic groups and nonionic repeat units. Such ionic groups include carboxyl, sulfate, phosphate and amino groups, and salts thereof. Typically, the ionic repeat containing groups comprise less than 25%, more preferably, 15% or less of the polymer. In a preferred embodiment, the ionomer functions as an adhesive. Examples of such ionomers include without limitation styrenated ethylene-acrylic acid copolymer or its salts, sulfonated polyesters and their salts and copolymers, polyacrylic acids and their salts and copolymers, hydroxy/carboxylated vinylacetate-ethylene terpolymers, functionalized acrylics, polyesters, latex, gelatin, soy protein, casein and other proteins, alginate, carrageenan, starch derivatives, ionic polysacharides, and the like. Examples of ionomers are described in more detail below.

A. Sulfonated Polymers

Sulfonated polyesters and copolymers thereof are described in U.S. Pat. Nos. 5,750,605, 5,552,495, 5,543,488, 5,527,655, 5,523,344, 5,281,630, 4,598,142, 4,037,777, 3,033,827, 3,033,826, 3,033,822, 3,075,952, 2,901,466, 2,465,319, 5,098,962, 4,990,593, 4,973,656, 4,910,292, 4,525,524, 4,408,532, 4,304,901, 4,257,928, 4,233,196, 4,110,284, 4,052,368, 3,879,450, and 3,018,272. The invention relates to compositions comprising sulfonated polyesters and copolymers thereof, e.g. as described in these patents, together with a polar carrier as described herein as well as the adhesive compositions described in these patents (comprising the sulfonated polyesters and copolymers thereof) together with the polar carrier. Such sulfonated polyesters and copolymers thereof are one preferred embodiment of the present invention, as such materials function both as an ionomer and as an adhesive.

In a preferred embodiment, the sulfonated polyester is a higher Tg (about 48° C. to about 55° C. or higher) linear polyester which shows improved heat resistance compared to lower Tg (about 35° C.) linear or branched sulfonated polyesters. Once blended with the polar carrier, the Tg of the resulting composition should be higher than the temperature at the intended use, e.g. higher than body temperature for diaper adhesives. For example, a linear sulfonated polyester with a Tg of 55° C. (e.g. AQ55S) blended with a sufficient amount (greater than 10%) of polar carrier (e.g. glycerin) to achieve RF activity will result in a Tg higher than body temperature if the polar carrier is no more than about 35% of the composition.

In another embodiment, a salt comprising a sulfonated polyester and a cationic dye as described in U.S. Pat. No. 5,240,780, are employed. Such salts provide a colored susceptor composition that may be used, e.g. in printing.

Sulfonated polyesters may be prepared by the polycondensation of the following reactants:

(a) at least one dicarboxylic acid;

(b) at least one glycol;

(c) at least one difunctional sulfomonomer containing at least one metal sulfonate group attached to an aromatic nucleus wherein the functional groups may be hydroxy, carboxyl, or amino groups.

The dicarboxylic acid component of the sulfonated polyesters comprises aliphatic dicarboxylic acids, alicyclic dicarboxylic acids, aromatic dicarboxylic acids, or mixtures of two or more of these acids. Examples of such dicarboxylic acids include oxalic; malonic; dimethylmalonic; succinic; glutaric; adipic; trimethyladipic; pimelic; 2,2-dimethylglutaric; azelaic; sebacic; fumaric; maleic; itaconic; 1,3-cyclopentanedicarboxlyic; 1,2-cyclohexanedicarboxylic; 1,3-cyclohexanedicarboxylic; 1,4-cyclohexanedicarboxylic; phthalic; terephthalic; isophthalic; 2,5-norbornanedicarboxylic; 1,4-naphthalic; diphenic; 4,4'-oxydibenzoic; diglycolic; thiodipropionic; 4,4'-sulfonyldibenzoic; and 2,5-naphthalenedicarboxylic acids. If terephthalic acid is used as the dicarboxylic acid component of the polyester, at least 5 mole percent of one of the other acids listed above may also be used.

It should be understood that use of the corresponding acid anhydrides, esters, and acid chlorides of these acids is included in the term "dicarboxylic acid." Examples of these esters include dimethyl 1,4-cyclohexanedicarboxylate; dimethyl 2,5-naphthalenedicarboxylate; dibutyl, 4,4'-sulfonyldibenzoate; dimethyl isophthalate; dimethyl terephathalate; and diphenyl terephthalate. Copolyesters may be prepared from two or more of the above dicarboxylic acids or derivatives thereof.

Examples of suitable glycols include poly(ethylene glycols) such as diethylene glycol, triethylene glycol, tetraethylene glycol, and pentaethylene, hexaethylene, heptaethylene, octaethylene, nonaethylene, and decaethylene glycols, and mixtures thereof. Preferably the poly (ethylene glycol) employed in the present invention is diethylene glycol or triethylene glycol or mixtures thereof. The remaining portion of the glycol component may consist of aliphatic, alicyclic, and aralkyl glycols. Examples of these glycols include ethylene glycol; propylene glycol; 1,3-propanediol; 2,4-dimethyl-2-ethylhexane-1,3,diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2-4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol. Copolymers may be prepared from two or more of the above glycols.

The difunctional sulfo-monomer component of the sulfonated polyester may advantageously be a dicarboxylic acid or an ester thereof containing a metal sulfonate group or a glycol containing a metal sulfonate group or a hydroxy acid containing metal sulfonate group.

Advantageous difunctional sulfo-monomer components are those wherein the sulfonate salt group is attached to an aromatic acid nucleus such as benzene, naphthalene, diphenyl, oxydiphenyl, sulfonyldiphenyl, or methylenediphenyl nucleus. Particular examples include sulfophthalic acid, sulfoterephthalic acid, sulfoisophthalic acid, 4-sulfonaphthalene-2,7-dicarboxylic acid, and their esters; metalosulfoaryl sulfonate having the general formula.

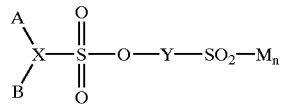

wherein X is a trivalent aromatic radical derived from a substituted or unsubstituted aromatic hydrocarbon, Y is a divalent aromatic radical derived from a substituted or unsubstituted aromatic hydrocarbon, A and B are carboalkoxy groups containing 1 to 4 carbon atoms in the alkyl portion or a carboxy group, the metal ion M is $Li^+$, $Na^+$, $K^+$, $Mg^{++}$, $Ca^{++}$, $Ba^{++}$, $Cu^{++}$, $Fe^{+++}$, and n is 1 for monovalent M or 2 for divalent M or 3 for trivalent M. When a monovalent alkali metal ion is used, the resulting sulfonated polyesters are less readily dissipated by cold water and more rapidly dissipated by hot water. When a divalent or a trivalent metal ion is used, the resulting sulfonated polyesters are not ordinarily easily dissipated by cold water, but are more readily dissipated in hot water. Depending on the end use of the polymer, either of the different sets of properties may be desirable. It is possible to prepare the sulfonated polyester using, for example, a sodium sulfonate salt and later by ion-exchange replace this ion with a different ion, for example, calcium, and thus alter the characteristics of the polymer. In general, this procedure is superior to preparing the polymer with divalent metal salt inasmuch as the sodium salts may be more soluble in the polymer manufacturing components than are the divalent metal salts. Polymers containing divalent or trivalent metal ions are less elastic and rubber-like than polymers containing monovalent ions. One such metallosulfoaryl sulfonate component may be prepared as shown by the following general reactions:

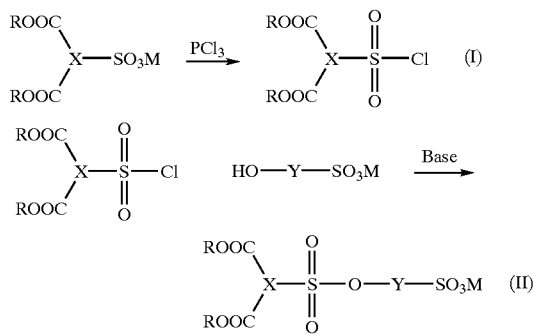

and other chlorinating agents (e.g., thionyl chloride, phosphorus trichloride, phosphorous oxychloride) may be used. In addition, the reaction between the sulfonyl chloride and the sulfophenol may be carried out in water or an inert organic solvent, and the base used may be an alkali metal hydroxide or a tertiary amine. Such suitable compounds are disclosed in U.S. Pat. No. 3,734,874.

Optionally, the polycondensation reaction may be carried out in the presence of one or more of the following:
(d) an unsaturated mono- or dicarboxylic acid; and,
(e) a difunctional hydroxycarboxylic acid having one —$CH_2$—OH group, an aminocarboxylic acid having one —NRH group, an amino alcohol having one —$CR_2$—CH and one —NRH group, a diamine having two —NRH groups, or a mixture thereof, wherein each R is hydrogen or a $C_{1-4}$ alkyl group.

The α,β-unsaturated acids (d) are described by the following structure:

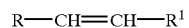

wherein R is H, alkylcarboxy, or arylcarboxy and $R^1$ is carboxy or arylcarboxy. Polymers derived from the above components can be used in combination with polymers derived from other components and/or in combination with other ethylenically unsaturated comonomers (e.g., acrylic acid, acrylamide, butyl acrylate, diacetone acrylamide). The comonomers can be from 1–75 parts by weight, preferably 5–25 parts by weight α,β-unsaturated acids.

Advantageous difunctional components which are aminoalchohols include aromatic, aliphatic, heterocyclic and other types as in regard to component (e). Specific examples include 5-aminopentanol-1,4-aminomethylcyclohexanemethanol, 5-amino-2-ethyl-pentanol-1,2-(4-β-hydroxyethoxyphenyl)-1-aminoethane, 3-amino-2,2-dimethylpropanol, hydroxyethylamine, etc. Generally these aminoalcohols contain from 2 to 20 carbon atoms, one —NRH group and one —$CR_2$—OH group.

Such difunctional monomer components which are aminocarboxylic acids include aromatic, aliphatic, heterocyclic, and other types as in regard to component (c) and include lactams. Specific examples include 6-aminocaproic acid, its lactam known as caprolactam, omegaaminoundecanoic acid, 3-amino-2-dimethylpropionic acid, 4-(β-aminoethyl) benzoic acid, 2(β-aminopropoxy)benzoic acid, 4-aminomethylcyclohexanecarboxylic acid, 2-(β-aminopropoxy)cyclohexanecarboxylic acid, etc. Generally these compounds contain from 2 to 20 carbon atoms.

Examples of such difunctional monomer component (e) which are diamines include ethylenediamine; hexamethylenediamine; 2,2,4-trimethylhexamethylenediamine; 4-oxaheptane-1,7-diamine; 4,7-dioxadecane-1,10-diamine; 1,4-cyclohexanebismethylamine; 1,3-cycloheptamethylenediamine; dodecamethylenediamine, etc.

Greater dissipatability is achieved when the difunctional sulfo-monomer constitutes from about 6 mole percent to about 25 mole percent out of a total of 200 mole percent of (a), (b), (c), (d), and any (e) components of the polyester or polyesteramide. The total of 200 mole percent can also be referred to as 200 mole parts.

Any of the above-identified difunctional monomers generally contain hydrocarbon moieties having from 1 to about 40 carbon atoms in addition to their two functional groups, but they may in general also contain up to six non-functional groups such as —O—, —S—, —$SO_2$—, —$SO_2$—O—, etc. For example, the poly(ethylene glycol) monomer used may contain from 1 to about 19 oxy groups, such as —O— groups.

In a preferred embodiment, the ionomer is one of the sulfonated polyesters sold by Eastman Chemical Company, Kingsport, Tenn. (hereafter "Eastman"). which are water dispersible, linear or branched polyesters formed by the polycondensation of glycols with dicarboxylic acids, some of which contain sodiosulfo groups. Sulfopolyester hybrids may also be employed which are formed by the in situ polymerization of vinyl and/or acrylic monomers in water dispersions of SULFOPOLYESTER. Such Eastman sulfonated polyesters may be purchased from Eastman under nos. AQ1045, AQ1350, AQ1950, AQ14000, AQ35S, AQ38S, AQ55S and EASTEK 1300.

The sulfonated polyesters and copolymers thereof may range from about 10 to about 90 weight percent, more preferably, about 60 to 80 weight percent, most preferably about 70 weight percent of the total composition. Depending upon the intended application, the polar carrier may range from about 10 to about 90 weight percent, more preferably, about 13 to about 30 weight percent, more preferably, about 15 to 25 weight, most preferably, about 30 weight percent of the total composition. One or more of the other additives described herein may be added to such compositions to modulate the adhesive or other properties of the composition.

Compositions comprising branched sulfonated polyesters tend to give clear, tacky and flexible films. Compositions comprising linear sulfonated polyesters tend to give clear or white, tack-free, flexible films.

Other sulfonated polymers that can be used in the practice of the invention include acrylaminopropane sulfonate (AMPS) based polymers (e.g. 2-acrylamido-2-methylpropanesulfonic acid and its sodium salt available from Lubrizol Process Chemicals). In addition, urethane ionomers can be prepared by reacting a diisocyanate with a diol that has sulfonate functionality (e.g. butane diol sulfonate).

B. Acrylic Acid and Maleic Anhydride Polymers and Copolymers

Other ionomers include acrylic acid polymers and copolymers and salts thereof Such polymers and copolymers are described in U.S. Pat. Nos. 5,821,294, 5,717,015, 5,719,244, 5,670,566, 5,618,876, 5,532,300, 5,530,056, 5,519,072, 5,371,133, 5,319,020, 5,037,700, 4,713,263, 4,696,951, 4,692,366, 4,617,343, 4,948,822, and 4,278,578.

The invention relates to compositions comprising the acrylic acid polymers and copolymers thereof with a polar carrier as described herein as well as the adhesive compositions described in these patents (comprising the acrylic acid polymers and copolymers thereof) together with the polar carrier.

Specific examples of such acrylic acid copolymers include ethylene acrylic acid copolymer and the ammonium (MICHEM 4983P) and sodium (MICHEM 48525P) salts thereof available from Michelman Incorporated, Cincinnati, Ohio. A further example is vinyl acetate acrylic copolymers (e.g. ROVACE HP3442) available from Rohm and Hass, Philadelphia, Pa. A still further example are the random copolymers of ethylene acrylic acid such as AClyn 285, available from Honeywell, Morristown, N.J.

The acrylic acid polymers and copolymers may range from about 10 to about 90 weight percent, more preferably, about 40 to 80 weight percent, most preferably about 50–70 weight percent of the total composition. Depending upon the application, the polar carrier may range from about 10 to about 90 weight percent, more preferably, about 13 to about 30 weight percent, more preferably, about 15–25 weight percent, most preferably, about 30 weight percent of the total composition. One or more of the other additives described herein may be added to such compositions to modulate the adhesive or other properties of the composition.

Compositions comprising ethylene acrylic acid copolymers and a polar carrier tend to give clear, colorless, tack-free films with very good adhesion that heat in well under one second when exposed to RF. Vinyl acetate acrylic copolymer compositions tend to give clear, colorless, flexible but very tacky films with very good adhesion that heat in well under one second when exposed to RF.

In a preferred embodiment, compositions comprising acrylic acid polymers or coplymers are applied as liquid dispersions and dried into an RF susceptive coating.

Alternatively, maleic anhydride based copolymers such styrene maleic anhydride, ethylene maleic anhydride, and propylene maleic anhydride (available from Eastman Chemicals) may be employed as an ionomer. Such compositions are preferably applied as an aqueous dispersion at room temperature and dried into an RF susceptive coating.

C. Starch/Polysaccharide Derivatives

Other ionomers include starch and polysaccharide derivatives such as polysulfonated or polysulfated derivatives, including dextran sulfate, pentosan polysulfate, heparin, heparan sulfate, dermatan sulfate, chondroitin sulfate, a proteoglycan and the like. Dextran sulfate is available from Sigma Chemical Corporation, St. Louis, Mo., with molecular weights of 10,000, 8,000 and 5,000. Examples of other ionic polysaccharides include carrageenan, chitosan, xanthan gum, etc.

Phosphorylated starch as disclosed in U.S. Pat. No. 5,329,004 may be employed as an ionomer.

The starch/polysaccharide derivatives may range from about 10 to about 90 weight percent, more preferably, about 60 to 80 weight percent, most preferably about 70 weight percent of the total composition. Depending on the application, the polar carrier may range from about 10 to about 90 weight percent, more preferably, about 13 to about 30 weight percent, more preferably, about 15–25 weight percent, most preferably, about 30 weight percent of the total composition. One or more of the other additives described herein may be added to such compositions to modulate the adhesive or other properties of the composition.

D. Proteins

Other ionomer adhesives include proteins such as gelatin, soy protein, casein, etc. Gelatin is the purified protein derived from the selective hydrolysis of collagen. Collagen is the principal organic component of the bones and skin of mammals. Common raw materials include bones, cattle hides and pigskins. Gelatins are classified as either acid type (A type) or limed (B type) according to the process by which they are made. Particular examples of gelatins include KNOX gelatin as well as types P, D, D-I, LB, LM and K, available from PB Gelatins. See also the gelatin described in U.S. Pat. No. 5,877,287. In a preferred embodiment, the gelatin is 45Y56-853-3V0-6CS, available from Eastman Gelatin, Peabody, Mass. Alternatively, a gelatin-modified polyurethane as disclosed in U.S. Pat. No. 5,948,857 may be used.

In a preferred embodiment, the pH of the gelatin is raised or lowered in order to enhance the ionomeric character of the gelatin. The pH may be raised by the addition of aqueous base to an aqueous solution or suspension of the gelatin. Examples of suitable bases include alkali metal hydroxides, alkali metal carbonates and bicarbonates, alkali metal acetates, ammonia, amino compounds such as methylamine, dimethylamine, trimethylamine, triethylamine, and the like. Alternatively, a basic buffer solution may be added, e.g. a solution comprising 2-amino-2-methyl-1-propanol; or a glycine buffer at pH 9.4 and 10.4; each of which is available from Sigma Chemical Corporation, St. Louis, Mo. Other buffers include 0.01 borax (pH 9.2), TRIS (pH 7–9.1 depending on concentration), 0.05 M carbonate (pH 9.93), and 0.05 M trisodium phosphate (pH 12). See "The Chemist's Companion," A. J. Gordon and R. A. Ford, John Wiley & Sons, New York, N.Y., 1972. The pH may be lowered by the addition of an acid such as HCl, HBr, $H_2SO_4$, $H_3PO_4$, or an organic acid such as $C_{1-4}$ alkanoic acid (e.g. acetic acid, propionic acid or butyric acid), an arylcarboxylic acid (e.g. benzoic acid), or arylsulfonic acid (e.g. p-toluenesulfonic acid). Alternatively, an acidic buffer may be added, e.g. acetate buffer at pH 4.5, 4.9 and 5.0; citrate buffer at pH 4.8; or a phosphate-citrate buffer at pH 5.0; each of which is available from Sigma Chemical Corporation. Other buffers include 0.005 M potassium tetraoxalate (pH 1.7), saturated potassium tartrate (pH 3.6), 0.05 M potassium phthalate (pH 4.0), and 0.05 M sodium succinate (pH 5.3). See "The Chemist's Companion," A. J. Gordon and R. A. Ford, John Wiley & Sons, New York, N.Y., 1972. It has been discovered unexpectedly that when the pH of the gelatin composition is shifted into the acidic or basic range, the composition exhibits enhanced heating in an RF field compared to the untreated gelatin. The best heating occurs when the pH is low. Such gelatin compositions give flexible films that attach well to substrates and heat in under one second.

In a preferred embodiment, the pH of the gelatin may range from about 8 to about 12. In a most preferred embodiment, the pH of the gelatin is about 10. In another preferred embodiment, the pH of the gelatin may range from about 1 to about 6. In a most preferred embodiment, the pH of the gelatin is about 2.

The gelatin may range from about 10 to about 90 weight percent, more preferably, about 60 to 80 weight percent, most preferably about 70 weight percent of the total composition. Depending on the application, the polar carrier may range from about 10 to about 90 weight percent, more preferably, about 13 to about 30 weight percent, more preferably about 15–25 weight percent, most preferably, about 30 weight percent of the total composition. One or more of the other additives described herein may be added to such compositions to modulate the adhesive or other properties of the composition.

E. Others

Other ionomers that may be used in the practice of the invention include sulfonated novolak resins obtained by a process comprising reacting an aromatic compound with a sulfonated agent to form a sulfonated aromatic compound, condensing the sulfonated aromatic compound with a non-sulfonated phenolic compound and an aldehyde or aldehyde precursor to form a sulfonated condensate, and reacting the condensate with a monovalent or divalent metal oxide, hydroxide, carbonic acid, boronic acid or carboxylic acid. See U.S. Pat. No. 5,098,774. Other ionomers that can be used are lignosulfonates and their sodium salts which are available with different molecular weights and levels of sulfonation from Westvaco, North Charleson, S.C.

In addition, urethane ionomers can be prepared by reacting a diisocyanate with a diol that has carboxy functionality (e.g. dimethylol).

IV. THE POLOR CARRIER

In a preferred embodiment, the ionomer is combined with a carrier that is a flowable polar compound, such as a polar solvent, having a high dielectric constant, e.g. $\in (20° C.) \geq$ about 10, more preferably, $\geq$ about 20. A preferred dielectric constant range is about 13–63 (25° C.), more preferably, about 17–43 (25° C.). It has been unexpectedly discovered that compositions comprising an ionomer and such a carrier heat much more rapidly when exposed to RF energy, even at low levels, compared to when the ionomer or carrier are exposed separately. Without being bound by any particular theory, it is believed that upon exposure to RF energy, the polar carrier allows for the migration and/or vibration of protons or metal ions from the ionomer, resulting in the generation of heat.

Such polar carriers include, but are not limited to, water, dimethylformamide (DMF), dimethylacetamide (DMAC), dimethylsulfoxide (DMSO), tetrahydrofuran (THF), polypropylene carbonates, ketones (such as acetone, acetyl acetone, cyclohexanone, diacetone alcohol, and isophorone), alcohols (such as ethanol, propanol, 2-methyl-1-propanol, and the like) amino alcohols (such as ethanolamine), oxazolidines, polyols, organic acids (such as formic, acetic, propionic, butyric and dimethylol butyric acid and the like), anhydrides (such as acetic anhydride and maleic anhydride), amides (such as formamide, acetamide and propionamide), nitrites (such as acetonitrile and propionitrile), and nitro compounds (such as nitrobenzene, nitroaniline, nitrotoluene, nitroglycerin and any of the nitroparaffins). Any polar carrier that can weaken, to some degree, the ionic interaction between the anion and cation of the ionomer may be utilized in the present invention.

Preferred polar carriers are humectants (e.g., glycerin, 1,2-propanediol and polyethyleneglycol), i.e., they retain at least a low level of moisture after application. It is believed that the low level of residual moisture enhances the RF activation of the compositions. Compositions comprising such polar carriers are considered to be dried, e.g. by conventional oven drying, forced air, heat lamps, microwave heating, RF heating or various combinations of these or other methods, even though a low level of residual moisture may be present. In a preferred embodiment, no more that about 5 weight percent water is present in such dried compositions.

Examples of polyols that may be used as a polar carrier include glycols such as diethylene glycol, triethylene glycol, tetraethylene glycol, dipropylene glycol, thioethylene glycol, and pentaethylene, hexaethylene, heptaethylene, octaethylene, nonaethylene, and decaethylene glycols, and mixtures thereof, as well as aliphatic, alicyclic, and aralkyl glycols. Particular examples of these glycols include ethylene glycol; 1,2-propylene glycol; 1,3-propanediol; 2,4-dimethyl-2-ethylhexane-1,3,diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2-4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol. Also included are polyethylene glycols, e.g. having weight average molecular weights ranging from about 400 to about 2,000; mixed poly(ethylene)-poly(propylene) glycols having weight average molecular weights ranging up to about 6,000 and containing from about 30 to about 90 weight percent ethylene oxide; the monomethyl, monoethyl and monobutyl ethers of ethylene glycol, propylene glycol and diethylene glycol, the monomethyl and monoethyl ethers of triethylene glycol; the dimethyl and diethyl ethers of diethylene glycol, dipropylene glycol and trimethylene glycol. Examples of polyols containing three or more hydroxy groups include glycerin and derivatives of glycerin such as glycerol mono-, di-, and triacetate, or monomethacrylate. Also included is polyvinylalcohol, which also functions as an adhesive compound. Polyvinylalcohols of molecular weights 89,000–98,000, 85,000–146,000, 124,000–186,000, 31,000–50,000, 85,000–146,000, 124,000–186,000, 13,000–23,000, 50,000–85,000, with various levels of hydrolysis, are available from Aldrich Chemical Company.

The polar carrier may also be an alkanolamine and substituted alkanolamine based on ethanol and isopropanol such as mono-, di- and triethanolamine, mono-, di- and triisopropanolamine, methylethanolamine, dibutylethanolamine, phenyldiethanolamine, di-(2-ethylhexyl)ethanolamine, dimethylisopropanolamine, dibutylisopropanolamine, and the like as well as mixtures thereof.

N-Alkyl sulfonamides are also useful carriers.

The present invention is not restricted to the listed carriers, and mixtures of carriers may be utilized, as would be apparent to those of skill in the art. Such polar carriers may comprise about 10 to 90 weight percent of the composition. In a preferred embodiment, the polar carrier comprises about 30 weight percent of the total composition. In a more preferred embodiment, the polar carrier comprises about 13–25% weight percent, more preferably, about 15–25 weight percent, most preferably, about 20–23 weight percent. At these percentages, very short heating times are possible while retaining acceptable shear strength of the bond. Thus, very good adhesion/bonding results are obtained when the weight ratio of polar carrier to ionomer ranges from about 13/87 to about 25/75.

As is well understood in the art of adhesives, coatings and sealants, low molecular weight polar carriers may act additionally as plasticizers to the compositions to which they are added. Furthermore, excessive amounts of a component that behaves as a plasticizer may have detrimental effects on the characteristics of the desired adhesive, sealant or coating, such as low cohesion, increased tackiness, or increased tendency of the composition to exude the excess plasticizing component. Therefore, a balance between achieving fast rates of RF-heating and achieving the desired physical properties as dictated by the desired end use of the composition must be considered. Certainly, a conservative maximum limit on the ratio of polar carrier material to ionomer to achieve optimum RF heating rates could be initially set at about 30/70. Ratios in excess of 30/70 would be used only if some other effect that results from increasing the ratio, such as increased tack and lower cohesion is desired or acceptable.

The lower limit of the ratio of polar carrier material to ionomer can be set according to the desired increase in the rate of RF heating relative to the neat ionomeric RF-susceptor material. Certainly, ratios as low as 5/95 can have a significant enough effect to be considered for applications where minimal increases in RF-heating rates are desired.

Preferable high dielectric constant carriers are those that can generate heat without being highly volatile, in order to preserve RF susceptor mobility in the composition. Preferred carriers are glycols such as glycerin and N-methyl pyrrolidone (NMP). NMP has a high dipole moment of 4.09 Debye, which produces a dielectric constant, K, of 32.2 at 25° C. NMP is noncorrosive, biodegradable, and almost odorless. NMP has a low order of oral toxicity and is neither a skin irritant nor a sensitizer. NMP is also an excellent solvent both for a wide range of organic compounds and polymers, as well as for some inorganic salts. In short, it is a very useful medium for dissolving or dispersing ionomers and film formers that are employed in the bonding or adhering of substrates or layers according to the present invention.

A further preferred high dielectric constant carrier is glycerin. Glycerin has a dielectric constant of 42.5 at 25° C., is noncorrosive, biodegradable, and odorless. Glycerin is nontoxic and is neither a skin irritant nor a sensitizer. Thus, glycerin is a preferred carrier for consumer products containing adhesives and coatings. Glycerin is also an excellent solvent both for a wide range of organic compounds and polymers, as well as for some inorganic salts.

Various additives described herein can be compounded with a base composition, comprising at least a polar carrier and an ionomer. The additives may be added in order to achieve a variety of desired properties for the target adhesive, coating or sealant that are balanced with the RF-heating rate of the base composition.

The susceptor composition can be used to bond or adhere substrates or layers to one another. The substrates can include single layers of polyolefins and non-polyolefins, as well as multilayer stacks. Such stacks may comprise 2, 3, 4, 5 or more layers. One or more susceptor compositions, which may be the same or different, may be between 2 or more layers of the multilayer stacks. All composition concentrations described herein correspond to weight-weight percentages, unless indicated otherwise.

V. FURTHER ADDITIVES TO THE SUSCEPTOR COMPOSITIONS

A number of different additives may be added to the susceptor compositions of the present invention including the carrier or mobile medium. In order to provide uniform heating of a susceptor composition, the ionomers are dissolved, distributed, or dispersed, preferably substantially uniformly, in a carrier containing either various polymers and/or solvents or plastisizers. Some carriers, such as solvents, plastizisers, or polymers, are utilized for their polar functionality and for their ability to enhance the heating process.

A. Adhesive/Thermoplastic Additives

The adhesive properties of the susceptor composition of the present invention are enhanced by the presence of one or more thermoplastic or adhesive compounds, such as polymers or copolymers, that are blended in the susceptor composition. Some of the thermoplastic or adhesive compounds utilized in the present invention include, but are not limited to, polyesters such as a thermoplastic methylol polyester prepared from the reaction of at least one dicarboxylic acid with a diglycidyl ether, a diglycidyl ester or combination thereof (see U.S. Pat. No. 5,583,187) or a cyanoacrylate/polyester adhesive composition (see U.S. Pat. No. 5,340,873); polyamides; polyurethanes (see U.S. Pat. No. 5,391,602); polysiloxanes; elastomers; polyvinylpyrrolidone; ethylene vinyl acetate copolymers (see U.S. Pat. No. 4,460,728), vinylpyrrolidone vinyl acetate copolymers; vinyl ether copolymers (e.g. polyvinyl methyl ether); polyvinyl alcohol; partially hydrolyzed polyvinyl acetate; copolymers comprising a starch ester (see U.S. Pat. No. 5,498,224) and starch hydrolysates (see U.S. Pat. No. 5,827,553); graft copolymer prepared from a vinyl monomer and a polyalkylene oxide polymer, and a hydroxy-containing ester or acid wax (see U.S. Pat. No. 5,852,080); copolymers comprising a graft copolymer prepared from a vinyl monomer, at least one polyalkylene oxide polymer, a polar wax and other optional ingredients (see U.S. Pat. No. 5,453,144); thermoplastic block copolymers comprising an aromatic vinyl copolymer block, a diene polymer or hydrogenated derivative thereof and other additives (see U.S. Pat. No. 5,723,222); vinyl chloride copolymers; vinylidene chloride copolymers; vinylidene fluoride copolymers; vinyl pyrrolidone homo- and copolymers; vinyl pyridine homo- and copolymers; hydrolyzed polyvinyl alcohol and compositions thereof (see U.S. Pat. No. 5,434,216); cellulose esters (e.g. cellulose acetate and starch acetate, see U.S. Pat. No. 5,360,845) and ethers (e.g. hydroxypropyl cellulose, methyl cellulose, ethyl cellulose, propyl cellulose and the like; see U.S. Pat. No. 5,575,840, 5,456,936 and 5,356,963); modified starch ester containing adhesives (see U.S. Pat. No. 5,360,845); high amylose starch containing adhesive (see U.S. Pat. No. 5,405,437); poly-alpha olefins; propylene homo- and copolymers; ethylene homo- and copolymers (especially those of vinyl acetate, vinyl alcohol, ethyl- and butyl- acrylate, carbon monoxide, acrylic and methacrylic acid, crotonic acid, and maleic anhydride), an alkyl acrylate hot melt adhesive (see U.S. Pat. No. 4,588,767), a hot melt adhesive comprising an alkyl acrylate and an alpha-olefin (see U.S. Pat. No. 4,535,140), a hot melt adhesive comprising an ethylene n-butyl acrylate copolymer (see U.S. Pat. No. 5,331,033), a hot melt adhesive comprising a graft copolymer comprising at least one vinyl monomer and at least one polyalkylene oxide polymer (see U.S. Pat. No. 5,217,798), a vinyl acetate copolymer copolymerized with a cyclic ureido compound (see U.S. Pat. No. 5,208,285), a hydrophilic polycarbodiimide (see U.S. Pat. No. 5,100,994), a photopolymerized, pressure sensitive adhesive comprising an alkyl acrylate, a monethylenically unsaturated polar copolymerizable monomer, ethylene vinylacetate copolymer and a photo initiator (see U.S. Pat. No. 5,079,047), a hot melt adhesive comprising tackifying resins, oil diluent, and a substantially radial styrene-butadiene block copolymer (U.S. Pat. No. 4,944,993), an adhesive prepared from the vinyl ester of an alkanoic acid, ethylene, a dialkyl maleate, an N-methylol comonomer, and an ethylenically unsaturated mono- or dicarboxylic acid (see U.S. Pat. No. 4,911,960), an adhesive prepared from the vinyl ester of an alkenoic acid, ethylene, a dialkyl maleate, and a monocarboxylic acid (see U.S. Pat. No. 4,892,917), a hot melt adhesive consisting essentially of an ethylene n-butyl acrylate copolymer (U.S. Pat. No. 4,874,804), hot melt adhesive compositions prepared from styrene-ethylene-butylene-styrene tri-block and/or styrene-ethylene-butylene di-block copolymers that are tackified (U.S. Pat. No. 4,822,653), a hot melt packaging adhesive comprising a ethylene n-butyl acrylate copolymer with n-butyl acrylate (U.S. Pat. No. 4,816,306), polysaccharide esters containing acetal and aldehyde groups (U.S. Pat. No. 4,801,699), polysaccharide aldehyde derivatives (U.S. Pat. No. 4,788,280), an alkaline adhesive comprising a latex polymer or a halohydrin quaternary ammonium monomer and starch (U.S. Pat. No. 4,775,706), polymeric fatty acid polyamides (U.S. Pat. No. Pat. No. 4,419,494), hot melt adhesives comprising resins containing 2-methylstyrene, styrene and a phenol (U.S. Pat. No. 4,412,030). The present invention is not restricted to the listed adhesive compounds and compositions, as would be apparent to those of skill in the art. Preferred adhesive compounds include random copolymers of ethylene vinyl acetate (e.g. ELVAX), polyolefin polymers (e.g. EPOLENE), homopolymers of amorphous polypropylene, and amorphous polypropylene-polyethylene copolymers (e.g. EASTOFLEX).

Such adhesive additives may comprise about 1 to 50 weight percent of the composition, more preferably, from about 20 to about 40 weight percent.

B. Adhesive/Coating Thermoset Additives

It is also possible to add a thermoset resin to the susceptor compositions of the present invention. Such thermosets are capable of being cross-linked or cured through heat and/or catalysts and include those described in U.S. Pat. No. 5,182,134, e.g. epoxies, polyurethanes, curable polyesters, hybrid thermosets, and curable acrylics. Others include bismaleimides, silicons, phenolics, polyamids and polysulfides among others. Further examples include maleate resins formed by the reaction of various polyols with maleic anhydride. Orthophthalic resins may be used which are formed by the reaction of phthalic anhydride and maleic anhydride or fumaric anhydride as the dibasic acid. Isophthalic resins may also be used which may be formed by reacting isophthalic acid and maleic anhydride. Others include the bis-phenol fumarides, chlorendic polyester resins, vinyl esters, dicyclopentadiene resins, orthotolyl biguanine, the diglycidyl ether formed from bis-phenol A and epichlorohydrin, triglycidyl isocyanurate thermosetting compositions, bis-phenol A-epichlorohydrin diglycidyl ether cured with phenolic cross-linking agents, aliphatic urethane thermosetting compositions such as an unblocked isofuron diisocyanate-E-caprolactam, BTDA thermosetting compositions which are generally the reaction product of 3,3,4,4-benzophenone tetracarboxylic dianhydride and a bis-phenol A-epichlorohydrin diglycidyl ether, hybrid thermosetting compositions which are the reaction product of a carboxylated saturated polyester curing agents and bis-phenol A-epichlorohydrin diglycidyl ether, standard bis-phenol A-epichlorohydrin diglycidyl thermosets such as those which are cured from 2-methylimidazole, and standard bis-phenol A-epichlorohydrin diglycidyl ether thermosets which are cured with 2-methylimidazole and dicyandiamide thermosetting compositions. See U.S. Pat. Nos. 5,182,134, 5,387,623

Other thermosets and adhesives/coatings that may be added to the susceptor compositions of the invention include a reactive polyurethane prepolymer and 2,2'-dimorpholinoethyl ether or di(2,6-dimethylmorpholinylethyl) ether catalyst (see U.S. Pat. No. 5,550,191), a free radical polymerizable acrylic monomer, diazonium salt/activator composition (see U.S. Pat. No. 4,602,073), a diphenylmethane diisocyanate, a caprolactone triol, a neopentyl adipate ester diol, and, optionally, at least one polypropylene diol together with a catalyst (U.S. Pat. No. 5,057,568), an aqueous polyurethane dispersion comprising an isocyanate-terminated polyurethane prepolymer containing carboxylic acid salt groups, and an active hydrogen containing chain extender (U.S. Pat. No. 4,801,644).

The susceptor compositions of the present invention may also be combined with a shelf stable thermosetting resin as described in U.S. Pat. No. 5,739,184, which is then activated by RF energy to give coatings, e.g. for wood or paper products. This thermosetting resin comprises an epoxy resin, a rosin and an organometallic compound in an amount effective to provide improved adhesion to wood or paper substrates.

Curing agents may also be combined together with the susceptor/thermoset compositions of the invention, including melamines such as dialkyl melamines, amides such as dicyandiamide, adipamide, isophthalyl diamide, ureas such as ethylene thiourea or guanylurea, azides such as thiosemicarbazide, azoles such as guanazole or 3-amino-1, 2,4-triazole, and anilines such as dialkylanilines such as dimethyl aniline and diethyl aniline.

Such thermoset additives may comprise about 1 to 50 weight percent of the composition, more preferably, up to about 40 weight percent.

C. Surfactant Additives

According to another embodiment of the present invention, surfactant additives can be added to the susceptor composition to enhance the ability to draw down the susceptor composition of the present invention onto the layers or substrates to be bonded, adhered or coated. Depending on the types of materials that are to be joined or coated, surfactant additives, such as SURFYNOL 104PA (available from Air Products Corporation) and SURFADONE LP 300 (N-dodecyl-2-pyrrolidone, available from International Specialty Products), can be used to wet a variety of substrates such as Mylar and polyethylene (PE). A further plasticizer is p-toluenesulfonamide, a good plasticizer that also dissolves stannous chloride. The present invention is not restricted to the listed surfactant additives, as would be apparent to those of skill in the art. Such surfactants may comprise about 0.1 to 5 weight percent of the composition.

D. Plasticizer Additives

The susceptor compositions of the present invention may further comprise a plasticizer to modify the flexibility of the adhesive or coating. Examples of such plasticizers include, but are not limited to acetyl tributyl citrate, butyl benzyl phthalate, butyl phthalyl butyl glycolate, dibutyl phthalate, dibutyl sebacate, diethyl phthalate, diethylene glycol dibenzoate, dipropylene glycol, dipropylene glycol dibenzoate, ethyl phthalyl ethyl glycolate, ethyl-p-toluene sulfonamide, hexylene glycol, methyl phthalyl ethyl glycolate, polyoxyethylene aryl ester, tributoxyethyl phthalate, triethylene glycol polyester of benzoic acid and phthalic acid, glycerin, or mixtures thereof. Other plasticizers that may be used include N-methyl-2-pyrrolidone (NMP), and substituted toluene sulfonamides (e.g. p-toluenesulfonamide, RIT-CIZER #8™ and RIT-O-LITE MHP™ from Rit-Chem Co., Inc., Pleasantville, N.Y.), and low molecular weight polyethylene (e.g. PEG200, available from Union Carbide). Such plasticizers may comprise about 1 to 40 weight percent of the composition.

E. Tackifiers

The tackiness of the compositions of the invention may be increased by the addition of a suitable tackifier, e.g. one or more of hydrogenated aromatic petroleum resins, hydrogenated aliphatic petroleum resins, and hydrogenated terpene resins (see U.S. Pat. No. 5,418,052), coumarone-indene, ester gum, gum rosin, hydrogenated rosin, phenolic modified hydrocarbon resins, rosin esters, tall oil rosins, terpene phenolic, terpene resins, toluene sulfonamide-formaldehyde resin, wood rosin (see U.S. Pat. No. 5,442,001), distilled rosin, dimerized rosin, maleated rosin, polymerized rosin (see U.S. Pat. No. 5,532,306). Other tackifiers and modifiers, include (but are not limited to) styrene and alpha methyl styrene resins, glycerol and pentaerithritol esters, etc. Particular tackifiers include WINGTACK 95 from Goodyear, Herculin D and PICCOLYTE C from Hercules, EASTO-TACK H100 from Eastman, ECR 149B or ECR 179A from Exxon Chemical (see U.S. Pat. No. 5,559,165), and Foral AX, from Hercules. Other tackifiers include rosin and its derivatives available from Reichold Chemicals, Manila Copal (softening point 81–90° C. acid No. 110-141), Pontianac (softening point 99–135° C. acid No. 1120129), and Sanarec (softening point 100–130° C., acid no. 117-155). Zwitterionic tackifiers may also be used. See U.S. Pat. No. 6,106,940. Such tackifiers may comprise about 1 to 25 weight percent of the composition.

F. Fillers

A number of different fillers may be added to the susceptor compositions of the invention, including, but not limited to cellulose, bentonite, calcium carbonate, calcium silicate, clay, mica silica, talc, alumina, glass beads, fibers and the like. Such fillers may comprise about 0 to 40 weight percent of the composition.

G. Stabilizers and Antioxidants

Stabilizers and antioxidants may be added to the susceptor compositions of the invention in amounts effective to achieve the intended result. Included among such stabilizers include high molecular weight hindered phenols and multifunctional phenols such as sulfur and phosphorous-containing phenols. Representative hindered phenols include 1,3,5-trimethyl-2,4,6-tris(3,5-di-tert-butyl-4-hydroxybenzyl)benzene, pentaerythritol tetrakis-3-(3,5-di-tert-butyl-4-hydroxypropionate, n-octadecyl-3,5-di-tert-butyl-4-hydroxyphenyl)propionate, 4,4'-methylenebis(2,6-di-tert-butylphenol), 4,4'-thiobis (6-tert-butyl-o-cresol),2,6-di-tert-butylphenol, 6-(4-hydroxyphenoxy)-2,4-bis(n-octylthio)-1,3,5-triazine, di-n-octadecyl-3,5-di-tert-butyl-4-hydroxybenzylphosphonate, 2-(n-octylthio)ethyl-3,5-di-tert-butyl-4-hydroxybenzoate, and sorbitol hexa[3-(3,5-di-tert-butyl-4-hydroxylphenyl)propionate (see U.S. Pat. No. 5,574,076). Such stabilizers and antioxidants may comprise about 0.01 to 5 weight percent of the composition.

H. Other Additives

According to another embodiment of the present invention, other types of additives to the susceptor composition may include flow aids, heat and UV stabilizers, coupling agents, waxes, pigments and other organic compounds. For example, in some instances, waxes can facilitate lower melt temperatures. Waxes that can be utilized include, but are not limited to, Bees wax (SYNCHROWAX BB4), Candelilla wax, CARBOWAX 3350 (available from Union Carbide Corporation), Carnauba wax, and CASTORWAX NF. Other waxes include poly(ethylene oxide) having a molar average molecular weight of above about 1000, and functionalized synthetic waxes such as carbonyl containing ESCOMER H101 from Exxon (see U.S. Pat. No. 5,532, 306).

Preferably, the polar wax is a crystalline wax as described in U.S. Pat. No. 5,750,605. Such crystalline polar waxes contain at least one polar functional group such as hydroxyl, amide, sulfone, phosphate, sulfonamide, urethane, carboxylic acid amine and carbonate. The polar functional group should be present at a concentration of greater than $3 \times 10^{-3}$ equivalents per gram. In addition, the molecular weight should be below 500 g/mole. Such crystalline polar waxes include N-(2-hydroxyethyl)-2,2'-ethylene-bis-stearamide, stearamide (available from Witco), 12-hydroxystearamide, N-(2-hydroxyethyl)-12-hydroxysteramide (PARICIN 220, available from CasChem), glycerin monostearate, sorbitan monostearate, 12-hydroxystearic acid, hydrogenated castor oil (castor wax), oxidized synthetic waxes and functionalized synthetic waxes such as oxidized polyethylene waxes (e.g. Petrolite E1040). A preferred polar wax is PARICIN 200.

The addition of polar waxes to the susceptor compositions of the invention result in reductions in the viscosity of the compositions, thus lowering the temperature required to apply the compositions as hot melt compositions. In addition, the addition of polar waxes to the susceptor compositions of the invention allows one to modify the flexibility, strength, toughness, cold flow and antiblocking characteristics of the compositions.

Preferably, the polar wax is present at no more than about 25%, more preferably, no more than 17% of the composition, most preferably, no more than 10% of the composition.

Other additives include elastomers such as those described in U.S. Pat. Nos. 5,506,298, 5,739,184, 5,169,890, 5,039,744, 4,761,198 may be used, including styrene butadiene rubber, polybutadiene rubber, rubber, nitrile rubbers, butyl rubber and halogenated butyl rubber.

When the compositions are applied and activated as coatings, they may further comprise one or more additives to impart color to the composition. Such additive include, without limitation, titanium dioxide, iron oxide pigments, carbon black and organic pigments such as isoindoline yellow.

The present invention is not restricted to the listed additives, as would be apparent to those of skill in the art. Such other additives may comprise about 1 to 25 weight percent of the composition.

VI. APPLYING THE SUSCEPTOR COMPOSITIONS TO SUBSTRATES

The compositions of the invention may be formulated to be applied as a liquid at room temperature, hot melt, or powder. Liquid compositions may be solvent borne or water-borne. The liquid applied compositions may be applied as a liquid at room temperature and dried down to give the desired coating. The liquid applied coating may be applied to a substrate by any conventional method including spraying, ink-jet, brushing, rolling, gravure printing, dripping and the like. Methods of actively drying down liquid compositions include but are not limited to conventional oven drying, forced air, heat lamps, microwave heating, RF heating or various combinations of these or other methods. When a liquid composition is dried down, it loses most or all of its volatiles. RF drying of a liquid applied composition may be accomplished by applying RF energy across the composition in order to generate sufficient heat within the liquid to facilitate or enhance the evaporative loss of water or solvent(s). The RF energy can be applied across the liquid at constant, intermittent, or gradient intensities to achieve the desired rate and degree of drying. Similarly, other methods of drying may be applied at constant, intermittent or gradient intensities to achieve the desired drying result.

Hot melt applied systems are applied in their molten state at an elevated temperature and then cooled to yield the desired solid coating. The hot melt compositions can be heated to a molten state by various methods including but not limited to conventional melt tanks, microwave heating and RF heating. Once the hot melt composition is melted, it may be applied in a variety of different types of hot melt coatings, including but not limited to spirals and beads, hot blown, slot coat, and co-extrusion. After application, the molten hot melt composition can be passively or actively cooled to return to its solid form. Active cooling may be accomplished by blowing cool air across the applied material, or by allowing the substrate to make contact with a heat-sink surface.

Powdered applied systems are applied in their "fine" particle state (1–20 $\mu$m) by electrostatic spray or gun. The applied layer is activated by RF energy as in liquid or hot-melt systems.

Once dried and/or cooled, the substrate may be stored until activation of the composition is desired. Many of the applied compositions of the invention are substantially non-tacky and may be applied to a substrate which is then rolled up. Upon unrolling and activating, the substrate may be adhered to one or more other substrates. Those compositions that are tacky may be activated immediately after being applied and dried if necessary. Alternatively, they may be covered with a removable strip or dusted with talc or similar material.

One aspect of the invention also relates to a method for applying a susceptor composition to a substrate, comprising:

(1) formulating the susceptor composition as a liquid dispersion;

(2) applying the liquid dispersion of the susceptor composition to the substrate;

(3) drying the susceptor composition, wherein the drying step may include the step of applying RF energy across the composition, thereby generating heat within the liquid dispersion. In a preferred embodiment, one may roll up the substrate after the susceptor composition has dried.

The susceptor compositions may be applied to any conventional substrates including, without limitation, woven and nonwoven substrates such as polyolefins, such as PP and PE webs, non-wovens, films, sheets and the like, cellulose substrates prepared from, for example, wood pulp (such as paper, cardboard and the like), cotton fibers (e.g. textiles such as cloth, sheeting and industrial fabrics), glass, ceramic surfaces, rubber and synthetic polymeric substrates such as polyester or polyolefin substrates prepared from, for example, polypropylene and polyethylene, polyvinyl alcohol, polyhydroxyvalerate butyrate, polylactides, cellulosics, polyamides, polyvinyl chloride, polystyrene, acrylics, synthetic textile products, etc. and any combination of the aforementioned. Other substrates include metal (e.g. aluminum foil and other metal foils), wood, composites, etc.

VII. APPARATUS FOR ACTIVATING THE VARIOUS COMPOSITIONS OF THE PRESENT INVENTION

Generally, the compositions of the present invention may be heated (i.e., activated) by any system capable of generating an electromagnetic field of sufficient strength and frequency.

Figure 4:
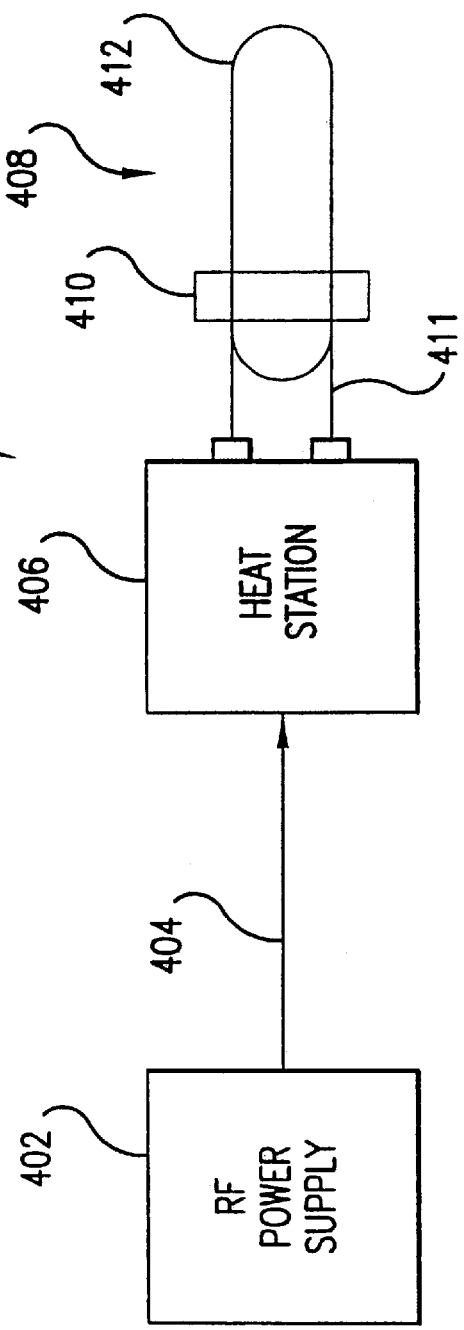
FIG. 4 illustrates a block diagram of an RF heating system according to a first embodiment.

FIG. 4 illustrates a high level block diagram of an RF heating system 400 that is capable of generating an electromagnetic field for activating the compositions of the present invention. Heating system 400 includes an RF power supply 402 that provides about a 1 kW, 1 to 100 MhZ, RF signal 404 to a heat station 406. Heating system 400 also includes an RF radiator 408 that is coupled to RF power supply 402 through heat station 406. Generally, heat station 406 includes a capacitor connected either in series with or parallel to RF radiator 408.

RF signal 404 provided to heat station 406 by RF power supply 402 creates an alternating current flowing through RF radiator 408, which creates an electromagnetic field. Heating of a sample 410, which is or includes a composition of the present invention, occurs when sample 410 is placed in proximity to RF radiator 408. The best heating takes place when sample 410 is placed near the proximal (or "terminal") end 411 of RF radiator 408, and little or no heating occurs when sample 410 is placed at the distal (or "turn") end 412 of RF radiator 408. Further, there is a heating gradient from terminal end 411 to turn end 412. In theory and without limitation, the best heating occurs at the terminal end 411 because it is believed that the intensity of the electric field component of the electromagnetic field at terminal end 411 is greater than at the distal end 412.

Figure 5:
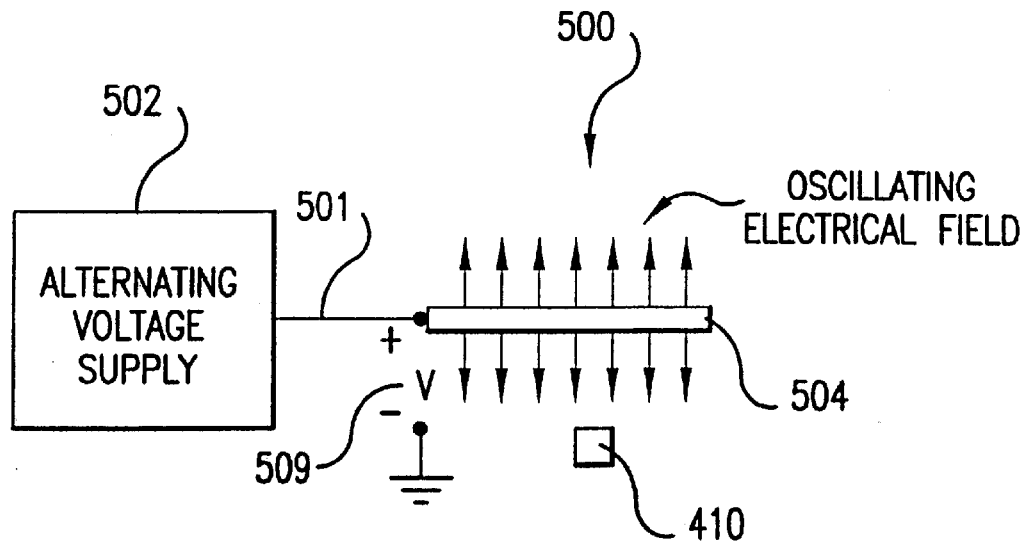
FIG. 5 illustrates a block diagram of a heating system according to a second embodiment.

FIG. 5 illustrates a high level block diagram of another embodiment of a heating system 500 that is capable of generating an electromagnetic field for activating the compositions of the present invention. Heating system 500 includes an alternating voltage generator 502 and an RF radiator (also referred to as "probe") 504, which is connected to an output terminal 501 of voltage generator 502 and which is in the shape of a rod (i.e. the length of the probe 504 is greater than it width and height). Voltage generator 502 alternately positively charges and negatively charges probe 504, thereby creating an electromagnetic field 506 that emanates from probe 504. Thus, probe 504 acts as an antenna. Heating can occur when sample 410 is placed in proximity to probe 504. How quickly and how much heating occurs depends on the sample itself, the strength of the electromagnetic field at the sample, and the frequency of the alternating voltage 509 produced by voltage generator 502.

Generally, probe 504 is a conductive material, such as, but not limited to copper, aluminum, or stainless steel, that is in the shape of a rod. Generally, probe 504 can have a variety of cross-sectional shapes, including cylindrical, square, rectangular, triangular, etc. Probe 504 can be hollow or solid, preferably hollow. Generally, probe 504 can be straight or non-straight, such as curved. The preferred characteristics of probe 504 ultimately depends on the application that it is being used for.

Figure 6:
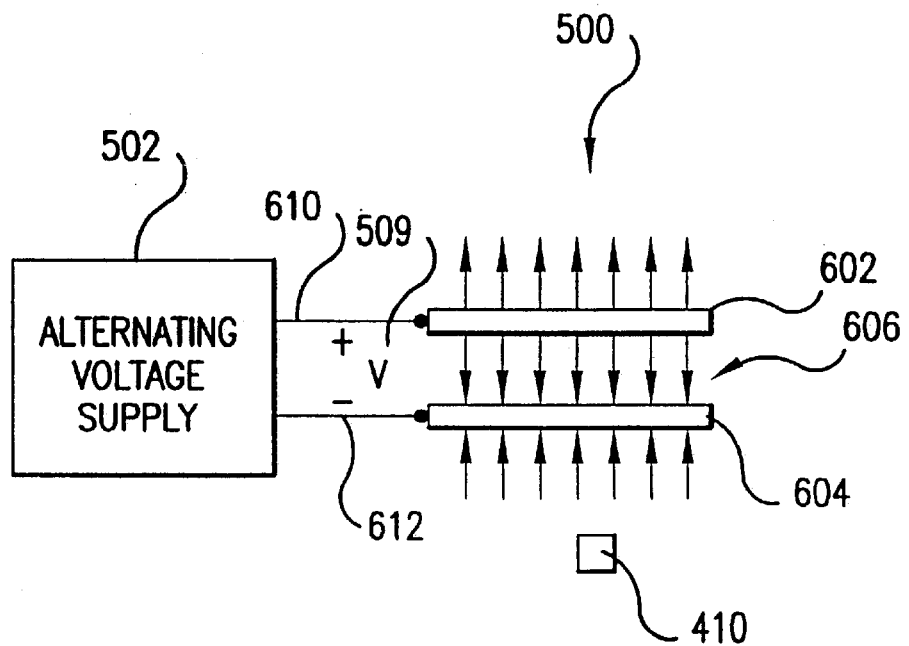
FIG. 6 illustrates a two probe heating system.

In yet another embodiment, which is illustrated in FIG. 6, heating system 500 includes at least two probes 602 and 604 for activating the compositions of the present invention. Probe 602 is connected to output terminal 610, and probe 604 is connected to output terminal 612. Like probe 504, probes 602 and 604 are made from conductive materials as discussed above. Probes 602 and 604 can have a variety of shapes and configurations. For example, they can be either straight or curved. Preferably, at least a portion of probe 602 is parallel to a portion of probe 604, although not required.

In the system shown in FIG. 6, probe 602 has a net positive charge when probe 604 has a net negative charge, and probe 602 has a net negative charge when probe 604 has a net positive charge. When probes 602 and 604 are oppositely charged, a strong electromagnetic field 606 is present between the probes. Thus, sample 410 is preferably heated by placing it in a region above (or equivalently below) the region between probe 602 and probe 604, as illustrated in FIGS. 7A and 7B. This region is referred to as an activation region. Preferably, an insulating layer 702 (see FIG. 7A) is placed between sample 410 and probes 602 and 604, although this is not a requirement.

Generally, the vertical distance between sample 410 and probes 602 and 604 ranges from about 0.01 to 2 inches, more preferably from about 0.02 to1 inch, and most preferably from about 0.025 to 0.185 inches. Sample 410 can also be heated by placing it between probes 602 and 604. Generally, The center to center distance between probes 602 and 604 ranges from about 0.1 to 3 inches, more preferably from about 0.2 to 2 inches, and most preferably from about 0.25 to 0.75 inches, but other distances are contemplated. Additionally, in general, and without limitation, the height and width of a rectangular probe, or the diameter for a cylindrical probe, ranges between about 0.02 and 0.5 inches, and the length generally ranges from about 0.25 inches to 20 feet.

In one embodiment, the distal end 750 of probe 602 is curled to reduce corona effect (see FIG. 7C). For the same reason, the distal end of probe 604 is also curled.

An advantage that the two probe system shown in FIG. 6 has over the system shown in FIG. 4, is that sample 410 heats equally as well at the proximal end of probes 602, 604 as it does at the distal end. Consequently, the system of FIG. 6 does not experience the heating gradient problem that is encountered with the system of FIG. 4.

Generally, the compositions of the present invention may be activated by a frequency of the alternating voltage 509 ranging from about 1 kHz to 5 GHz, more preferably from about 1 MHZ to 100 MhZ, and most preferably about 50 to 80 MHZ. The peak to peak voltage between probes 602 and 604 generally ranges from 1 to 15 kilo volts (kV). Generally, the duration of RF energy application to the sample 410 (also referred to as dwell time), for most applications, ranges from about 100 milliseconds to 30 seconds. However, there are some applications where the dwell time greatly exceeds 30 seconds. In the case of a composition comprising a thermoset resin, the dwell time ranges from about 1 second to 20 minutes, preferably from about 1 to 10 minutes, and most preferably from about 2.5 to 5.0 minutes to initiate cross linking reactions(s) leading to a high degree of thermoset character.

Figure 8:
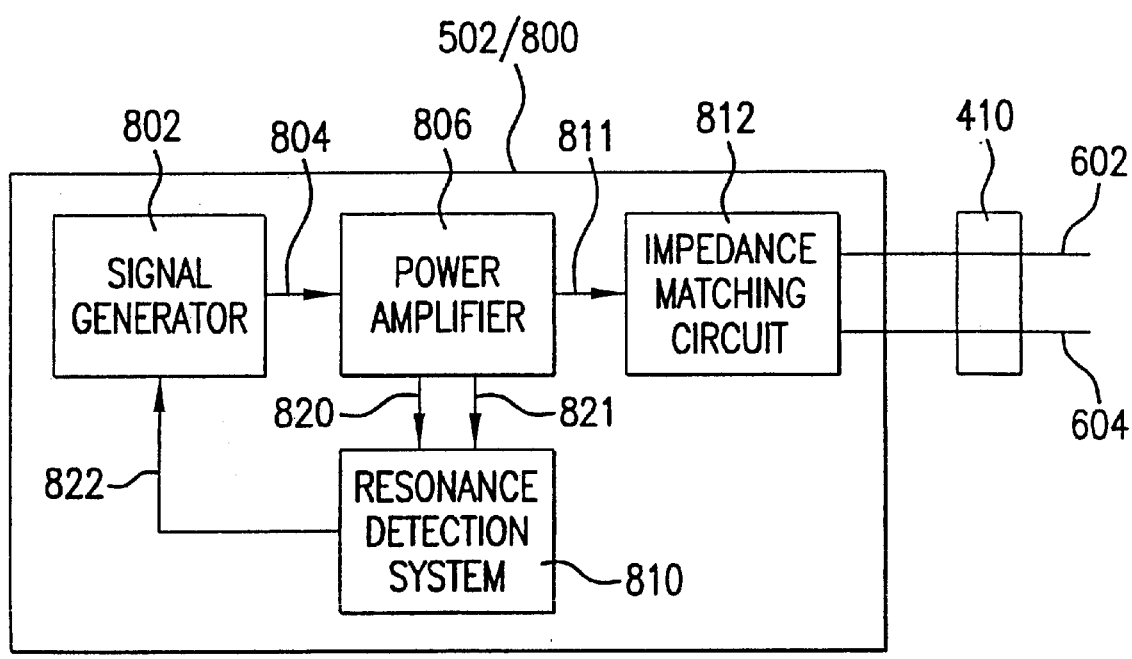
FIG. 8 is a functional block diagram of one embodiment of power supply.

FIG. 8 is a functional block diagram of one embodiment of power supply 502 (also referred to as voltage generator 502). This embodiment of power supply 502 is referred to herein as power supply 800. The invention, however, is not limited to this or any particular power supply, since any system capable of generating a strong enough electromagnetic field could be utilized to activate the compositions of the present invention.

In one embodiment, power supply 800 includes a power amplifier 806, a signal generator 802, an impedance matching circuit 812, and a resonance detection system (RDS) 810. Signal generator 802 function to generate an RF signal 804. The frequency of RF signal 804 is determined by a control signal 822 sent from RDS 810 to signal generator 802. In this embodiment, the frequency of RF signal 804 preferably ranges between 50 MHZ and 80 MHZ. Power amplifier 806 functions to amplify RF signal 804 to produce an amplified RF signal 811. RF signal 811 is provided to impedance matching circuit 812 (also referred to herein as "heat station") through, preferably, a 50 ohm cable. When RF signal 811 is fed into impedance matching circuit 812, electromagnetic field (EMF) 606 emanates from probes 602 and 604. EMF 606 is used to activate the compositions described herein.

Power amplifier 806 is configured to provide signal 820 and signal 821 to RDS 810. Signal 820 corresponds to the amount of power being delivered to impedance matching circuit 812 ("forward power") and signal 821 corresponds to the amount of reflected power. RDS 810 implements a resonant frequency tracking algorithm for setting the frequency of RF signal 804. The resonant frequency tracking algorithm uses the signals 820 and 821 as inputs with a goal to minimize the reflected power. That is, RDS 810, as required, adjusts the frequency of RF signal 804 so as to minimize reflected power. Resonant frequency tracking algorithms are described in U.S. patent application Ser. No. 09/113,518, filed Mar. 17, 1998, and entitled, "RF Power Supply." This application is incorporated in its entirety herein by this reference. RDS 810 uses control signal 822 to control signal generator 802, and thereby control the frequency of signal 804.

In one embodiment, power amplifier 806 is a power amplifier capable of amplifying an RF signal having a frequency above 50 MHZ to produce an amplified RF signal having a power of about 1000 Watts or greater. One such example amplifier is the CPS 1000 amplifier sold by Comdel of 11 Kondelin Road, Gloucester, Mass. 01930. Signal generator 802 is further described in U.S. patent application Ser. No. 09/113,518.

Figure 9:
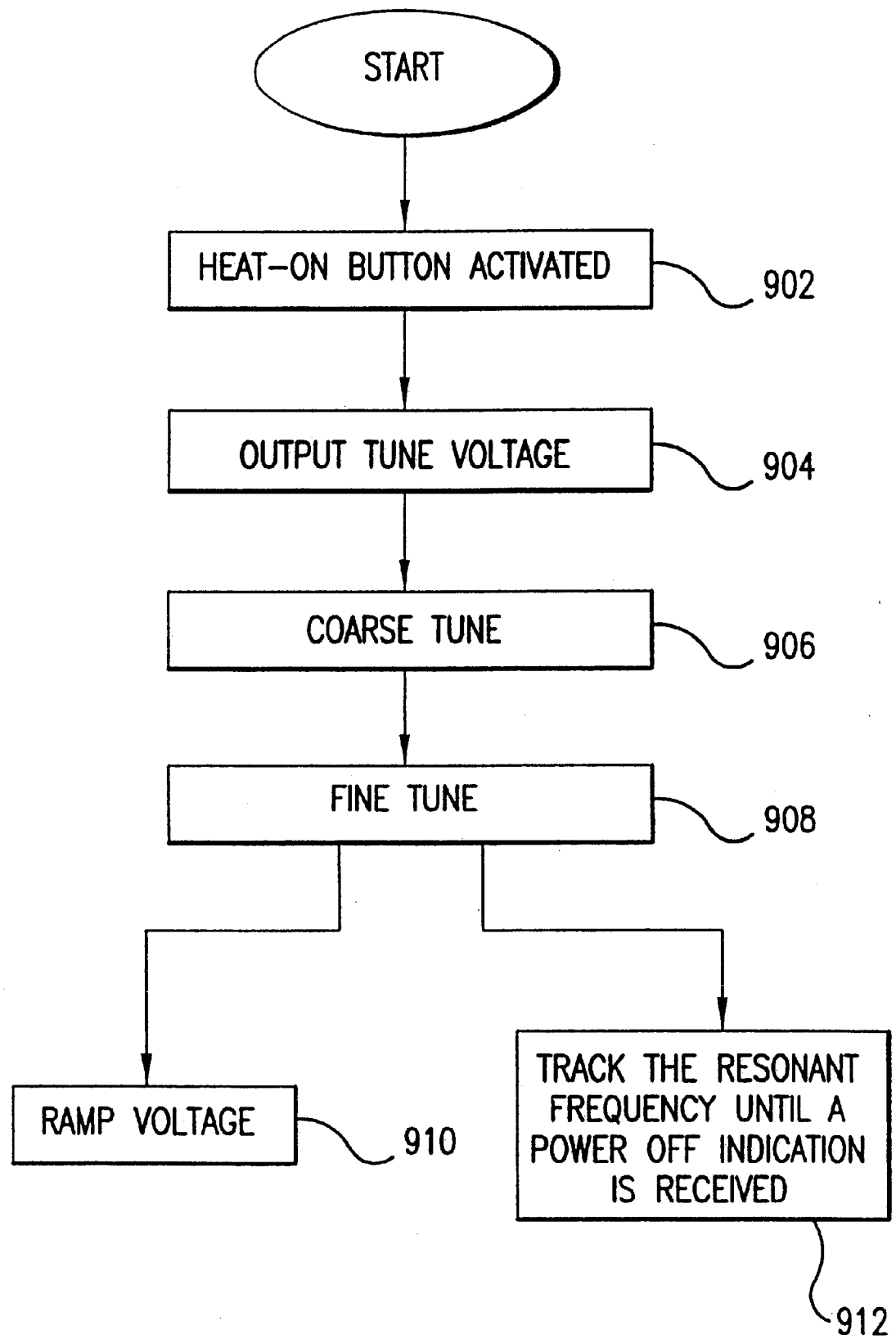
FIG. 9 is a flow chart illustrating a process for heating a composition according to the present invention.

FIG. 9 is a flow chart illustrating a process for heating a composition according to the present invention using power supply 800. The process begins with step 902 when a user or production line control system (not shown) sends a "heat-on" signal to power supply 800. Upon receiving the "heat-on" signal, RDS 810 begins an initial tuning process for determining the frequency of RF signal 804 that produces the minimum amount of reflected power. The initial tuning process encompasses steps 904–908. In step 904, power supply 800 outputs a low level power signal (e.g., 5–50 Watts). The low power level (referred to as the "tune power level") is the lowest power level that can provide a sufficient signal to measure the reflected power over a range of frequencies. The objective is to consume the least amount of energy during the initial tuning process. Typically, the "tune" power level is 3–5% of the full scale power, where the full scale power is the power at which the composition is intended to be heated. Typically, this power is at about 1 kW, but higher or lower power levels could also certainly be used.

After step 904, control passes to step 906. In step 906, power supply 800 performs coarse tuning. That is, heating system 800 determines a coarse estimate (i.e., rough estimate) of the frequency that produces the minimum reflected power. Hereafter, this frequency shall be referred to as the resonant frequency. The coarse estimate of the resonant frequency can be determined by sampling reflected power over a first predetermined frequency range. After step 906, control passes to step 908. In step 908, the power supply 800 performs fine tuning. That is, the power supply 800 determines a fine estimate (i.e., more precise estimate) of the resonant frequency. The fine estimate can be determined by sampling the reflected power over a second frequency range, which includes the coarse estimate of the resonant frequency. After step 908, control passes to steps 910 and 912 in parallel. In step 910, power supply 800 ramps (i.e., rapidly increases) the power output such that within approximately 30 milliseconds the power increases from the "tuning" power level to approximately the full scale power level. In step 912, power supply 800 continuously tracks the resonant frequency until a power off indication is received. The methods for coarse tuning, fine tuning, and tracking resonant frequency are described in U.S. patent application Ser. No. 09/113,518.

Figure 10A:
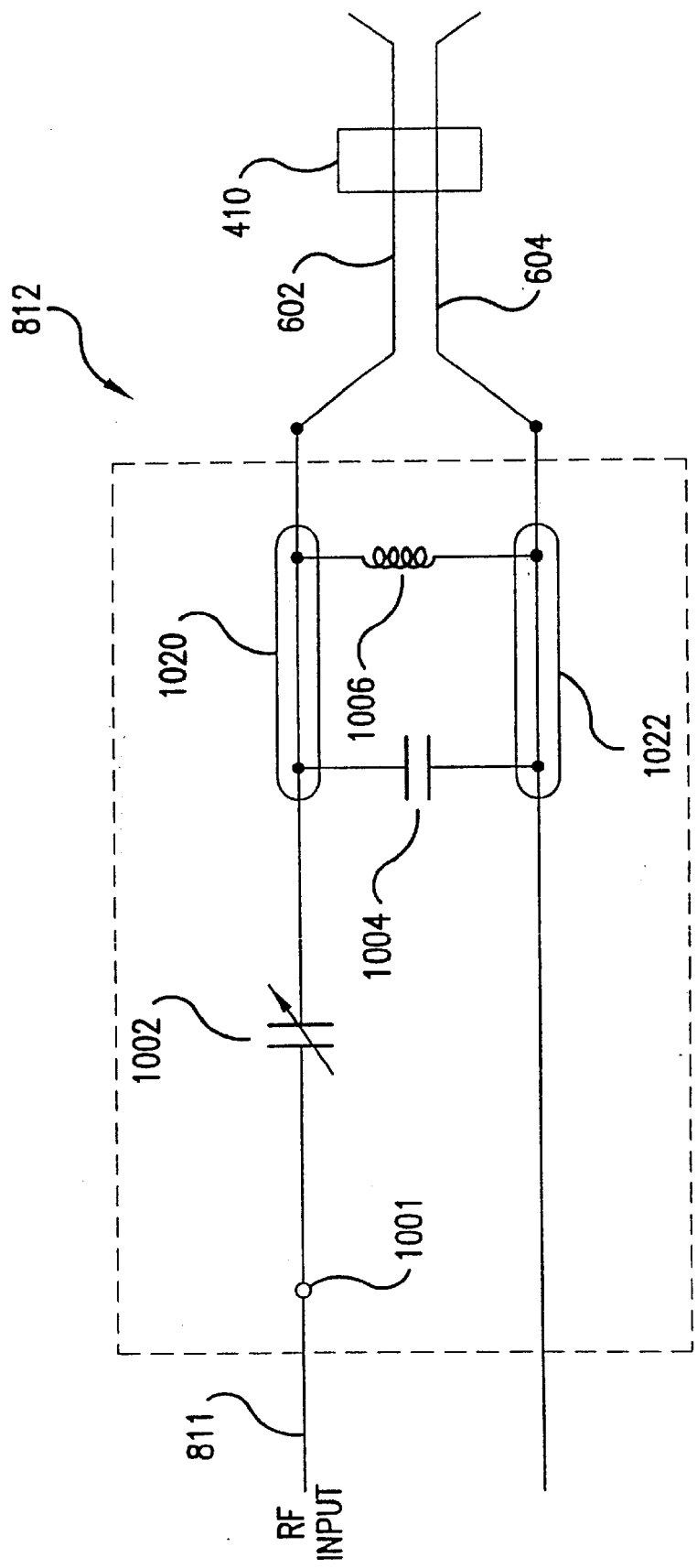
FIG. 10A further illustrates one embodiment of an impedance matching circuit.

FIG. 10A further illustrates one embodiment of impedance matching circuit 812. Impedance matching circuit 812 is used to match the impedance of 50 ohms on the input to the variable impedance of the probes 602 and 604 and sample 410. The impedance of the probes 602 and 604 and sample 410 is typically in the order of 200 to 500 ohms. The impedance of the sample has an equivalent circuit of a resistance between 500 Ohms and 50 Kilo Ohms in parallel with a 0.1 pico farad capacitor.

Circuit 812 includes a connector 1001, two capacitors 1002 and 1004, and an inductor 1006. Capacitor 1002 is a variable capacitor, which is adjustable from 10 to 50 picofarads (pf) to achieve impedance match to the varying impedance of probes 602 and 604 and sample 410. The capacitance of capacitor 1004 is preferably 100 pf, and the inductance of inductor 1006 is preferably 1.0 micro henries (uH). Capacitor 1004 and inductor 1006 form a parallel resonance circuit that will resonate typically at a frequency between 12.5 and 14.5 MHZ. Capacitor 1004 and inductor 1006 are water cooled with a flow rate of approximately half a gallon per minute. Probe 602 is connected to a node 1020 of circuit 812, and probe 604 is connected to a node 1022 of circuit 812. The high power RF input 411 (typically less than 1 kilowatt) from a 50 ohm source generator is connected to connector 1001.

A process for setting the capacitance of variable capacitor 1002 begins by applying a low power level RF signal (typically 10 watts) to input 1001 of circuit 812. The frequency of the applied RF signal 811 is adjusted until the amount of reflected power is minimized. The capacitance of capacitor 1002 is then adjusted to optimize the reflected power minima. To achieve the least amount of reflected power that is practical to achieve, which is about two percent reflected power (or 1.25 voltage standing wave ratio (VSWR)), the frequency of the applied RF signal 811 and the capacitance of capacitor 1002 are adjusted in an iterative process. Once the process is completed, sample 410 is placed in proximity to probes 602 and 604. At this point it may be necessary to adjust the frequency of operation and capacitor 100 in order to achieve an optimum reflected power. Once optimum reflected power is achieved, the power level of the input RF signal 811 is increased. As the input RF power level 811 is increased the resonant frequency of the matching circuit and probes 602 and 604 and sample 410 will change requiring a change of operating frequency to continue to minimize the reflected power.

Figure 10B:
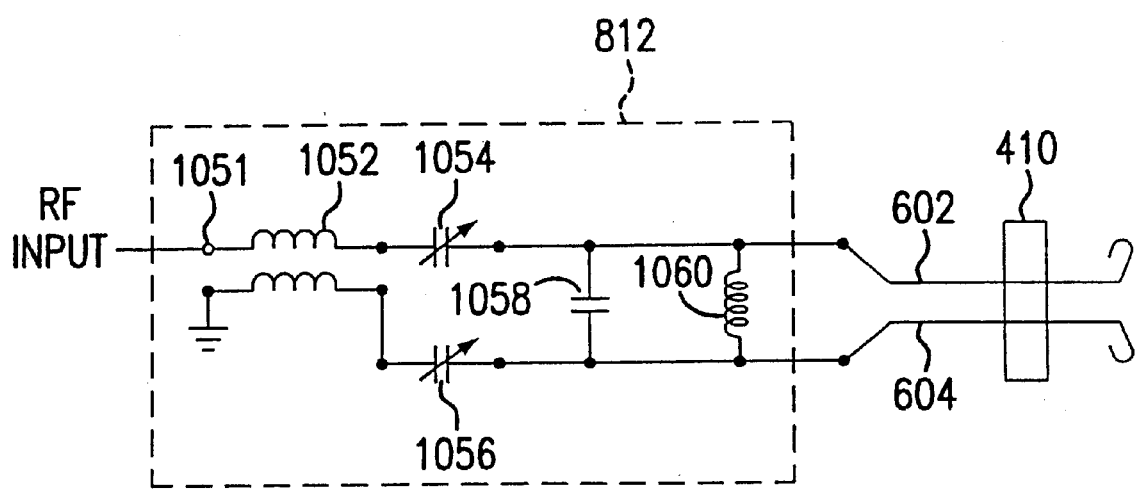
FIG. 10B further illustrates another embodiment of an impedance matching circuit.

FIG. 10B illustrates another embodiment of impedance matching circuit 812. In this embodiment, impedance matching circuit 812 includes a connector 1051, a 1:1 balun transformer 1052, two variable capacitors 1054 and 1056, and one inductor 1060. Capacitors 1054 and 1056 are adjustable from about 3 to 25 picofarades (pf) to achieve impedance match to the varying impedance of probes 1082 and 1084 and sample 410. The inductance of inductor 1060 is preferably about 5 micro henries (uH). Capacitor 1058 is not an actual circuit element of the impedance matching circuit 812. Capacitor 1058 represents the capacitance associated with the inductor system, which consists of the inductor 1060, the leads (not shown) connecting the inductor 1060 to the capacitors 1054 and 1056, and the leads (not shown) connecting the probes 1082 and 1084 to the inductor 1060. The capacitance of capacitor 1058 is preferably less than about 15 pf. One advantage impedance matching circuit 812 shown in FIG. 10B has over the impedance matching circuit shown in FIG. 10A, is that the impedance matching circuit 812 shown in FIG. 10B provides a balanced signal on the probes 1082 and 1084 relative to ground. This system provides even heating between the two probes.

Figure 10C:
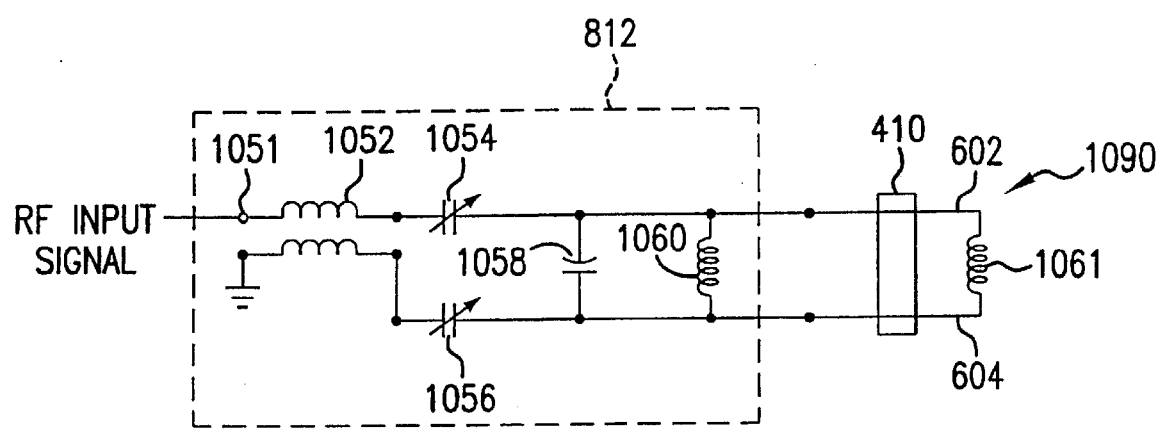
FIG. 10C illustrates an antenna that can be used to create the EMF used to activate a sample.

FIG. 10C illustrates an antenna 1090 that can be used to create the EMF used to activate sample 410. Antenna 1090 includes probe 602, probe 604, and a coil (also referred to as "inductor") 1061. Preferably, coil 1061 is constructed from the same material as probes 602 and 604. As shown in FIG. 10C, inductor 1060 of impedance matching circuit 812 is connected to a first end of probe 602 and a first end of probe 604. That is, the first end of probe 602 is connected to one end of inductor 1060 and the first end of probe 604 is connected to the other end of inductor 1060. Likewise, coil 1061 is connected between a second end of probe 602 and a second end of probe 604. The capacitance of capacitor 1058 in this configuration is about 47 pf. The addition of coil 1061 at the distal end of the probes reduces the tendency to cause corona at the distal end and provides uniform activation of sample 410 regardless of the location of sample 410 along the probes.

Figure 10D:
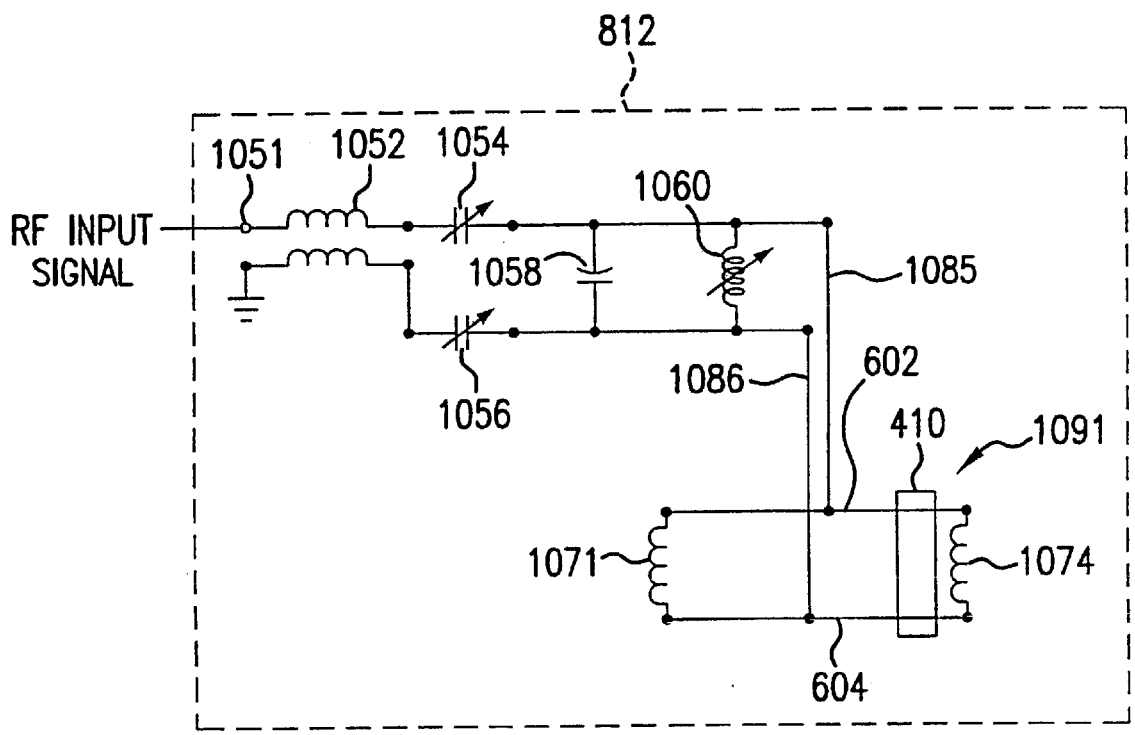
FIG. 10D illustrates an embodiment of an impedance matching circuit and another antenna.

FIG. 10D illustrates another embodiment of impedance matching circuit 812 and another antenna 1091. The embodiment shown in FIG. 10D is designed to be used with a power amplifier that can provide at least a 1 kW RF signal having a frequency ranging between 50 and 80 MHZ. In this embodiment, the capacitors 1054 and 1056 are adjustable from about 1 to 5 picofarads (pf) to achieve impedance match to the varying impedance of probes 602 and 604 and sample 410. Also, inductor 1060 is a variable inductor. The inductance of inductor 1060 is set so that the circuit resonates at about 60 MHZ. The capacitance of "capacitor" 1058 is about 5 pf.

Antenna 1091 includes probe 602, probe 604, coil 1071, and coil 1074. Coils 1071 and 1074 are connected in parallel by probes 602 and 604, as is shown in FIG. 10D. The inductance of coils 1071 and 1074 are preferably about 1 microHenry (uH), and the length of probes 602 and 604 in a preferred embodiment is 40 inches. Antenna 1091 is connected to impedance matching circuit by connectors 1085 and 1086. Preferably, as shown in FIG. 10D, one end of connector 1085 is connected to a point on probe 602 that is equally distant from both ends of the probe, and the other end of connector 1085 is connected to impedance matching circuit 812. Similarly, one end of connector 1086 is connected to the middle point of probe 604 and the other end of connector 1086 is connected to impedance matching circuit 812.

Figure 10E:
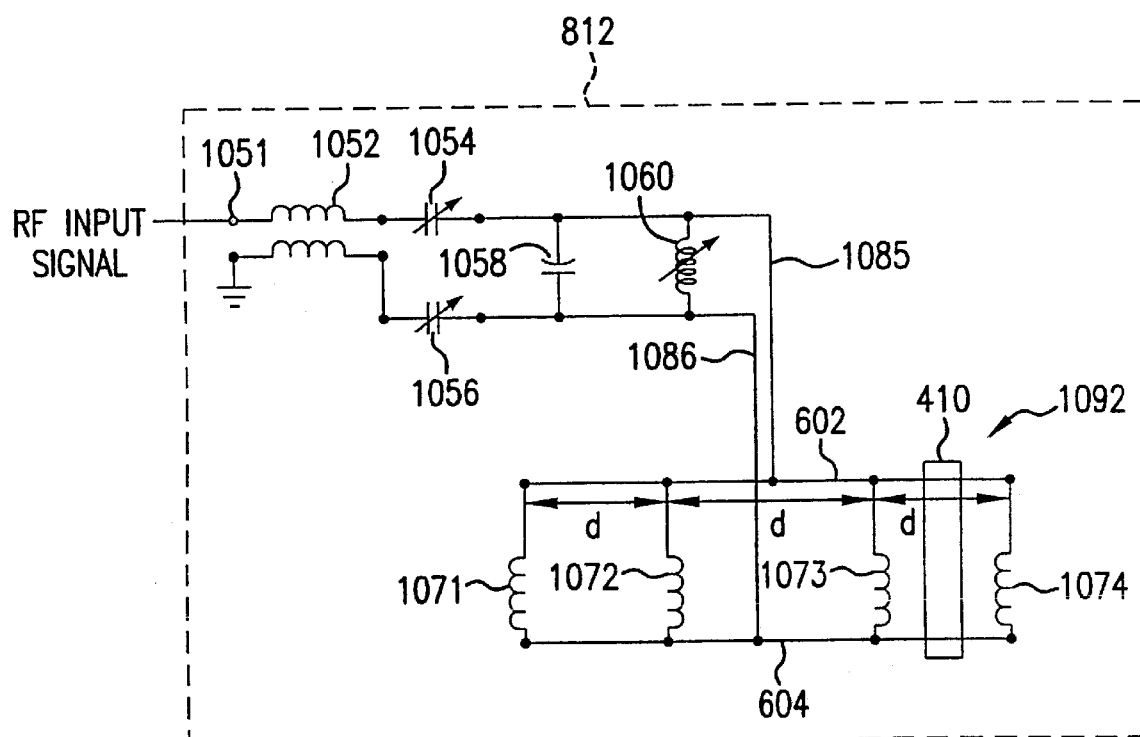
FIG. 10E illustrates an antenna that can be used to create the EMF used to activate a sample.

FIG. 10E illustrates an antenna 1092 that can be used to create the EMF used to activate sample 410. Antenna 1092 includes probe 602, probe 604 and multiple coils. In the embodiment shown in FIG. 10E, antenna 1092 includes four coils: 1071–1074. In one embodiment, the inductance of coils 1071 and 1074 is about 1 uH, and the inductance of coils 1072 and 1073 is about 0.5 uH. Coils 1071–1074 are connected in parallel with each other by probes 602 and 604. The distance "d" between adjacent coils is preferably ⅛ of the wavelength of the RF input signal. Thus, with a 60 MHZ input signal and with four coils present, the length of probes 602 and 604 is about 56 inches. This design achieves four high impedance areas along the probes.

Like antenna 1091, antenna 1092 is connected to impedance matching circuit 812 by connectors 1085 and 1086. As in antenna 1091, one end of connector 1085 is connected to the middle point of probe 602, and the other end of connector 1085 is connected to impedance matching circuit 812. Similarly, one end of connector 1086 is connected to the middle point of probe 604 and the other end of connector 1086 is connected to impedance matching circuit 812.

At 60 MHZ, it is possible to profile the voltage along the probes. By changing the inductance of any one of coils 1071–1074, or the position of any one of coils 1071–1074, the voltage from that coil to next can be changed. This is advantageous where the heating effect needs to be lowered for better process control after the initial heating takes place.

VII. METHOD OF BONDING SUBSTRATES

The compositions of the present invention may be employed in a variety of bonding methods, including but not limited to adhesive bonding, thermal bonding and mechanical bonding.

Adhesive bonding is accomplished when a susceptor composition is interposed between two substrates that are to be joined (adherands) and activated by RF energy to undergo adhesive attachment to each of the adherands.

In the case of thermoplastic adhesive compositions such as hot melts, RF energy causes the composition to melt and wet-out onto adherands that are in close contact. Upon cooling, the composition returns to a solid state with sufficient cohesive strength and adhesion to each of the adherands to form a good bond. The degree of heating and melting of the susceptor composition is controlled by the intensity and duration of the applied RF energy and the formulation of the adhesive composition. Such control is required to prevent undesired results stemming from under-heating or over-heating the adhesive composition. For example, under-heating can result in a weak bond due to insufficient wet-out of the adhesive onto the adherands. Also, over-heating can result in undesirable bond, with thermal distortion or destruction of the adherands, as well as thermal degradation of the thermoplastic composition.

In the case of thermoset adhesive compositions, RF energy causes the composition to become cured, resulting in sufficient increase in cohesive strength and adhesion to adherands to form a strong bond. As in the case of thermoplastic compositions, the degree of heating and curing of thermoset compositions is controlled by the intensity and duration of the applied RF energy. Such control is required to prevent undesired results from under-heating or over-heating. For example, under-heating can result in a weak bond due to insufficient cross-linking. Over-heating can cause effects such as thermal distortion or destruction of the adherands, as well as thermal degradation and excessive shrinkage of the thermosetting composition.

Thermal bonding is accomplished when the composition is used to generate sufficient heat to cause one or more adherands to become thermally fused to each other.

One example of thermal bonding involves saturating a porous thermoplastic material, such as a non-woven polypropylene web, with an RF-heatable composition, and then interposing the saturated web of material between two adherands and RF-heating the composition to cause the saturated web and adjacent adherands to melt and fuse to each other.

Another example of thermal bonding involves saturating a porous, first thermoplastic adherand with an RF-heatable composition, and then placing the first adherand against a second thermoplastic adherand and RF-heating the composition to cause the first and second adherands to melt and fuse together.

Figure 11:
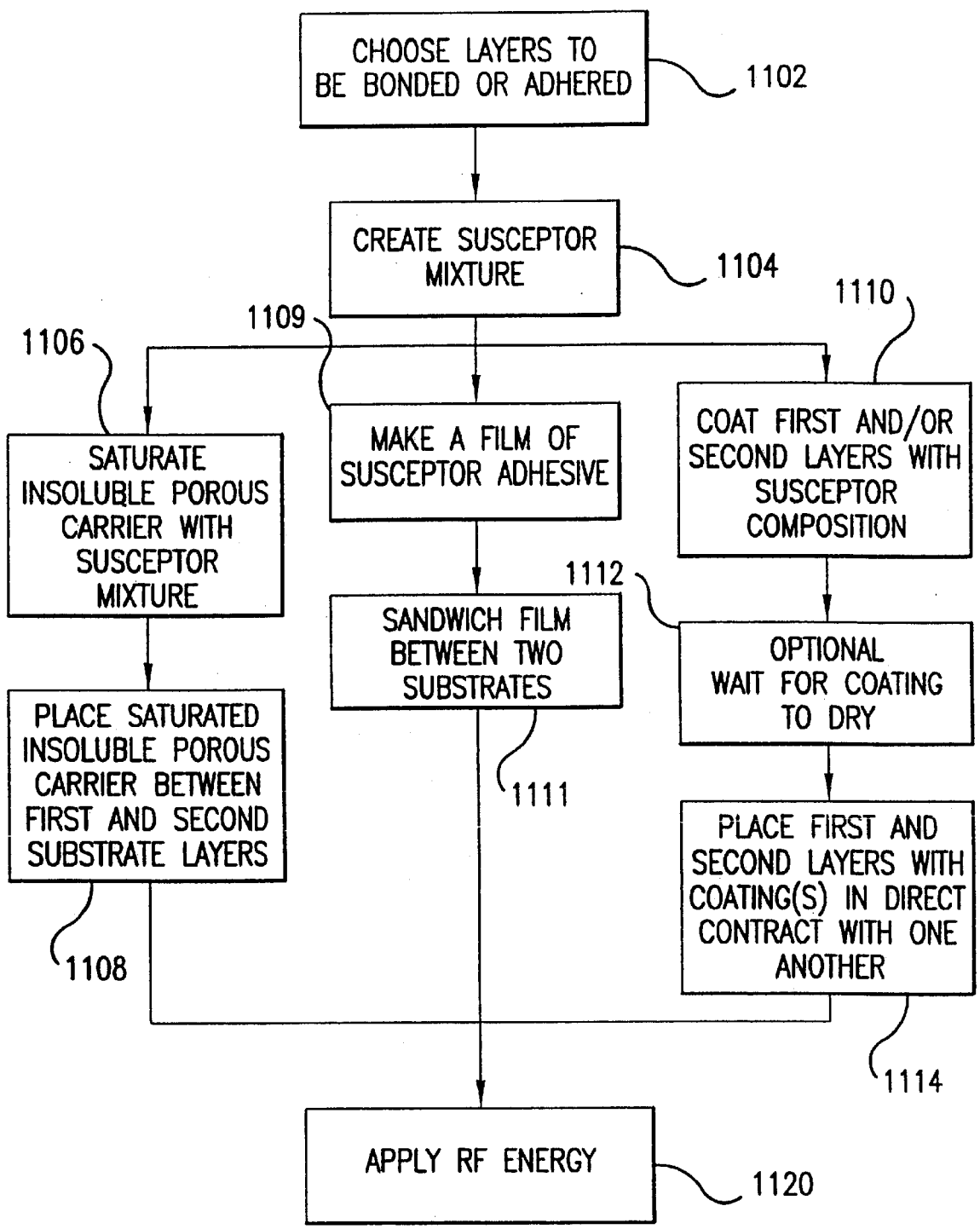
FIG. 11 shows a method of bonding adherents using a composition that is activated in the presence of RF energy.

FIG. 11 shows a method of bonding polyolefin and non-polyolefin materials using a composition that is activated in the presence of RF energy according to the present invention.

In step 1102, adherands that are to be bonded or adhered are chosen. Once the materials or layers are chosen, an appropriate composition is prepared in step 1104. For example, if nonwoven PP layers are chosen to be bonded, a susceptor, which includes an ionomer as described herein, is combined with a polar carrier. The type of composition may depend on whether a transparent, translucent, or lightly colored adhesive obtained by the method of the present invention is needed for a particular application. After the composition is prepared in step 1104, control can pass to step 1106, 1109, or 1110.

In step 1106, a second carrier, such as an insoluble porous carrier (e.g., nonwoven PP), is saturated with the prepared composition. In step 1108, the saturated insoluble porous carrier is then placed in between the layers chosen to be bonded. RF energy is applied in step 1120. The RF energy applied in step 1120 can be applied for 100 milliseconds to several minutes. The application of RF energy allows for the precision heating of the layers to be bonded, without the unwanted side effects of non-uniform bonding, or damage to the bonded layers.

In step 1110, one or both of the layers to be bonded are coated with the composition. In step 1112, the composition is allowed to dry or the hot melt to congeal depending on the type of composition created. Alternatively, a heat source (e.g. an oven or lamp) and fan may be used to dry the coating or RF energy may be applied to drive off any water or other solvents. According to step 1114, the layers to be bonded are placed together, such that the coated surfaces are in contact. Uniform pressure placed on the contacted layers helps enhance the bonding or adhesion process activated by the applied RF energy (step 1120). Such uniform pressure may be applied while the composition is being activated or immediately thereafter by use of conventional nip rollers.

In step 1109, a film of the composition is created. Such a film can be created according to film making processes well known in the art. The film made in step 1109 can then be sandwiched between the two materials to be bonded in step 1111. RF power is then applied in accordance with step 1120.

In a further embodiment, two or more adherands may be bonded or adhered by a process comprising: applying a first composition onto a first adherand; applying a second composition onto a second adherand; contacting the first composition with the second composition; applying RF energy to the first and second compositions to heat the compositions, thereby causing the first and second adherands to become adhered or bonded; wherein one of the compositions comprises an ionomer and the other of the compositions is a polar carrier, and the ionomer and/or the polar carrier are present in amounts effective to allow the first and second compositions to be heated by RF energy. Such amounts effective may be achieved by applying the ionomer and polar carrier in amounts which will result in RF heating, e.g. the ionomer may be applied at 0.75–0.87 g/cm$^2$ and the polar carrier may be applied at 0.25–0.13 g/cm$^2$ to achieve a layered composition comprising a weight ratio of polar carrier to ionomer of 13/87 to 25/15.

Figure 52:
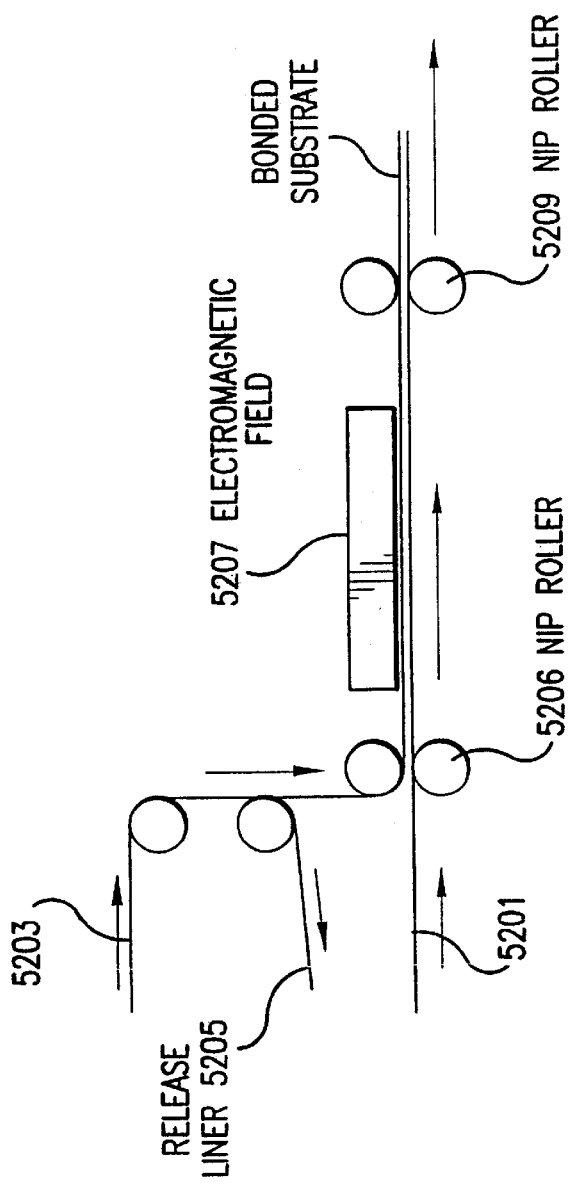
FIG. 52 illustrates a system for bonding two substrates.

In this embodiment of the invention, the ionomer and polar carrier components of the susceptor composition are applied separately to the adherands prior to placing the adherands together. FIG. 52 shows an ionomer-coated adherand 5201 assembled to an adherand 5203 coated with the polar carrier. After coating one or both of the adherands, one may apply a temporary release liner 5205 to the coated side to allow the coated adherand to be rolled up or stacked. Alternatively, one may dry one or both coatings.

After nipping the two coated adherands in the assembly stage, the assembly is passed through an RF field 5207 for activation. The RF energy causes the susceptor and carrier to heat with the resulting adhesion between the two adherands. The final nip rollers 5209 press and bonds the two adherands, while cooling the bond line.

Figure 53:
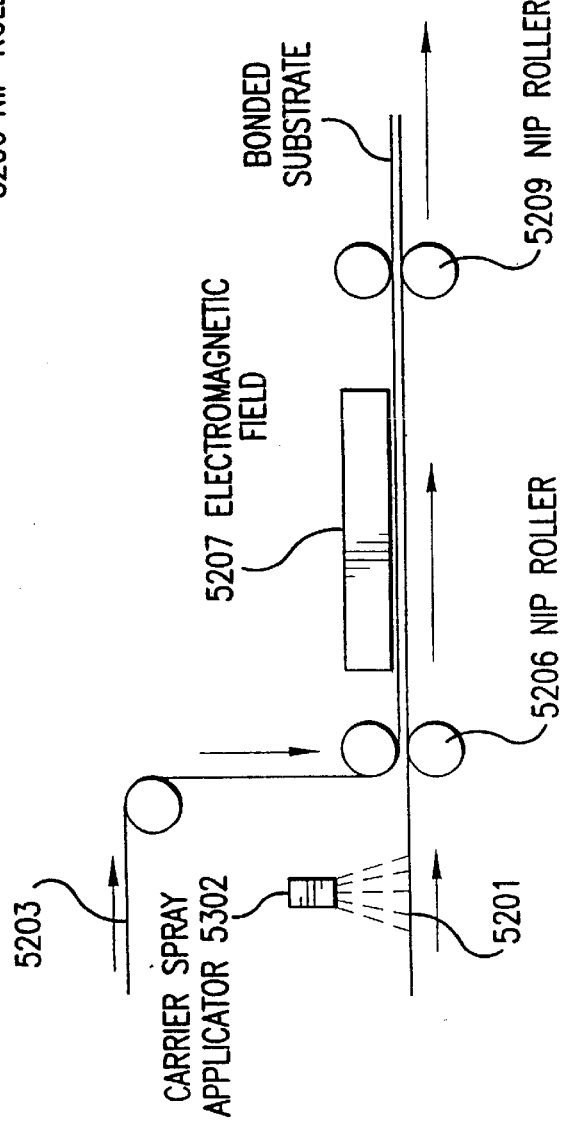
FIG. 53 illustrates another embodiment of a system for bonding two substrates.

FIG. 53 shows the replacement of the pre-applied polar carrier on the adherand with a polar carrier spray coated onto the adherand just prior to the assembly nip rollers 5206. A polar carrier is applied (e.g. sprayed or otherwise as described herein) by a spray applicator 5302 onto adherand 5201. When assembled with the ionomer coated adherand 5203 and exposed to RF energy, the interfaced composition activates to form a bond.

IX. ADDITIONAL PROBE EMBODIMENTS

Additional embodiments of probes 602 and 604 are described below with reference to FIGS. 12 to 17. These additional embodiments are in no way limiting and merely provide additional examples of possible configurations of the probes.

Figure 12:
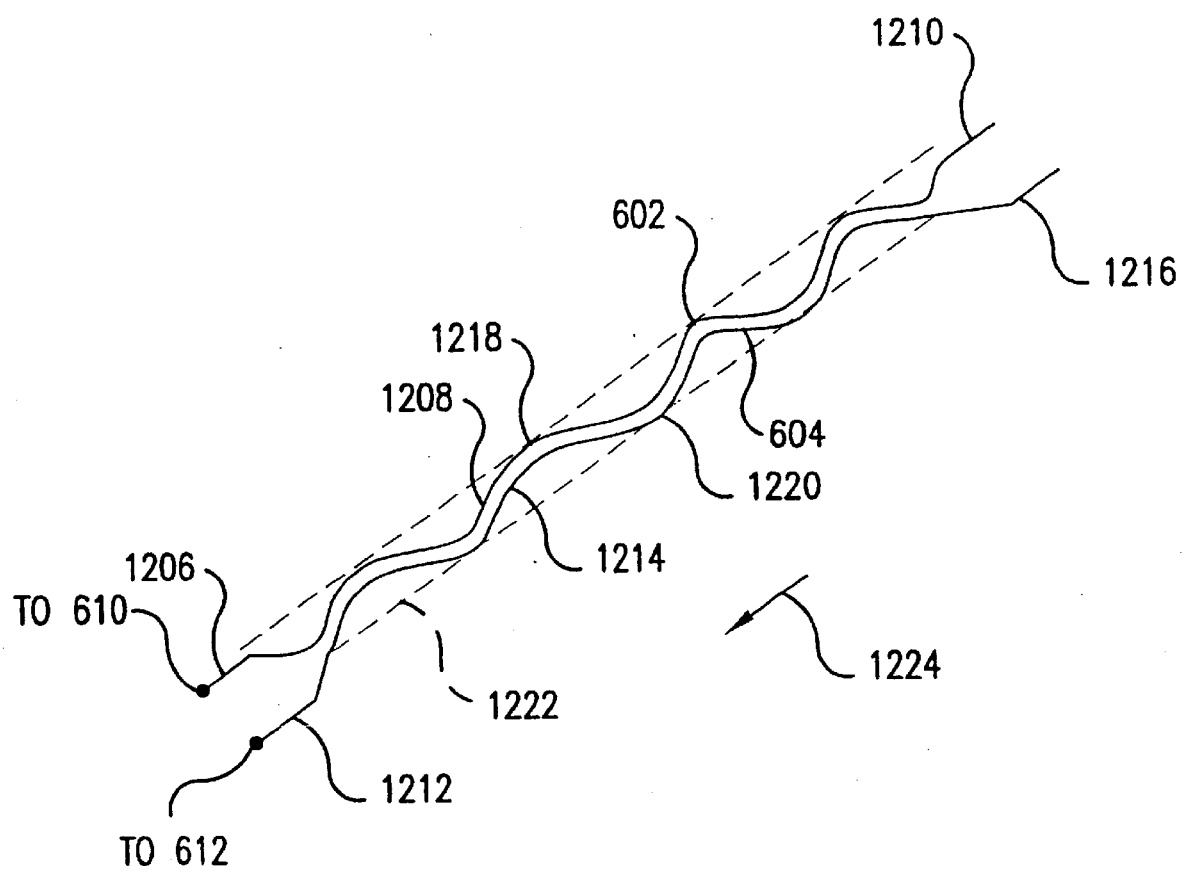

In FIG. 12, probes 602 and 604 are each curvilinear and oppositely charged. In this particular example, probes 602 and 604 are sinusoidally or "S" shaped, but any similar arrangement is possible. Probes 602 and 604 are made from conductive materials, as described above, preferably, but not limited to, copper, aluminum, or stainless steel. Probe 602 includes a proximal region 1206, and activation region 1208 and a distal region 1210. Similarly, probe 604 includes a proximal region 1212, an activation region 1214, and a distal region 1216. In proximal regions 1206 and 1212, probes 602 and 604 are spaced apart in order to prevent arcing. The amount of spacing depends on the size of probes 602 and 604, and in one example, probes of 0.125 inch square cross-section should be spaced at least 1.1875 inches apart. Similarly, distal regions 1210 and 1216 are spaced apart to prevent arcing, the amount of such spacing is similarly dependent upon the size of the probes. In activation regions 1208 and 1214, probes 602 and 604 are in proximity to one another in order to create an electromagnetic field between the probes. How close probes 602 and 604 must be to one another again depends on the size of the probes and the magnitude of the charge on them. In one example, probes 602 and 604 have about a 0.125 inch square cross-section and preferably spaced between 0.25 and 0.75 inches apart. It is preferable the space between probes 602 and 604 remains substantially equal throughout the activation region, but it is not necessary. An activation zone 1222 is defined in activation regions 1208 and 1214 between an outermost end 1218 of probe 602 and an outermost end 1220 of probe 604. Activation zone 1222 is indicated in dashed lines in FIG. 12. Activation zone 1222 defines the area of sample 410 that can be heated/activated by the system when the substrates being joined are moving in the direction indicated. If the substrates are stationary with respect to the probes, the activation zone is defined by the area in between the probes.

Figure 13C:
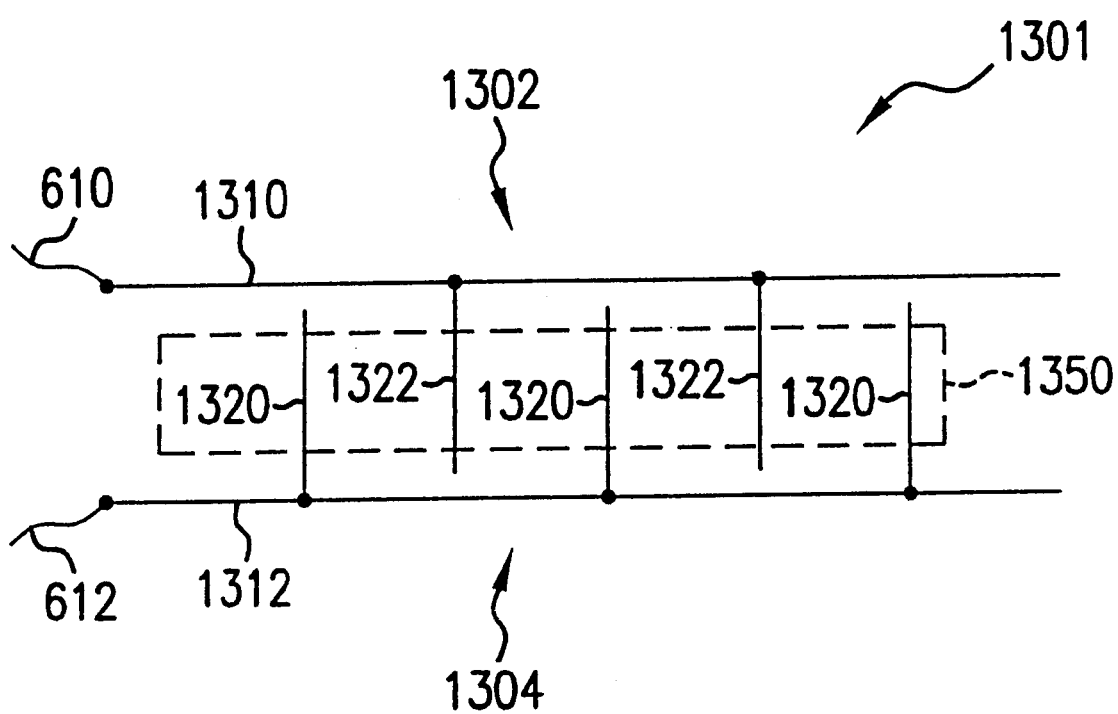

In another embodiment, probes 602 and 604 may be repeated in order to provide a larger activation zone. Such an arrangement is shown in FIGS. 13A, 13B and 13C. For example, in FIG. 13A, a pattern of one probe 602 and two probes 604 is provided. This arrangement may include any number of probes 602 and 604, as long as oppositely charged probes are placed next to one another. This arrangement works equally well with multiple sets of curvilinear probes, as shown in FIG. 13B.

FIG. 13C illustrates one embodiment of what is termed an "interdigitated probe system." The interdigitated probe system 1301 is advantageous because it provides an extended activation zone, as shown by the dotted rectangle 1350. Interdigitated probe system 1301 includes a first element 1302 and a second element 1304.

The first element 1302 includes a first conductor 1310 and one or more second conductors 1322 connected to the first conductor 1310. Preferably, conductors 1322 are coplanar and uniformly spaced apart, but this is not a requirement. Additionally, in one configuration of element 1302, each conductor 1322 forms a right angle with conductor 1310, but this is also not a requirement.

Similarly, the second element 1304 includes a first conductor 1312 and one or more second conductors 1320 connected to the first conductor 1312. Preferably, conductors 1320 are coplanar and uniformly spaced apart, but this is not a requirement. Additionally, in one configuration of element 1304, each conductor 1320 forms a right angle with conductor 1312, but this is also not a requirement.

In one embodiment, first element 1302 and second element 1304 are orientated such that conductors 1320 are coplanar with conductors 1322 and each conductor 1320 is adjacent to at least one conductor 1322. First element 1302 and second element 1304 are not limited to any particular type of conductive material. However, conductors 1310, 1312, 1320, and 1322 are preferably copper, and more particularly, copper tubes. In one embodiment, the copper tubes have a one-eighth of an inch diameter.

In one embodiment, the length of conductors 1310 and 1312 is about 40 inches, and the length of conductors 1320 and 1322 is about 2 inches. However, conductors 1310, 1312, 1320, and 1322 are not limited to any particular length. Typically, the length of conductors 1310 and 1312 ranges between about 3 inches and 80 inches, and the length of conductors 1320 and 1322 ranges between about 1 inch and 70 inches.

Figure 14:
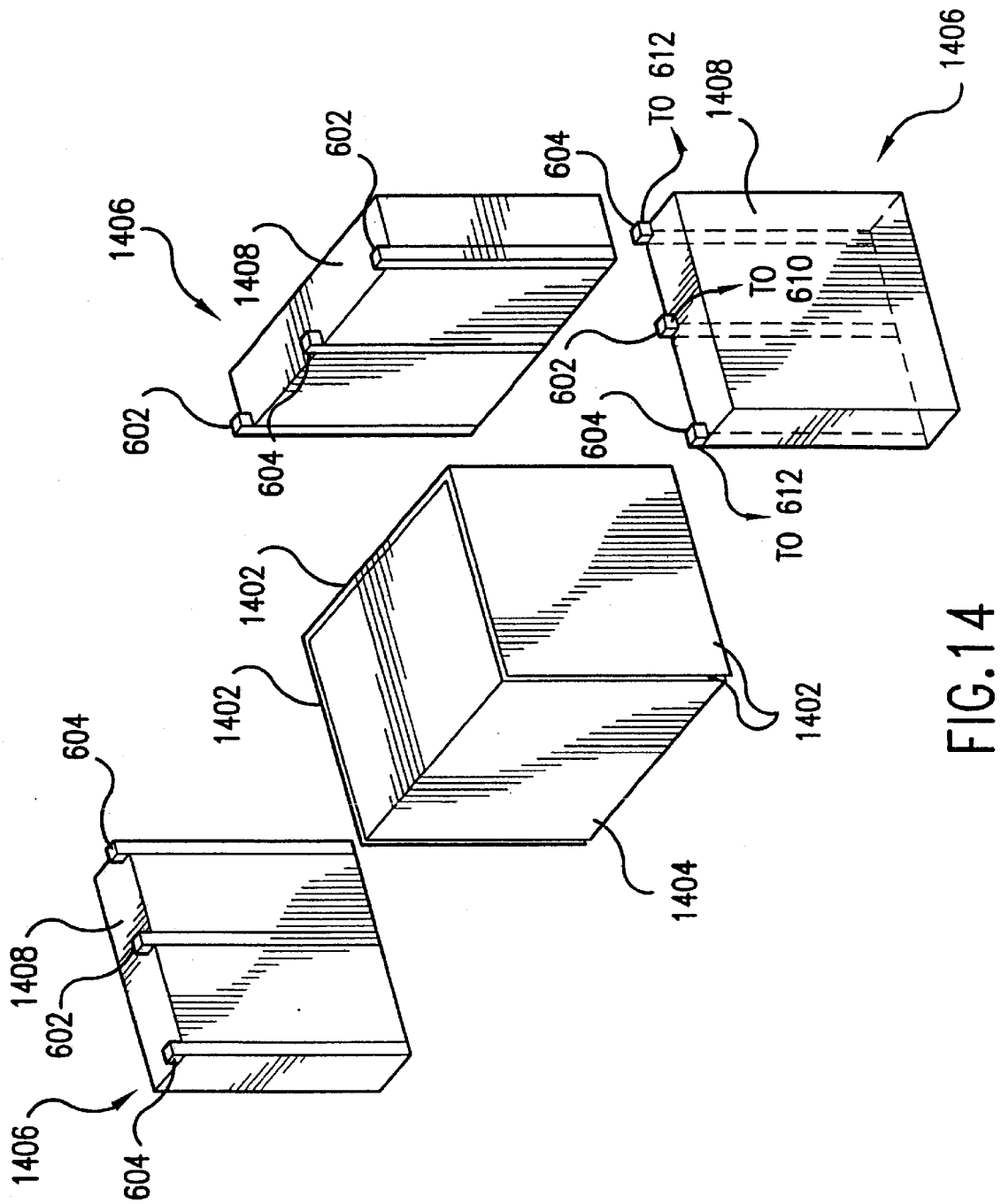

FIG. 14 shows another embodiment of a probe system for activating a multi-sided sample 1402. In this embodiment, sample 1402 is mounted on a block 1404. Sample 1402 may be mounted on any similar device which allows each side of sample 1402 to be exposed to moving probe blocks 1406. This particular example shows a three-sided sample exposed to three moving probe blocks 1406, however, the sample may include more sides and be exposed to an equivalent amount of moving probe blocks. Probe blocks 1406 include probes 602 and 604 mounted in an electrically insulating material such as, but not limited to, polytetrafluoroethylene (TEFLON™). Probes 602 and 604 are mounted on pressure plates 1408 of probe blocks 1406. In this particular example, three probes are used in each probe block 1406, two negatively charged probes 604 and one positively charged probe 602. However, more or less probes can be used, depending on the size of the probe blocks, as long as adjacent probes are oppositely charged. Probes 602 and 604 are coupled to an alternating voltage supply 502, via output terminals 610 and 612 as generally shown in FIG. 6. Probe blocks 1406 are moved into proximity of sample 1402 mounted on block 1404, preferably between 0.125 and 0.375 inch, thereby activating the compositions of the present invention, as previously described. Alternatively, probe blocks 1406 could be placed at the appropriate interval and block 1404 with sample 1402 could be moved into position to be activated. While FIG. 14 shows the probe blocks 1406 as having a regular shape, one skilled in the art will recognize that the probe blocks could be any three dimensional shaped object.

FIG. 15 shows another embodiment for activating a multi-sided sample 1502 using a stationary probe system. In this embodiment. probes 602 and 604 are mounted on multiple sides of a single probe block 1504, similar to the manner in which probes 602 and 604 were mounted in probe blocks 1406, described above. In this particular example, probes 602 are mounted on three sides of a generally square probe block 1504, but probes 602 and 604 could be mounted on multiple sides of any polygonal block or three dimensional object. Sample 1502 is brought into proximity of probe block 1504 by pressure plates 1506, thereby activating the compositions of the present invention, as previously described. In this particular example, two negatively charged probes 604 and one positively charged probe 602 are shown on each side of probe block 1504, however, it will be recognized that any number of probes could be utilized, depending on the application, as long as adjacent probes are oppositely charged. Probes 602 and 604 are coupled to an alternating voltage source 502 via output terminals 610 and 612, as generally depicted in FIG. 6.

Figure 16B:
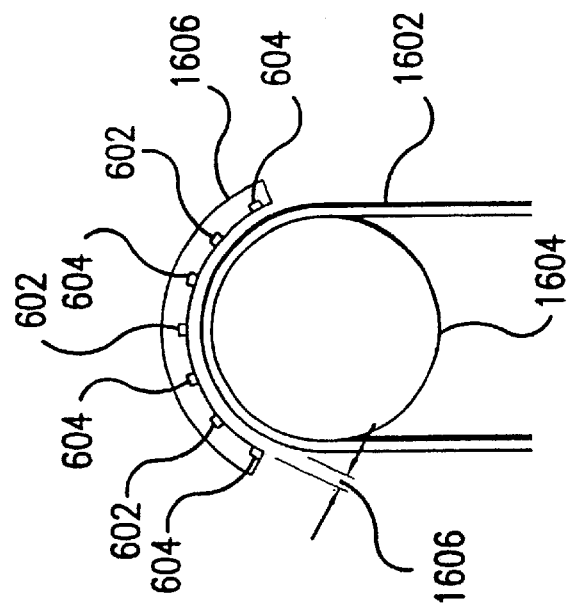
Figure 16A:
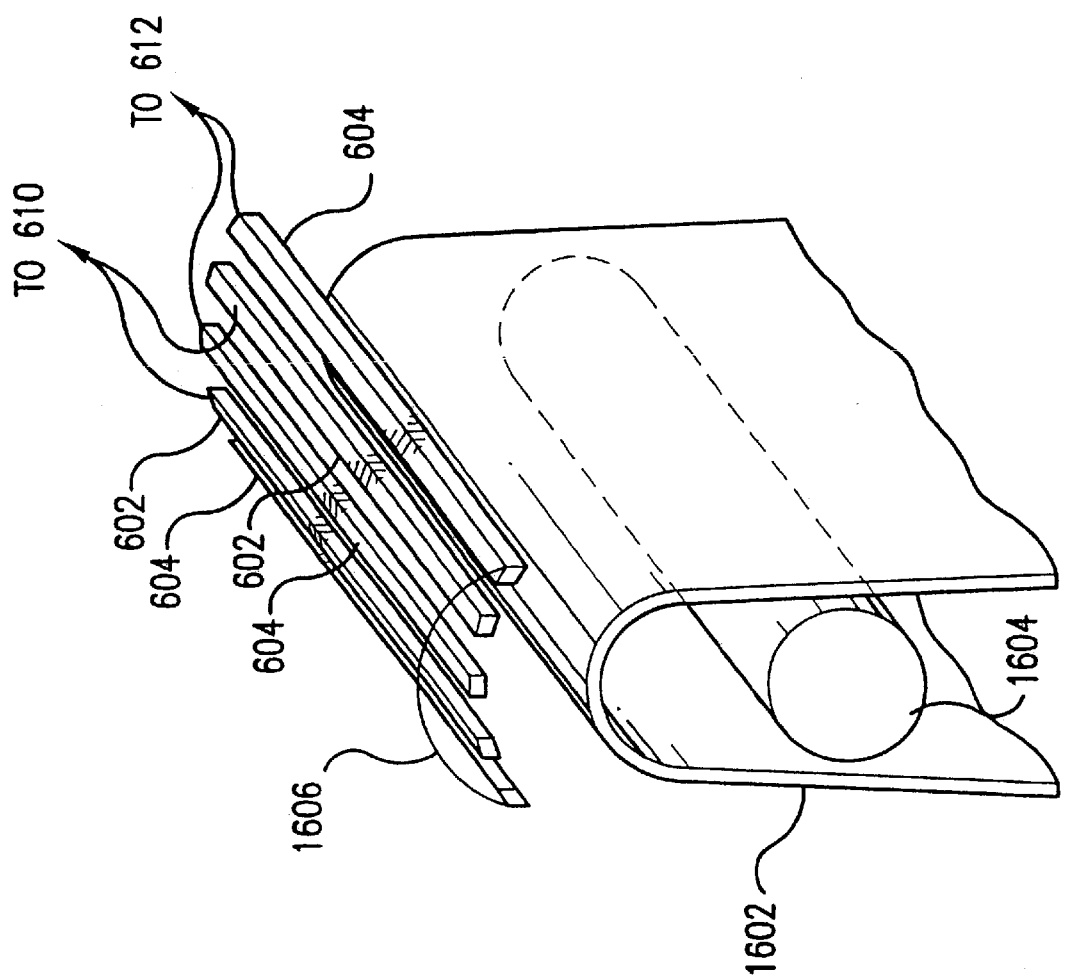

FIGS. 16A and 16B show yet another embodiment of a probe system for activating a sample material including compositions of the present invention. In FIGS. 16A and 16B, sample 1602 is draped over a conveyor rod 1604 and generally moves along the circumference of the conveyor rod. Conveyor rod 1604 is constructed of electrically non-conductive material. A probe system 1606 is disposed in proximity to a portion of the circumference of conveyor rod 1604, e.g., 0.02 to 1.5 inches, and more preferably within 0.125 to 0.375 inch, and is shaped to conform to the shape of conveyor rod 1604, as best seen in FIG. 16B. Probe system 1606 includes adjacent, alternately charged probes 602 and 604 for activating sample 1602. Probes 602 and 604 are coupled to an alternating voltage source 502, as generally depicted in FIG. 6.

Figure 17:
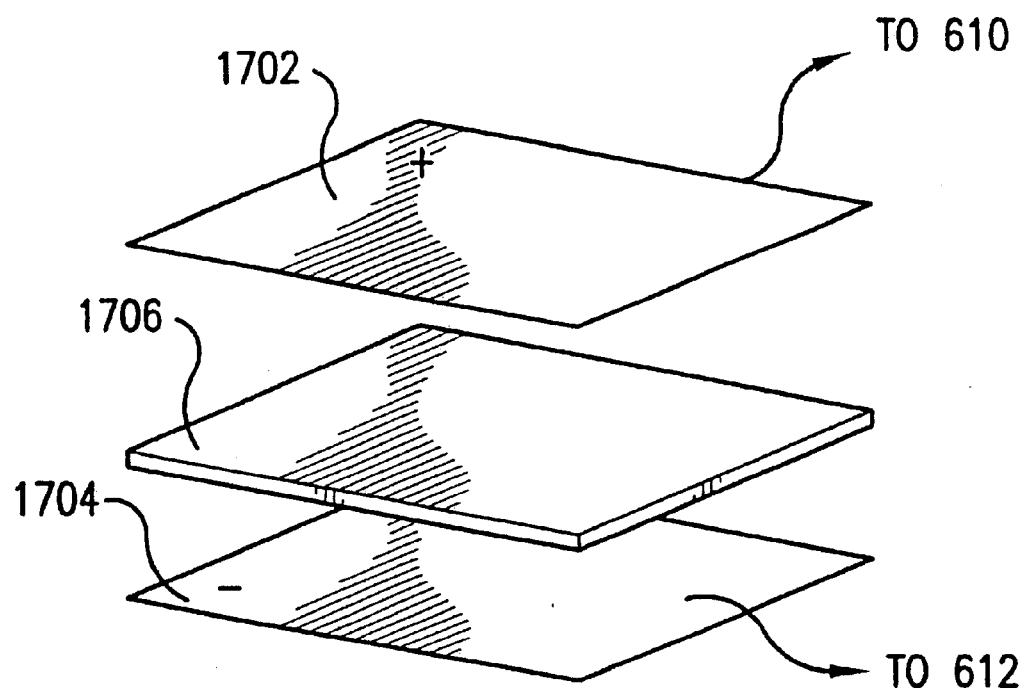

The probe systems described above all activate a single side of the sample material. However, probe systems could be placed on both sides of the material in each of the above-described embodiments, provided that the polarity of the probes is such that the electromagnetic fields do not cancel each other out. A particular example of an activation system for activating both sides of the material is shown in FIG. 17. Rather than using a probe system, two oppositely charged conductive plates 1702 (positively charge) and 1704 (negatively charged) are disposed on opposite sides of sample material 1706. Plates 1702 and 1704 are preferably constructed of copper, but may be constructed of any suitable conductive material, such as the aforementioned conductive materials of probes 602 and 604. Sample material 1706 may be stationary or moving when exposed to the activation region between plates 1702 and 1704. Plates 1702 and 1704 are preferably spaced between 0.02 and 24 inches, more preferably between 0.02 and 15 inches, and most preferably between 0.05 and 0.375 inches. Plates 1702 and 1704 are coupled to an alternating voltage source 502 via output terminals 610 and 612, as generally depicted in FIG. 6.

X. APPLICATOR SYSTEM FOR APPLYING A COMPOSITION OF THE PRESENT INVENTION TO A SUBSTRATE/ADHERAND

Figure 18:
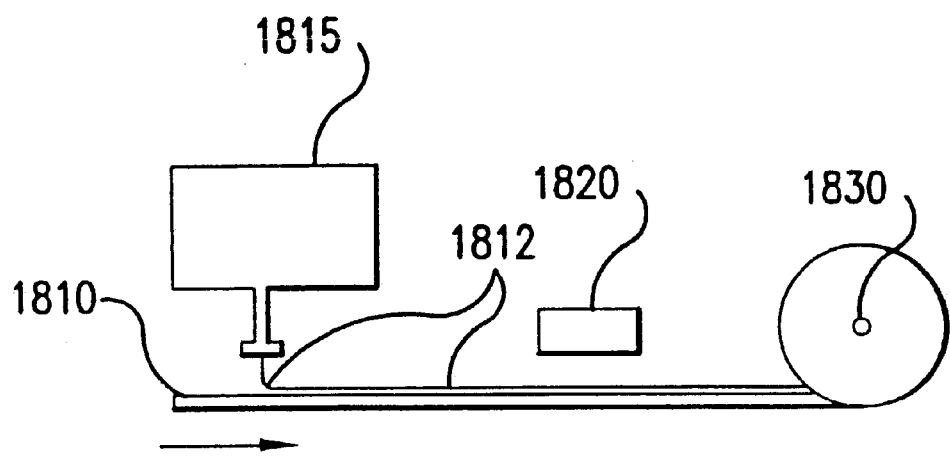
FIG. 18 illustrates one embodiment of an application system for applying a composition according to the present invention to a substrate.

FIG. 18 illustrates one embodiment of an application system 1800 for applying a composition according to the present invention to an adherand 1810. The manufacturing system includes an applicator 1815. Applicator 1815 applies a hot melt or liquid dispersion or powder of the composition 1812 to one side of adherand 1810. Composition 1812 may be applied via a hot melt by applying heat to the composition 1812 so that it reaches its melting point and can be applied to an adherand. In a hot melt application heat is applied to the composition 1812 in the applicator 1815, and the composition 1812 is applied to the adherand at a temperature between 200 and 325 degrees Fahrenheit, preferably 250 degrees Fahrenheit.

Composition 1812 may also be formulated as a liquid dispersion. The composition 1812 can then be applied to the adherand at room temperature. Once the liquid dispersion composition 1812 is applied to the adherand, the coated material 1810 is passed through a heating system 1820. Heating system 1820 acts to dry the composition 1812. Heating system 1820 can be any conventional heating system, like an oven, or heating system 1820 can be an RF heating system, such as heating system 500 described above. Other drying means that may be employed include, for example, a heat lamp with or without a fan to remove volatiles, or microwave heating system.

Composition 1812 can be applied in powder form by conventional electrostatic gun/spray.

In one embodiment, the coated adherand 1810 is rolled onto a roller 1830 after composition 1812 is sufficiently dried. Alternatively, the coated adherand 1810 can be cut into pieces and stacked. The coated susceptor 1810 can be used at a later point in time in the bonding process described above. The bonding process can occur anytime within a few seconds up to many months after the adherand 1810 has been coated with composition 1812.

XI. SYSTEM FOR ADHERING OR BONDING TWO ADHERANDS

Figure 19:
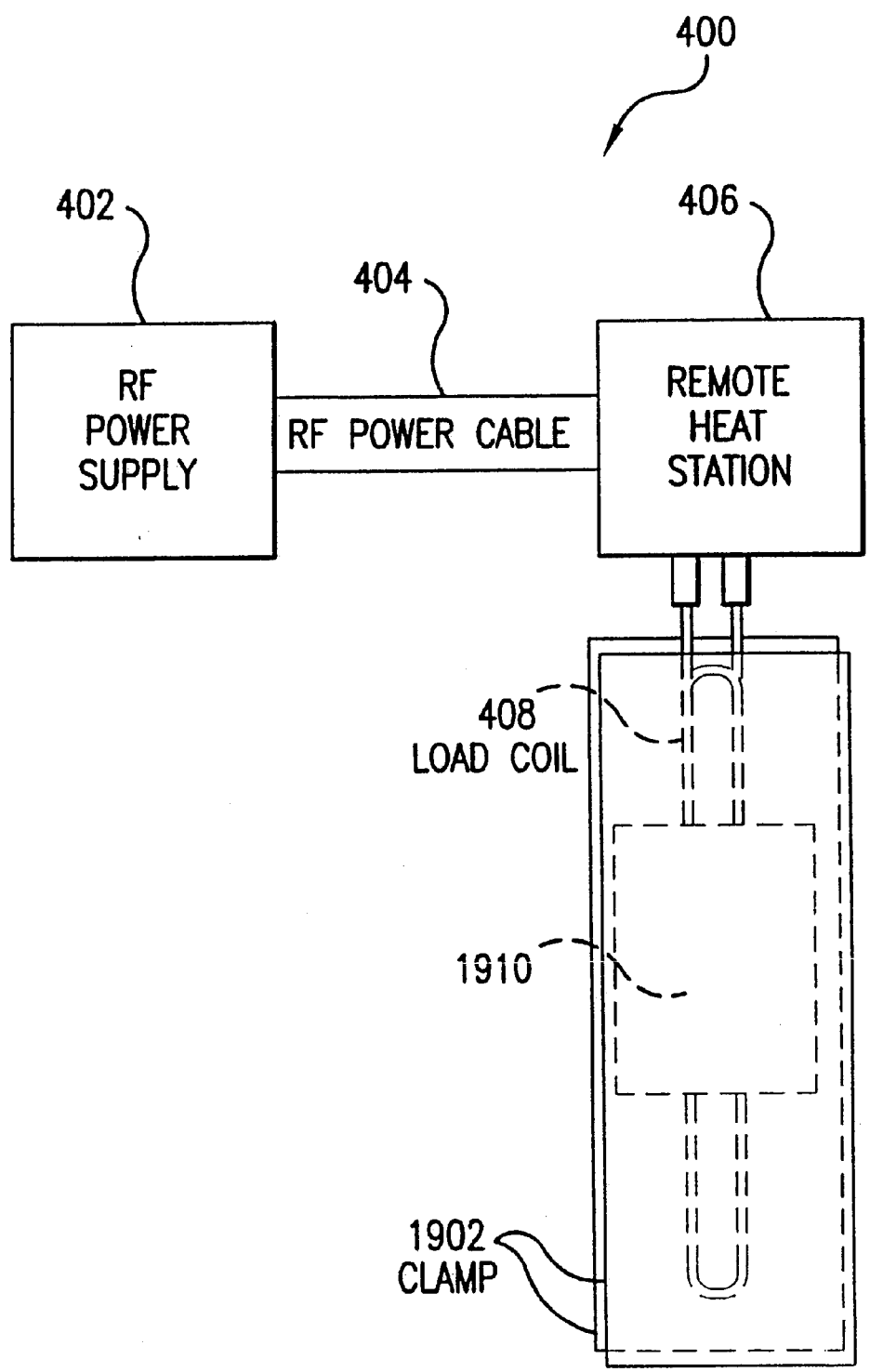
FIG. 19 illustrates one embodiment of a system for bonding or adhering various adherents.

FIG. 19 illustrates one embodiment of a system for bonding or adhering various adherands or layers. The system utilizes RF heating system 400, including power supply 402, cable 404, heat station 406, and coil 408, and clamp 1902. The adherands to be bonded by RF heating 400, shown as layers 1910, pass through or in proximity to coil 408. Layers 1910 can either be coated with a suitable susceptor composition, can sandwich a film made from a susceptor composition or can sandwich an insoluble, porous carrier (such as a thermoplastic carrier web) that is saturated with a susceptor composition as described above. A clamp 1902 provides uniform pressure to the adherands to be bonded or adhered. Alternatively, coil 408 can be implemented to provide a uniform pressure to the adherands to be bonded or adhered. Precision bonding or adhering takes place as the layers 1910 are exposed to the electromagnetic field generated when an alternating current flows through coil 408. The electromagnetic field has sufficient RF energy to activate the bonding composition. Preferably, layers 1910 are exposed to the electromagnetic field for at least 100 milliseconds to several seconds or minutes. In the case of thermoset compositions, in general, longer times are needed, e.g. from 1 second to several minutes or hours.

Figure 20A:
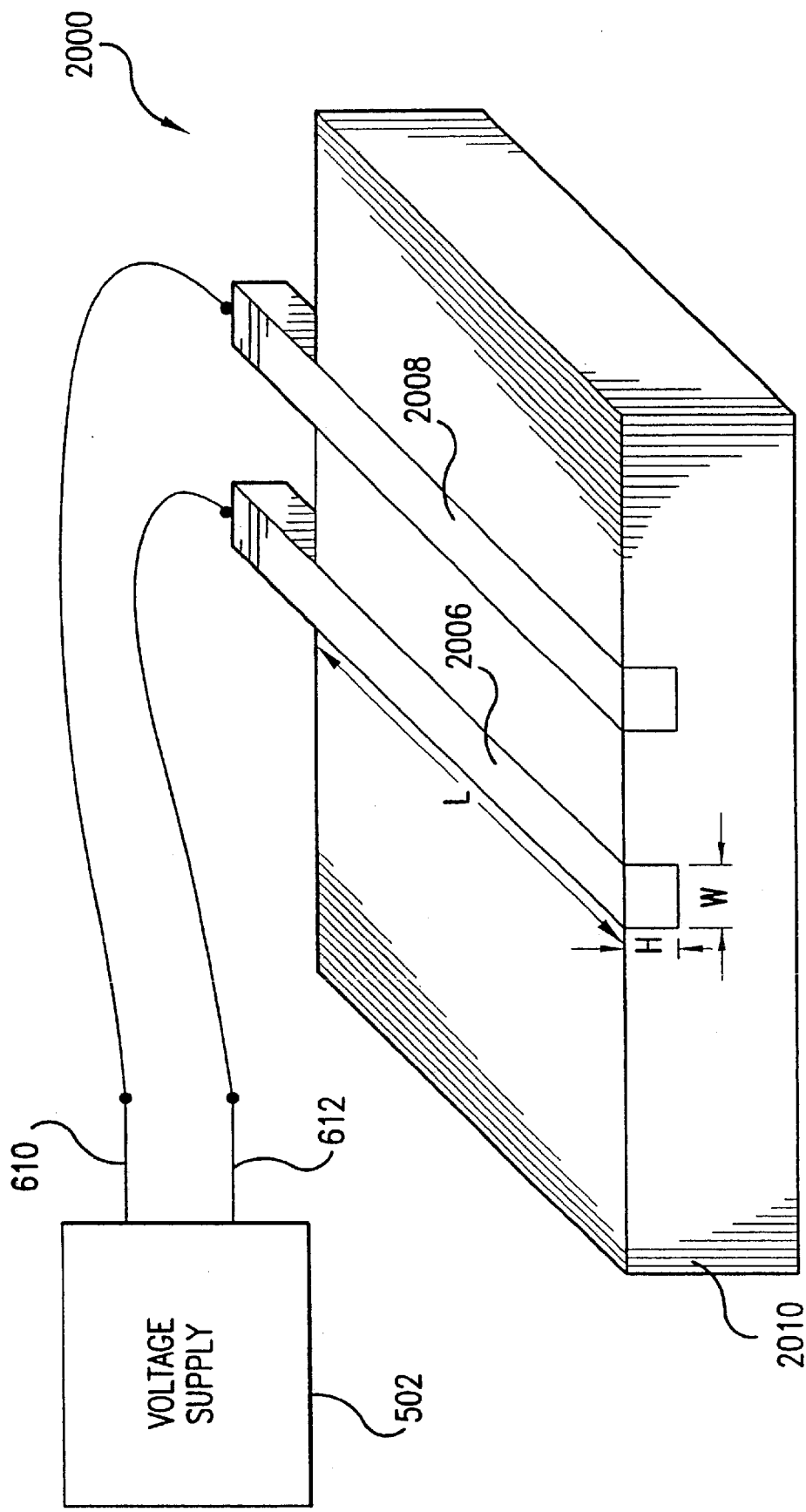
FIGS. 20A and 20B illustrates a static bonding system for bonding adherents.
Figure 20B:
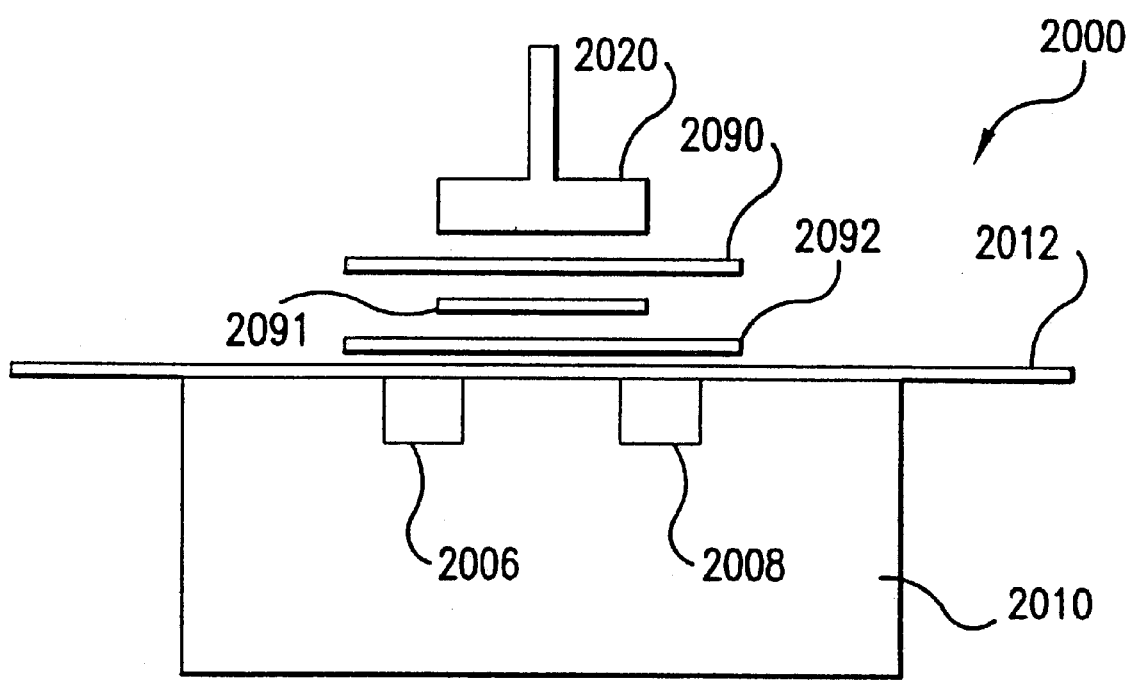

FIGS. 20A and 20B illustrates a static bonding system 2000 for bonding or adhering adherands 2090 and 2092 (see FIG. 20B). Bonding system 2000 is referred to as a static because the adherands to be bonded do not substantially move while they are being exposed to the electromagnetic field that activates an RF activatable composition which is located between the adherands.

Referring now to FIG. 20A, bonding system 2000 includes a power supply, such as voltage supply 502, for generating an alternating voltage between output terminal 612 and output terminal 610. Connected to output terminal 612 is a probe 2006, and connected to output terminal 610 is a probe 2008. The characteristics of probe 2006 and probe 2008 are described above with reference to probes 602 and 604. In one embodiment, probe 2006 and 2008 are rectangular hollow tubes made from a conductive material, preferably copper. Preferably, the height (H) and width (W) of each probe is about equal, and the length (L) is generally larger than the height and width. For example, in one embodiment, the height and width of each probe is about ⅛ of an inch, whereas the length of each probe is about 10 inches. In general, the height and width of a rectangular probe, or the diameter for a cylindrical probe, ranges between about 0.02 and 0.5 inches, and the length generally ranges from about 0.25 inches to 20 feet.

System 2000 is not limited to two probes. A third probe (not shown) could be placed adjacent to probe 2006 such that probe 2006 will then be between the new probe and probe 2008. With this configuration, the new probe would be connected to the output terminal that probe 2008 is connected to, which in this case is terminal 610. An exemplary three probed system is illustrated in FIG. 13A. One skilled in the art should recognize that any number of probes could be used, provided that no two adjacent probes are connected to the same output terminal of voltage supply 502.

In one embodiment, probes 2006 and 2008 are placed in an electrically insulating block 2010. Insulating block 2010 is composed of an electrically insulating material, such as, but not limited to polytetrafluoroethylene (TEFLON™). An optional electrically insulating layer 2012 (see FIG. 20B) may be placed on top of probes 2006 and 2008. Preferably, electrically insulating layer is made from polytetrafluoroethylene or other like material which resists adhesion of the substrates or adherands thereto.

Figure 20C:
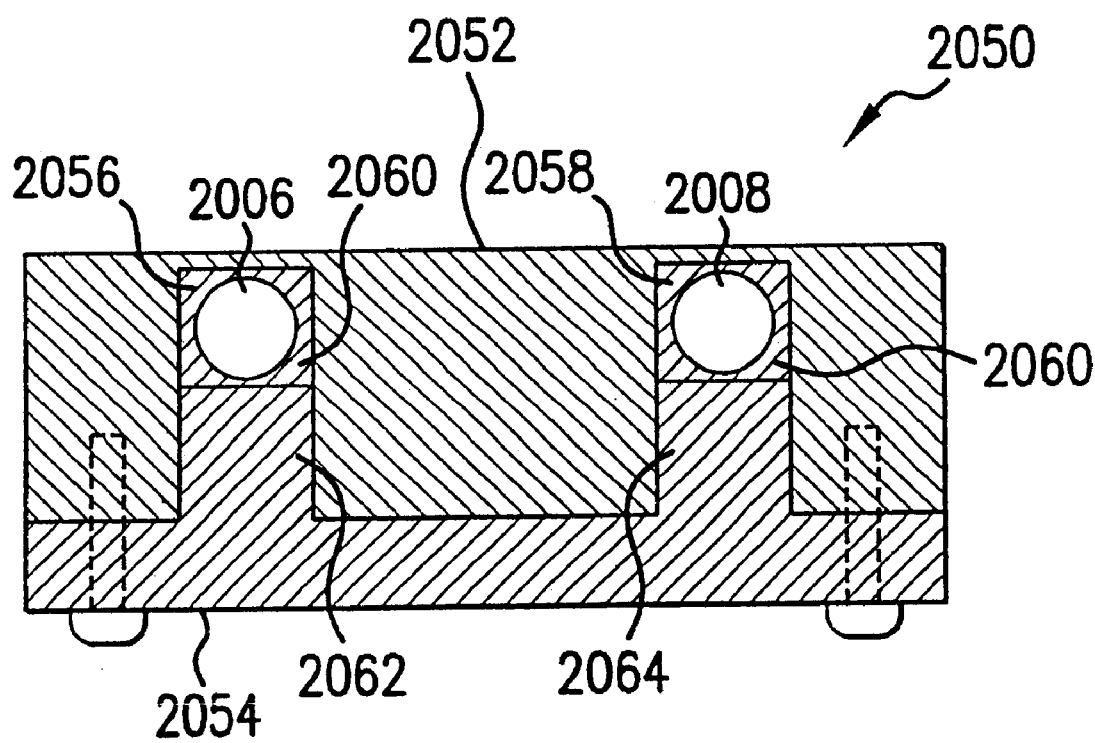
FIG. 20C illustrates an electrically insulating block for housing probes.

An alternative electrically insulating block 2050 is illustrated in FIG. 20C. FIG. 20C shows a cross-sectional view of probes 2006 and 2008 housed within the insulating block 2050. Insulating block 2050 is formed from two elements, insulating element 2052 and insulating element 2054.

Insulating element 2052 has two U shaped recesses 2056 and 2058 for receiving probes 2006 and 2008, respectively. In one embodiment, a low dielectric encapsulate 2060 is placed with the probes in the recesses. Insulating element 2054 has two protrusions 2062 and 2064 for mating with the recesses 2056 and 2058 of insulating element 2052. Preferably, both insulating element 2052 and insulating element 2054 consist primarily of polytetrafluoroethylene (TEFLON™).

Referring now to FIG. 20B, to bond adherand 2090 to adherand 2092, adherand 2090 and/or adherand 2092 is coated with a suitable composition 2091, or a film of the composition 2091 is sandwiched between adherand 2090 and adherand 2092, or an insoluble porous carrier is saturated with composition 2091 and placed between adherand 2090 and adherand 2092. Adherands 2090 and 2092 are then placed over probes 2006 and 2008 such that composition 2091 is between the adherands and over the region between probe 2006 and probe 2008, as shown. Power supply 502 is then activated, which creates an alternating voltage between terminals 612 and 610, which creates an electromagnetic field between probes 2006 and 2008. The composition 2091 is exposed to the electromagnetic field for a predetermined amount of time. The predetermined amount of time can range between about 100 milliseconds to about one second, several minutes, or hours depending on the composition and/or the strength of the electromagnetic field. The electromagnetic field causes composition 2091 to heat. When composition 2091 reaches a given temperature, the composition will begin to melt and flow, causing an impedance change on the matching circuit 812. The impedance change can be detected by a change in reflected power signal 832. This change in reflected power signal 832 can be used to control the intensity of the RF energy. Other methods of detecting when composition 2091 melts is to detect displacement of a pressure plate 2020 with a feed back loop. After the predetermined amount of time has expired or while the composition is exposed to the electromagnetic field, the adherand can be pressed together using pressure plate 2020, pressure roller (not shown), or any other pressure delivery apparatus or means, thereby assuring a good bond.

The resulting bond can be an adhesive bond, mechanical bond, thermal bond, or any combination of aforementioned bonds. For example, composition 2091 may have adhesive properties to create an adhesive bond between adherands 2090 and 2092, and/or composition 2091 may be used as a source of thermal energy for welding the adherands together.

An advantage of the present invention is that non-electrically conductive materials can be stacked on top of an adherand without affecting the bonding process. Only composition 2091 is directly heated when the layers are exposed to RF energy. Thus, by selectively heating only the composition 2091, multiple layers may be assembled prior to forming the bond between adherands 2090 and 2092. This allows the assembly of complex laminates prior to bonding.

Another advantage of the present invention is that RF energy can be re-applied to the bonded product and the two (or more) adherands 2090 and 2092 can be disassembled.

This is known as de-activating the composition 2091. In fact, the composition 2091 can be activated and de-activated a number of times.

Figure 38:
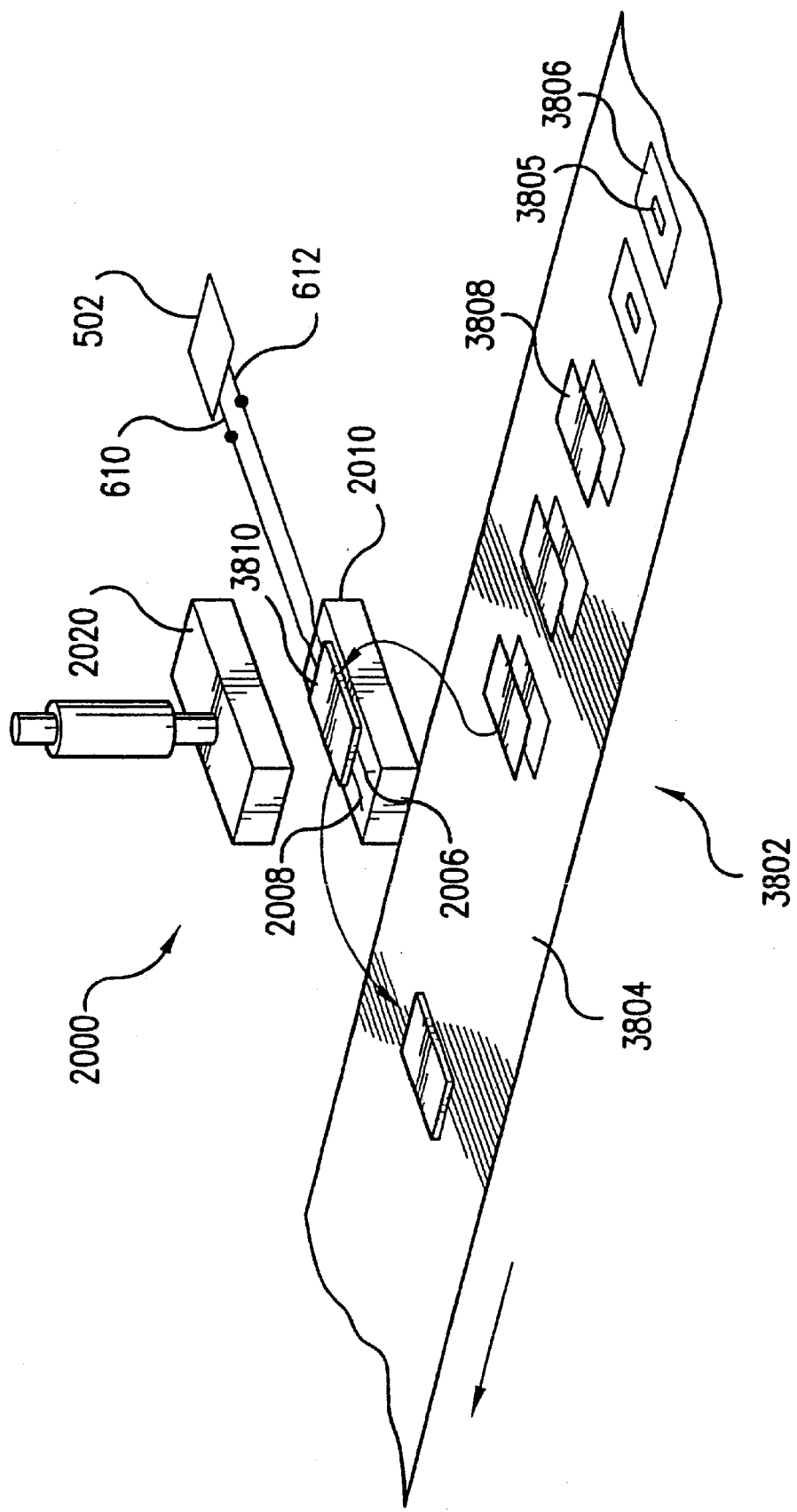
FIG. 38 illustrates a step and repeat manufacturing system.
Figure 39:
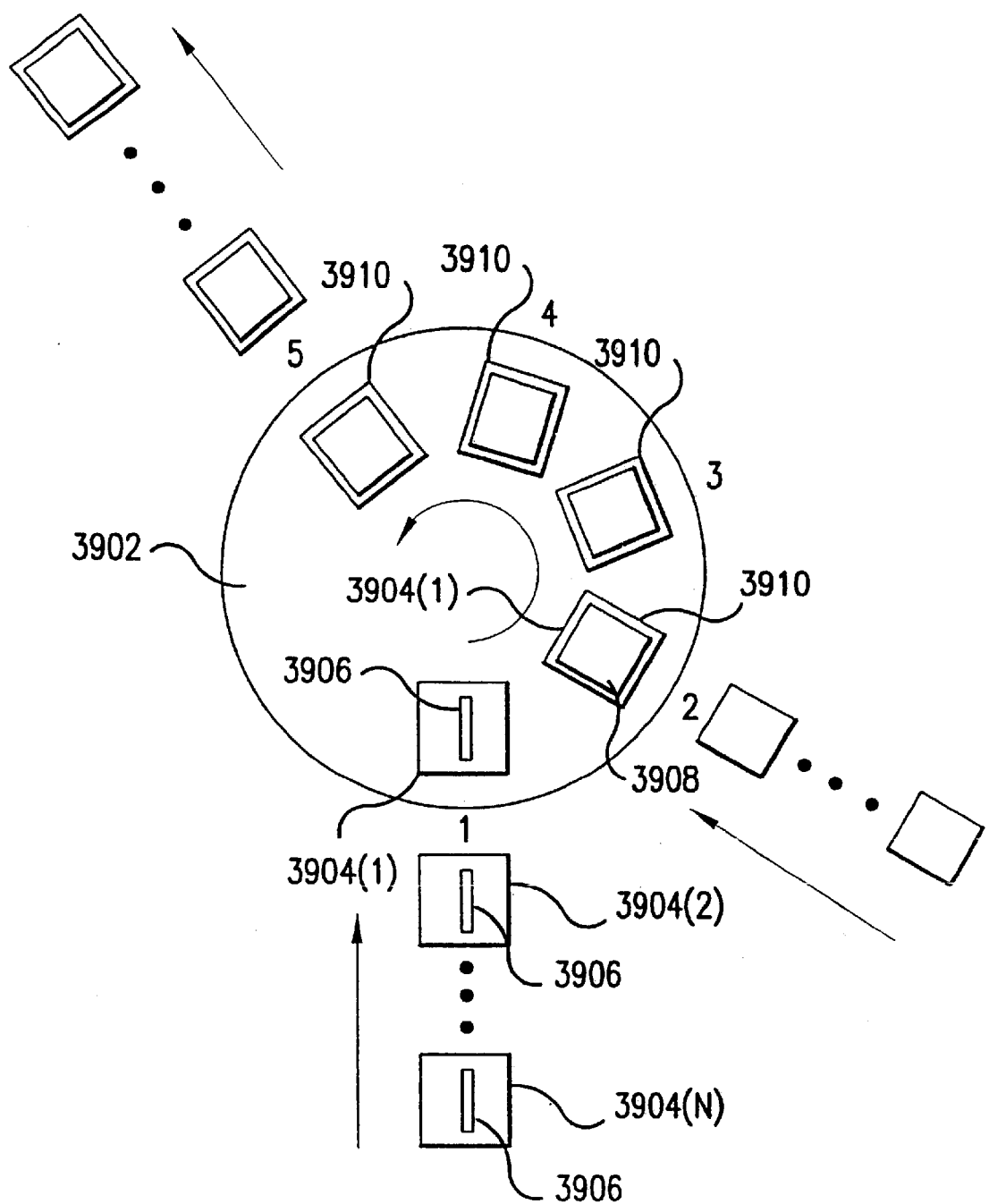
FIG. 39 illustrates an index table bonding system.

FIGS. 38 and 39 illustrate two exemplary manufacturing systems in which static bonding system 2000 could be utilized. FIG. 38 illustrates a step and repeat manufacturing system. There are many applications in general manufacturing where adherands are joined or bonded together using an adhesive. In a conventional step and repeat joining (or bonding) system there is a gluing station immediately followed by a joining station. The gluing station applies an adhesive to an adherand. After the adhesive is applied, the adherand moves immediately to a joining station where it is brought together with the other adherand to which it is to be joined. The joining station then nips the adherands together to form a bond.

The adhesive compositions according to the present invention allow the adhesive to be applied to the adherand(s) prior to the adherand(s) entering the manufacturing line. For example, the adhesive compositions according to the present invention may be applied at the part supplier's facility with on-demand bonding occurring for, example, days, weeks, or months later, by RF activation.

Referring now to FIG. 38, a step and repeat manufacturing process as applied to a continuous production line 3802 with base adherand 3806 and top adherand 3808 being supplied to bonding system 2000 on a conveyor system 3804. In one embodiment, base adherand 3806 is pre-coated with an adhesive composition 3805 according to the present invention. Base adherand 3806 could have been coated minutes, days, weeks, or months prior to base adherand 3806 entering continuous production line 3802. Base adherand 3806 travels along the conveyor 3804 and top adherand 3808 is assembled to base adherand 3806 by hand or automatic system (not shown). The assembled adherands 3810 are placed onto a pressure plate 2010 in which probes 2006 and 2008 are embedded. The bonding process begins when an electromagnetic field is created between probes 2006 and 2008 by power supply 502. The electromagnetic field activates the adhesive composition 3805, which then creates a bond between adherands 3806 and 3808. Pressure plate 2020 is used to nip the bond during and/or after RF activation. After the bond is nipped, the assembly 3810 is removed from bonding system 2000 and placed back on the conveyor 3804.

FIG. 39 illustrates an index table bonding system. Index table bonding systems are used in many manufacturing industries to automate the bonding process. Examples include the bonding of labels onto bottles. The index table process allows for setting up multiple stations where different processes in the assembly process are performed. The time the index table stops at each station is the same, thus it is dependent upon the slowest process. An advantage of using an adhesive composition according to the present invention includes the pre-application to one or both of the parts to be bonded prior to loading the parts onto the index table. Other advantages are fast activation and curing time. Consequently, by removing the adhesive application from the index table, one less station is used and a higher production throughput is achieved.

Referring now to FIG. 39, an index table bonding system is described. The index table bonding system includes an index table 3902, which is generally round and rotates either clockwise or counter-clockwise. Base parts 3904(1)–(N) having a pre-applied adhesive composition 3906 are placed onto index table 3902. When index table 3902 moves base part 3904(1) to the next station (station 2), a top part 3908 is placed onto base part 3904 to form assembly 3910. Assembly 3910 then moves to station 3 where it is exposed to an RF field, which activates adhesive composition 3906. In station 3, the RF field is generated by probes (not shown) positioned so that adhesive composition 3906 is activated. The probes may be configured to either contact the assembly 3910 and apply some pressure to aid in the bonding process. Alternatively, the probes could be configured so there is no contact with the assembly 3910. After activation of the adhesive 3906, the assembly 3910 moves to station 4 for a nip or cure portion of the bonding process. After station 4, the assembly 3909 moves to station 5 where it is unloaded from the index table 3902.

Figure 21:
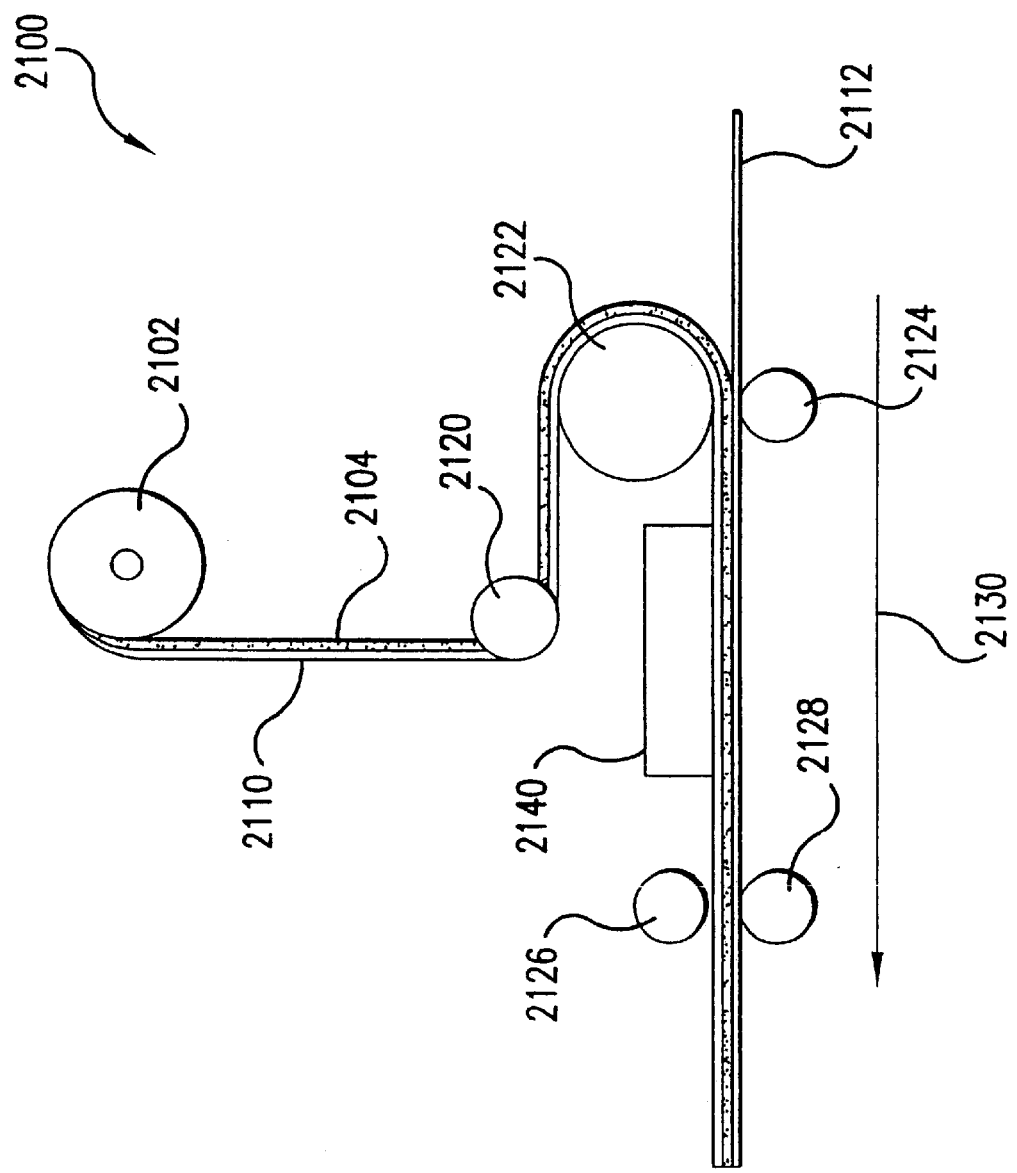
FIG. 21 illustrates an in-line bonding system.

FIG. 21 illustrates a dynamic bonding system 2100 (also referred to as an in-line bonding system) for bonding or adhering adherands. Bonding system 2100 is referred to as dynamic because the adherands to be adhered, adherands 2110 and 2112, continuously move through an electromagnetic field; which is generated by heating system 2140. In one embodiment, adherand 2110 is pre-coated with a composition 2104 according to the system shown in FIG. 18.

Bonding system 2100 includes a roll 2102 of coated adherand 2110 and plurality of rollers 2120, 2122, 2124, 2126, and 2128 for, among other things, continuously guiding coated adherand 2110 and adherand 2112 through an electromagnetic field generated by heating system 2140. In one embodiment, coated adherand 2110 and adherand 2112 move through the electromagnetic field at a rate of about 00.01 to 2000 feet per minute, most preferably, about 1000 feet per minute (ft/minute).

The bonding process begins when coated adherand 2110 is fed onto roller 2120. Coated adherand 2110 is then passed over roller 2122. A pressure activated construction bond may be formed by passing the two adherands 2110 and 2112 between roller 2122 and nip roller 2124. A construction bond may be required in this process to maintain the proper location of coated adherand 2110 and adherand 2112 prior to and/or during activation. Preferably, the composition 2104 is formulated to provide a pressure sensitive tack when a construction bond is needed. Coated adherand 2110 and adherand 2112 are not limited to any particular thickness. As should be readily apparent to one skilled in the art, the system can be designed to accommodate any reasonable thickness of adherand.

In this embodiment, the invention relates to a method for dynamically bonding a first adherand to a second adherand, comprising:

(1) creating an article of manufacture comprising the first adherand, the second adherand, and a susceptor composition of the present invention, the composition being placed between the first adherand and the second adherand ;

(2) moving the article of manufacture along a predetermined path;

(3) generating along a portion of the predetermined path an RF field having sufficient energy to activate the composition, wherein the composition is activated by its less than one second exposure to the RF field.

In a preferred embodiment, the article passes through the RF field at a rate of at least about one-thousand feet per minute. In a more preferred embodiment, the article passes through the RF field at a rate of about 1000 feet per minute.

Figure 22:
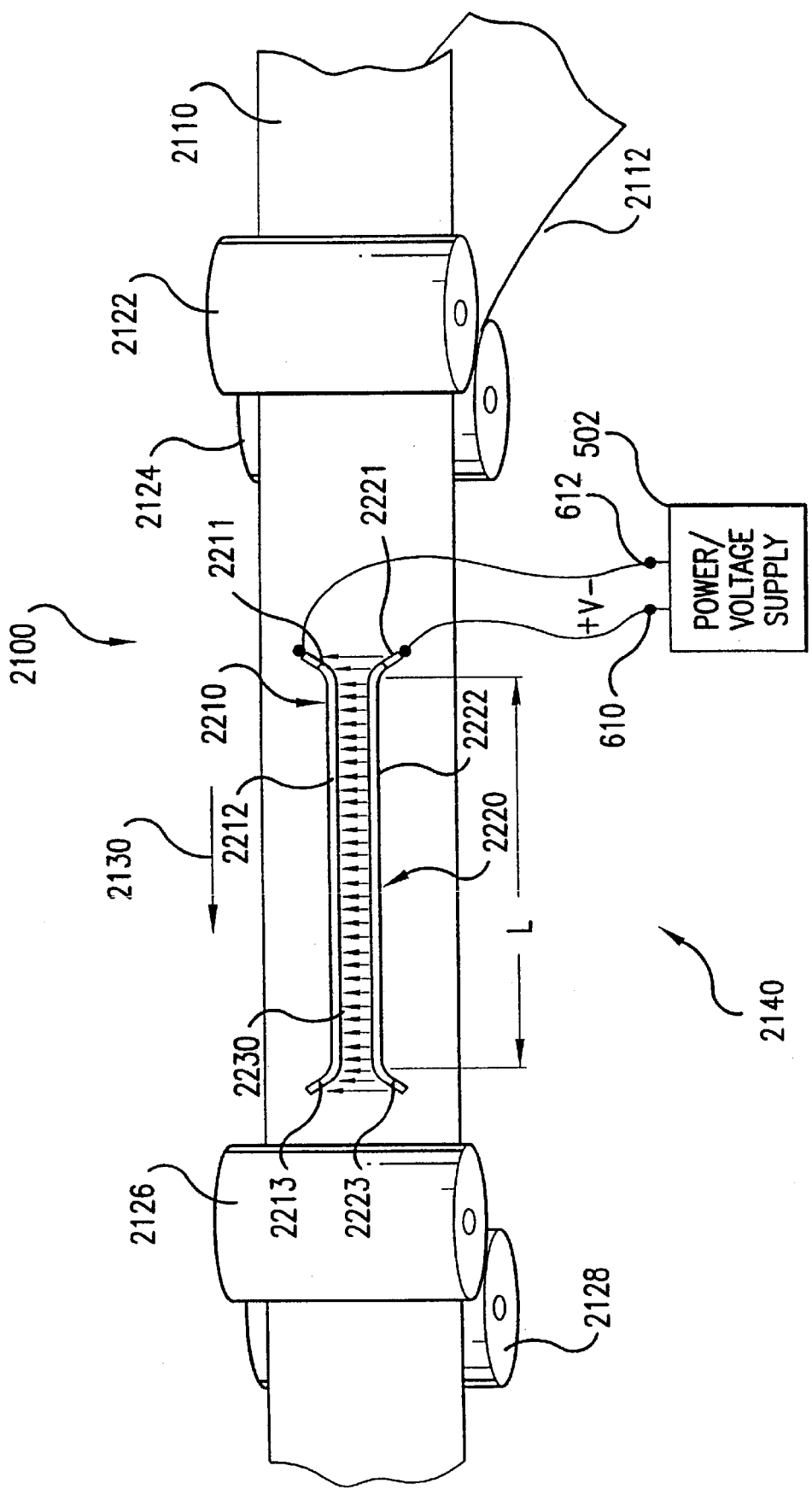
FIG. 22 further illustrates one embodiment of the in-line bonding system illustrated in FIG. 21.

Referring now to FIG. 22, after the construction bond is formed, the construction bonded coated adherand 2110 and adherand 2112 are passed through an RF field 2230, which is generated by heating system 2140. FIG. 22 further illustrates heating system 2140 for use in dynamic bonding system 2100.

Heating system 2140 includes a power supply, such as power supply 502, for generating an alternating voltage between terminal 612 and terminal 610. Connected to terminal 612 is a probe 2210, and connected to terminal 610 is a probe 2220. The characteristics of probes 2210 and 2220 are described above with reference to probes 602 and 604 and probes 2006 and 2008. In one embodiment, probe 2210 has a distal section 2211, a center section 2212 and a proximal section 2213. Similarly, in one embodiment probe 2220 has a distal section 2221, a center section 2222 and a proximal section 2223. Preferably, center section 2212 is parallel with center section 2222, and they both have a length of about 48 inches when the adherands 2110 and 2112 are traveling at about 1000 feet/minute in the direction indicated by arrow 2130. This configuration results in about a preferred 240 millisecond dwell time. Dwell time refers to the maximum amount of time that any given point on adherands 2110 and 2112 is positioned beneath (or over) probes 2210 and 2220 (i.e., within the activation region). If the speed of the adherands 2110 and 2112 is increased, the preferred dwell time can remain constant by increasing the length of probes 2210 and 2212. For example, if it is desired for the adherands 2110 and 2112 to move at a rate of about 2000 feet/min over probes 2210 and 2220, and the preferred dwell time is about 100 milliseconds, then the minimum length of probes 2210 and 2220 would be about 40 inches. Although a preferred dwell time is 600 milliseconds, the dwell time can be increased to several minutes if desired by increasing the length of probes 2210 and 2220, e.g., from about the 20 inches to 20 feet, and/or decreasing the speed at which adherands 2112 and 2110 travel over probes 2210 and 2220. Shorter probes are also contemplated, for example from about 0.25 inches to about 20 inches.

Preferably, probes 2210 and 2220 are positioned with respect to coated adherand 2110 such that the composition that coats coated adherand 2110 is beneath (or above) an activation region. The activation region is the area between the center section 2212 and center section 2222.

The frequency of the alternating voltage generated by power supply 502 can range from the low Kilohertz to high Gigahertz range. In one embodiment the frequency ranges between about 1 MHz to about 5 GHz, most preferably about 60 MHz. The peak to peak level of the voltage generated by power supply 502 may range from about 500 V to 20 kV, most preferably about 1 to 15 kV. The composition 2104 will remain activated as long as the RF energy is delivered.

After the adherands 2110 and 2112 pass over (or under) probes 2210 and 2220 they are nipped by non-destructive nip rollers 2126 and 2128, which assure that a good bond is created between adherand 2110 and adherand 2112. For optimal performance, the nip rollers 2126 and 2128 apply pressure immediately after re-flow temperatures are achieved within the adhesive material. Additionally, nip roller 2126 and/or nip roller 2128 may be cooled to remove thermal energy from the adherands. Upon cooling, the composition forms a strong bond between the adherands 2110 and 2112. The bonded adherands can then be subsequently processed in accordance with a particular application.

There are a number of benefits of the above system. First, the system provides a finished bond in less than about one second of activation. Second, the activation process does not produce harmful emissions or by-products that may interfere with the bonding of two thin films. Third, the activation only occurs in the activation region.

Figure 23:
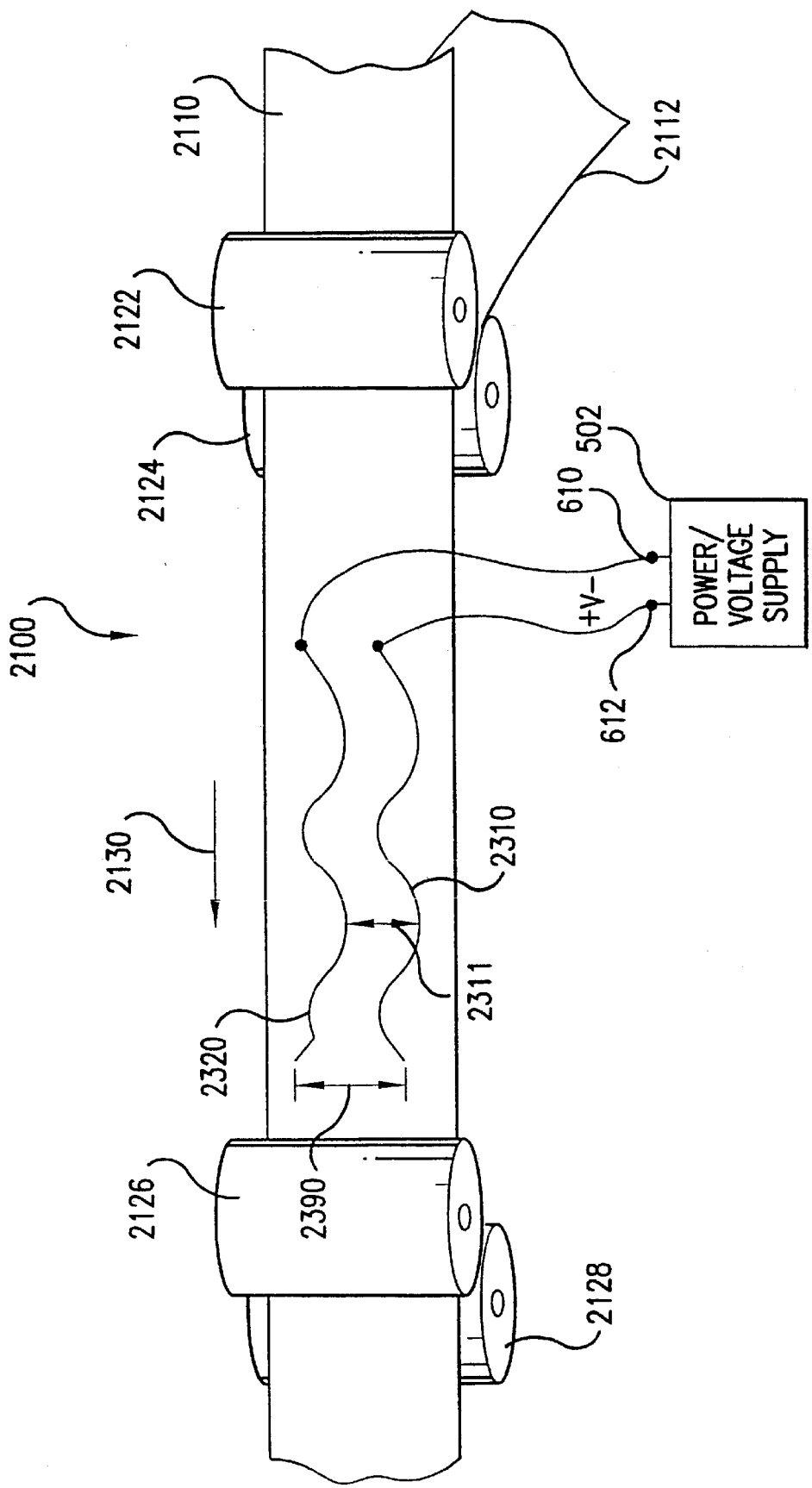
FIGS. 23–27 illustrate alternative designs of the in-line bonding system illustrated in FIG. 21.

FIGS. 23–27 illustrate alternative designs for heating system 2140. As shown in FIG. 23, curved probes 2310 and 2320 can be used in place of straight probes 2210 and 2220. An advantage of curved probes 2310 and 2320 is that the width 2390 of the activation region is greater then the distance 2311 between probes 2310 and 2320, whereas the width of the activation region provided by probes 2210 and 2220 equals the distance between center section 2212 of probe 2210 and center section 2222 of probe 2220.

Figure 24:
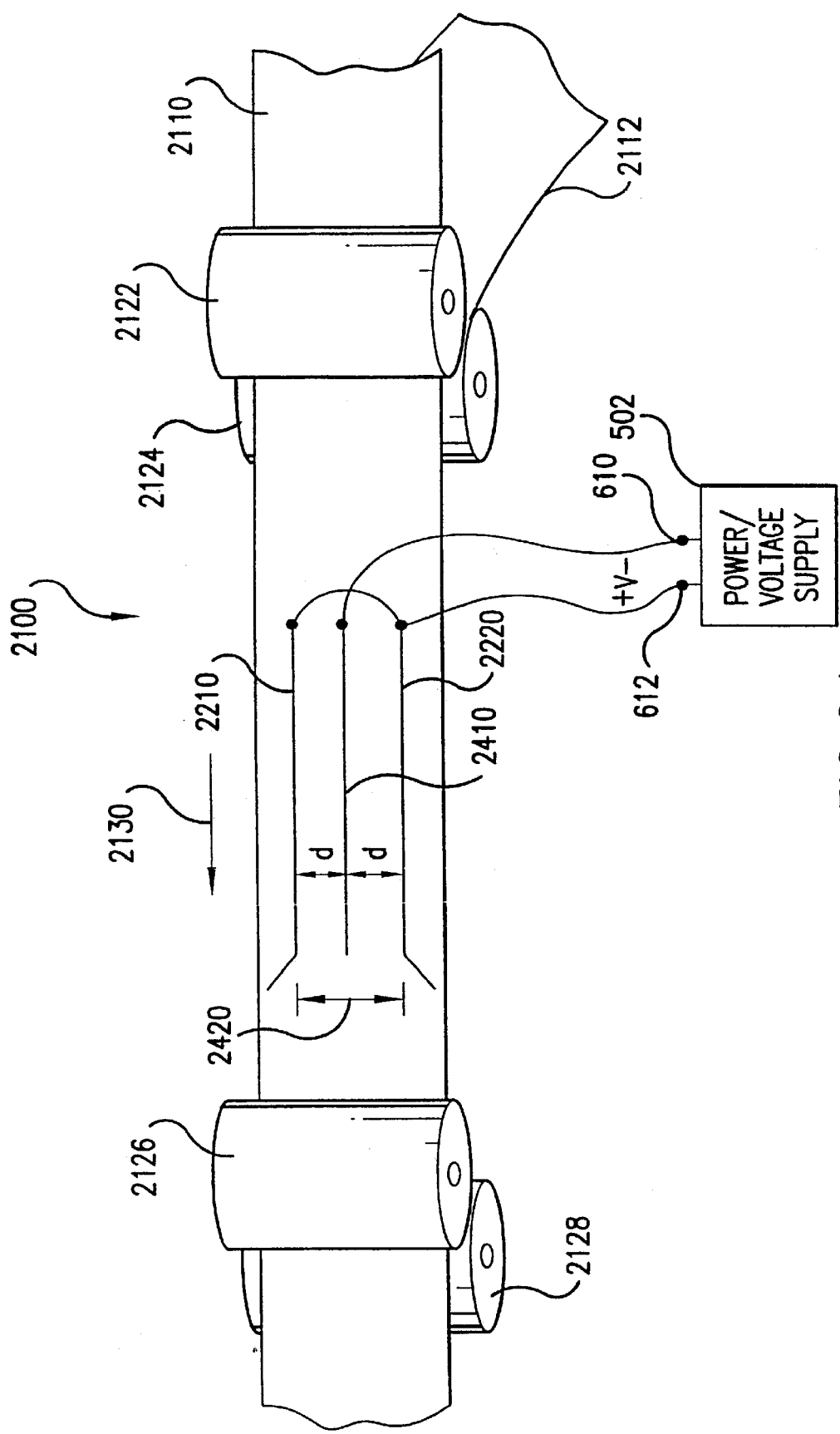

The heating systems shown in FIG. 24 includes probe 2410 in addition to probes 2210 and 2220. Probe 2410 is positioned between probes 2210 and 2220. Probe 2410 is parallel with probes 2210 and 2220. Preferably, the distance (d) between probe 2410 and 2210 is equal to the distance (d) between probe 2410 and probe 2220. Probes 2210 and 2220 are both connected to the same output terminal of voltage supply 502, whereas probe 2410 is connected to the other output terminal. An advantage of the probe design illustrated in FIG. 24, is that it provides a larger activation region. The width 2420 of the activation region is greater than the distance (d) between any two of the probes. Based on the above description, one skilled in the art will recognize that any number of probes can be used in heating system 2140, provided that no two adjacent probes are connected to the same output terminal of voltage supply 502.

Figure 25:
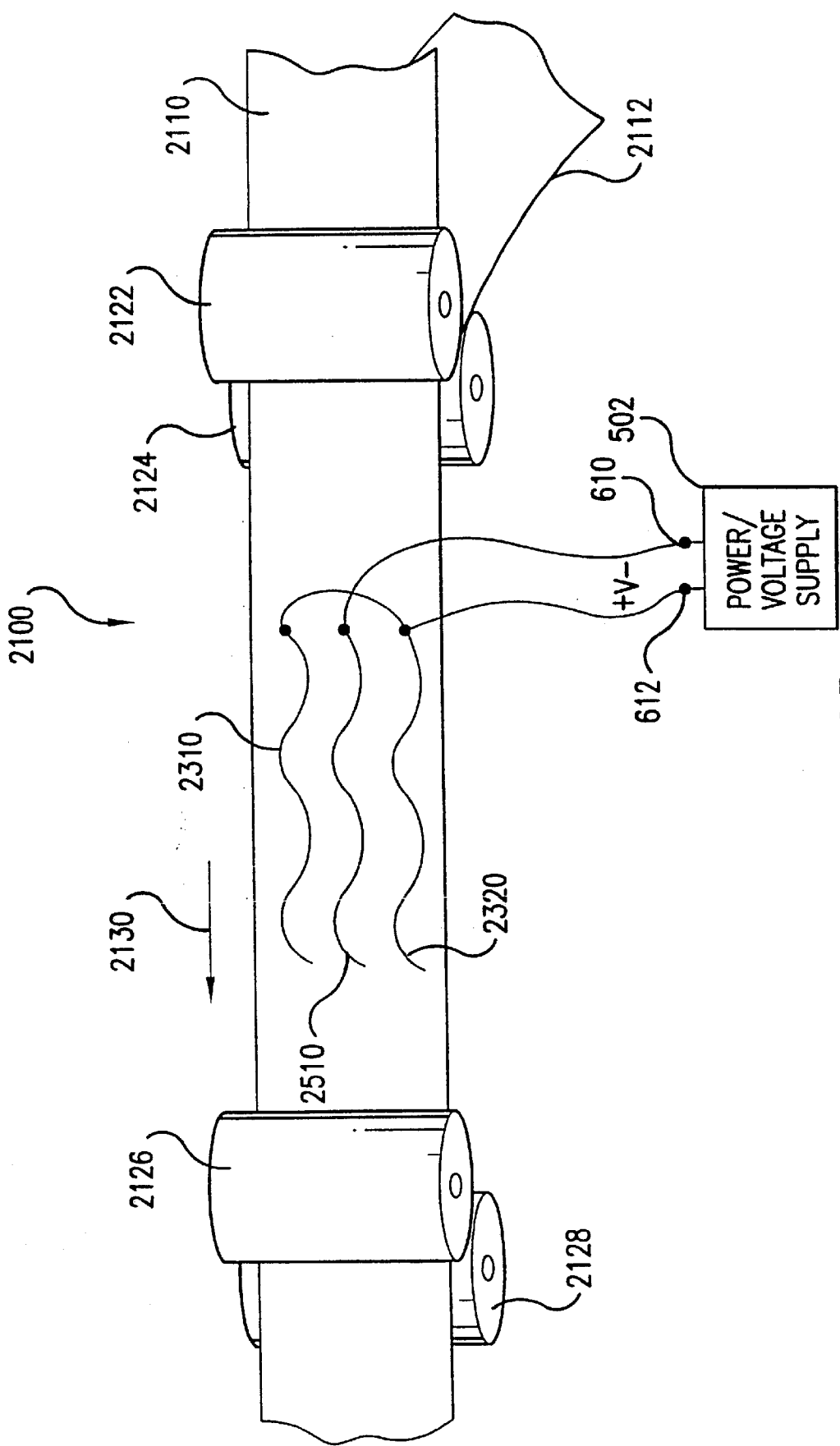

The heating system shown in FIG. 25 is similar in concept to the one shown in FIG. 24. A curved probe 2510 is placed between curved probes 2310 and 2320. Curved probes 2310 and 2320 are both connected to the same output terminal of voltage supply 502, whereas probe 2510 is connected to the other output terminal. Again, an advantage of the heating system shown in FIG. 25 is that it can provide a larger activation region than the similar heating system shown in FIG. 23.

Figure 26:
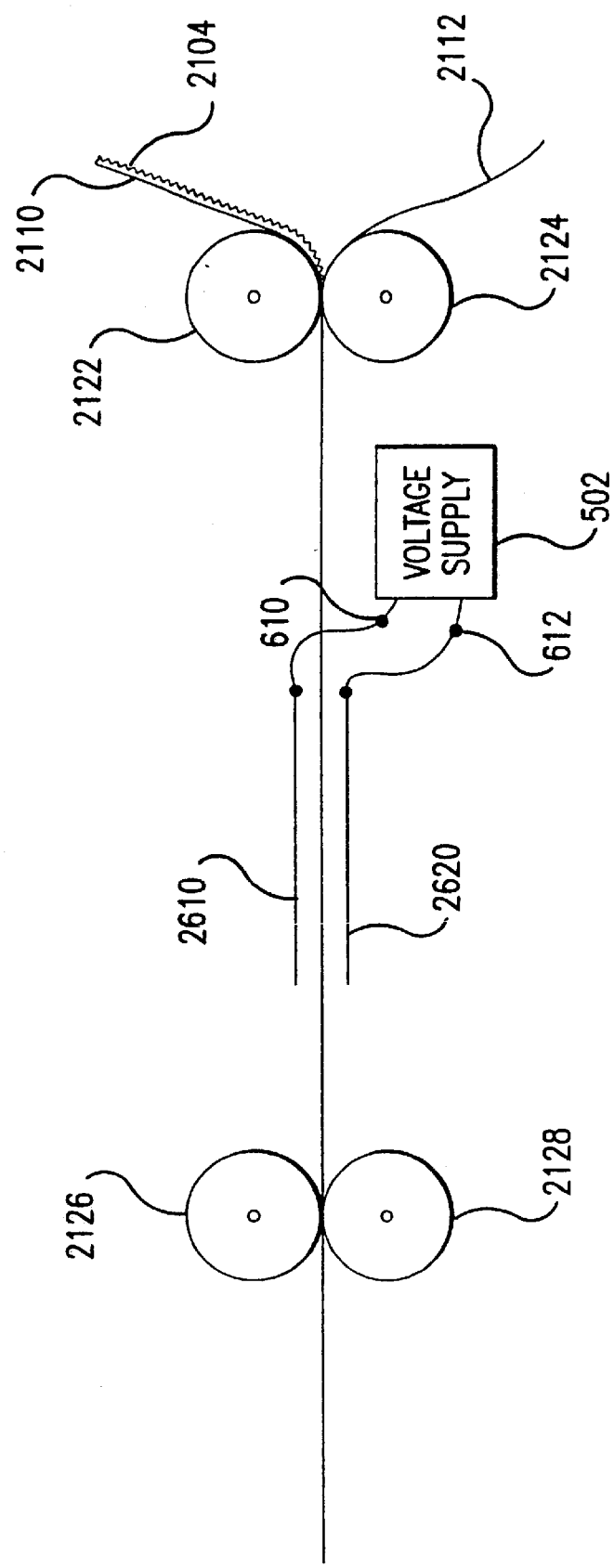
Figure 27:
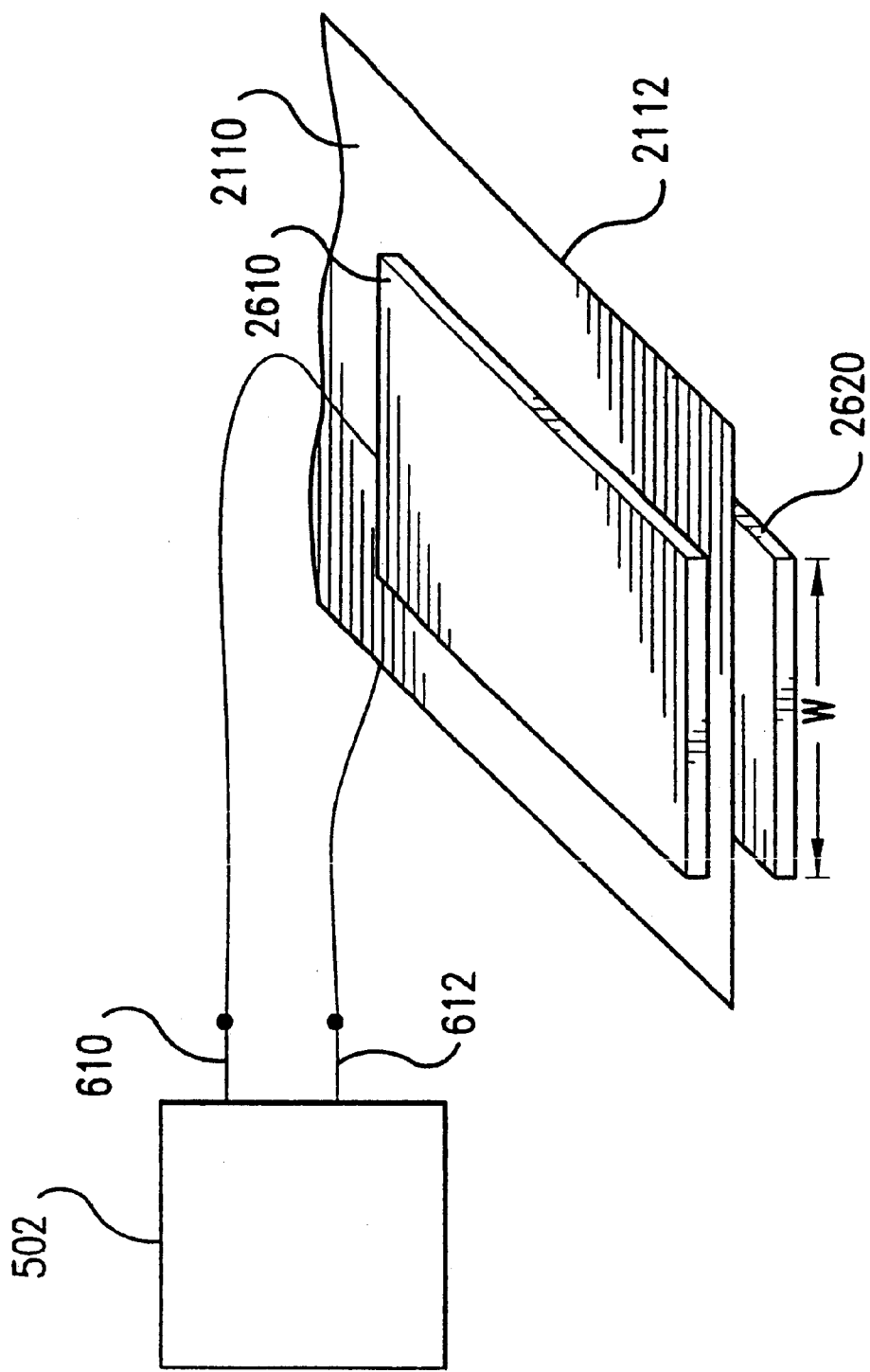

FIG. 26 illustrates another heating system. The heating system shown in FIG. 26 includes two plates 2610 and 2620. Plate 2610 is positioned above adherand 2110 and plate 2620 is positioned below adherand 2112. Thus, composition 2104 travels between plates 2610 and 2620. Plate 2610 is connected to output terminal 610 of voltage supply 502, and plate 2620 is connected to output terminal 612 of voltage supply 502. When voltage supply 502 is turned on, it generates an electromagnetic field between plates 2610 and 2620, which is used to activate composition 2104. FIG. 27 illustrates another perspective of plates 2610 and 2620. As is apparent from FIG. 27, the width of the activation region for this design is simply the width (W) of the plates. The center to center distance (d) between plate 2610 and plate 2620 can range from 0.02 inches to 20 inches. In one embodiment, the distance ranges between 0.25 inches and 1.5 inches. The length (L) of course depends on the desired dwell time and the rate at which any given point on adherand 2110 or 2112 travels between any two points along the length of one of the plates.

XII. EXEMPLARY SPECIFIC APPLICATIONS OF THE PRESENT INVENTION

The susceptor compositions may be employed for many purposes including bonding, cutting, and coating. Thus, the susceptor compositions may be employed for packaging applications, e.g. to bond or adhere cases or cartons as described in U.S. Pat. No. 5,018,337, but with the additional step of RF activation.

Applications for the RF cured thermoset compositions, which are illustrative only and not to be considered limiting of the scope of the present invention, include:

Coatings for conventional and spray applications on plastics, metals, wood etc.

Corrosion resistance coatings.

Industrial and protective coatings.

Top coats.

Automotive coatings.

Lamination of composites.

Laminating adhesives.

Bonding of structural composites.

Inks and decorative coatings.

Barrier coatings.

Additional applications are listed below, but are likewise illustrative and not limiting of the scope of the present invention.

A. Manufacture of Flexible Packaging

Figure 28A:
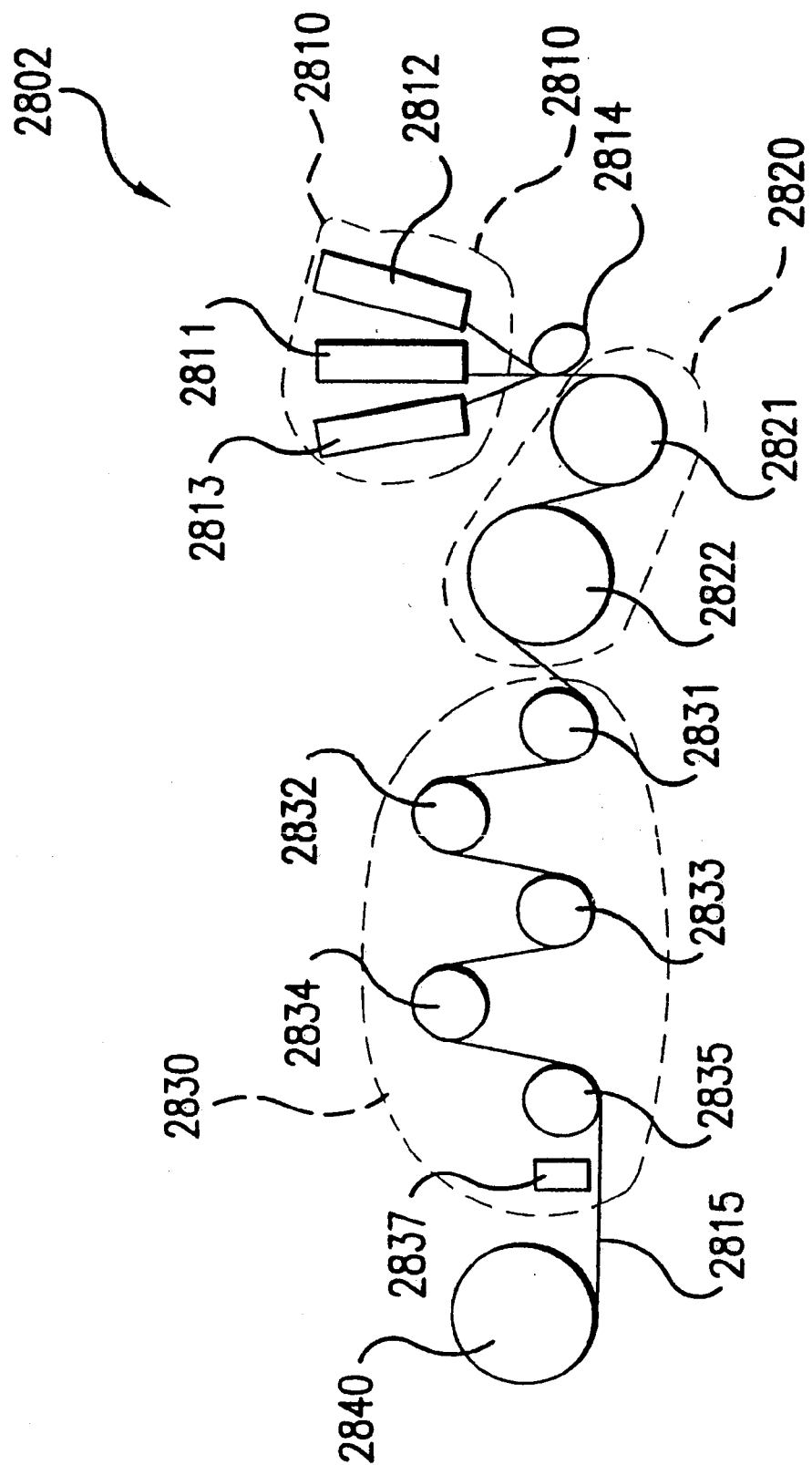
FIGS. 28A and 28B illustrate one embodiment of a system for the manufacture of flexible packaging material.
Figure 28B:
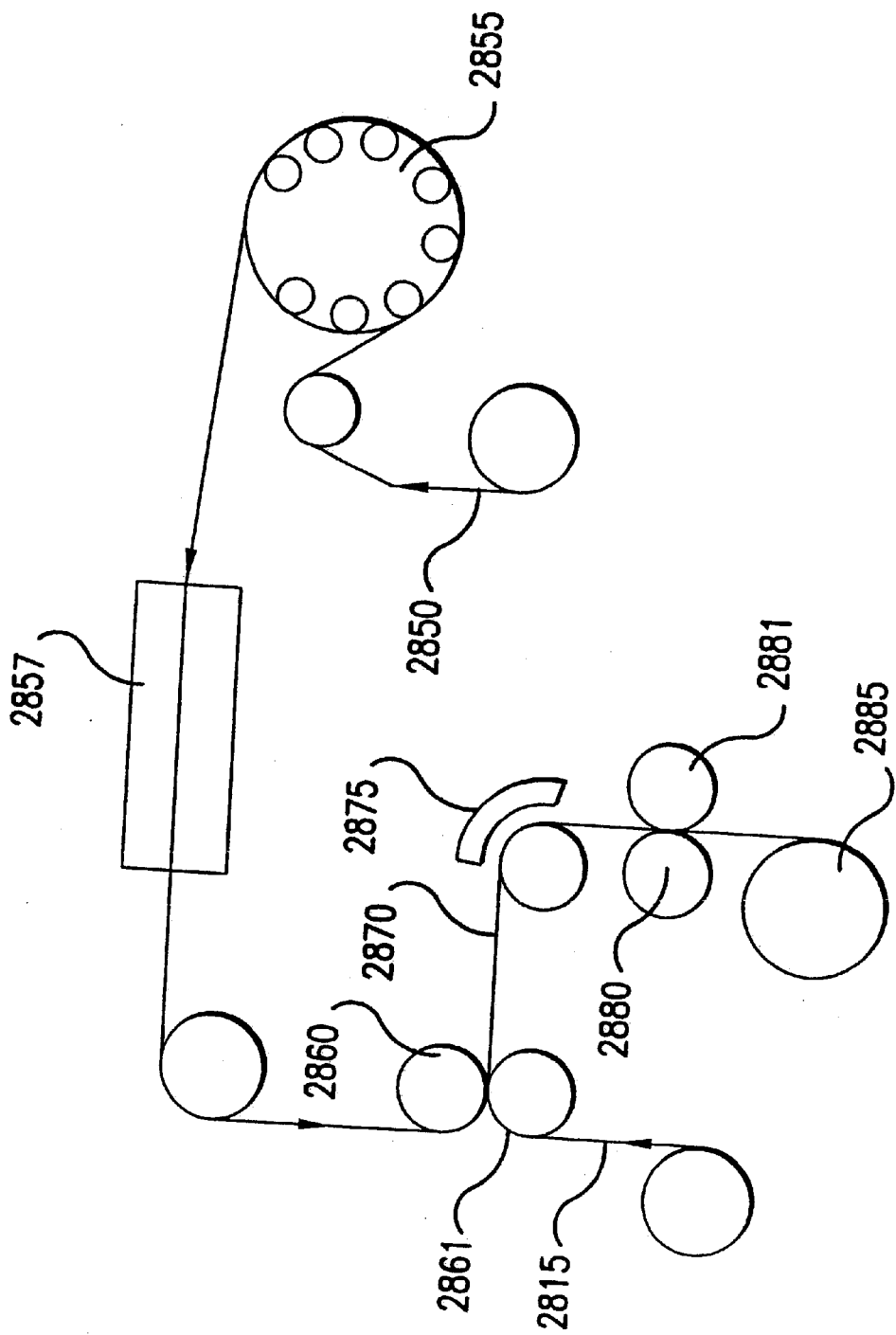

FIGS. 28A and 28B illustrate one embodiment of a system for the manufacture of flexible packaging. Flexible packages are used for, among other things, packaging foods. The system includes a system 2802 (see FIG. 28A) for manufacturing an RF activated adhesive film 2815 and a bonding system 2804 20 (see FIG. 28B) for bonding the adhesive film 2815 to another film 2850.

Referring now to FIG. 28A, film manufacturing system 2802 includes an extruding system 2810, a casting wheel 2814 a heating system 2820, a stretching system 2830, and an optional film roller 2840. In one embodiment, extruding system 2810 includes three extruders 2811, 2812, and 2813. An RF activated adhesive composition according to the present invention is first formulated into an extrudable resin (for example, ethylene vinyl acetate or other polymer based material is added to the adhesive composition) and then provided to extruder 2813 in a pellet or liquid form. Polypropylene or other like similar substance, such as but not limited to ethylene vinyl acetate (EVA), is provided to extruder 2811, and a sealing material is provided to extruder 2812. The output of extruders 2811–2813 are cast into a film 2815 by casting wheel 2814.

Figure 29:
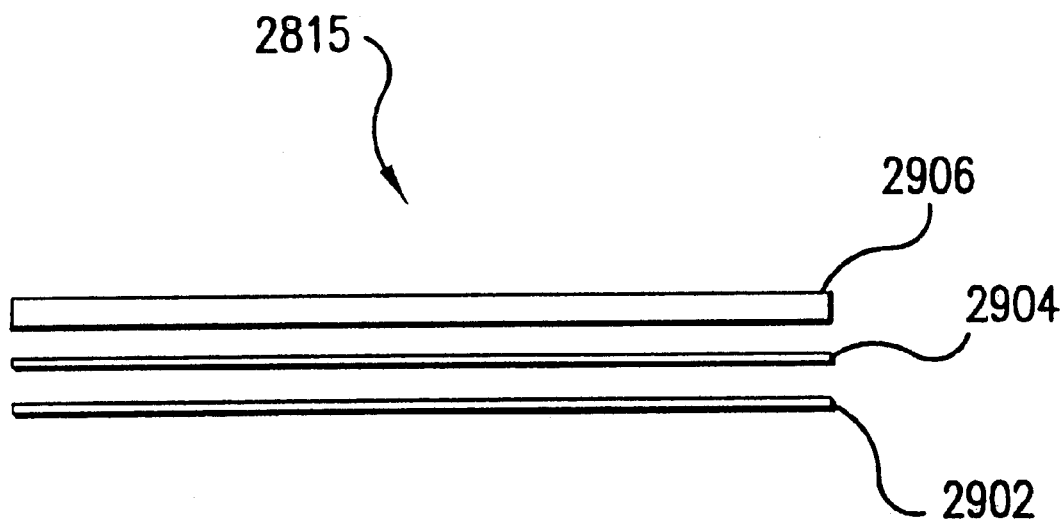
FIG. 29 further illustrates film 2815.

FIG. 29 illustrates film 2815. As shown in FIG. 29, film 2815 includes a first layer 2902 consisting of the sealing material, a second layer 2904, e.g., OPP and/or EVA and/or other similar substance, and a third layer 2906 consisting of the RF activated adhesive. Because film 2815 includes an adhesive composition according to the present invention, film 2815 can be RF activated.

Referring back to FIG. 28A, film 2815 is provided to heating system 2820. In one embodiment, heating system 2820 includes heater rollers 2821 and 2822. The function of heating system is to heat the film to a temperature that allows the film to be stretched. After being processed by heating system 2820, film 2815 is stretched by stretching system 2830. In one embodiment, stretching system 2830 includes a plurality of stretch rollers 2831, 2832, 2833, 2834, and 2835 and a transverse stretcher 2837. Stretching system 2830 stretches film 2815 both length and width wise. After being stretched, film 2815 may be rolled up using film roller 2840. Alternatively, film 2815 can be cut and stacked after being stretched.

Figure 30:
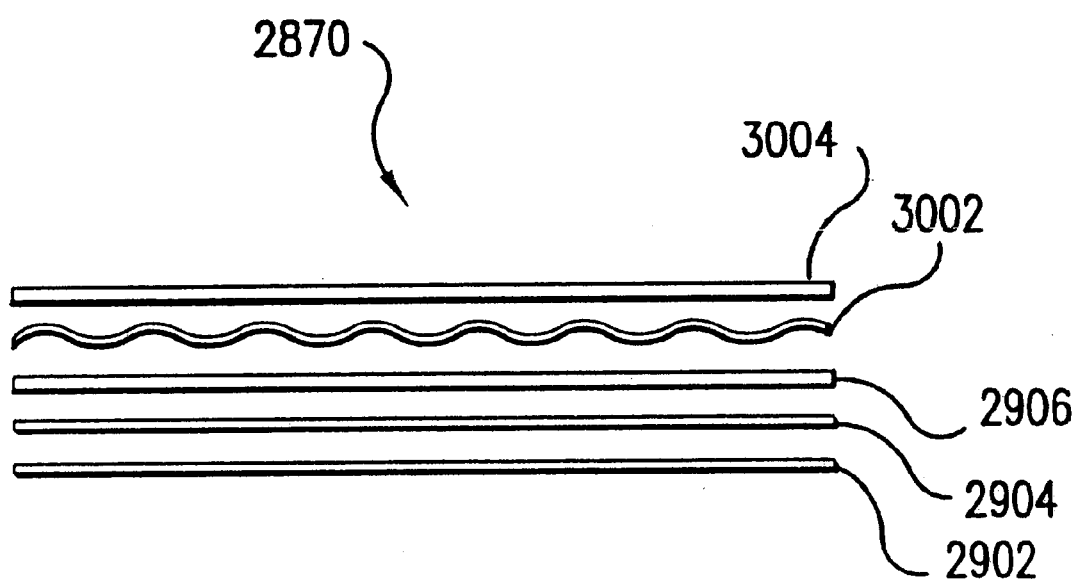
FIG. 30 illustrates one embodiment of film 2870.

Referring now to FIG. 28B, bonding system 2804 is used to bond film 2815 with film 2850. In one embodiment, film 2850 is a 70 gauge oriented polypropylene (OPP) film. Film 2850 is passed over a print wheel 2855 and then through oven 2857. A pair of nip rollers 2860 and 2861 press film 2815 with film 2850 to form a construction bond and thus form a single multi-layer film 2870. FIG. 30 illustrates one embodiment of film 2870.

As shown in FIG. 30, film 2870 includes layer 2902 consisting of the sealing material, layer 2904 that includes thermoplastics and/or elastomers, for example, OPP and/or EVA and/or other similar substance, third layer 2906 consisting of the RF susceptor composition, a fourth layer 3002 consisting of the ink applied by print wheel 2855, and a fifth layer 3004 consisting of film 2850.

Referring back to FIG. 28B, an RF heating system 2875 creates an RF field that is used to heat adhesive layer 2906. Heating system 2875 defines an activation region. The activation region is an area in which the RF field generated by heating system 2875 is strong enough to activate adhesive layer 2906. Film 2870 can travel through the activation region in as quickly as about 100 milliseconds. Shortly after passing through the activation region, film 2870 is nipped by nip rollers 2880 and 2881 and then rolled by film roller 2885. FIGS. 16A and 16B illustrate one embodiment of the probe portion of heating system 2875. Other heating systems could be used, such as those described above with respect to FIGS. 20 and 21.

Figure 31:
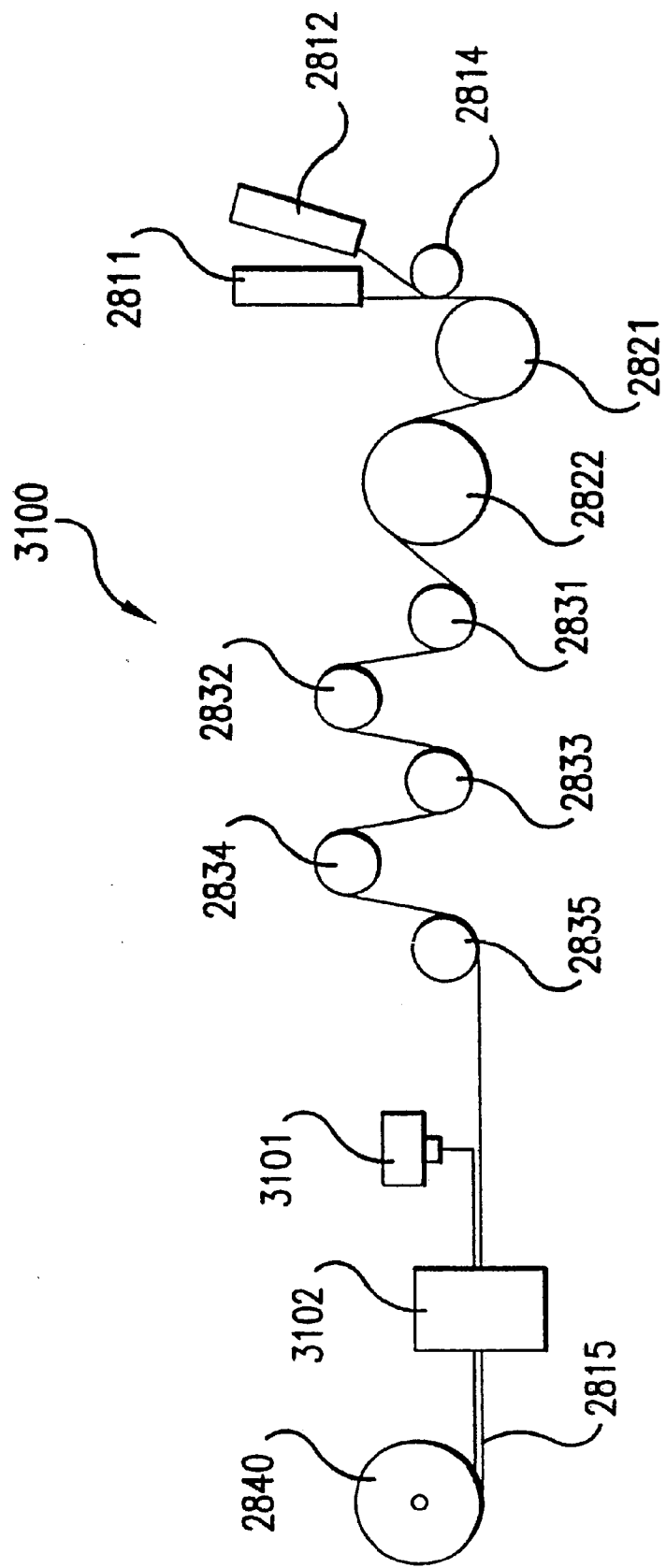
FIG. 31 illustrates an alternative system for manufacturing an RF activated adhesive film for use in the flexible packaging industry.

FIG. 31 illustrates an alternative system 3100 for manufacturing an RF activated adhesive film for use in the flexible packaging industry. System 3100 is similar to system 2802, except that system 3100 does not include extruder 2813. In place of extruder 2813, system 3100 includes an adhesive applicator 3101 and a heating system 3102. An adhesive composition according to the present invention is formulated into a liquid dispersion and applied to film 2815 by adhesive applicator 3101. In one embodiment adhesive applicator 3101 includes a gravure application tool (not shown). Heating system 3102 can be a conventional heating system, such as an oven, or it can be an RF heating system, such as heating system 600 or any of the other heating systems described herein.

B. Food Packaging and Cap Sealing

Conventionally, metallic foils are used as susceptors of electromagnetic energy to generate heat for package sealing. Typical examples include tamper evident bottle seals (i.e., cap sealing) and food packaging. While the conventional systems are effective in sealing the packages, the use of metallic foils eliminates the manufacturer's ability to perform post sealing inspection, such as metal detection, x-ray, and the like. Additionally, there may be a recycling benefit and a cost saving to the system by eliminating the metallic foil.

Figure 32:
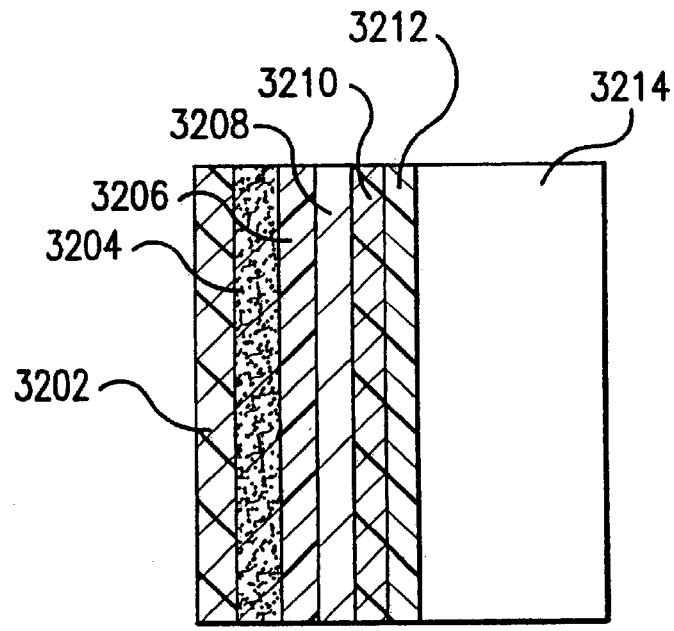
FIG. 32 illustrates a conventional aseptic package material construction.

One solution is to replace the metallic foil with a composition of the present invention. The composition may or may not have adhesive properties. FIG. 32 illustrates a conventional aseptic package construction. A conventional aseptic package includes an outer polyethylene layer 3202, a paper layer 3204, a second polyethylene layer 3206, a layer of metallic foil 3208, a third 3210 polyethylene layer, an inner polyethylene layer 3212, and a container 3214 that holds the food or beverage. Inner polyethylene layer 3212 is the layer that contacts with the container 3214, and is used to seal the container during the food packaging process. The sealing is achieved through induction heating of the metallic foil layer 3208 causing the inner polypropylene layer 3212 to melt and bond to the container 3214.

Figure 33:
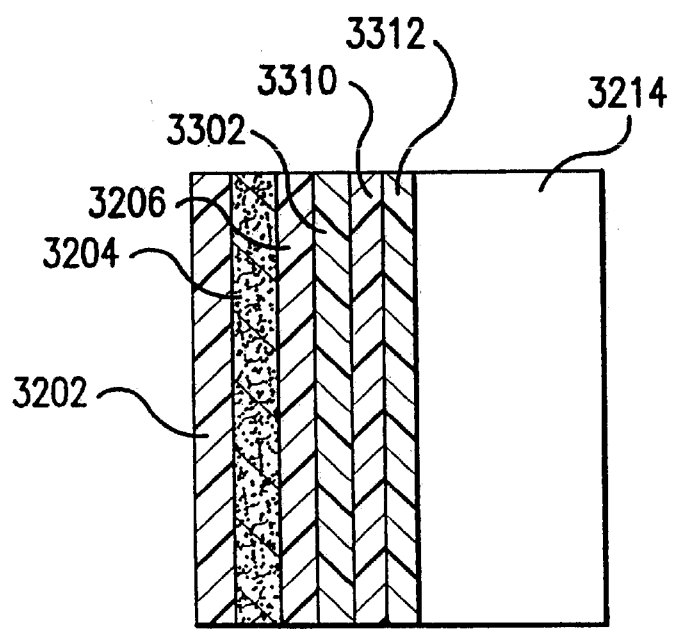
FIG. 33 illustrates an aseptic package material according to one embodiment that does not include metallic foil.

FIG. 33 illustrates one embodiment of a packaging construction that does not use metallic foils. The packaging construction includes the outer polyethylene layer 3202, the paper layer 3204, the second polyethylene layer 3206, a susceptor composition according to the present invention 3302, a barrier layer 3310, an inner layer 3212, and a container 3214 that holds the food or beverage. Inner layer 3212 is the layer that contacts with the container 3214, and is used to seal the container 3214 during the food packaging process. Inner layer 3212 can be a polyethylene or EVA layer. In one embodiment, barrier layer 3310 is an EVOH barrier layer. The sealing is achieved through RF heating of susceptor composition 3302, which causes the inner layer 3212 to melt and bond to the container 3214. The advantage of replacing metallic foil 3208 with susceptor composition 3302 is that now the container 3214 can be inspected after it is sealed by using a metal detector or x-ray machine, and there are recycling advantages as well.

Figure 34:
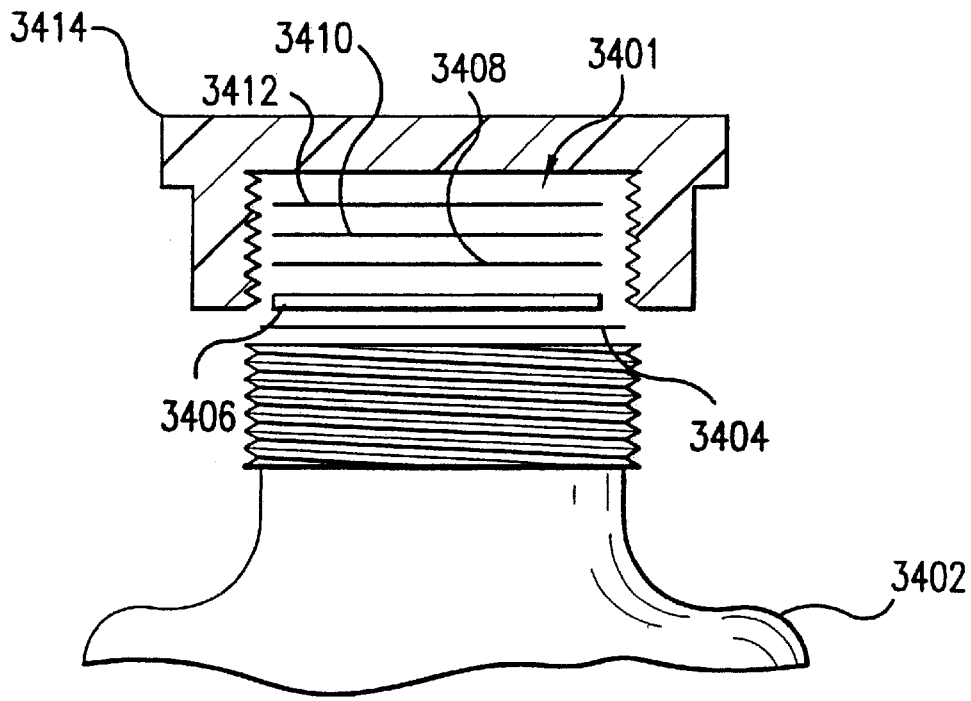
FIG. 34 illustrates another embodiment of an aseptic packaging material construction that does not use metallic foils.

A conventional cap sealing construction is illustrated in FIG. 34. FIG. 34 illustrates a polyethylene bottle 3402, a seal 3401, and a bottle cap 3414. Seal 3401 includes several layers of substrate, including a polyethylene layer 3404, a metallic foil layer 3406, another polyethylene layer 3408, a wax layer 3410, and a paper layer 3412. Seal 3401 is adhered to bottle 3402 by heating foil through induction, which causes layer 3404 to weld to bottle 3402. As discussed above, it is desirable to remove metallic foil layer 3406.

Figure 35:
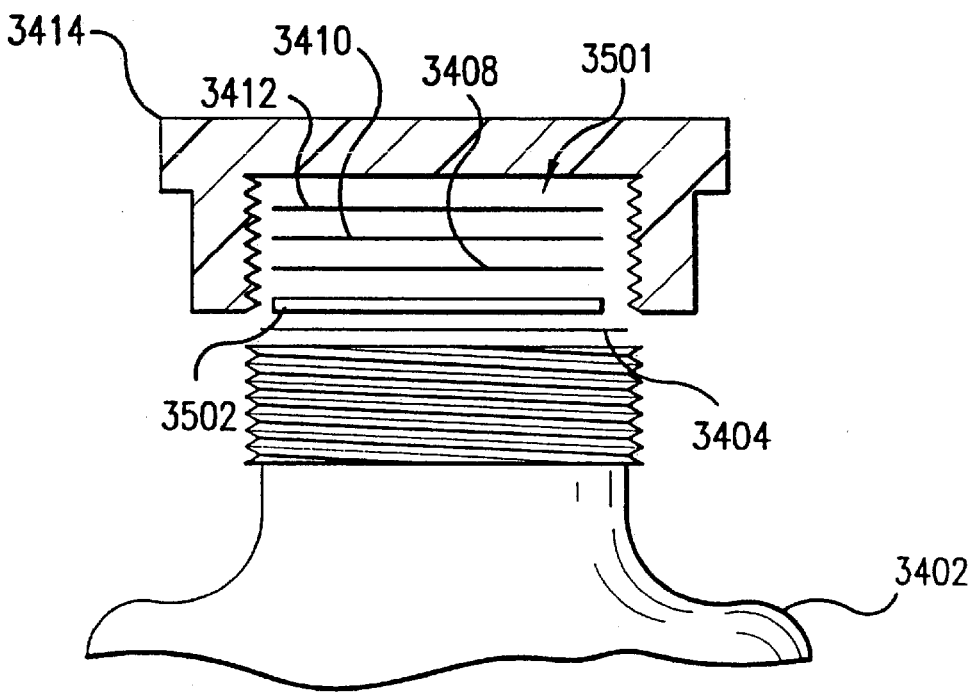
FIG. 35 illustrates a conventional cap sealing construction.

FIG. 35 illustrates an improved seal 3501 for bottle 3402. Seal 3501 is identical to seal 3401 (see FIG. 34), except that the metallic foil 3406 has been replaced with a composition 3502 according to the present invention. As discussed above, the advantage of removing metallic foil 3406 is that now bottle 3402 can be inspected after it is sealed by using a metal detector or x-ray machine, and can be more easily recycled.

Figure 36:
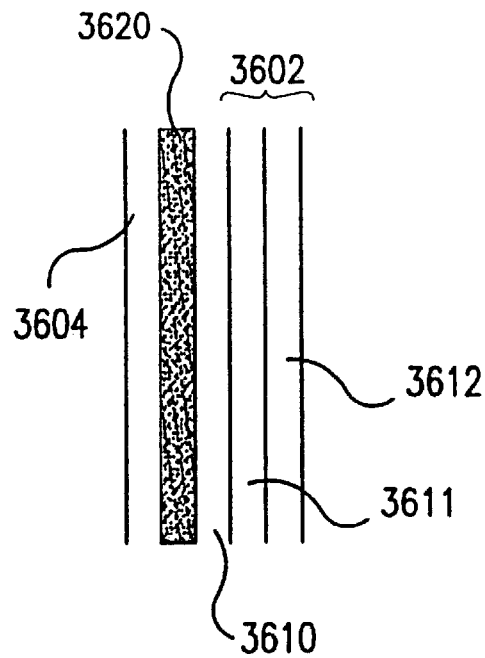
FIG. 36 illustrates a seal, according to one embodiment, for sealing a bottle.
Figure 37:
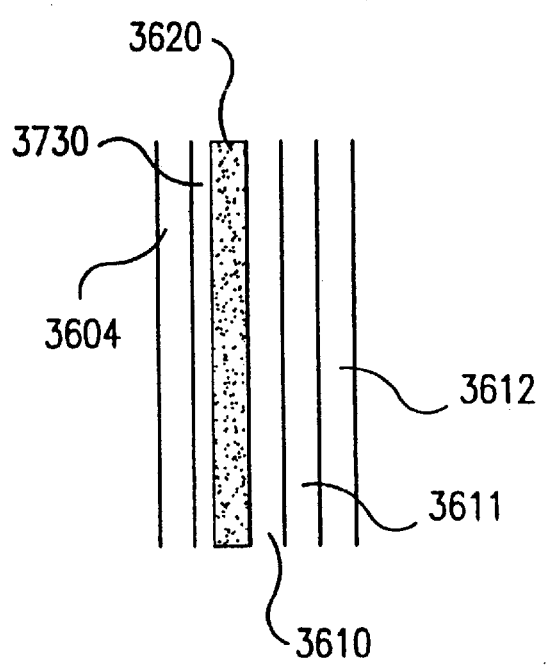
FIG. 37 illustrates a design for adhering a flexible bag to an outer box.

Another use of the compositions described herein is to attach a flexible bag 3602 containing dry food to an outer box 3604, as illustrated in FIG. 36. In one embodiment, flexible bag 3602 includes three layers, 3610,3611, and 3612, and outer box 3604 is a paper product, such as a paper board. To bond flexible bag 3602 to outer box 3604, an adhesive composition 3620 according to the present invention is placed between outer box 3604 and layer 3610. Adhesive composition 3620 is then exposed to an RF field that causes the composition 3620 to melt and flow and bond layer 3610 to outer box 3604. In one embodiment, layer 3610 is a polyethylene layer, layer 3611 is an EVOH barrier layer, and layer 3612 is an EVA food contact layer. In another embodiment (see FIG. 37), outer box 3604 is coated with a polyethylene layer (or other like layer) 3730. This configuration creates an improved bond.

C. Printing Applications

The susceptor compositions of the present invention may also be applied together with one or more inks to provide writing, a design or graphic, e.g. as is described in U.S. Pat. No. 4,595,611. Particular application of this aspect of the invention is in the preparation of ink-printed substrates such as ovenable food containers. Examples of pigments that can be combined with the susceptor composition include titanium dioxide, iron oxide pigments, carbon black and organic pigments such as isoindoline yellow. In a preferred embodiment, the susceptor is a sulfonated polyester. Alternatively, a sulfonated polyester-cationic dye salt may be employed as disclosed in U.S. Pat. No. 5,240,780. The substrate may be printed once or multiple times to achieve the desired result. Once printed, the substrate may be further coated with a clear unpigmented composition which may comprise the susceptor composition of the invention. The same composition used to print may be used to further coat, but without the added pigments. The susceptor compositions may be RF activated after each printing/coating step, or after all of the coatings are applied. Finally, the substrate may be coated with a clear polyester sealing resin.

An extension the printing application is high speed ink-jet used in printers/copiers. Inks formulated as liquids (H-P/Cannon) or solid (Tetronic) composition can contain the susceptor compositions of this invention in amounts effective that can be activated by RF energy for rapid drying and fixing. Current ink formulations are too "slow in drying" or need excessive heat energy.

D. Bookbinding and Mailers

Figure 43:
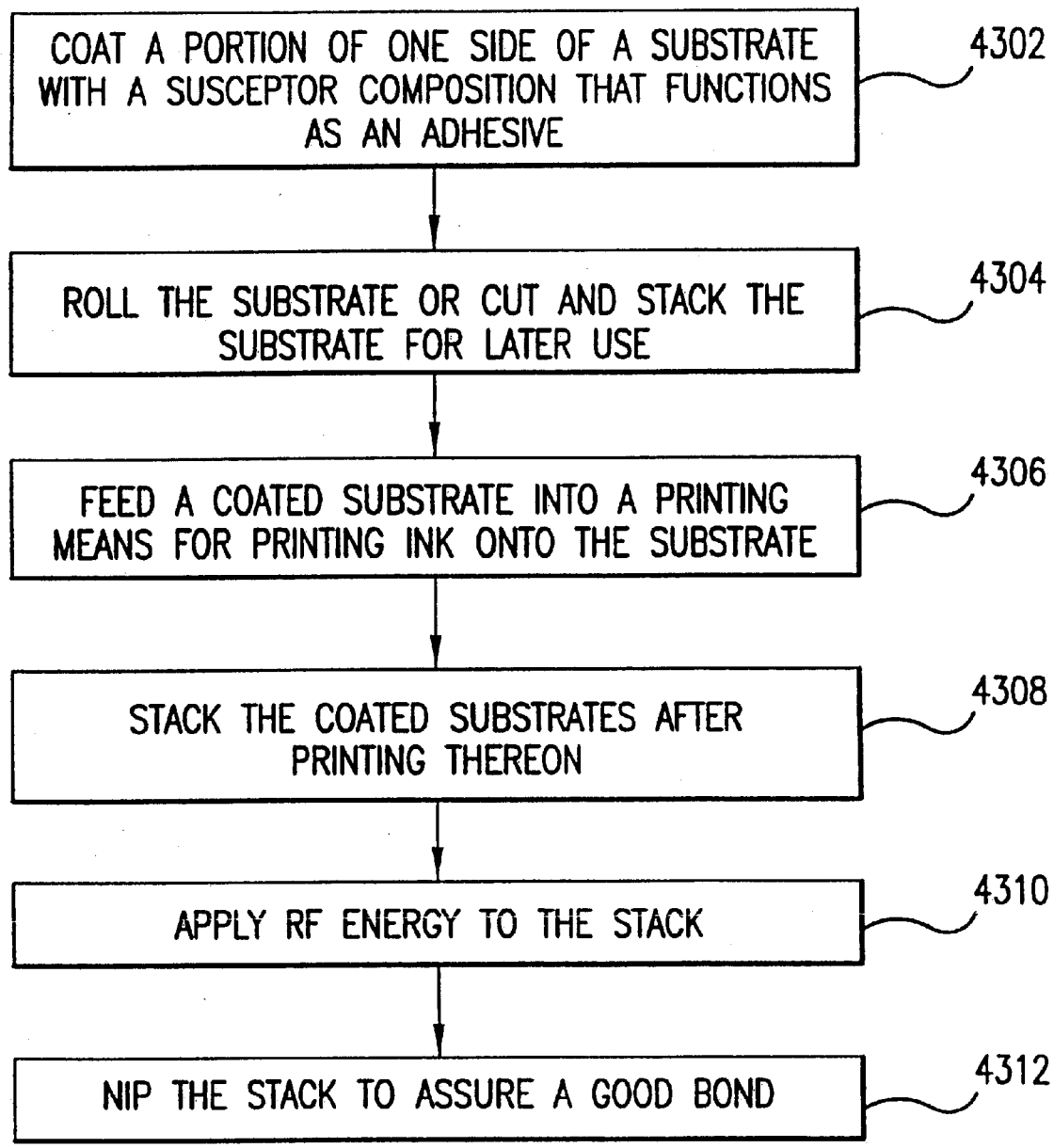
Figure 44:
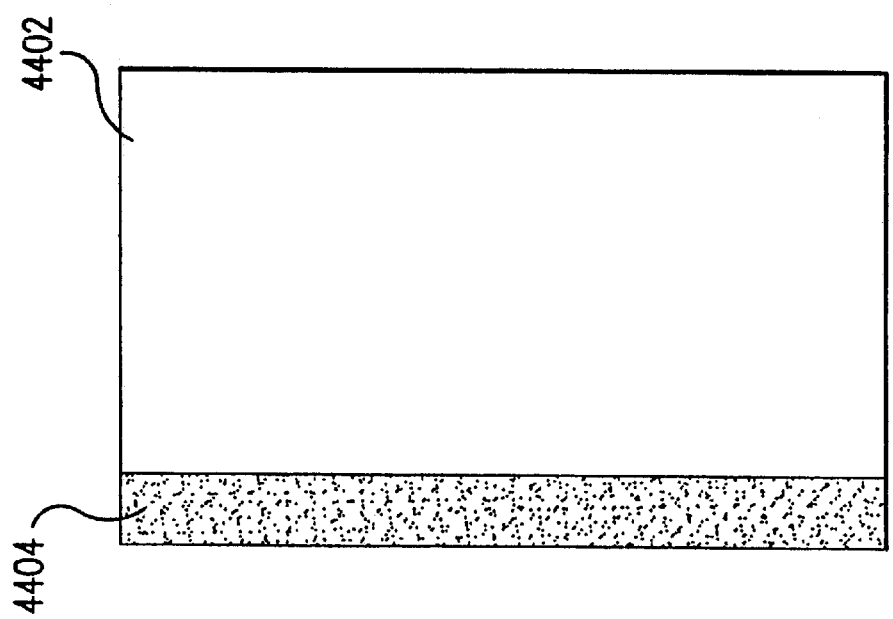
FIG. 44 illustrates a paper substrate coated with a susceptor composition.

The susceptor compositions of the present invention may be used to bond paper substrates used in printing and/or copying. An advantage of the present invention is that a substrate to be printed on (such as a paper substrate) can be coated with a susceptor composition described herein prior to printing on the substrate. For example, FIG. 43 illustrates a process for assembling a book, magazine, or periodical, or the like. In step 4302, a portion of one side of a substrate is coated with a susceptor composition that functions as an adhesive. Any one of the various methods for coating a substrate described herein can be used to coat the substrate. FIG. 44 illustrates a preferred portion of a substrate to be coated with the susceptor composition. As shown in FIG. 44, a thin strip of the susceptor composition 4404 coats one edge of the substrate 4402. The portion of the substrate that is not coated is the portion where ink will be printed. Preferably, the susceptor composition 4404 is formulated such that it is tack free, however, this is not a requirement.

Figure 45:
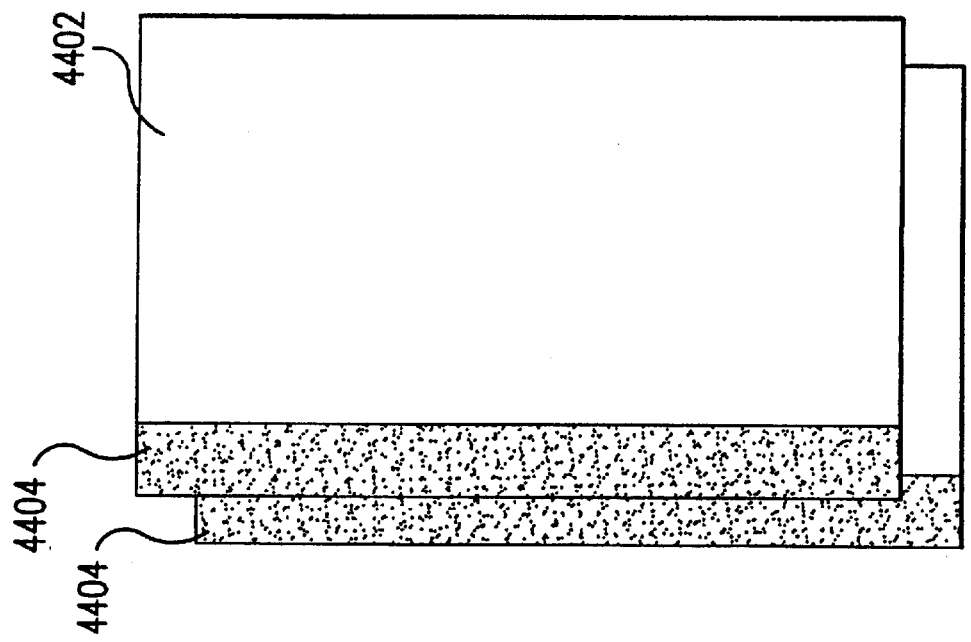
FIG. 45 illustrates a stack of coated paper substrates.

After the substrate 4402 has been coated, the substrate may be processed into rolls, stacks and the like and stored for later use (step 4304). In step 4306, the coated substrate is fed into a printing means that prints ink onto the substrate. The printing means can be a conventional printer or conventional photocopying machine. Further, the substrate can be fed into the printing means as a continuous substrate or as cut pieces. For this example, we will assume that cut pieces of the substrate are fed into the printing means. In step 4308, after the printing means prints ink onto a substrate, the substrate is stacked with the other substrates that have already been fed into the printing means as shown in FIG. 45. The stack is placed in an electromagnetic field. The electromagnetic field causes the susceptor composition to melt and flow. The stack is then nipped to assure a good bond (step 4312).

In one embodiment, prior to placing the stack in the electromagnetic field, the substrate stack is pressure bonded by applying upward and/or downward pressure on the stack. In another embodiment, the ink that is printed on the substrates includes a susceptor composition. In this way, the ink can be dried rapidly by passing the substrate through an electromagnetic field.

Figure 47:
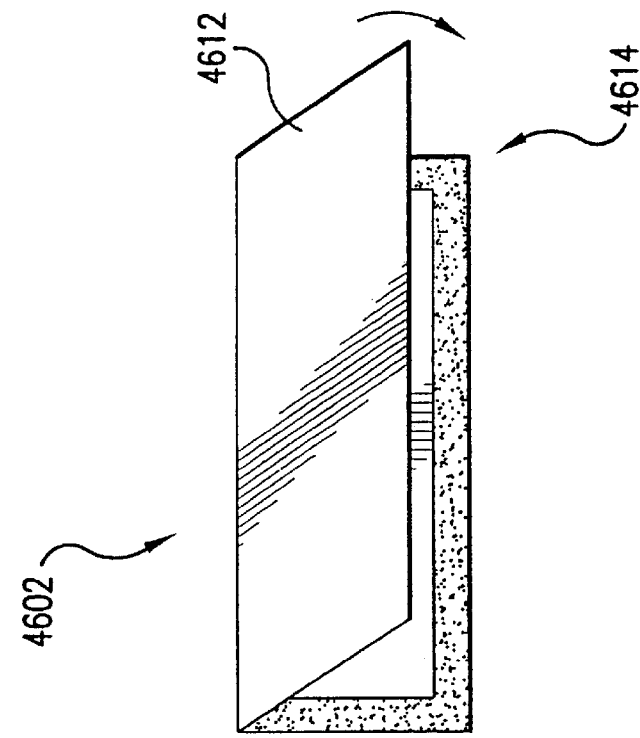
FIGS. 46 and 47 illustrates one embodiment of an envelope or mailer according to the present invention.
Figure 46:
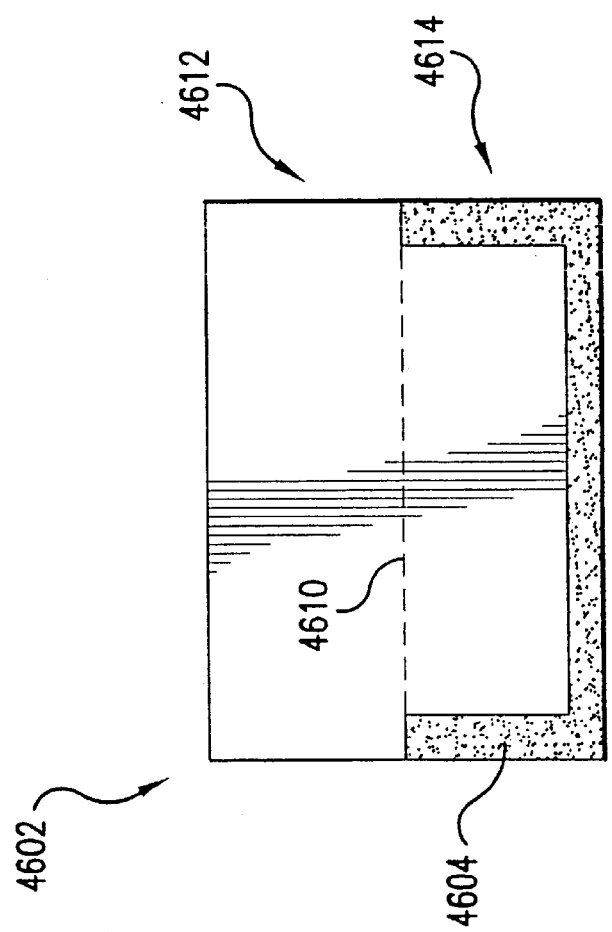

In another embodiment, mailers or envelopes can be constructed. Referring to FIG. 46, a portion of one side of substrate 4602 is coated with a susceptor adhesive composition 4604. Preferably, the susceptor adhesive composition 4604 is formulated so that it is tack-free. The substrate 4602 includes a fold line 4610. The coated substrate 4602 can be fed into a printing means that prints ink onto the substrate. After the ink is printed thereon, the substrate is folded along the fold line 4610 so that the top portion 4612 of the substrate 4602 contacts the bottom portion 4614 of the substrate (see FIG. 47). At this point, the substrate is passed through the electromagnetic field so as to melt and flow the susceptor composition 4604, thereby bonding the top portion 4612 of the substrate with the bottom portion 4614 when the susceptor composition 4604 solidifies.

E. Security Devices

As would be apparent to one skilled in the relevant art(s), the susceptor composition of the present invention can be used to seal containers, casings, housings and the like (hereafter "container"). In particular, the susceptor composition of the present invention is preferably used to seal containers that a manufacturer does not want accessed by others. A manufacturer may want to prevent a third party from opening certain containers for security, safety or quality control reasons. However, the inside of the container must still be accessible to the manufacturer or qualified repair facility. By exposing the seal to an electromagnetic field, the manufacturer can disassemble the container.

For example, a manufacturer may want to prevent an article intended for one-time use from being reused. As such, the susceptor composition of the present invention can be used, for example, to seal the shell or casing of a disposable camera. The manufacturers of such disposable cameras often do not want to have the shells reloaded and reused by the consumer or a competitor company. If the susceptor composition of the present invention is used to seal the camera shell, then when the film developer opens the camera body to remove and process the film, mating sections of the camera shell attached by the adhesive would break or deform such that the camera body could not be reused. As such, the susceptor composition of the present invention would prevent tampering with and unauthorized reloading of disposable camera shells.

Figure 48:
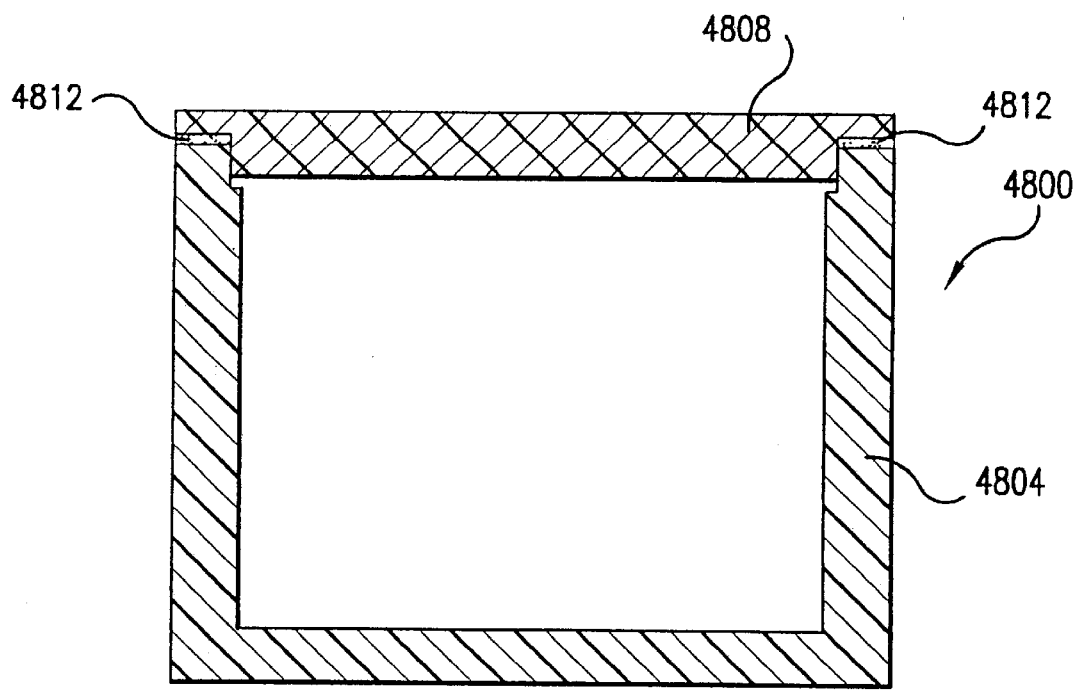
FIG. 48 illustrates a cross-section of a container sealed with a susceptor composition of the present invention.

FIG. 48 shows an example of a container 4800 sealed with a susceptor composition of the present invention. Container 4800 includes a first portion 4804 and a second portion 4808. In one embodiment, first portion 4804 is a container base and second portion 4808 is a lid. Container 4800 can be made from a variety of materials, including, for example, polypropylene, polystyrene, polyolefin, wood or wood products, rubber, plastics, glass, ceramics, paper, cardboard, natural or synthetic textile products, aluminum or other foils, metals, or any combination of these materials. An adhesive composition 4812, made in accordance with the present invention, is applied to a surface of container 4800. In the example of FIG. 48, adhesive composition 4812 is applied to a first mating surface of first portion 4804. Second portion 4808 is then placed on top of first portion 4804, so that a second mating surface of second portion 4808 comes in contact with adhesive composition 4812. A suitable electromagnetic field, as described herein, is then applied to adhesive composition 4812 to join the first and second mating surfaces of first and second portions 4804 and 4808.

To open container 4800, suitable RF energy must again be applied to container 4800 to cause adhesive composition 4812 to reflow. If a person attempts to open container 4800 without applying the suitable electromagnetic field, the container 4800 is designed to preferably break or catastrophically fail and so that it cannot be reused.

Figure 49:
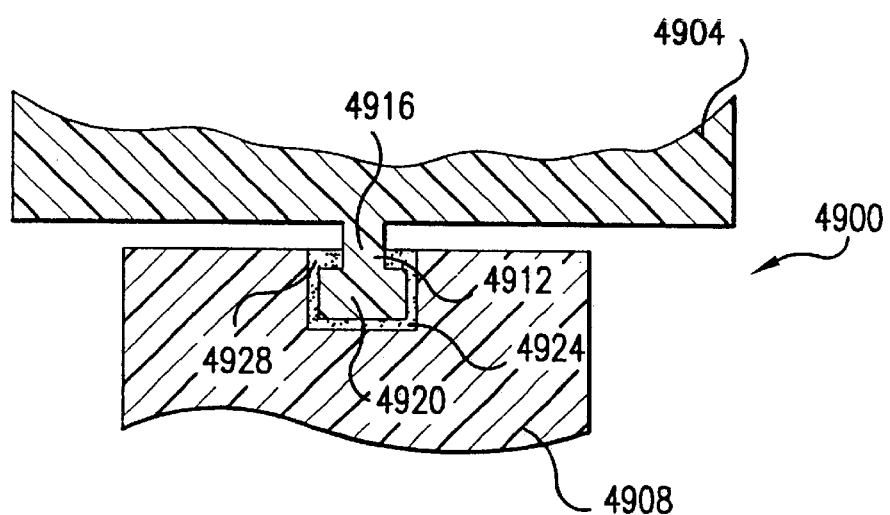
FIG. 49 illustrates another example of a device sealed or otherwise joined together with a composition of the present invention.

FIG. 49 shows another example of a device 4900 sealed or otherwise joined together with a susceptor composition of the present invention. Device 4900 includes a first portion or substrate 4904 and a second portion or substrate 4908. Device 4900 can be made of a variety of materials, as discussed above with respect to container 4800, shown in FIG. 48. In this embodiment, first substrate 4904 includes a male portion 4912 forming the first mating surface. Male portion 4912 includes a narrowed section 4916 and a wider section 4920. A corresponding female portion 4924 forming a second mating surface is formed in second portion 4908 and is configured to accommodate or receive wider section 4920 of male portion 4912. Second portion 4908 may also be configured to accommodate a portion of narrowed section 4916.

An adhesive composition 4928, made in accordance with the present invention, is applied to the second mating surface of female portion 4924 of second portion 4908. First portion 4904 is then assembled so that the first mating surface comes in contact with adhesive composition 4928 on second portion 4908 while the adhesive composition is within the electromagnetic field. First portion 4904 is locked into second portion 4908 once the application of electromagnetic filed is discontinued, causing adhesive composition 4928 to solidify. To disassemble device 4900, an electromagnetic field must again be applied to adhesive 4928 to cause it to reflow and allow the portions 4904 and 4908 to separate. If someone attempts to disassemble device 4900 without application of a suitable electromagnetic field, narrowed section 4916 of male portion 4912 will break or otherwise catastrophically fail resulting in device 4900 being unusable. As such, this embodiment will prevent authorized disassembly and reuse of device 4900.

Figure 50:
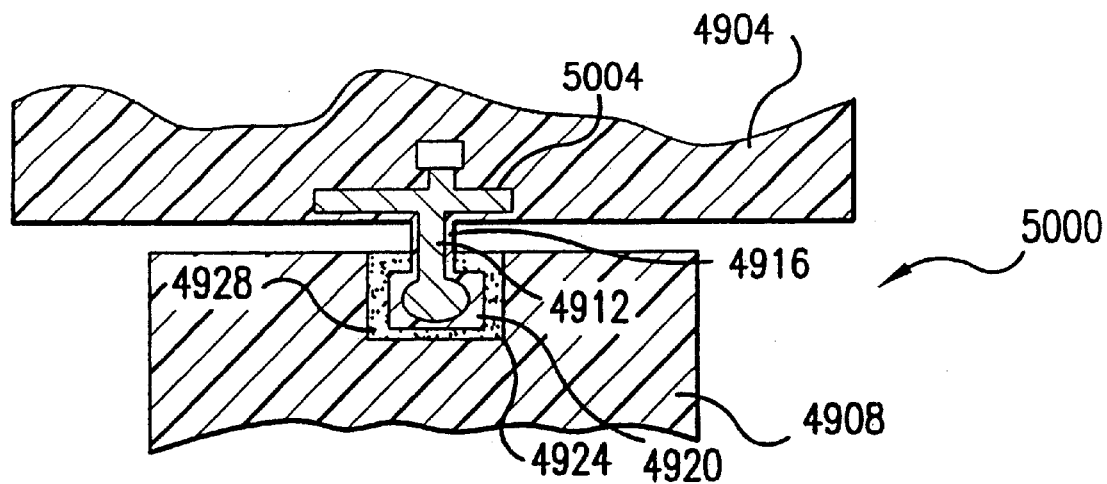
FIG. 50 shows another example of a device sealed or otherwise joined together with a composition of the present invention.

FIG. 50 shows another example of a device 5000 sealed or otherwise joined together with a susceptor composition of the present invention. Device 5000 is similar to device 4900 described above with respect to FIG. 49, except that an electronic circuit path 5004 is added to male portion 4912 such that it is disposed through narrowed section 4916. As such, should portions 4904 and 4908 of device 5000 be disassembled without application of a suitable electromagnetic field, electronic circuit path 5004 will be cut during failure of narrowed section 4916, resulting in further failure of device 5000.

Figure 51:
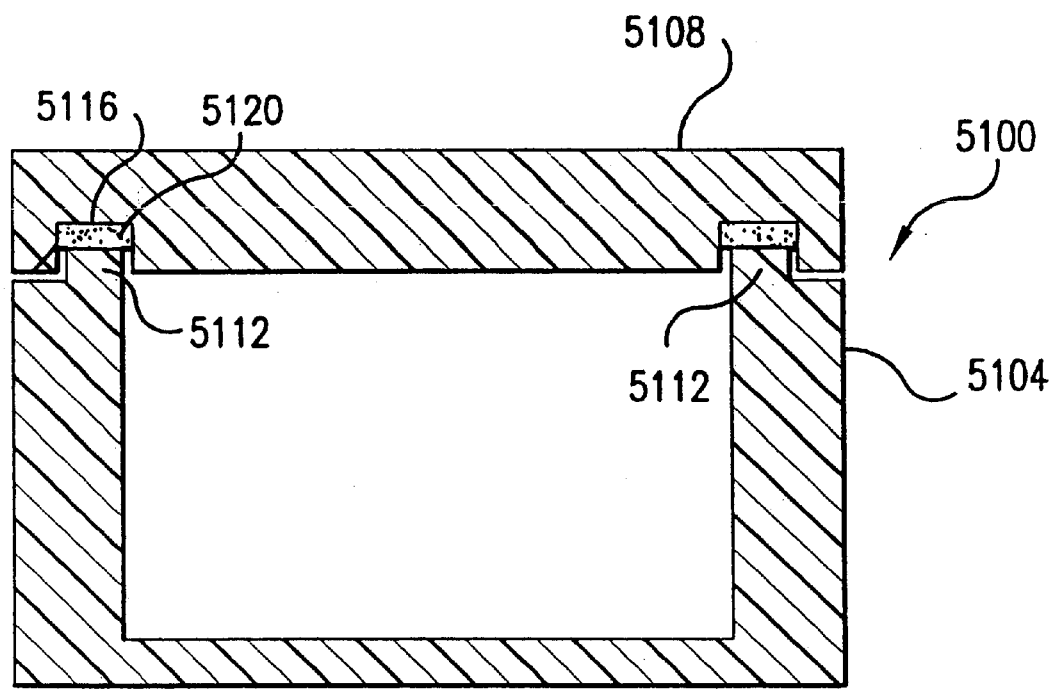
FIG. 51 illustrates still another example of a cross-section of a container 5100 that has been sealed with the adhesive of the present invention.

FIG. 51 shows still another example of a cross-section of a container 5100 that has been sealed with the adhesive of the present invention. Container 5100 includes a first portion 5104 and a second portion 5108. Container 5100 can be made of a variety of materials, as discussed above with respect to container 4800, shown in FIG. 48. First portion 5104 includes a protrusion 5112 which forms a first mating surface. In the embodiment shown in FIG. 51, protrusion 5112 extends around the entire circumference of container 5100. However, it would be apparent to one skilled in the relevant art that one or more discrete protrusions 5112 could be used instead of or in addition to the continuous protrusion 5112. Second portion 5108 includes a recess 5116 which forms a second mating surface corresponding to the first mating surface of protrusion 5112. Protrusion 5112 and corresponding recess 5116 are formed slightly inward of the periphery of container 5100 to so that when first and second portions 5104 and 5108 are joined, the mating surfaces and an adhesive composition 5120 therebetween cannot be accessed, thereby further reducing the risk of a person prying apart or otherwise disassembling container 5100. A susceptor composition 5120, of the present invention, is applied to the second mating surface of recess 5116. First and second portions 5104 and 5108 can be joined together by application of suitable electromagnetic field and similarly disassembled by re-application of the electromagnetic field.

The invention relates to an apparatus, comprising:
    a first portion having a first mating surface;
    a second portion, having a second mating surface;
    a susceptor composition of the present invention disposed
        between the first mating surface and the second mating surface, wherein the composition adheres the first mating surface to the second mating surface such that application of a force to separate the first mating surface and the second mating surface results in breakage of the apparatus unless the composition is in a melted state.

In this apparatus, the susceptor composition may be disposed on the first mating surface and the second mating surface such that the composition is not accessible when the first and second mating surfaces are joined. In another embodiment, the first mating surface may comprise a protrusion disposed on the first portion. In another embodiment, the second mating surface may comprise a recess formed in the second portion. In a further embodiment, the apparatus may further comprise an electronic circuit path disposed in the protrusion. In another embodiment, the first portion and the second portion are disassembled upon application of an electromagnetic energy to the composition.

F. Thermal Destruction

The susceptor composition of the present invention can not only be used to coat a substrate and bond adherands, but also can be used to cut a substrate. A substrate can be cut using a susceptor composition described above by first applying the susceptor composition to at least one side of the substrate. Next, an electromagnetic field is applied to the susceptor composition causing the susceptor composition to heat. The thermal energy generated by the susceptor composition heats the substrate, particularly the section of the substrate that is in contact with the susceptor composition. The substrate is heated until a section of the substrate melts resulting in the substrate being cut.

In this embodiment, the invention relates to a method for cutting a substrate, comprising:

- applying a susceptor composition of the invention to a portion of the substrate, wherein the portion of the substrate defines a first section of the substrate and a second section of the substrate;
- melting the portion of the substrate, wherein the melting step includes the step of heating the susceptor composition, wherein the step of heating the composition includes the step of applying RF energy to the composition;
- after the portion of the substrate has begun to melt, applying a force to the substrate to separate the first section from the second section.

G. Seam Sealing

The susceptor compositions of the present invention may be used to seal the seams of products made from cloth. Conventional cloth materials manufactured from man made or natural fibers are sewn together to form cloth products, such as clothing, bags, tents, awnings, covers, and the like. Typically, the seams of cloth products such as tents, awnings, bags, etc. need to be sealed to prevent leakage of liquids through the small holes in the products created by a sewing needle and thread during a stitching process. The susceptor compositions of the present invention can be used to seal these seams.

Figure 62:
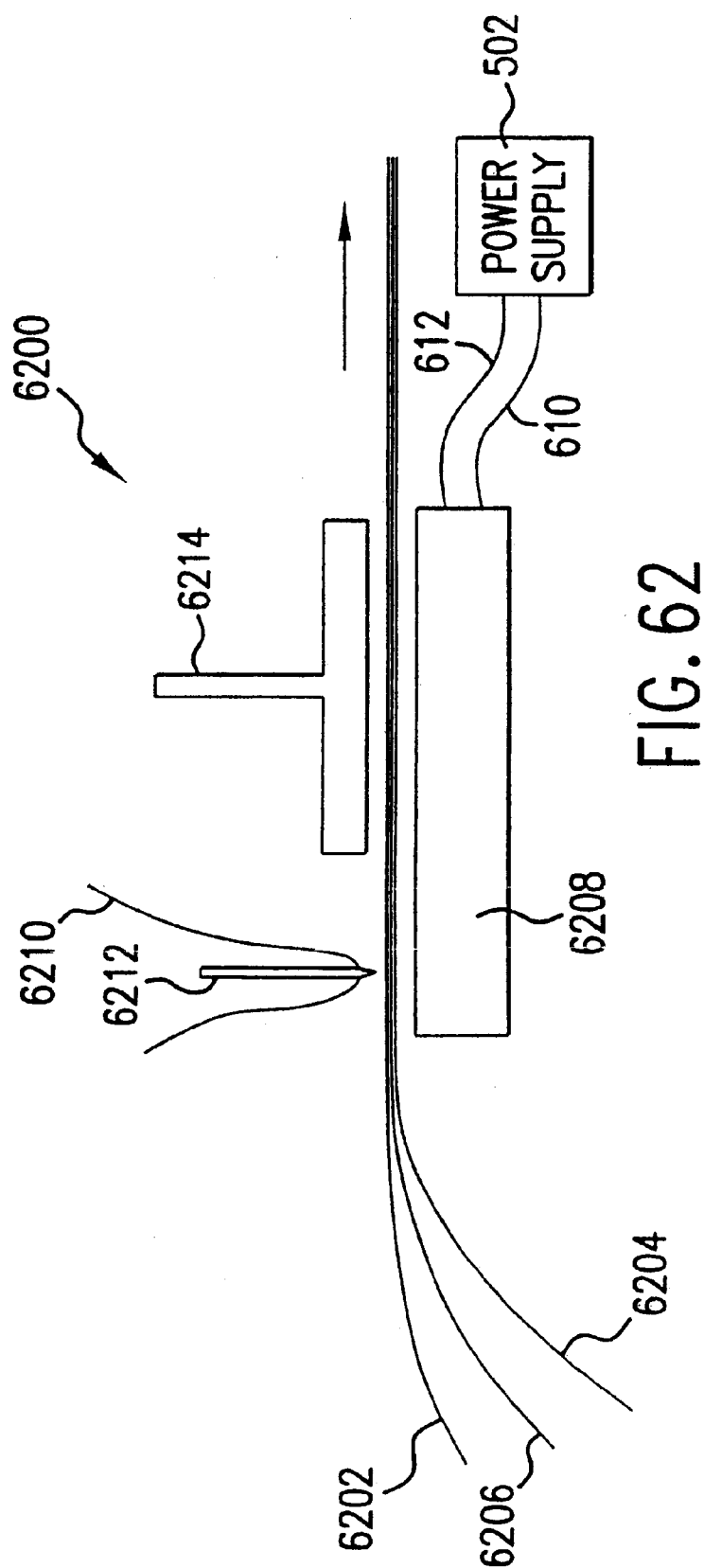
FIG. 62 illustrates a seam sealing system according to one embodiment.

FIG. 62 illustrates how a susceptor composition of the present invention can be used to seal the seams of cloth products. FIG. 62 illustrates a seam sealing system 6200 for sewing a first cloth material 6202 to a second cloth material 6204 and for sealing the seam. In one embodiment, a susceptor composition 6206 according to the present invention is placed between the first and second cloth materials 6202 and 6204. In another embodiment, either one or both of the cloth materials 6202 and 6206 are coated with the composition in the location where the seam will exist.

The system includes a pressure plate 6208 and a reciprocating needle 6212, through which a thread 6210 can be threaded, for joining the first cloth material 6202 with the second cloth material 6204. The seam sealing system 6200 also includes an RF heating system according to the present invention for activating the composition 6206. The RF heating system includes a reciprocating pressure foot 6214 and at least two probes (not shown) placed within and near the surface of the pressure plate 6208. The probes (not shown) are connected to the power supply 502 for generating an RF field at the probes. Alternatively, the probes can be located within the pressure foot 6214 as opposed to the pressure plate 6208.

The cloth materials 6202 and 6204 and the composition 6206 are pulled past the reciprocating needle 6212 and then past the reciprocating pressure foot 6214. The reciprocating needle 6212 and thread 6210 stitch the first material 6202 to the second material 6204, thereby joining the materials together at a seam. This stitching process creates small holes in the materials 6202 and 6204. The RF field generated at the probes within the pressure plate 6208 activates the composition 6206, which causes the composition 6206 to flow and thereby fill or cover the small holes created by the needle 6212 during the stitching process. The reciprocating pressure foot 6214 functions to evenly flow the activated composition 6206, thereby facilitating the composition in the filling/covering of the holes created by the needle 6212. In this manner, the susceptor compositions of the present invention can be used to seal seams.

XIII. KITS

The invention also provides kits for use in the preparation of the susceptor compositions according to the present invention. Kits according to the present invention comprise one or more containers such as jars, vials, drums, boxes and the like, wherein a first container contains a susceptor composition of the invention. Additional kits of the invention comprise one or more containers wherein a first container contains one or more ionomer compounds and/or polar carriers, such as water, glycerin, N-methyl pyrrolidone (NMP), dimethylformamide (DMF), dimethylacetamide (DMAC), dimethylsulfoxide (DMSO), tetrahydrofuran (THF), polyvinyl pyrrolidone (PVP), polyvinylpyrrolidone/vinyl acetate copolymer (PVP/VA), and branched polyesters. Additives as described herein may be present in the first container means or separate container means. The kits of the invention may be used to produce one or more of the bonding compositions of the present invention for use in a variety of applications as described below.

The invention also provides for kits comprising at least two containers, wherein one of the containers comprises an ionomer and another of the containers comprises a polar carrier, wherein when the susceptor and the carrier are applied to substrates and the applied susceptor and carrier are interfaced, a composition is formed that is heatable by RF energy. Any one of the container means or a separate container means may contain one or more of the additives described herein.

XIV. EXPERIMENTAL SET-UP

Figure 40:
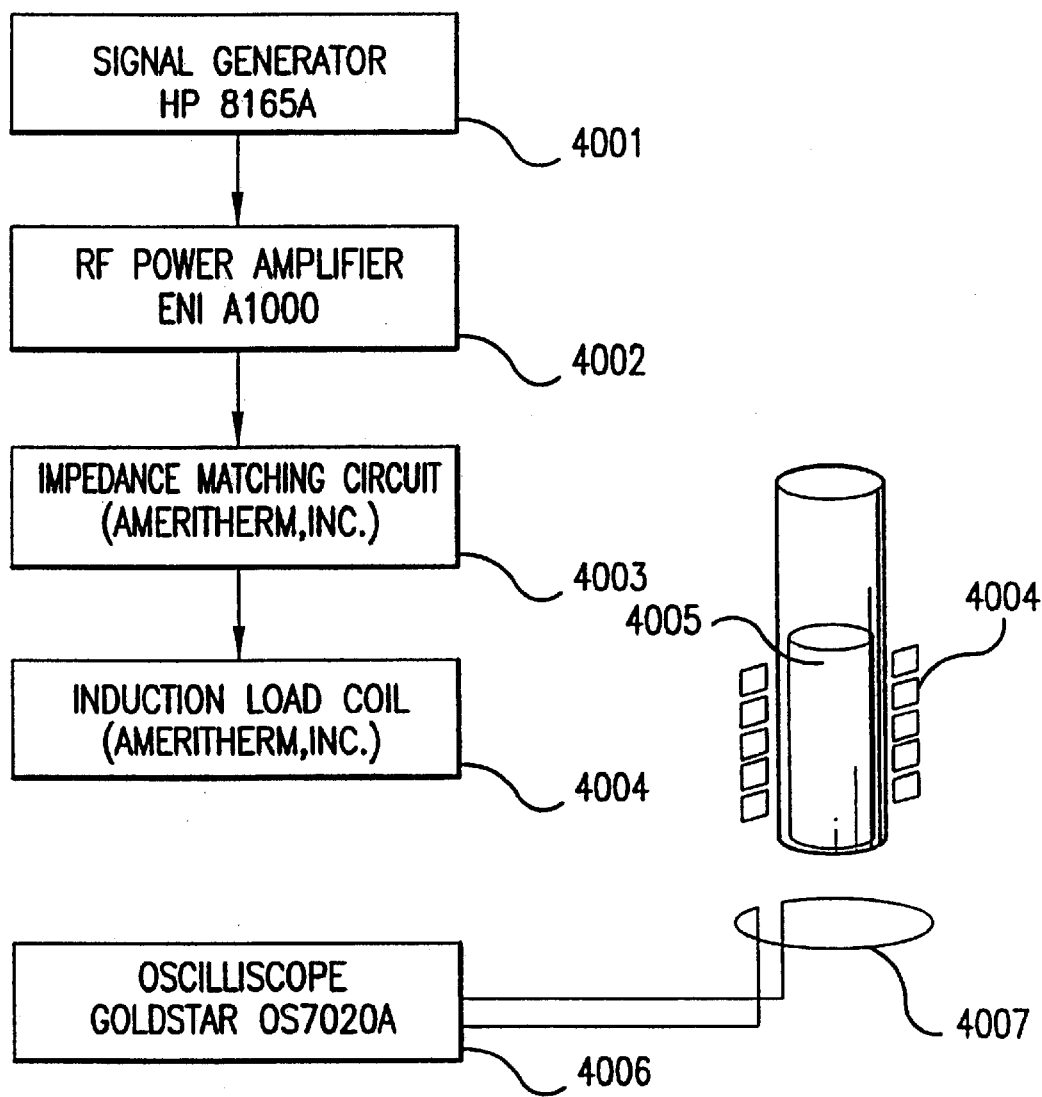
FIG. 40 shows an example experimental set-up utilized to test compositions according to the present invention.

FIG. 40 shows an example experimental set-up utilized to test the susceptor compositions. An RF signal is generated by a signal generator 4001. Signal generator 4001 can be an HP 8165A signal generator (available from Hewlett Packard Corporation). The RF signal is coupled to the input side of RF power amplifier 4002 (available from ENI). The RF power is fed from the output side of RF power amplifier 4002 to the input side of an impedance matching circuit 4003 that functions to match the output impedance to the combined load impedance of coil 4004 and test sample 4005. Impedance matching circuit 4003 can be designed according to known electronics principles as would be apparent to those of skill in the art. See, e.g., "The Art of Electronics," by P. Horowitz and W. Hill, Second Ed., Cambridge University Press (1994), especially Chapter 40, incorporated by reference herein. The RF power of load coil 4004 is inductively coupled to test sample 4005. The frequency of signal generator 4001 is tuned to result in resonance at load coil 4004. This frequency is detected by a single turn, 2 inch diameter probe loop 4007, which is located just below and in proximity to load coil 4004. Resonance is indicated by a maximum resulting voltage drop across probe loop 4007, and was displayed on an oscilloscope 4006, such as a model number OS7020A oscilloscope available from Goldstar. Frequency tuning is performed at sufficiently low RF powers in order to avoid heating of test sample 4005. Once the frequency of signal generator 4001 is tuned to resonance, the RF power delivered to load coil 4004 is increased to a desired power level by increasing the output level of signal generator 4001. The front panel of RF power amplifier 4002 displays the measured RF power level delivered to test sample 4005.

Figure 41:
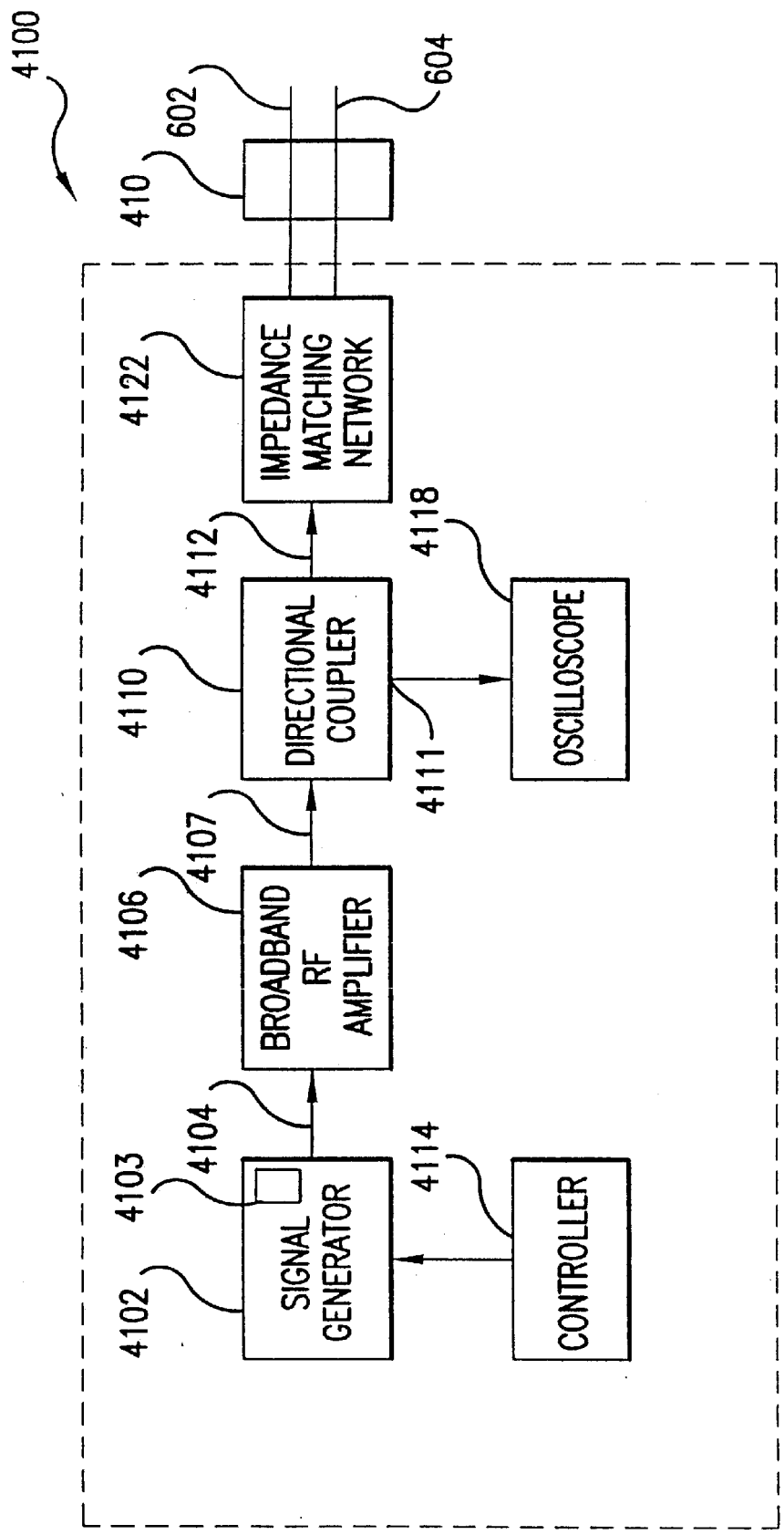
FIG. 41 illustrates another experimental set-up for testing compositions according to the present invention.

FIG. 41 illustrates another experimental heating system 4100. Heating system 4100 includes a signal generator 4102. Signal generator 4102 can be an HP 8165A signal generator (available from Hewlett Packard Corporation). Signal generator 4102 is used to generate a low level RF signal having a frequency between 10 MHZ and 15 MHz. Signal generator has a control panel 4103 that allows a user to manually select the frequency of the generated RF signal. The output level of the signal is also controllable from control panel 4103, or from a controller 4114. The output level of the generated RF signal can vary from 0 Volts to 1 Volt peak to peak into 50 ohms, or 0 dBm.

Controller 4114 is interfaced to signal generator through a general purpose interface board (GPIB) (not shown). In one embodiment, controller 4114 is a personal computer (PC) running the Windows® operating system. A visual C++ program that provides a user interface for controlling the output level of signal generator 4102 is configured to run on controller 4114.

The low level RF signal generated by signal generator 4102 is provided to the input of a broadband RF amplifier 4106 using a coaxial cable 4104. Preferably, broadband RF amplifier 4106 is the A1000 broadband amplifier sold by ENI of Rochester, N.Y., and coaxial cable 4104 is a standard RG58 coaxial cable. Broadband Amplifier 4106 amplifies the low level RF signal by 60 dB, thereby providing a 1 Kilowatt output into a 50 ohm load for a 1 milliwatt (0 dBm) input. If the low level RF input signal provided to amplifier 4106 consists of a timed pulse, amplifier 4106 will amplify the pulse to produce a high level pulse output.

Connected to the output of broadband amplifier 4106 is a directional coupler 4110. A suitable directional coupler can be purchased from Connecticut Microwave Corporation of Cheshire, Conn. Directional coupler 4110 is connected to the output of amplifier 4106 through an RF cable 4107, such as an RG393 RF cable. The output of directional coupler 4110 is connected to an impedance matching circuit 4122 using RG393 RF cable 4112.

The function of impedance matching circuit 4122 is to match a 50 ohm input impedance to a variable impedance of probes 602 and 604 and the sample 410. Typical impedances of probes 602 and 604 in combination with sample 410 range from 200 ohms up to 500 ohms.

Directional coupler 4110 has a reflected power output port 4111 that is connected to an oscilloscope 4118. Preferably, oscilloscope 4118 is a TDS210 digital real time oscilloscope available from Tektronix, Inc. Directional coupler 4110 provides a signal representing the amount of reflected power to oscilloscope 4118, which then displays the magnitude of the reflected power.

The process for heating sample 410 using heating system 4100 will now be described. Initially, an operator interacts with a user interface on controller 4114 to activate signal generator 4102 so that it produces a 50 millivolt RF signal. The reflected power is then observed on oscilloscope 4118. The frequency of the 50 millivolt RF signal and matching circuit 4122 are adjusted such that the reflected power is minimized. Once the frequency and the matching circuit are adjusted such that the reflected power is minimized, the signal generator is turned off and sample 410 is placed close to probes 602 and 604.

Next, controller 4114 is used to turn on signal generator 4102 so that it once again produces a 50 millivolt RF signal. At this point, the frequency and matching circuit are adjusted again until the reflected power is minimized. On achieving the minimum reflected power, signal generator 4102 is turned off. Next, operator uses controller to direct signal generator to produce an RF signal with a voltage ranging from 100 millivolts to 1000 millivolts and with a pulse time of between 20 milliseconds and 1000 milliseconds. This low level RF signal is amplified by broadband amplifier 4106. The amplified signal is then provided to impedance matching circuit 4122 and an a RF pulsed electromagnetic field is produced at probes 602 and 604. The presence of the pulsed electromagnetic field causes sample 410 to heat.

Figure 42:
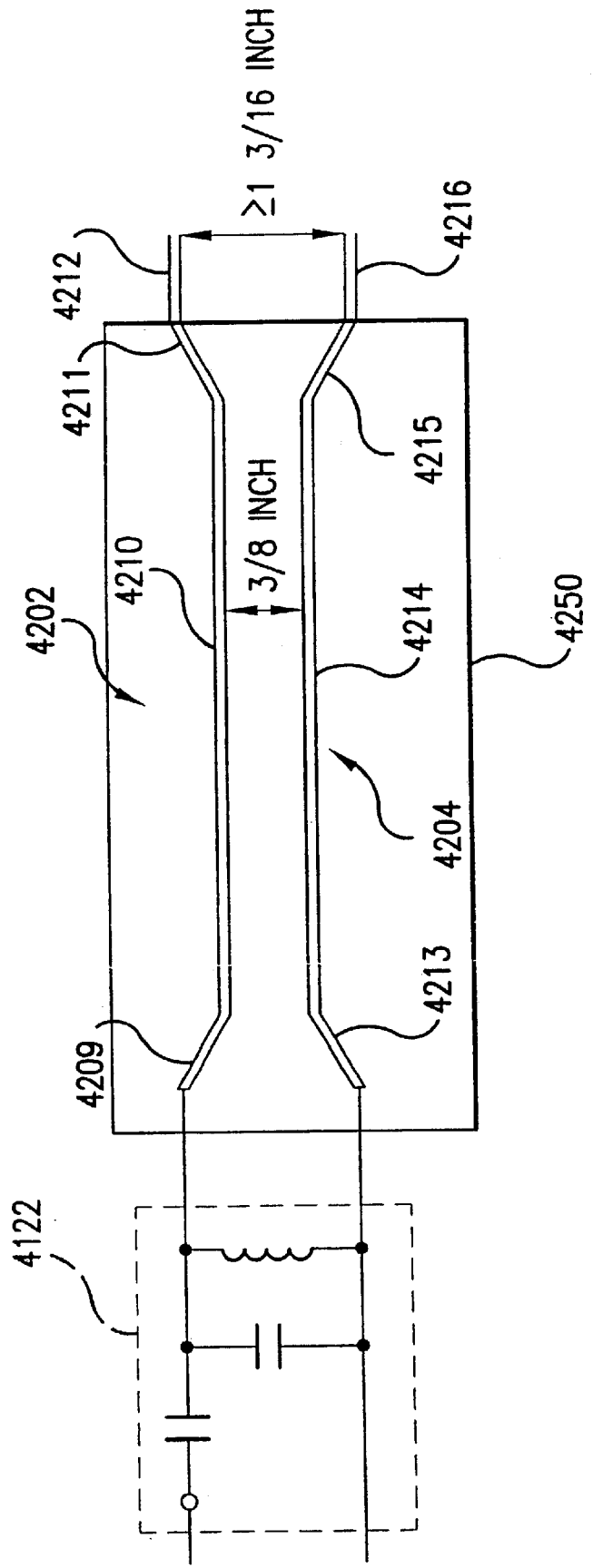
FIG. 42 illustrates test probes.

FIG. 42 illustrates probes 4202 and 4204, which were the probes utilized to test the compositions described herein. The present invention is not limited to this or any particular probe design. Probe 4202 and probe 4204 are both ⅛ inch square copper tubes. Probe 4202 and probe 4204 both rest on a block 4250 of non-electrically conductive material, preferably, but not limited to, TEFLON™. More specifically, block 4250 has ⅛ inch square slots milled therein so that probes 4202 and 4204 are recessed into block 4250.

Probe 4202 has a proximal section 4209, a center section 4210, a transition section 4211, and a distal section 4212. Similarly probe 4204 has a proximal section 4213, a center section 4214, a transition section 4215, and a distal section 4216. Center section 4210 is parallel with center section 4212. The center to center distance between center section 4210 and center section 4212 is on half of an inch.

Proximal section 4209 diverges away from probe 4204. Similarly, proximal section 4213 diverges away from probe 4202. The center to center distance between the proximal end of proximal section 4209 and the proximal end of proximal section 4213 is about at least one and three sixteenths of an inch.

Distal section 4212 is parallel with distal section 4216 and parallel with center section 4210. The center to center distance between distal section 4212 and distal section 4216 is about at least one and three sixteenths of an inch. Transition section 4211 is between center section 4210 and distal section 4212. Similarly, transition section 4215 is between center section 4214 and distal section 4216.

The reason the distance between the proximal end of proximal section 4209 and the proximal end of proximal section 4213 is about at least one and three sixteenth of an inch is to prevent arcing at the ends of probe 4202 and 4204. For that same reason the distance between distal section 4212 and distal section 4216 is about at least one and three sixteenth of an inch.

XV. EXAMPLES

Without further elaboration, it is believed that one skilled in the art can, using the preceding description, utilize the present invention to its fullest extent. The following preferred specific embodiments are, therefore, to be construed as merely illustrative and not limitive of the remainder of the disclosure in any way.

Example 1

This example demonstrates the effect of varying the concentration of the polar carrier in blends of the polar carrier and ionomer. The polar carrier of this example is glycerin. Glycerin has a dielectric constant of 42.5 at 25° C. The ionomer of this example is a commercially available sulfonated polyester ionomer (Eastman AQS55S).

Several compositions were prepared as hot-melt blends of AQ55S and glycerin. The wt. % concentration of glycerin in the compositions was varied from 10% to 70. The compositions were prepared as follows:

Each composition was prepared to have a total mass of 50 grams. For each composition, the respective amounts of AQ55S pellets and glycerin were initially weighed into a resin flask and mixed to achieve thorough wetting of the resin pellets with the glycerin. The flask was then fit with a condenser column and sealed stir-assembly, and partially immersed into a 335 F. hot oil bath to achieve controlled heating and melting of the mixture. After the pellets became molten and swollen with the glycerin, the mixture was stirred and blended into a uniform composition.

Each composition was then applied in its molten state as a 0.003 inch thick×1 inch wide×5 inch long, continuous layer along the center line of a 4 inch wide×0.0035 inch thick sheet of transparency film (3M PP2500 Transparency Film) and allowed to set-up at room temperature. Several such draw downs were made for each composition. A twin blade sample cutter was used to cut strips from the draw downs, by cutting across and perpendicular to the 5 inch long center line of each of the draw downs. This produced 1 inch wide×4 inch long strips of acetate film, each with a 1 inch×1 inch×0.003 inch thick coating of composition in the center and 1½ inch long tails on each end. The resulting coatings differed in their relative RF-heating properties as well as their relative heat resistance to bond failure in a given shear loading condition.

RF-heating of each composition was evaluated as follows. For each composition, several sandwiches were prepared. Each sandwich was made by placing the polypropylene (PP) non-woven side of a 1 inch wide×4 inch long strip of a bilaminate web against the coated side of the coated acetate test strip. The bilaminate web was composed of a layer of PP non-woven bonded to a layer of polyethylene (PE) film. Each sandwich was placed directly over the RF probes (410) of the RF set-up described in FIG. 41, such that the uncoated side of the acetate test strip was placed toward the probes. The sandwich layers were pressed firmly together against a layer of 0.010 inch thick layer of TEFLON™ and acetate that separated the RF probes and sandwich. A single pulse of 0.5 kW, 13.5 MHZ RF energy was applied for a controlled duration to each sandwich. For each composition several sandwiches were activated, each at an incrementally longer duration. This gave a range of RF heating results. Threshold RF activation was determined from each range of results as the minimum duration that result in sufficient melting and wetting of the adhesive coating to the web to be observed by the naked eye. Threshold RF activation by the specific RF set-up (generally indicated in FIG. 41) resulted in a narrow band of heating that was biased toward and parallel to the "high" probe of the probe assembly (602 or 604). This was because an "unbalanced" impedance matching network was used in the set-up.

Resistance to shear load bond failure was evaluated as follows. For each composition, bonded specimens were prepared. The specimens each consisted of a sandwich of a 1 inch×4 inch×0.0035 inch thick layer of acetate pressed against and hot-melt bonded to the coated side of a coated acetate test strip. (The coated acetate test strips were prepared as described earlier in this example.) Each hot-melt bond was facilitated by pressing the sandwich on a 275 F. hot plate surface under a 0.5 Kg load for 30 seconds, and then removing the sandwich and allowing it to cool and solidify into a bonded specimen. Each sandwich had a pair of "tails" of unbonded acetate on each side of a centered 1 inch×1 inch bonded area of the sandwich. One tail from each of the two pairs and on opposite sides of the sandwich was cut off. This resulted in the final bonding specimen, consisting of two 1 inch×3 inch layers of 0.0035 inch thick acetate bonded together across a 1 inch by 1 inch overlap by an interposed 0.003 inch thick layer of the composition being tested. The specimens were then placed under a shear load of 0.5 Kg in a temperature controlled chamber at 100 F. The time required to result in total bond failure (disassembly of the specimen) at 100 F. was measured for each specimen and is referred to herein as "Shear Holding Time".

Figure 54:
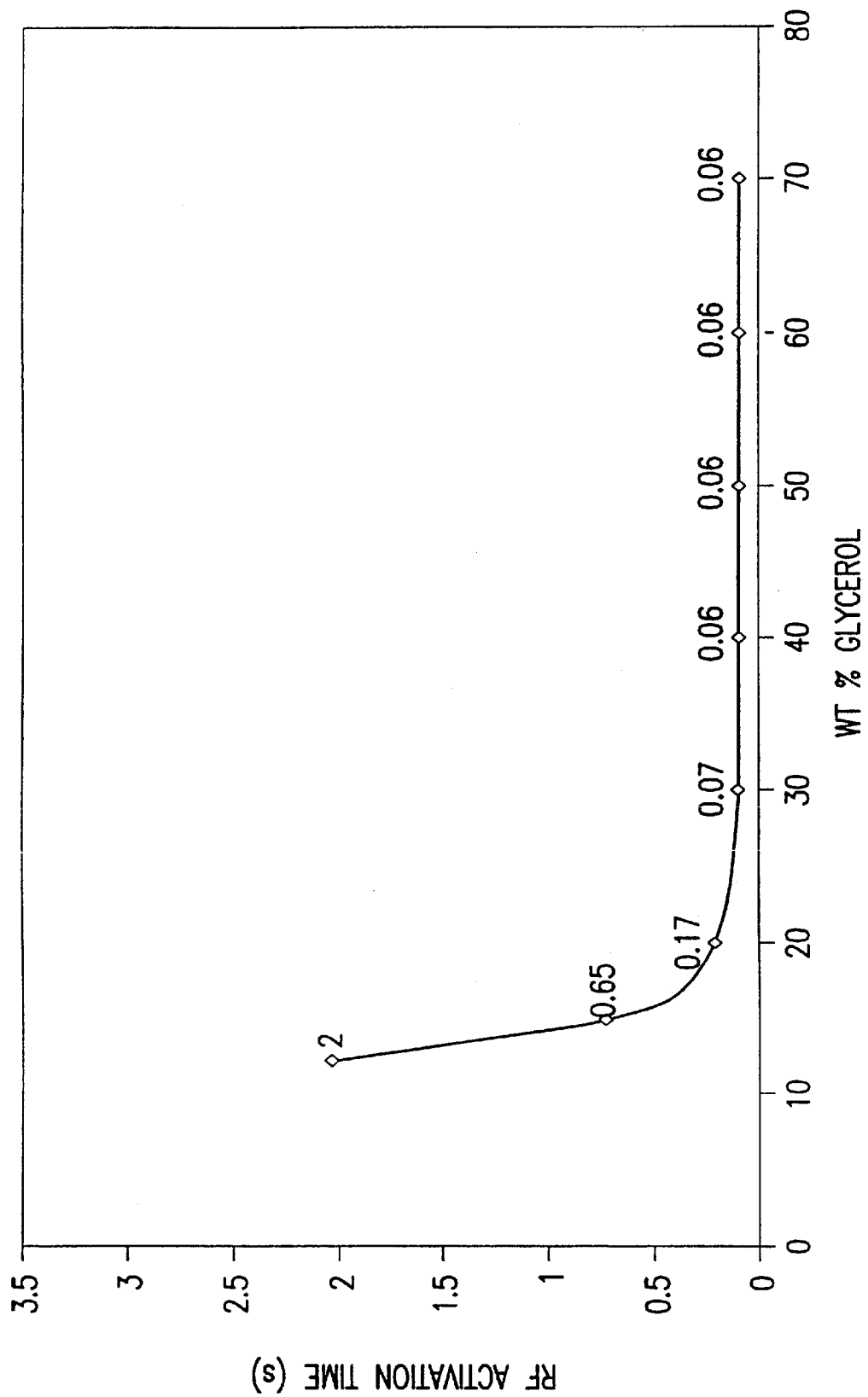
FIG. 54 depicts a graph showing RF activation time vs. % Glycerin for a composition comprising AQ55S.
Figure 55:
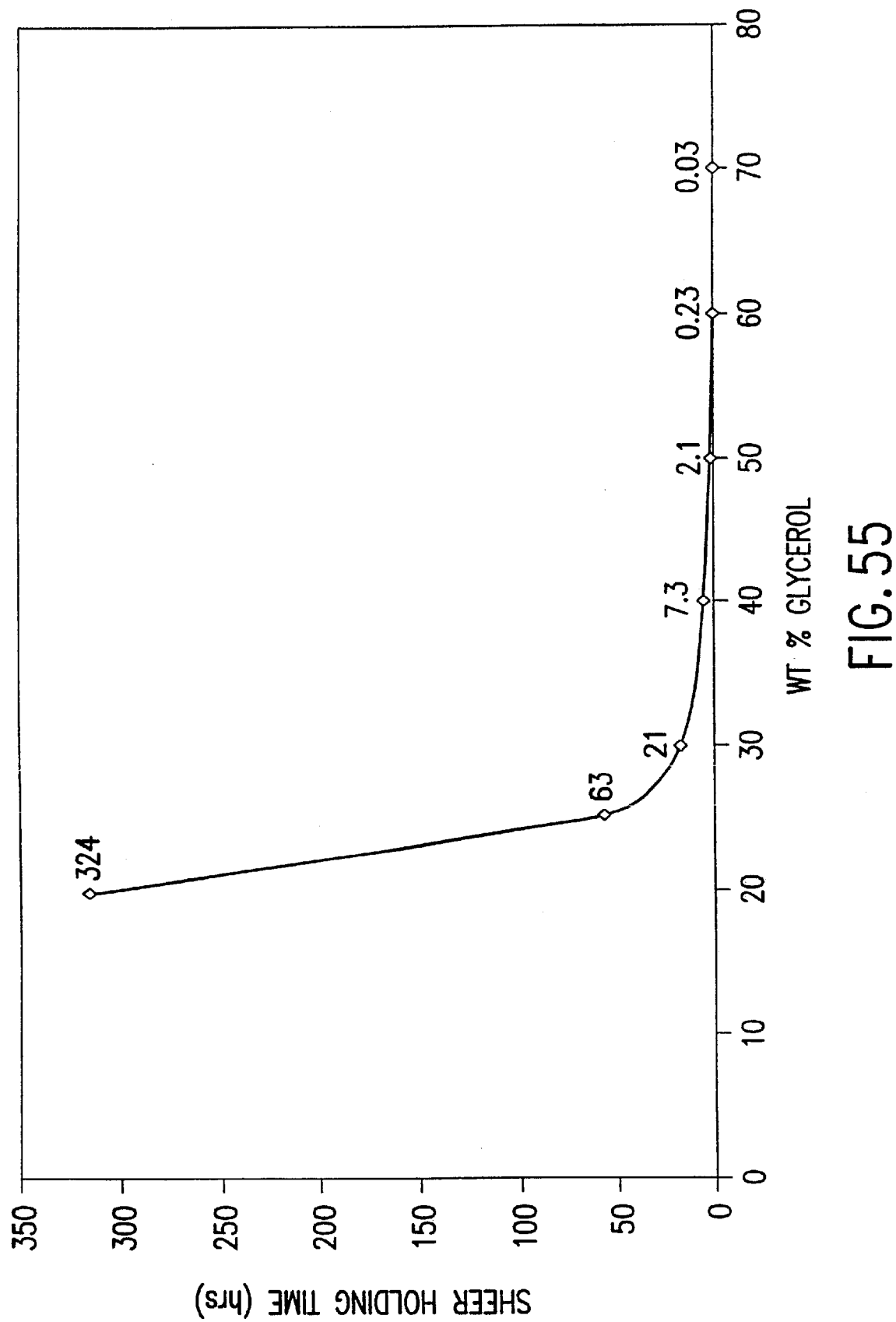
FIG. 55 depicts a graph showing shear holding time vs. % glycerin for a composition comprising AQ55S.

The following observations were made:
(1) As the percentage of glycerin was increased from 10% to 70%, a sharp increase in relative rates of RF heating began to occur at about 10% glycerin. (See FIG. 54.)
(2) As the percentage of glycerin was decreased from 70% to 10% a sharp increase in relative heat resistance began to occur at about 30% glycerin. (See FIG. 55.)

Example 2

This example demonstrates the effect of varying the concentration of the polar carrier in blends of the polar carrier and an alternative sulfonated polyester ionomer to the AQ55S of Example 1. The polar carrier of this example is glycerin. The ionomer of this example is a commercially available sulfonated polyester ionomer (Eastman AQ35S)

Several compositions were prepared as hot-melt blends AQ35S and glycerin. The wt. % concentration of glycerin in the compositions was varied from 10% to 70%.

The compositions were prepared as follows:

Each composition was prepared to have a total mass of 50 grams. For each composition, the respective amounts of AQ35S pellets and glycerin were initially weighed into a resin flask and mixed to achieve thorough wetting of the resin pellets with the glycerin. The flask was then fit with a condenser column and sealed stir-assembly, and partially immersed into a 335 F. hot oil bath to achieve controlled heating and melting of the mixture. After the pellets became molten and swollen with the glycerin, the mixture was stirred and blended into a uniform composition.

RF-heating and resistance to shear load bond failure was evaluated for each composition as described in Example 1.

Figure 56:
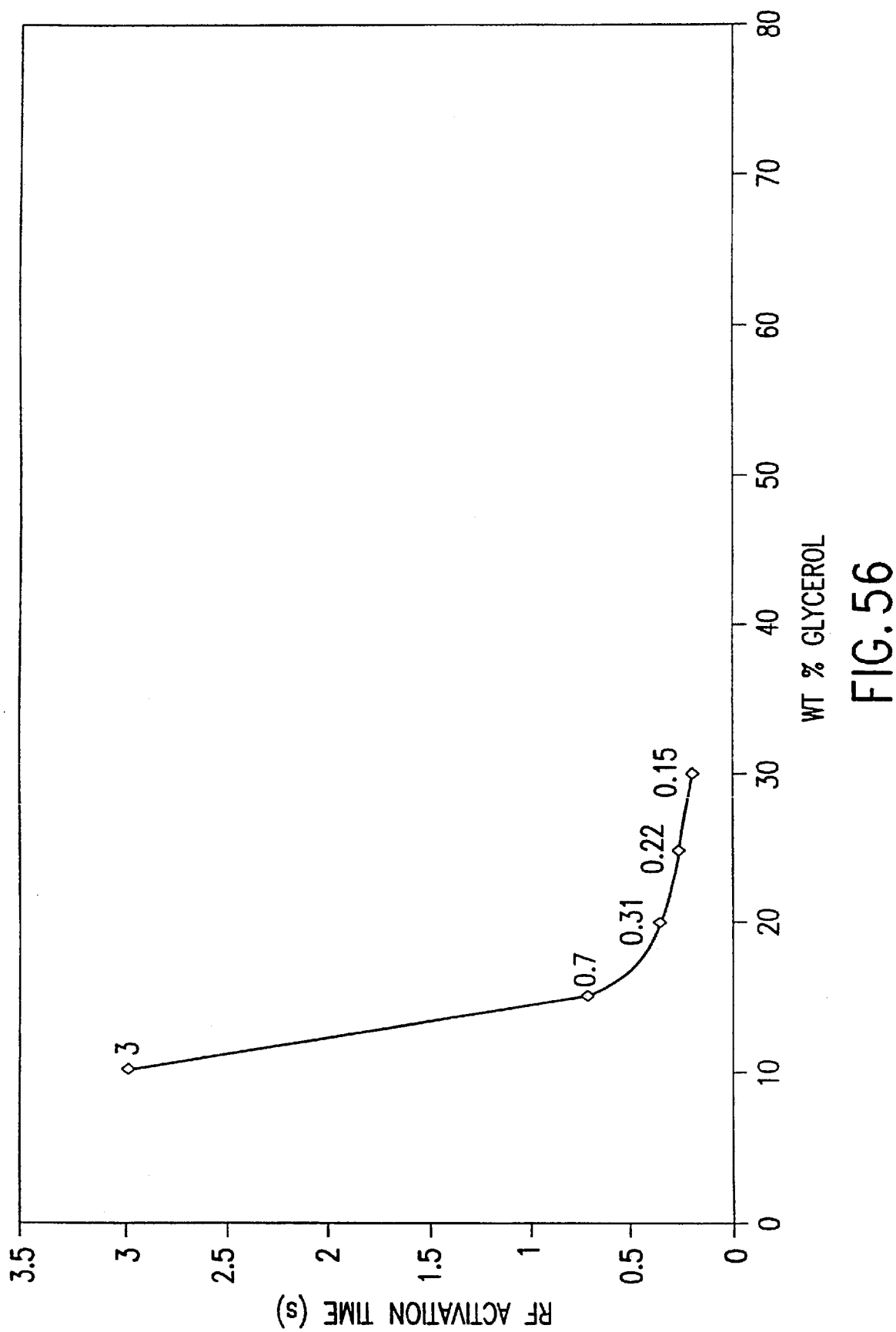
FIG. 56 depicts a graph showing RF activation time vs. % glycerin for a composition comprising AQ35S.

The following observations were made:

(1) As the percentage of glycerin was increased from 10% to 30%, a sharp increase in relative rates of RF heating began to occur at about 10% glycerin. (See FIG. 56.)

Figure 57:
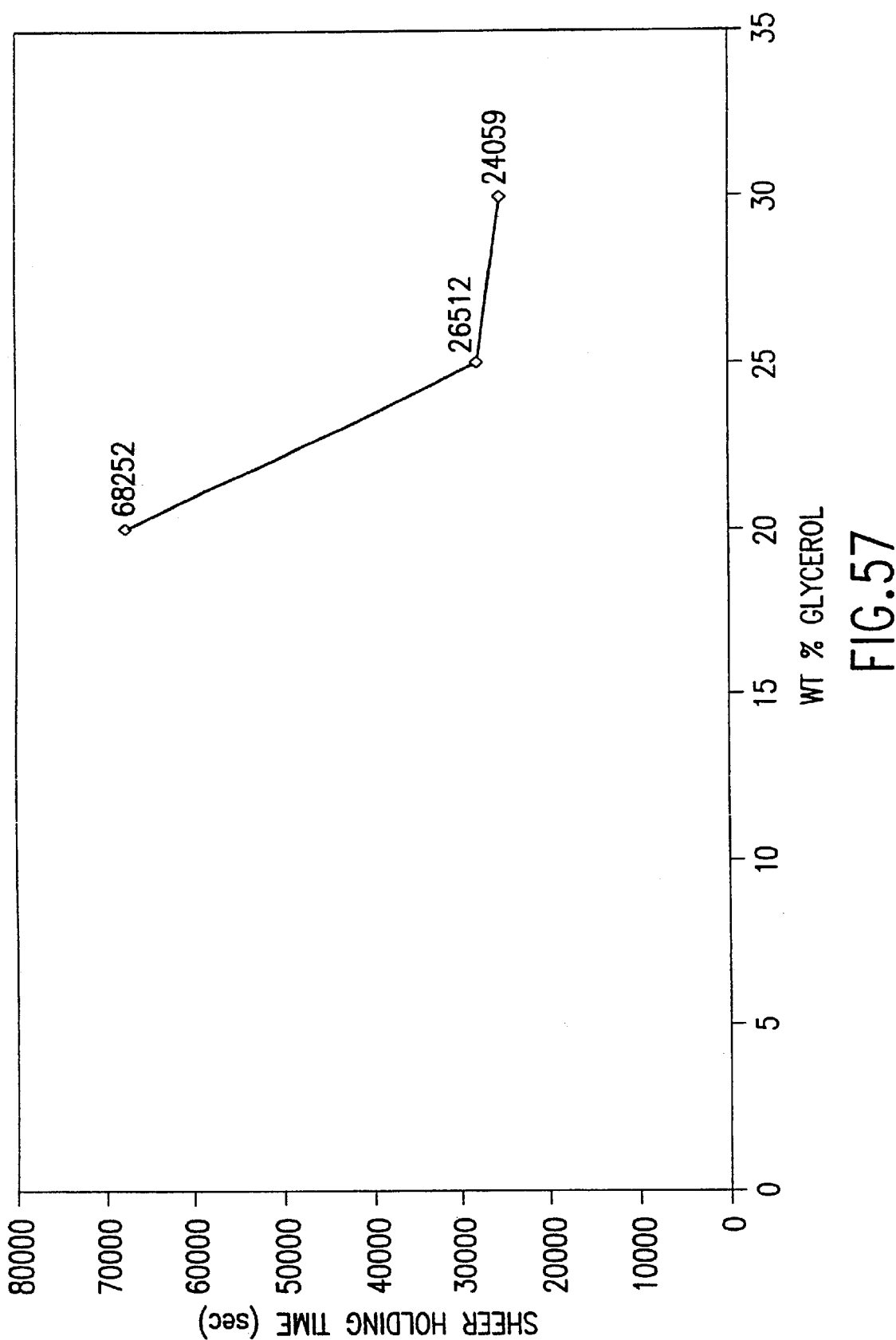
FIG. 57 depicts a graph showing shear holding time vs. % glycerin for a composition comprising AQ35S.

(2) As the percentage of glycerin was decreased from 30% to 20% a sharp increase in relative heat resistance began to occur at about 30% glycerin. (See FIG. 57.) These results agreed closely with the results of Example 1.

Example 3

This example demonstrates the effects of dielectric constant and concentration of various polar carriers on the ability to achieve significantly improved RF activation times in compositions comprising blends of ionomers and polar carriers, as compared to compositions comprising the ionomer without sufficient presence of polar carrier.

The polar carriers and respective measured dielectric constants of this example are:

(1) Propylene carbonate; dielectric constant=62.67 at 25° C.

(2) Glycerin; dielectric constant=42.5 at 25° C.

(3) N-methyl-2-pyrrolidone; dielectric constant=32.2 at 20° C.

(4) 1,2-propyleneglycol dielectric constant=32 at 25° C.

(5) Polyethylene glycol 200; dielectric constant=17.70 at 23.5° C.

(6) Benzoflex 9-88 (dipropylene glycol benzoate); dielectric constant=12.28 at 25° C.

The ionomer of this example is a commercially available 30% solids aqueous dispersion of sulfonated polyester ionomer (Eastman AQ35D). Several compositions were prepared as aqueous mixtures of AQ35D and each of the polar carriers. The wt. % concentration of polar carrier in each of the compositions was varied from 0% up to 50%, where total weight is based on total weight of ionomer solids combined with total weight of polar carrier.

The compositions were prepared as follows:

Each composition was prepared to have a total mass of 50 grams. For each composition, the respective amounts of AQ35D ionomer dispersion and glycerin were initially weighed into a jar and mixed for about 10 minutes. The jars were sealed with tops until castings were made.

Each composition was then applied as a liquid at room temperature into castings onto a 0.0035 inch thick sheet of transparency film (3M PP 2500 Transparency Film) and allowed to dry down into 0.003 inch thick coatings. The resulting coatings differed in their relative RF-heating properties. RF activation was evaluated as described in Example 1.

Figure 58:
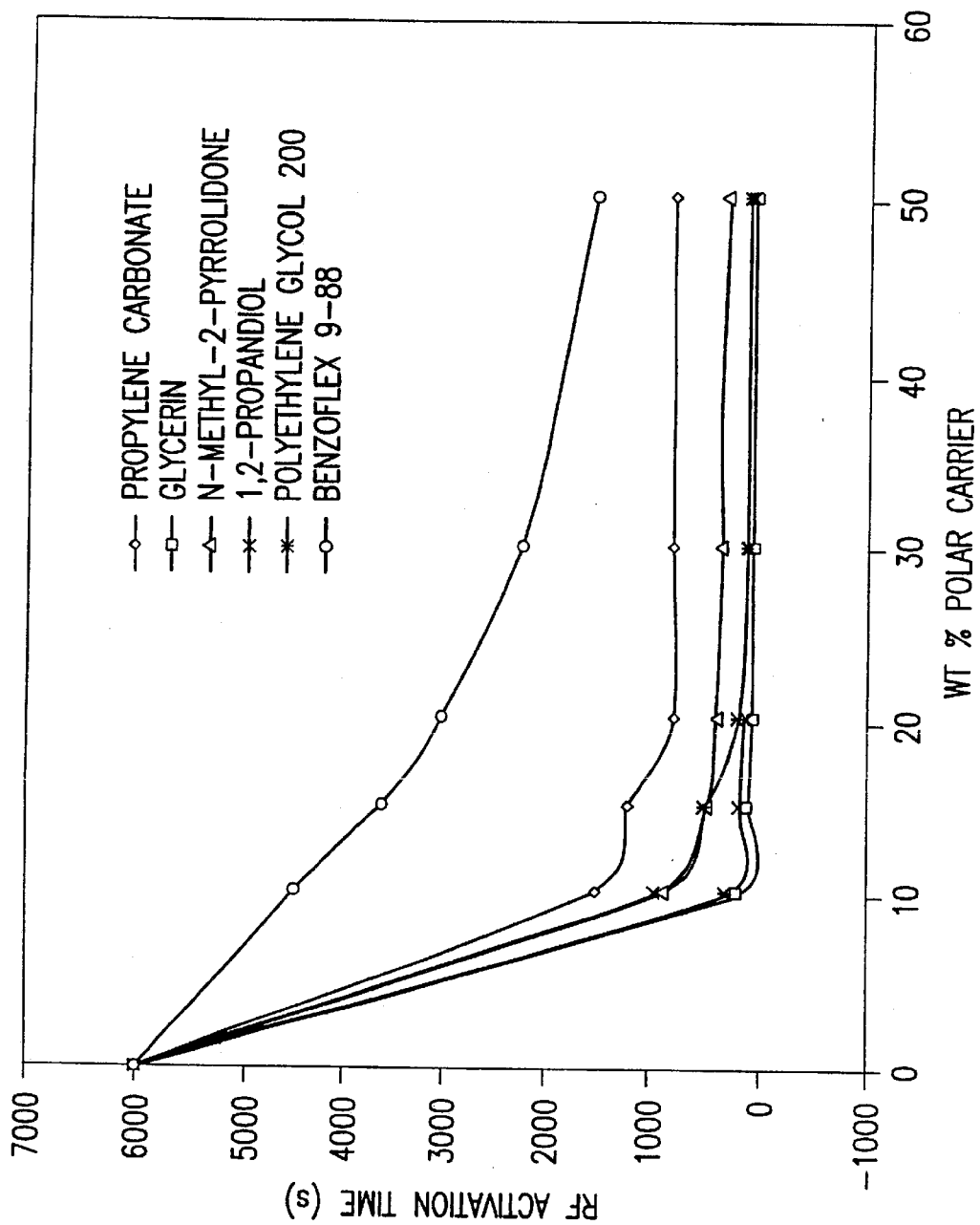
FIG. 58 depicts a family of curves showing RF activation time vs. % various polar carriers.

The following observations were made:

As the percentage of each polar carrier was increased from 0% to 50%, a sharp increase in relative rates of RF heating began to occur at about 10% (except for the composition that was prepared from Benzoflex 9-88, which experienced a relatively slow and gradual increase). (See FIG. 58.)

While Benzoflex 9-88 gave a compatible composition with the AQ35S polymer, it resulted in a significantly less RF-active composition than any of the compositions that were prepared from more polar materials with relatively high dielectric constants. (See FIG. 58.)

Example 4

This example demonstrates the effect of varying the concentration of a microcrystalline wax in the composition, X % (80% AQ55S/20% Glycerin)/Y % wax. The microcrystalline wax in this example was PARICIN 220 (N-(2-hydroxyethyl)-12-hydroxystearamide).

The compositions were prepared as follows:

Each composition was prepared to have a total mass of 50 grams. A 300 gram batch of 80% AQ55S/ 20% glycerin was prepared. 240 grams of AQ55S pellets and 60 grams of glycerin were initially weighed into a resin flask and mixed to achieve thorough wetting of the resin pellets with the glycerin. The flask was then fit with a condenser column and sealed stir-assembly, and partially immersed into a 335 F. hot oil bath to achieve controlled heating and melting of the mixture. After the pellets became molten and swollen with the glycerin, the mixture was stirred and blended into a uniform composition. After a total of 4 hours of heating, the flask was removed from the hot oil bath. Several glass jars were each filled with 20 grams of the molten composition. Incrementally increasing amounts of PARICIN 220 were weighed into the hot contents of each jar, to result in a concentration series of X % (80% AQ55S/20% Glycerin)/Y % PARICIN 220, where Y=0, 1, 2, 3, 4, 5, 10, 15, 20, 25 and 30, and X=100−Y. Each open jar was placed in an oven at 300 F. for 30 minutes and allowed to become molten. The molten contents were then hand stirred with wooden stir sticks for 2 minutes to form a smooth and uniform blend.

Each composition was then applied in its molten state as a 0.003 inch thick×1 inch wide×5 inch long, continuous layer along the center line of a 4 inch wide×0.0035 inch thick sheet of transparency film (3M PP2500 Transparency Film) and allowed to set-up at room temperature. Several such draw downs were made for each composition A twin blade sample cutter was used to cut strips from the draw downs, by cutting across and perpendicular to the 5 inch long center line of each of the draw downs. This produced 1 inch wide×4 inch long strips of acetate film, each with a 1 inch×1 inch×0.003 inch thick coating of composition in the center and 1½ inch long tails on each end.

The resulting coatings differed in their relative RF-heating properties and melt viscosities.

RF-heating was evaluated for each composition as described in Example 1. The Brookfield viscosity of each composition was measured at 275 F., using an S27 spindle.

Figure 59:
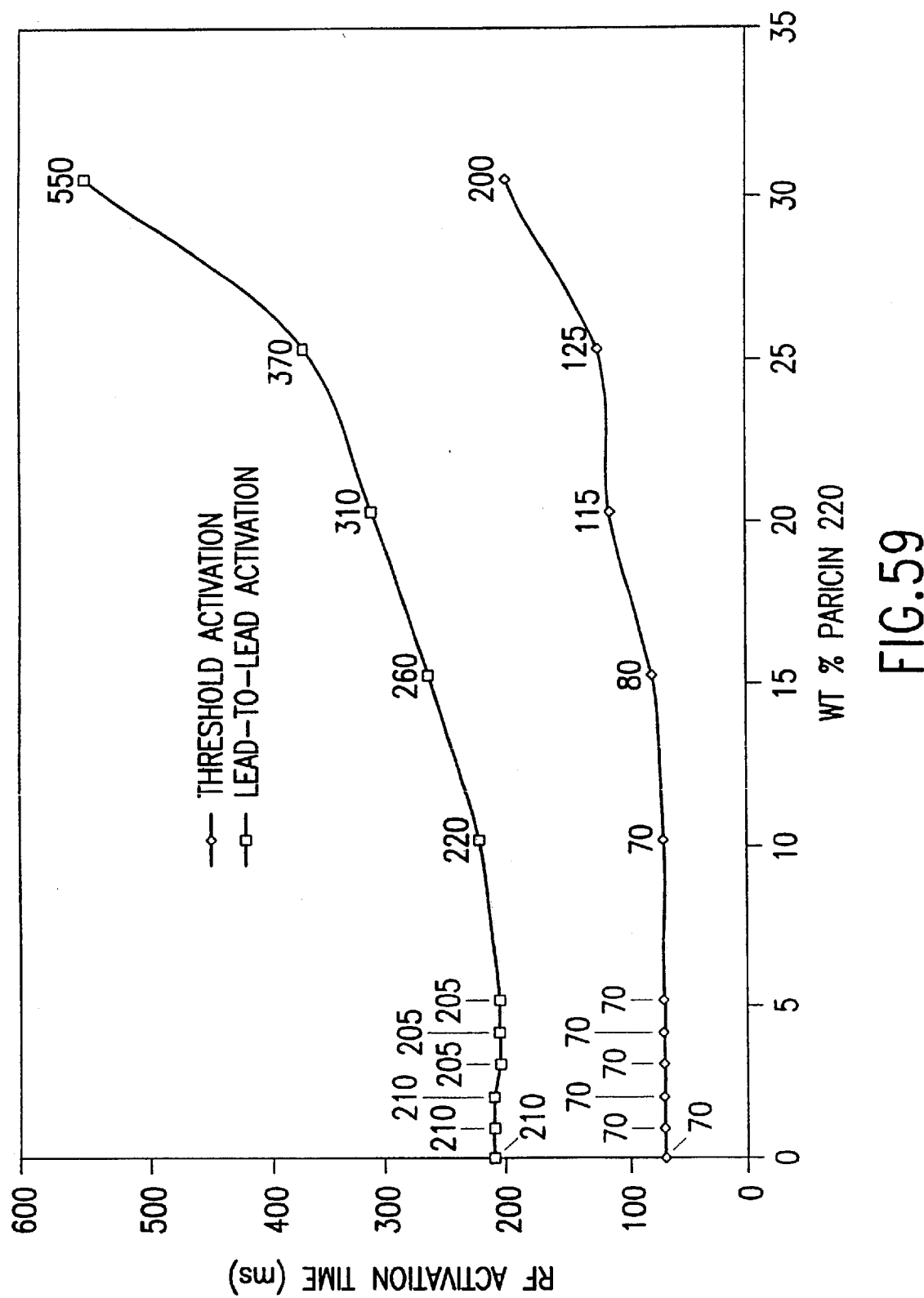
FIG. 59 depicts a graph showing RF activation time vs. % PARICIN 220 in a composition comprising 80% AQ55S/20% glycerin.
Figure 60:
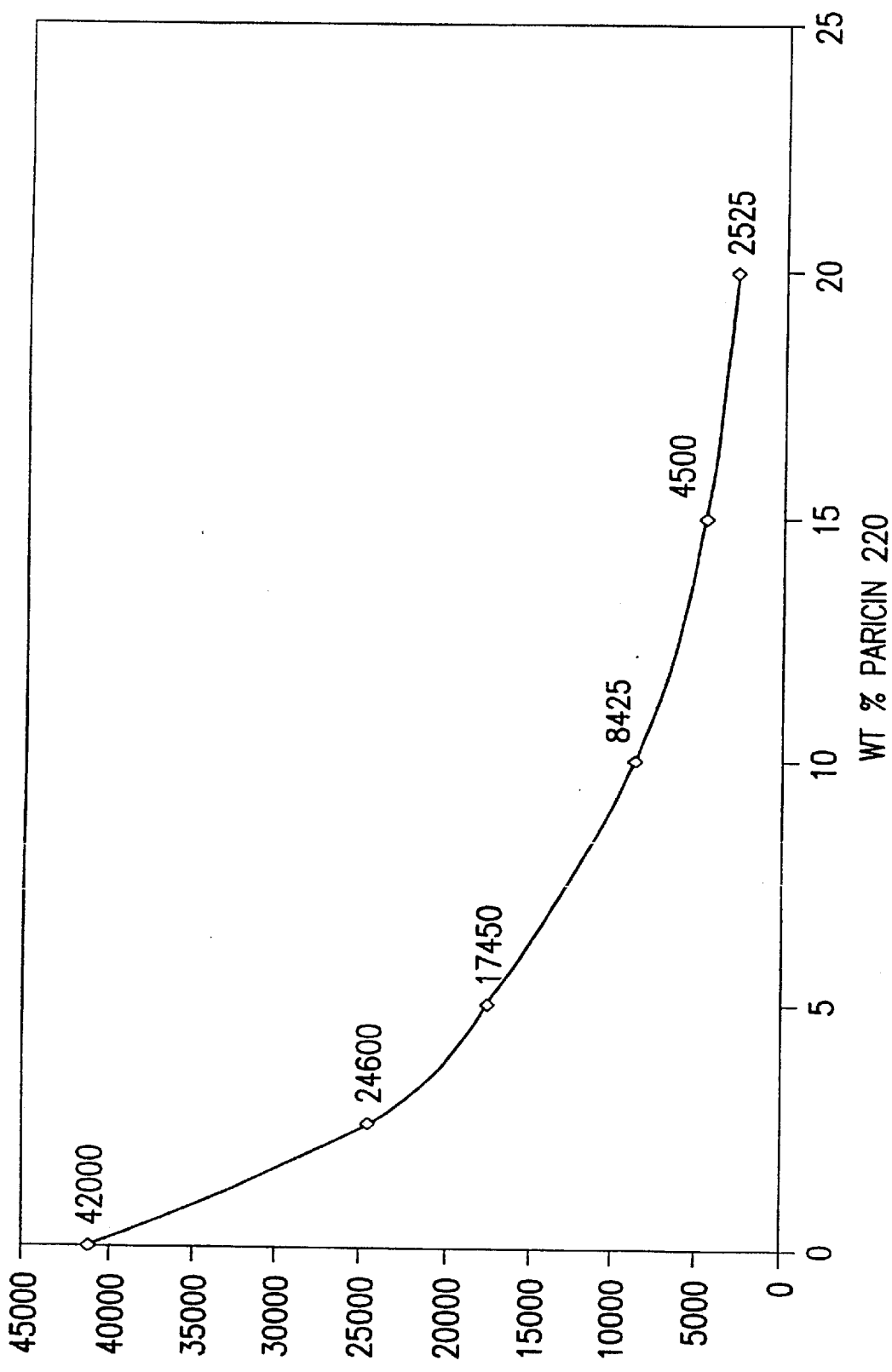
FIG. 60 depicts a graph showing brookfield viscosity vs. % PARICIN 220 in a composition comprising 80% AQ55S/20% glycerin.

The following observations were made:

As the wt % of PARICIN 220 was increased from 0 to 10%, there was a slight increase (<5%) in the time required to heat each composition to the same degree as required at 0% PARICIN 220. As the wt % of PARICIN 220 was increased from 10% to 30%, there was a significant increase in the time required to heat each composition to the same degree as required at 0% PARICIN 220. (See FIG. 59.)

As the wt % of PARICIN 220 decreased from 10% to 0%, the melt viscosity at 275 F. increased by a factor of 6 from 6800 cP to 42000 cP.

Example 5

This example demonstrates the effect of varying the concentration of the polar carrier in blends of the polar carrier and an ionomer, where the ionomer is the sodium salt of an ethylene acrylic acid copolymer. The polar carrier of this example is glycerin. The ionomer of this example is a commercially available aqueous dispersion of the sodium salt of an ethylene acrylic acid copolymer (MICHEM 48525P).

Several compositions were prepared as aqueous mixtures of MICHEM 48525P and glycerin. The wt. % concentration of glycerin in each of the compositions was varied from 0% up to 50%, where total weight is based on total weight of ionomer solids combined with total weight of glycerin.

The compositions were prepared as follows:

Each composition was prepared to have a total mass of 50 grams. For each composition, the respective amounts of MICHEM 48525P ionomer dispersion and glycerin were initially weighed into ajar and mixed for about 10 minutes. The jars were sealed with tops until castings were made. Each composition was then applied as a liquid at room temperature into castings onto a 0.0035 inch thick sheet of transparency film (3M PP2500 Transparency Film) and allowed to dry down into 0.003 inch thick coatings. The resulting coatings differed in their relative RF-heating properties. RF activation was evaluated as described in Example 1.

Figure 61:
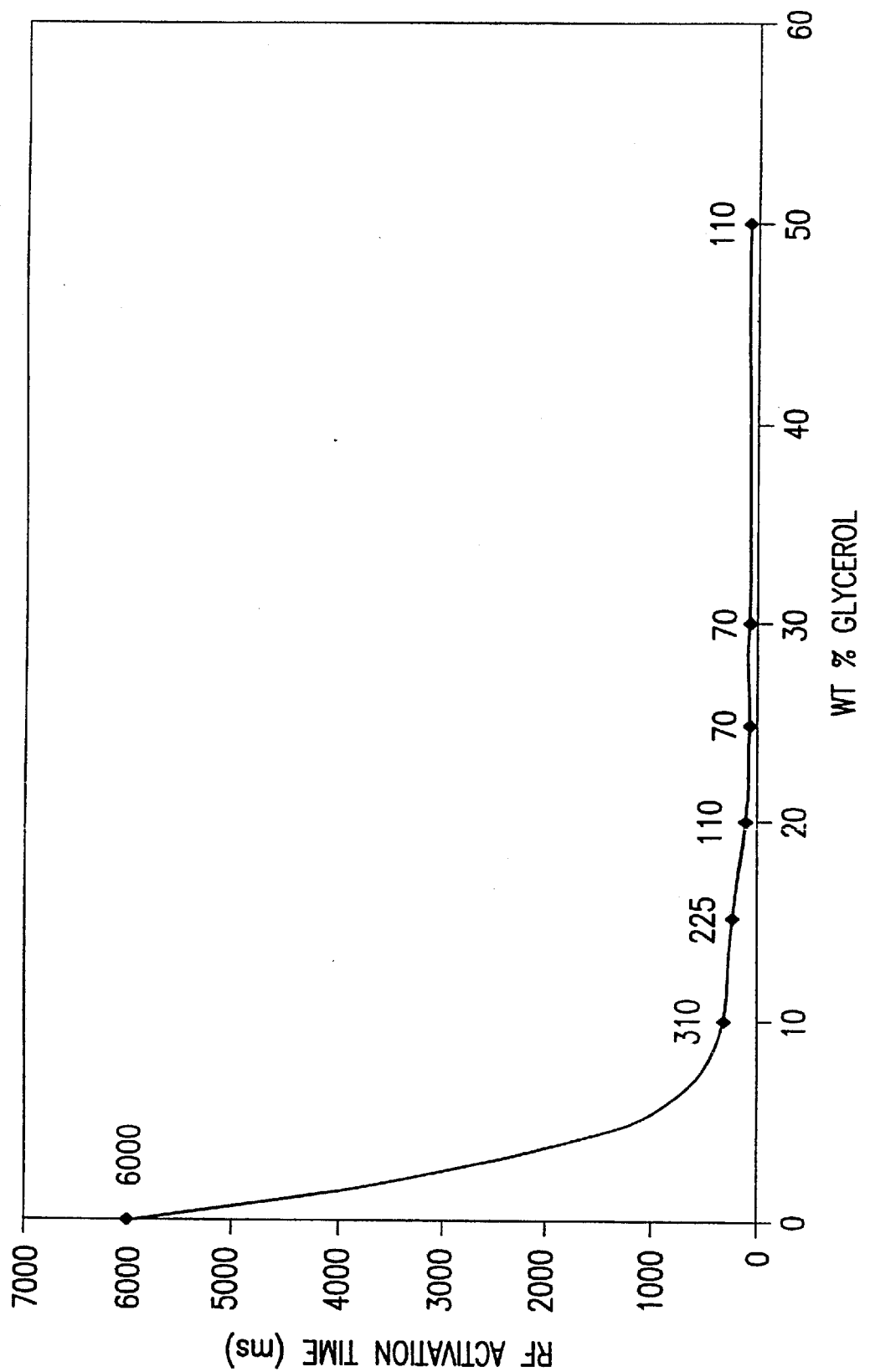
FIG. 61 depicts a graph showing RF activation time vs. % glycerin in a composition comprising the sodium salt of an ethylene acrylic acid copolymer (MICHEM Prime 48525P).

The following observations were made:

As the percentage of each polar carrier was increased from 0% to 50%, a sharp increase in relative rates of RF heating began to occur at about 10% glycerin (See FIG. 61). This result agrees well with the results of Example 4.

Example 6

This example demonstrates the relative heat resistance to bond failure in a given shear loading condition of four separate compositions that are composed of four different sulfonated polyesters respectively (AQ14000, AQ35S, AQ48S and AQ55S) and the same polar material in each case (glycerin). The ionomers of this example are commercially available sulfonated polyester ionomers (Eastman AQ14000, AQ35S, AQ48S and AQ55S).

The four compositions were prepared to have 80 wt % ionomer/ 20 wt % glycerin. Each composition was prepared to have a total mass of 50 grams. For each composition, the respective amounts of ionomer pellets and glycerin were initially weighed into a resin flask and mixed to achieve thorough wetting of the resin pellets with the glycerin. The flask was then fit with a condenser column and a sealed stir-assembly, and then partially immersed into a 335 F. hot oil bath to achieve controlled heating and melting of the mixture. After the pellets became molten and swollen with the glycerin, the mixture was stirred and blended into a uniform composition.

Each composition was then applied in its molten state as a 0.003 inch thick×1 inch wide×5 inch long, continuous layer along the center line of a 4 inch wide×0.0035 inch thick sheet of transparency film (3M PP2500 Transparency Film) and allowed to set-up at room temperature. Several such draw downs were made for each composition. A twin blade sample cutter was used to cut strips from the draw downs, by cutting across and perpendicular to the 5 inch long center line of each of the draw downs. This produced 1 inch wide×4 inch long strips of acetate film, each with a 1 inch×1 inch×0.003 inch thick coating of composition in the center and 1½ inch long tails on each end. The resulting coatings were each evaluated for their relative RF-heating properties as well as their relative heat resistance to bond failure in a given shear loading condition, as described in Example 1.

The following observations were made for the four compositions:

80% AQ14000/20% Glycerin

Tg of AQ14000=7° C.

Threshold RF Activation Time=130 ms

Shear Holding Time=1,604 sec

80% AQ35S/20% Glycerin

Tg of AQ35S=35° C.

Threshold RF Activation Time=310 ms

Shear Holding Time=68,252 sec

80% AQ48S/20% Glycerin

Tg of AQ48S=48° C.

Threshold RF Activation Time=90 ms

Shear Holding Time=40,346 sec

80% AQ55S/20% Glycerin

Tg of AQ55S=55° C.

Threshold RF Activation Time=100 ms

Shear Holding Time=1,450,000 sec

Example 7

This example demonstrates a hot melt composition prepared from a sulfonated polyester ionomer (AQ55S) and a polar plasticizer (RIT-CIZER #8). The composition was prepared to have 80 wt % ionomer/20 wt % RIT-CIZER #8. The composition was prepared to have a total mass of 50 grams. The respective amounts of ionomer pellets and RITZER #8 were initially weighed into a resin flask and mixed to achieve thorough wetting of the resin pellets with the RIT-CIZER #8. The flask was then fit with a condenser column and a sealed stir-assembly, and then partially immersed into a 335 F. hot oil bath to achieve controlled heating and melting of the mixture. After the pellets became molten and swollen with the RIT-CIZER #8, the mixture was stirred and blended into a uniform composition. The composition was then applied in its molten state as a 0.016 inch thick×1 inch wide×1 inch long, continuous layer along the center line of a 4 inch wide×0.0035 inch thick sheet of transparency film (3M PP2500 Transparency Film). The resulting coating was evaluated for relative RF-heating as described in Example 1.

The following observations were made for the composition:

The composition was very thick and stiff at 335° F. It was not possible to measure the Brookfield viscosity at 275° F. At room temperature, the composition was clear, tough and brittle. There seemed to be very good compatibility between the polymer and RIT-CIZER #8. The threshold RF activation time was measured to be approximately 4 seconds.

Example 8

This example demonstrates a composition that comprises an ionomer adhesive, a polar carrier and an adhesive compound. First, several different RF susceptor compositions were prepared by blending various ionomers and polar carriers. Then, each of the RF susceptor compositions were blended with an adhesive compound.

Preparation of the RF-susceptor Compositions

Several different RF susceptor compositions were prepared by blending various commercially available sulfonated polyester ionomers (Eastman AQ35S, AQ48S and AQ55S, AQ1045, AQ1350, AQ14000) with a polar carrier (glycerin). The RF-susceptor compositions of this example include:

70 wt % AQ35S/30 wt % Glycerin 70 wt % AQ48S/30 wt % Glycerin 70 wt % AQ55S/30 wt % Glycerin 70 wt % AQ1045/30 wt % Glycerin
70 wt % AQ1350/30 wt % Glycerin
70 wt % AQ14000/30 wt % Glycerin.

Each RF-susceptor composition was prepared to have a total batch mass of 300 grams. For each composition, the respective amounts of ionomer and glycerin were initially weighed into a resin flask and mixed to achieve thorough wetting of the resin pellets with the glycerin. The flask was then fit with a condenser column and sealed stir-assembly, and partially immersed into a 335 F. hot oil bath to achieve controlled heating and melting of the mixture. After the polymer became molten and swollen with the glycerin, the mixture was stirred and blended into a uniform composition. The compositions that comprised linear polymers (AQ35S, AQ48S and AQ55S) were each blended at 335 F. for 3 hours. The composition comprising AQ1045 was blended at 335 F. for 1 hour. The compositions comprising AQ1350 and 14000 were each blended at 335 F. for 1.5 hours. Each of the RF-susceptor compositions was cooled and stored at room temperature for later use.

Preparation of the Compositions Comprising Blends of RF-susceptor Compositions and an Adhesive Compound Each of the RF susceptor compositions were blended with an adhesive compound. The adhesive compound of this example is a random copolymer of ethylene vinyl acetate (EVA). The commercially available EVA that was used is DuPont Polymer's ELVAX 210.

Each composition was prepared to have a total mass of 17 grams. For each composition, 7 grams of ELVAX 210 and 10 grams of the respective RF-susceptor composition was added to a glass jar at room temperature. The open jar was then heated in a convection oven at 335 F. for 40 minutes. After 40 minutes of heating, the jar was removed from the oven to the surface of a 330 F. hot plate and stirred by hand for 1 minute to result in a uniform smooth blend.

A total of six compositions were prepared. The RF-susceptor/Adhesive compositions of this example include:

A. 41 wt % AQ35S/18 wt % Glycerin/41 wt % ELVAX 210
B. 41 wt % AQ48S/18 wt % Glycerin/41 wt % ELVAX 210
C. 41 wt % AQ55S/18 wt % Glycerin/41 wt % ELVAX 210
D. 41 wt % AQ1045/18 wt % Glycerin/41 wt % ELVAX 210
E. 41 wt % AQ1350/18 wt % Glycerin/41 wt % ELVAX 210
F. 41 wt % AQ14000/18 wt % Glycerin/41 wt % ELVAX 210

Evaluation of the blends of RF-susceptor compositions with ELVAX 210.

Immediately after stirring the composition into a uniform blend, each composition was then applied in its molten state as a 0.003 inch thick×1 inch wide×5 inch long, continuous layer along the center line of a 4 inch wide×0.0035 inch thick sheet of transparency film (3M PP2500 Transparency Film) and allowed to set-up at room temperature. Several such draw downs were made for each composition. A twin blade sample cutter was used to cut strips from the draw downs, by cutting across and perpendicular to the 5 inch long center line of each of the draw downs. This produced 1 inch wide×4 inch long strips of acetate film, each with a 1 inch×1 inch×0.003 inch thick coating of composition in the center and 1½ inch long tails on each end.

The resulting coatings were each evaluated for their relative coat properties as well RF-heating properties, as described in Example 1.

The following observations were made for the six compositions:

TABLE 1

| | Coating Properties | | | | |
|---|---|---|---|---|---|
| Composition | Toughness | Clarity | Color | Tackiness | RF Activation Time (ms) |
| A | Soft | Translucent | White | Slight Tack | 520 |
| B | Tough | Translucent | White | Tacky | 100 |
| C | Very Tough | Translucent | White | Very Slight Tack | 280 |
| D | Very Soft | Clear | None | Tacky | 430 |
| E | Soft | Clear | None | Tacky | 380 |
| F | Soft | Clear | None | Tacky | 340 |

Example 9

This example demonstrates susceptor compositions comprising an ionomer, a polar carrier and various low molecular weight polyolefin additives.

First, an RF heatable hot melt composition was prepared by blending 70 wt % AQ35 (a sulfonated polyester, commercially available from Eastman Chemical Company) with 30 wt % glycerin for about 3 hours at 335 F. Then, several compositions were prepared by blending small samples of the molten AQ35/glycerin blend, separately with various grades of EPOLENE (low molecular weight polyolefins, commercially available from Eastman Chemical Company).

The polyolefin polymers of this example are Eastman Chemical's: EPOLENE-10, EPOLENE-11, EPOLENE-14, EPOLENE-15, EPOLENE-20, EPOLENE N-21, and EPOLENE N-34. EPOLENE polymers are low molecular-weight polyolefins that can be useful as base polymers for hot-melt adhesives.

Each composition was then applied in its molten state as a 0.003 inch thick×1 inch wide×5 inch long, continuous layer along the center line of a 4 inch wide×0.0035 inch thick sheet of transparency film (3M PP2500 Transparency Film) and allowed to set-up at room temperature. Several such draw downs were made for each composition. A twin blade sample cutter was used to cut strips from the draw downs, by cutting across and perpendicular to the 5 inch long center line of each of the draw downs. This produced 1 inch wide×4 inch long strips of acetate film, each with a 1 inch×1 inch×0.003 inch thick coating of composition in the center and 1½ inch long tails on each end.

The resulting coatings were each evaluated for their relative RF-heating properties as well as their relative heat resistance to bond failure in a given shear loading condition, as described in Example 1.

Table 2 summarizes the observations that were made for the various compositions:

TABLE 2

70% AQ35 / 30% Glycerin + 5% EPOLENE

| EPOLENE# | mw | viscosity | RFtime (msec) | hangtime[a] |
|---|---|---|---|---|
| –10 | 10000 | 8675 | 210 | 3.91 |
| N-11 | 6000 | 7450 | 210 | 2.99 |
| N-14 | 4000 | 7750 | 220 | 4.77 |
| N-15 | 12000 | 13500 | 210 | 2.60 |
| N-20 | 15000 | 10020 | 220 | 6.01 |
| N-21 | 6500 | 6125 | 210 | 1.91 |
| N-34 | 6200 | 8100 | 210 | 2.95 |

70% AQ35 / 30% Glycerin + 10% EPOLENE

| EPOLENE# | mw | viscosity | RFtime (msec) | hangtime |
|---|---|---|---|---|
| –10 | 10000 | 10220 | 250 | 3.30 |
| N-11 | 6000 | 7975 | 240 | 1.94 |
| N-14 | 4000 | 8725 | 250 | 3.33 |
| N-15 | 12000 | 17900 | 250 | 1.46 |
| N-20 | 15000 | 9450 | 240 | 2.28 |
| N-21 | 6500 | 7112 | 240 | 1.59 |
| N-34 | 6200 | 8212 | 240 | 1.78 |

70% AQ35 / 30% Glycerin + X % EPOLENE –10

| % EPOLENE | viscosity | RFtime (msec) | hangtime |
|---|---|---|---|
| 0 | 6362 | 200 | 4.46 |
| 2.5 | 8337 | 210 | 2.10 |
| 5 | 8675 | 210 | 3.91 |
| 10 | 10220 | 250 | 3.30 |
| 15 | 11570 | 280 | 5.03 |
| 20 | 12250 | 280 | 5.99 |
| 25 | 14620 | 300 | 7.55 |
| 30 | 15250 | 825 | 5.35 |

[a]Hangtime is the number of hours for 1 sq. inch bond area to fail at 100 F under a 0.5 kg shear load.

Example 10

This example demonstrates a series of compositions that comprise: 9% polyethylene glycol (of various molecular weights) and 91% (75% AQ55/25% glycerin).

First, a blend of 75% AQ55 and 25% glycerin was made by blending AQ55 and glycerin for 3 hours at 335 F. Then, a series of compositions was prepared in which each composition was prepared as a molten blend of 9% polyethylene glycol (PEG) and 91% (75% AQ55/25% glycerin).

Each composition was then applied in its molten state as a 0.003 inch thick×1 inch wide×5 inch long, continuous layer along the center line of a 4 inch wide×0.0035 inch thick sheet of transparency film (3M PP2500 Transparency Film) and allowed to set-up at room temperature. Several such draw downs were made for each composition. A twin blade sample cutter was used to cut strips from the draw downs, by cutting across and perpendicular to the 5 inch long center line of each of the draw downs. This produced 1 inch wide×4 inch long strips of acetate film, each with a 1 inch×1 inch×0.003 inch thick coating of composition in the center and 1½ inch long tails on each end. The resulting coatings were each evaluated for their relative RF-heating properties as well as their relative heat resistance to bond failure in a given shear loading condition, as described in Example 1.

Table 3 summarizes the observations that were made for the various compositions:

TABLE 3

| PEG # (PEG200 through PEG8000) | Brookfield Viscosity (cP at 275 F) | tack 1 = very slight tack; 2 = slight tack; 3 = tacky | RFtime time required to melt sample (ms). | hangtime hrs for 1 sq. inch bond area to fail at 100 F under a 0.5 kg shear load. |
|---|---|---|---|---|
| 200 | 15650 | 1 | 130 | 12.94 |
| 300 | 12500 | 1 | 150 | 11.35 |
| 400 | 14600 | 1 | 130 | 5.34 |
| 600 | 13700 | 3 | 140 | 7.23 |
| 900 | 12250 | 1 | 150 | 5.76 |
| 1000 | 12800 | 1 | 150 | 6.82 |
| 1450 | 11700 | 1 | 210 | 4.85 |
| 3350 | 15070 | 1 | 200 | 5.70 |
| 4000 | 14620 | 2 | 250 | 5.51 |
| 4600 | 16400 | 2 | 220 | 9.34 |
| 8000 | 17320 | 1 | 230 | 6.35 |

Thus, when faster RF heating times are required, lower molecular weight PEGs, e.g. 200–1000 MW, are preferred.

Thus, when faster RF heating times are required, lower molecular weight PEGs, e.g.200–1000 MW, are preferred.

Example 11

This example demonstrates a composition comprising 10% IGEPAL (a commercially available surfactant from Rhodia and 90% (75% AQ55/25% glycerin).

A first composition comprising 75% AQ55 and 25% glycerin was prepared by blending AQ55 and glycerin for 6 hours at 335 F. A second composition was prepared by blending IGEPAL CO-880 at 10 wt % with a sample of the first composition.

Each composition was then applied in its molten state as a 0.003 inch thick×1 inch wide×5 inch long, continuous layer along the center line of a 4 inch wide×0.0035 inch thick sheet of transparency film (3M PP2500 Transparency Film) and allowed to set-up at room temperature. Several such draw downs were made for each composition. A twin blade sample cutter was used to cut strips from the draw downs, by cutting across and perpendicular to the 5 inch long center line of each of the draw downs. This produced 1 inch wide×4 inch long strips of acetate film, each with a 1 inch×1 inch×0.003 inch thick coating of composition in the center and 1½ inch long tails on each end.

The resulting coatings were each evaluated for their relative RF-heating properties as well as their relative heat resistance to bond failure in a given shear loading condition, as described in Example 1.

Table 4 summarizes the observations that were made for the various compositions:

TABLE 4

| Composition | Viscosity (cP at 275 F) | RF Activation Time Time required to melt the sample (ms). |
|---|---|---|
| 75% AQ55/25% glycerin | 28,200 | 180 |
| 90% (AQ55/glycerin)/ 10% IGEPAL CO-880 | 9,750 | 360 |

Example 12

This example demonstrates an RF heatable composition comprising 75% AQ48 (a commercially available sulfonated polyester from Eastman Chemical Company) and 25% glycerin.

The composition was prepared by blending 75 wt % AQ48 with 25 wt % glycerin for 4 hours at 335 F. The resulting molten composition was fluid and clear. When this composition was cast onto layers of acetate and allowed to cool, the resulting solid draw-downs were clear and had cold-tack. This composition is ideal for applications where parts are to be initially adhered with a green strength bond by the composition and subsequently fused by the heat that is generated from within the composition as it is exposed to RF energy.

The molten composition had a Brookfield viscosity of 5,750 cP at 275 F., using an S27 spindle at 20 RPM. The composition was then applied in its molten state as a 0.003 inch thick×1 inch wide×5 inch long, continuous layer along the center line of a 4 inch wide×0.0035 inch thick sheet of transparency film (3M PP2500 Transparency Film) and allowed to set-up at room temperature. Several such draw downs were made. A twin blade sample cutter was used to cut strips from the draw downs, by cutting across and perpendicular to the 5 inch long center line of each of the draw downs. This produced 1 inch wide×4 inch long strips of acetate film, each with a 1 inch×1 inch×0.003 inch thick coating of composition in the center and 1½ inch long tails on each end. The resulting coatings were each evaluated for their RF-heating properties, as described in Example 1. RF activation was achieved in 160 ms.

The composition was then drawn into flat beads (0.10 inches wide by 0.01 inches thick at the maximum thickness—the beads were crowned in the middle and feathered at the edges). Three sandwiches of materials were made. Each sample was made by placing a single bead of the composition between two identical layers of thin-film bilaminate polyolefin material. Each layer of bilaminate material was composed of two layers—one layer of polypropylene non-woven (PP) and one layer of polyethylene film (PE).

The first sandwich (sample 1) was assembled such that the bead was in direct contact with the PP side of one of the layers of bilaminate, and the PP side of the other layer of bilaminate. The second sandwich (sample 2) was assembled such that the bead was in direct contact with the PP side of one of the layers of bilaminate, and the PE side of the other layer of bilaminate. The third sandwich (sample 3) was assembled such that the bead was in direct contact with the PE side of one of the layers of bilaminate, and the PE side of the other layer of bilaminate.

In each case, the bead had slight tack and was able to gently hold the layers of the sandwich together. Each sandwich was then activated in a 13.5 MHZ RF field for 200 ms at 1000 watts. In each case, melting of the bilaminate layers had occurred. Then the sandwiches were each immersed and washed in MEK for several minutes in order to remove the adhesive from the bond line. In each case, after washing the adhesive from the sandwich, residual bonding was observed between all layers of the sandwich in the areas where melting had been observed.

Example 13

This example relates to hot-melt compositions comprising a combination of ionomer and polar carrier. The example demonstrates how the compositions can be made to have very fast RF-heating rates relative to the neat ionomer. The rapid RF-heating rates are shown to be a function of the ratio of polar carrier to ionomer. Several ratios of polar carrier to ionomer were prepared and evaluated for RF-heating rates. The RF-heating rates were then normalized with respect to the RF-heating rates of the neat ionomers that are used. The example addresses two major categories of suitable RF susceptor materials: (1) 100% sodium neutralized sulfonated polyesters, and (2) 80% sodium-neutralized ethylene acrylic acid copolymer. The techniques of this example are generally applicable to compositions that comprise any suitable combination of ionomers and polar carriers, and may further comprise additives that are typical of adhesives, coatings and sealants.

The Ratio of Polar Carrier Material/Ionomeric RF-Susceptor Material

The following compositions were blended in a resin flask, by heating in an oil bath at 335 F. for 20 minutes, while stirring with a glass stir rod.

(1) 0 wt % Glycerin/100 wt % AClyn 285
(2) 10 wt % Glycerin/90 wt % AClyn 285
(3) 20 wt % Glycerin/80 wt % AClyn 285
(4) 30 wt % Glycerin/70 wt % AClyn 285
(5) 40 wt % Glycerin/60 wt % AClyn 285
(6) 40 wt % Glycerin/60 wt % AClyn 285

AClyn 285 is an ionomer. It is a 80% sodium-neutralized random copolymer of ethylene acrylic acid, commercially available from Honeywell; Morristown, N.J., USA.

(7) 0 wt % Glycerin/100 wt % AQ1045
(8) 10 wt % Glycerin/90 wt % AQ1045
(9) 20 wt % Glycerin/80 wt % AQ1045
(10) 30 wt % Glycerin/70 wt % AQ1045
(11) 40 wt % Glycerin/60 wt % AQ1045
(12) 40 wt % Glycerin/60 wt % AQ1045

AQ1045 is an ionomer. It is a sodium-neutralized sulfonated copolyester, commercially available from Eastman Chemical; USA.

Evaluation of RF-heating Rate

Each composition was evaluated for the rate of RF heating, by preparing several specimens and RF-heating each specimen for a different amount of time while holding all other conditions constant, to determine the minimum amount of time required to result in a given degree of melting and fusing in a specimen produced from the composition.

Figure 63:
FIG. 63 depicts a five-layer sandwich that contains a susceptor composition layer 6302 that can be heated with RF energy.

Specimens were produced as five-layer sandwiches, as described below and in FIG. 63. For each composition, several specimens were prepared. Each specimen was comprised of a five-layer sandwich of materials, as described below and in FIG. 63.

Layer 1 (6301). Bottom Layer. A 1 inch×4 inch×0.0035 inch thick piece of acetate (3M PP2500 Transparency Film).

Layer 2 (6302). A 1 inch×1 inch×0.003 inch thick layer of the test composition, applied as a hot melt to the first layer, and allowed to cool to room temperature before forming the sandwich.

Layer 3 (6303). A 4 inch×4 inch×0.0035 inch thick piece of acetate (PP2500 Transparency Film; 3M).

Layer 4 (6304). A 1 inch×4 inch×0.005 inch thick piece of Parafilm (Parafilm Laboratory Film; American National Can; Chicago, Ill.).

Layer 5 (6305). Top layer. A 1 inch×4 inch×0.005 inch thick piece of Parafilm (Parafilm M Laboratory Film; American National Can; Chicago, Ill.).

Figure 64A:
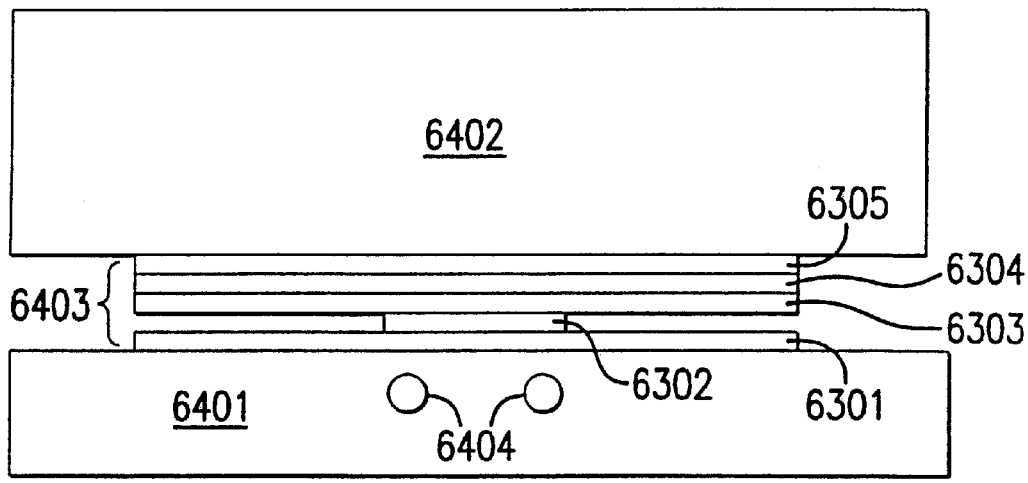
FIG. 64A depicts a side view of a five-layer sandwich 6306 between two blocks of TEFLON (6401 and 6402), wherein block 6401 contains two probes 6307.
Figure 64B:
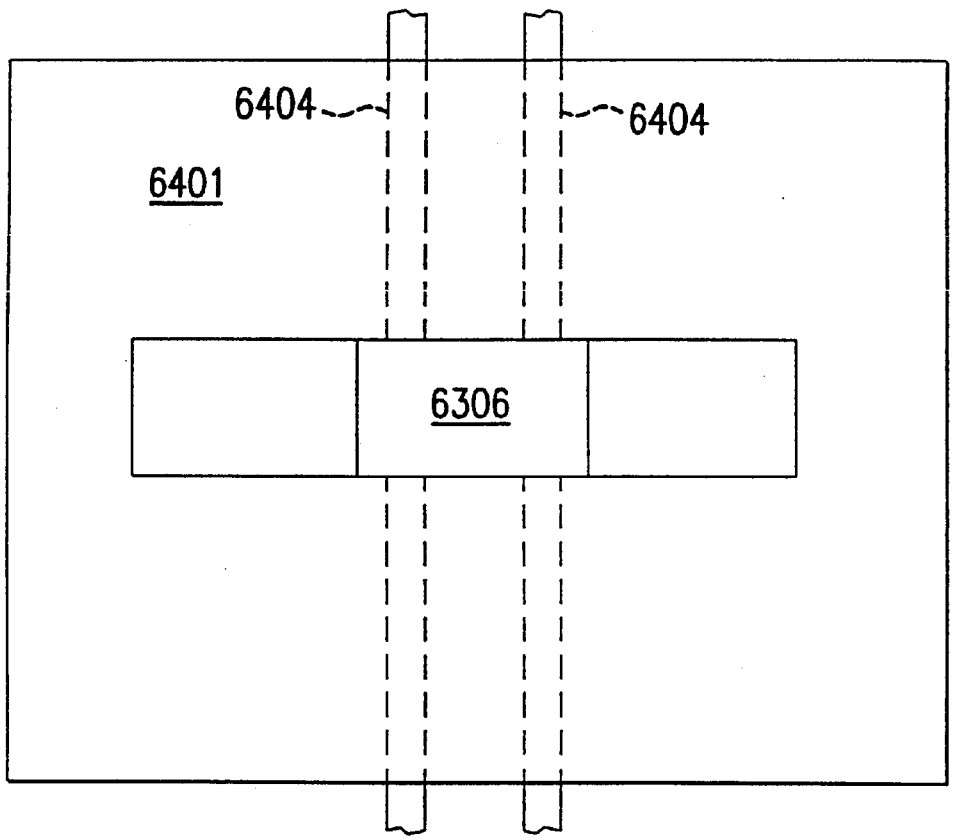
FIG. 64B is a top view of the five-layer sandwich 6306 on block 6401.

Each specimen was heated by placing the 5-layer sandwich 6403 in the field of a pair of RF probes 6404 (FIGS. 64A and 64B), applying even pressure to the sandwich between blocks of TEFLON (6401 and 6402), and exposing the sandwich to RF energy (500 watts at about 15 MHZ) for a variable amount of time, with all other conditions held constant.

The RF Time was determined as the minimum period of time that was required to uniformly RF heat and fuse the two layers of Parafilm, 6304 and 6305 to a given extent.

The Normalized RF Heating Rate was calculated as the reciprocal of the normalized RF Time of each composition, where the RF Time data was normalized with respect to the neat ionomer of the composition.

Results

Scatter plots were made of

Figure 65:
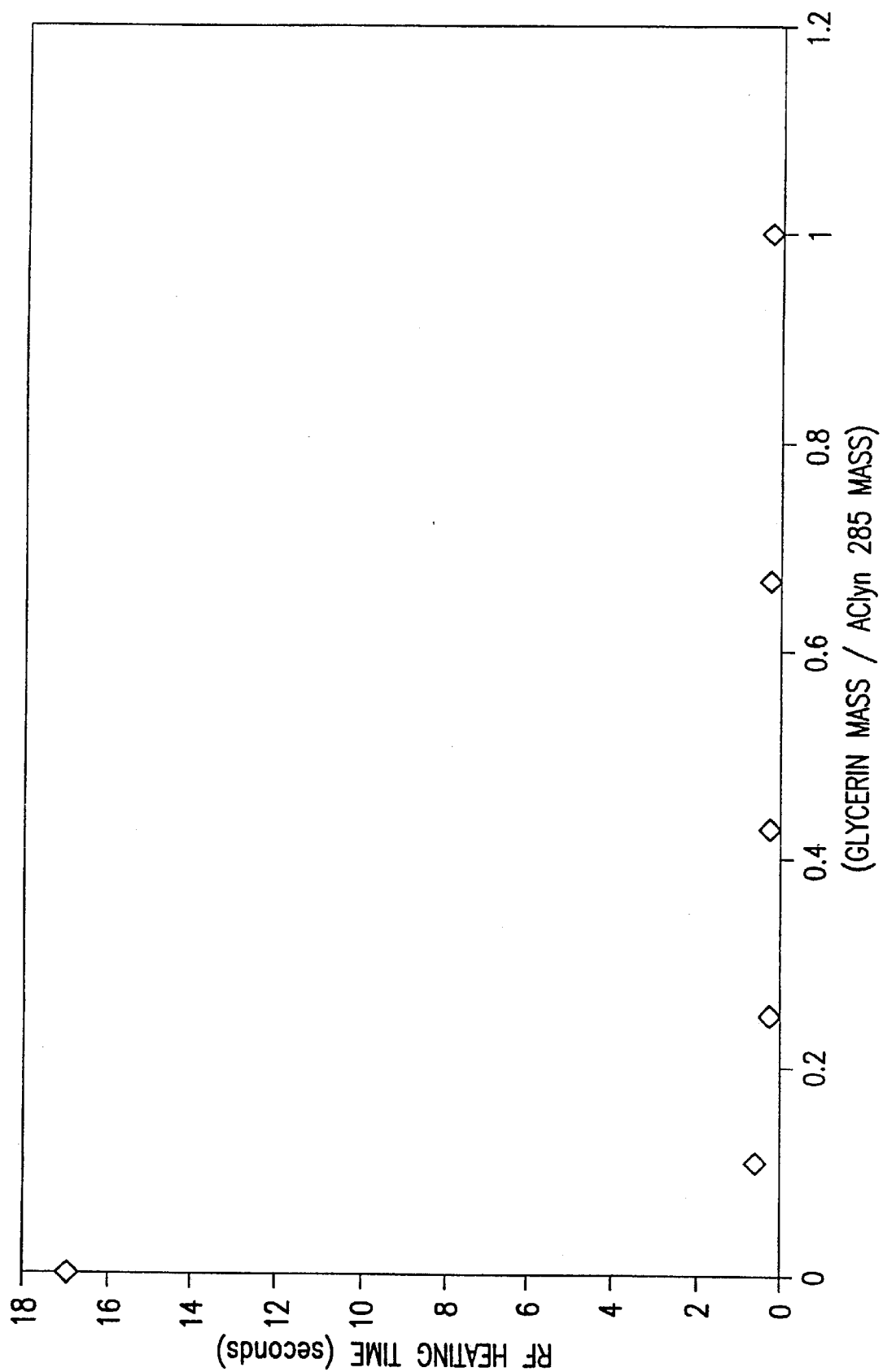
FIG. 65 depicts a graph showing the relationship between RF heating time vs. (glycerin mass/AClyn 285 mass).

RF Time vs. (Glycerin mass/Polymer mass) for the AClyn 285-based compositions. See FIG. 65.

Figure 66:
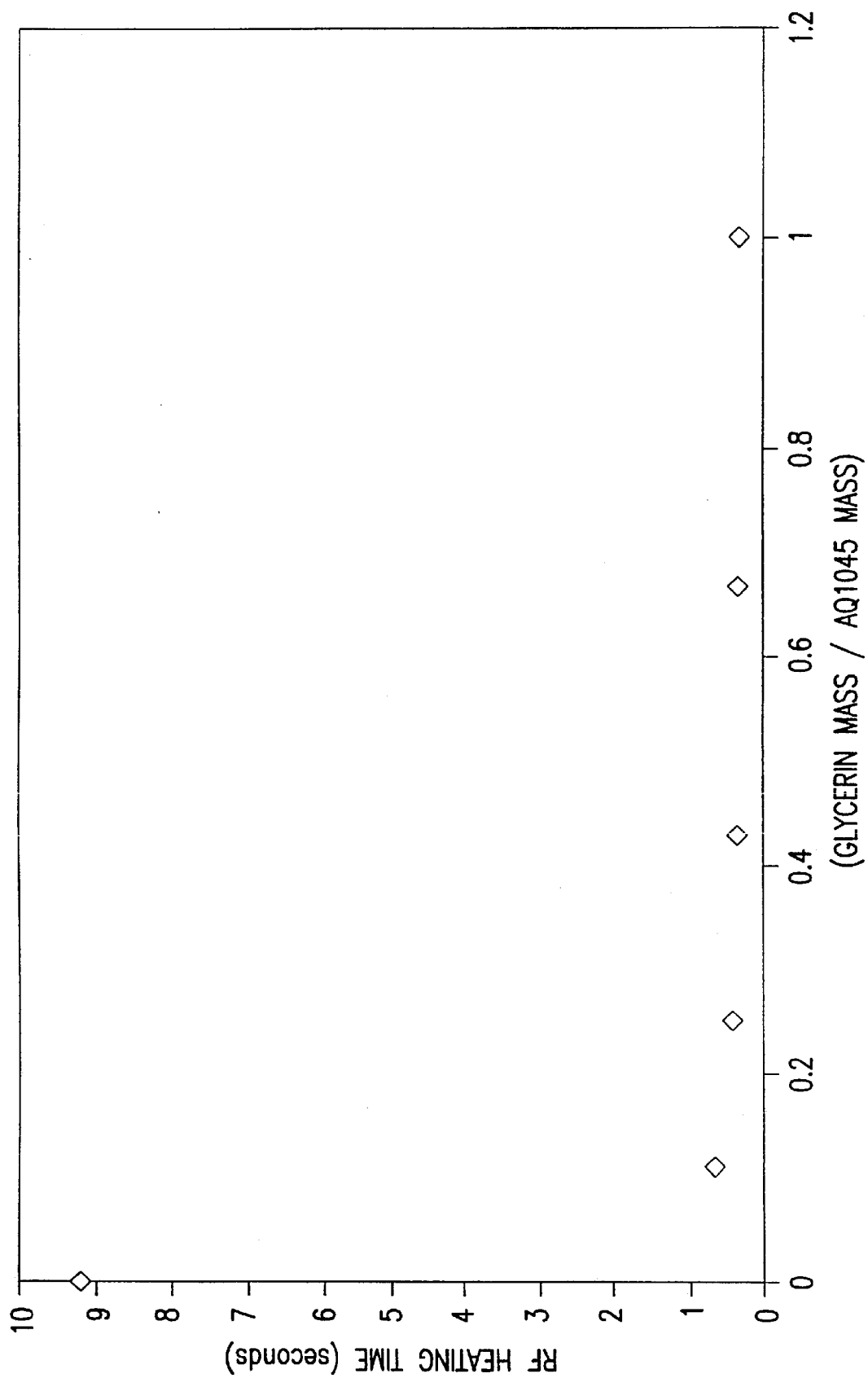
FIG. 66 depicts a graph showing the RF heating time vs. (glycerin mass/AQ 1045 mass).

RF Time vs. (Glycerin mass/Polymer mass) for the AQ1045-based compositions. See FIG. 66.

Figure 67:
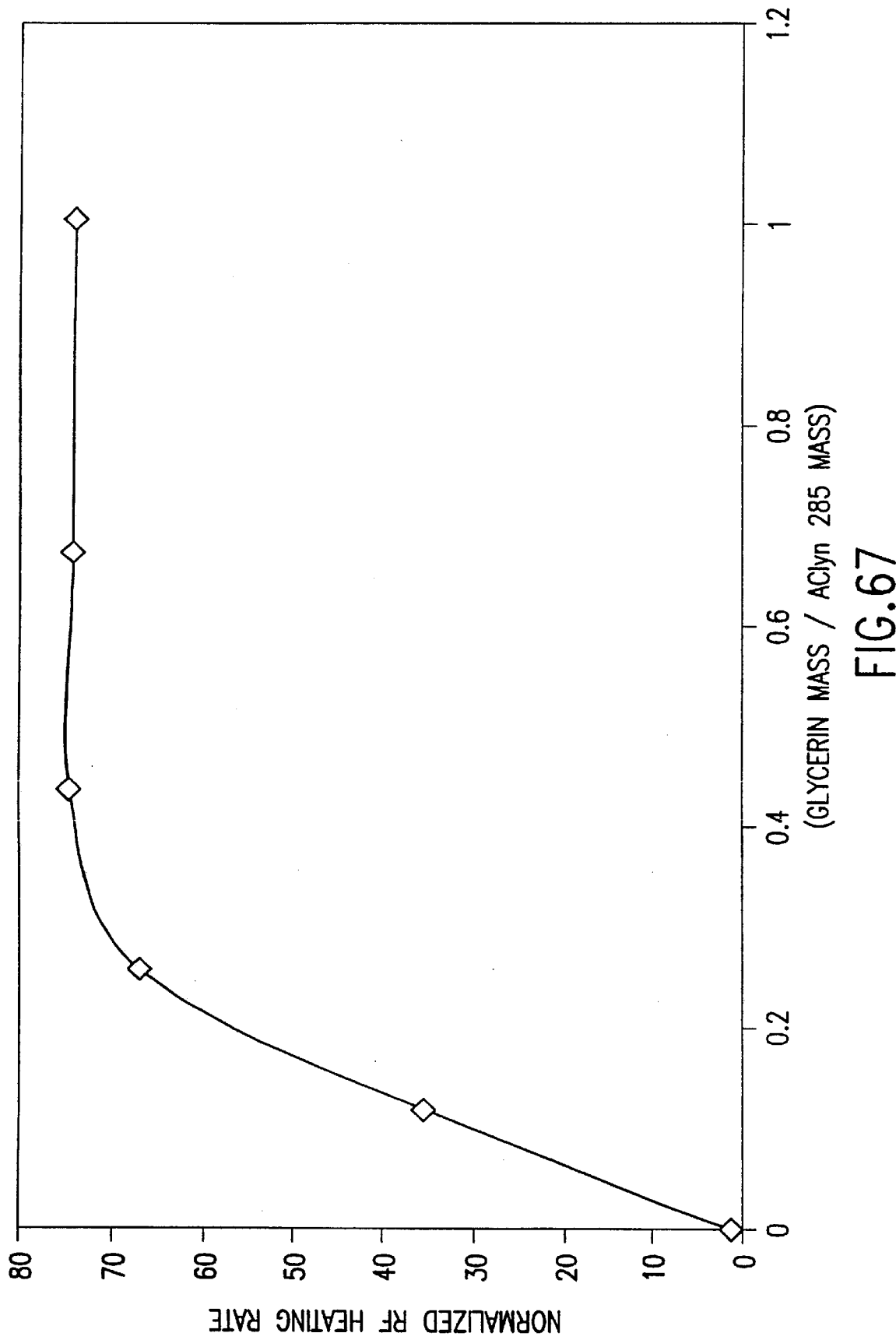
FIG. 67 depicts a graph showing the normalized RF heating rates vs. (glycerin mass/AClyn 285 mass).

Normalized RF-Heating Rate vs. (Glycerin mass/Polymer mass) for the AClyn 285-based compositions. See FIG. 67.

Figure 68:
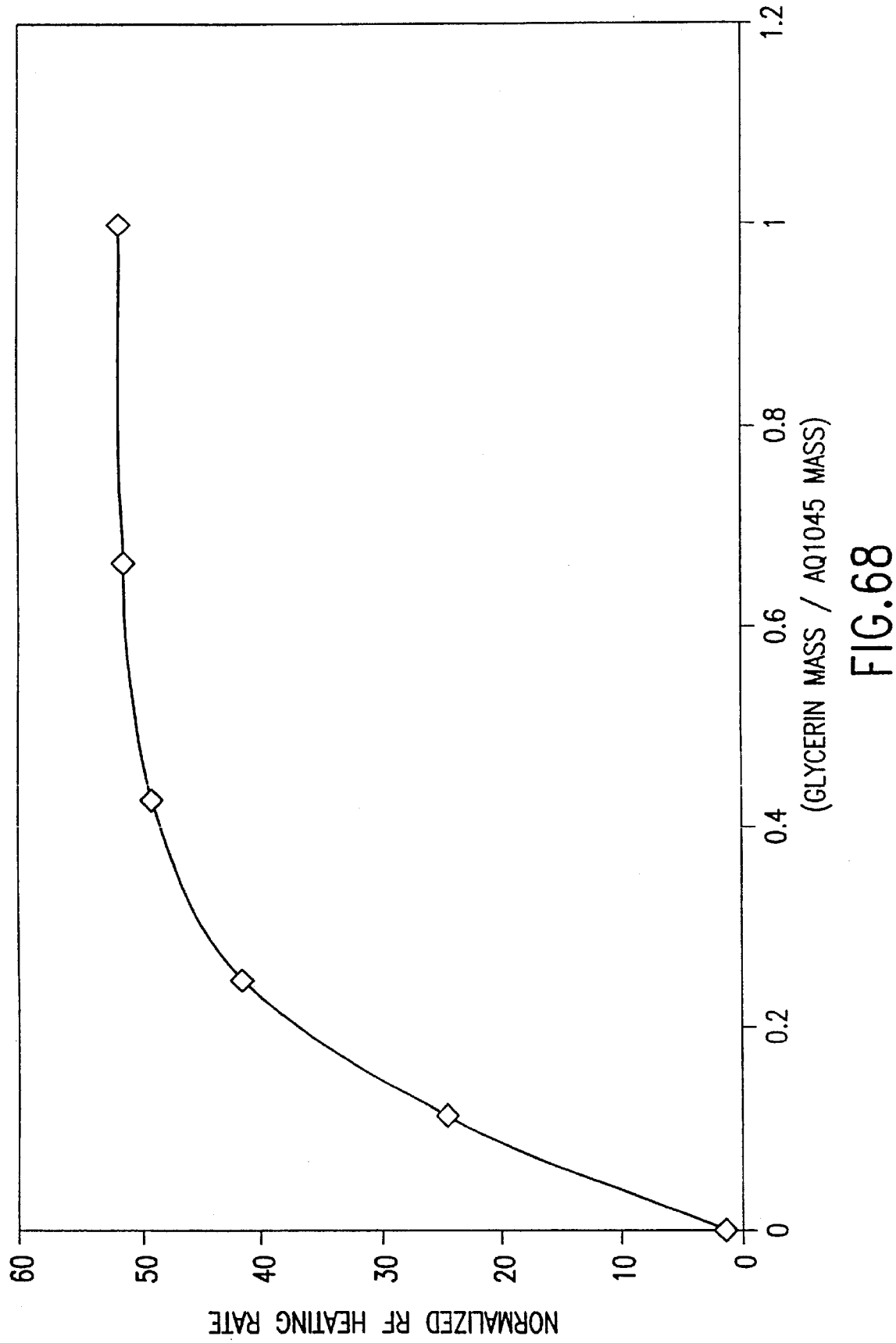
FIG. 68 depicts a graph showing the normalized RF heating rates vs. (glycerin mass/AQ 1045 mass).

Normalized RF-Heating Rate vs. (Glycerin mass/Polymer mass) for the AQ1045-based compositions. See FIG. 68.

In each case, the scatter plots indicate a strong functional dependence between the ratio of polar carrier to ionomer and the RF-heating rate. There is a strong positive correlation that looks approximately linear between the ratio of polar carrier to ionomer and the RF-heating rate, that plateaus at a ratio of about 30% polar carrier/70% ionomer (=0.43).

One may conclude from these results, that by increasing the ratio of polar carrier to ionomer from 0/100 to 30/70, an unexpected dramatic increase in the rate of RF-heating can be achieved. From a ratio of about 30/70 up, the rate of heating remains approximately constant at almost 2 orders of magnitude greater than the rate of RF-heating for the neat ionomeric RF-susceptor material.

Example 14

This examples demonstrates the effects on RF heating time by a number of additives.

Preparation of Compositions

The following compositions were blended in a resin flask, by heating in an oil bath at 335 F. for 20 minutes, while stirring with a glass stir rod.

(1) 15% PARICIN 220/85% (0 wt % Glycerin/100 wt % AClyn 285)
(2) 15% PARICIN 220/85% (5 wt % Glycerin/95 wt % AClyn 285)
(3) 15% PARICIN 220/85% (10 wt % Glycerin/90 wt % AClyn 285)
(4) 15% PARICIN 220/85% (20 wt % Glycerin/80 wt % AClyn 285)
(5) 15% PARICIN 220/85% (30 wt % Glycerin/70 wt % AClyn 285)
(6) 15% PARICIN 220/85% (40 wt % Glycerin/60 wt % AClyn 285)
(7) 15% PARICIN 220/85% (50 wt % Glycerin/50 wt % AClyn 285)

PARICIN 220 is a hydroxystearamide wax, commercially available from CasChem, Inc., Bayonne, N.J., USA.

(1) 15% Gulf Wax/85% (0 wt % Glycerin/100 wt % AClyn 285)
(2) 15% Gulf Wax/85% (5 wt % Glycerin/95 wt % AClyn 285)
(3) 15% Gulf Wax/85% (10 wt % Glycerin/90 wt % AClyn 285)
(4) 15% Gulf Wax/85% (20 wt % Glycerin/80 wt % AClyn 285)
(5) 15% Gulf Wax/85% (30 wt % Glycerin/70 wt % AClyn 285)
(6) 15% Gulf Wax/85% (40 wt % Glycerin/60 wt % AClyn 285)
(7) 15% Gulf Wax/85% (50 wt % Glycerin/50 wt % AClyn 285)

Gulf Wax is a paraffin wax, commercially available from Gulf.

(1) 30% Foral AX/70% (0 wt % Glycerin/100 wt % AClyn 285)
(2) 30% Foral AX/70% (5 wt % Glycerin/95 wt % AClyn 285)
(3) 30% Foral AX/70% (10 wt % Glycerin/90 wt % AClyn 285)
(4) 30% Foral AX/70% (20 wt % Glycerin/80 wt % AClyn 285)
(5) 30% Foral AX/70% (30 wt % Glycerin/70 wt % AClyn 285)
(6) 30% Foral AX/70% (40 wt % Glycerin/60 wt % AClyn 285)
(7) 30% Foral AX/70% (50 wt % Glycerin/50 wt % AClyn 285)

Foral AX is a polar functional tackifying resin, commercially available from Hercules.

(1) 15% EG200/85% (0 wt % Glycerin/100 wt % AClyn 285)
(2) 15% PEG200/85% (5 wt % Glycerin/95 wt % AClyn 285)
(3) 15% PEG200/85% (10 wt % Glycerin/90 wt % AClyn 285)
(4) 15% PEG200/85% (20 wt % Glycerin/80 wt % AClyn 285)
(5) 15% PEG200/85% (30 wt % Glycerin/70 wt % AClyn 285)
(6) 15% PEG200/85% (40 wt % Glycerin/60 wt % AClyn 285)
(7) 15% PEG200/85% (50 wt % Glycerin/50 wt % AClyn 285)

PEG200is polyethylene glycol, liquid at room temperature, and behaves as a polar plasticizer. It is commercially available from Union Carbide.

(1) 15% PEG1450/85% (0 wt % Glycerin/100 wt % AClyn 285)
(2) 15% PEG1450/85% (5 wt % Glycerin/95 wt % AClyn 285)
(3) 15% PEG1405/85% (10 wt % Glycerin/90 wt % AClyn 285)
(4) 15% PEG1450/85% (20 wt % Glycerin/80 wt % AClyn 285)
(5) 15% PEG1450/85% (30 wt % Glycerin/70 wt % AClyn 285)
(6) 15% PEG1450/85% (40 wt % Glycerin/60 wt % AClyn 285)

(7) 15% PEG1450/85% (50 wt % Glycerin/50 wt % AClyn 285)

PEG1450 is polyethylene glycol, liquid at room temperature, and behaves as a polar plasticizer. It is commercially available from Union Carbide.

Results

Each composition was evaluated for RF-heating rates as described above. Scatter plots were made of Normalized RF-Heating Rate vs. (Glycerin/AClyn for each series of compositions. See FIG. 69.

In each case, the scatter plots indicate a strong functional dependence between the ratio of polar carrier to ionomer and the RF-Heating Rate. There is a strong positive correlation that looks approximately linear between the ratio of polar carrier material to ionomer and the RF-Heating Rate, that plateaus at a ratio of about 30% polar carrier/70% ionomer (=0.43). This result resembles the results above, where no additive was present.

Example 15

This example demonstrates hot-melt compositions comprising:

(1) RF-heatable base material (25% Glycerin/75% AClyn 285), (2) Adhesive polymer (EASTOFLEX E 1060), (3) Tackifying resin (EASTOTAC H-100R).

AClyn 285 is an ionomeric RF-susceptor material. It is a 80% sodium-neutralized random copolymer of ethylene acrylic acid, commercially available from Honeywell; Morristown, N.J., USA. EASTOFLEX E 1060 is an amorphous propylene-ethylene copolymer, commercially available from Eastman Chemical; Tennessee, USA. EASTOTAC H-100R is a hydrocarbon tackifying resin, commercially available from Eastman Chemical; Tennessee, USA.

Preparation of Compositions

Five compositions were prepared. Each compositions was blended in an open glass jar, on a hot plate at 320 F. for 45 minutes, with hand stirring, using glass stir rods. The blends were smooth and uniform. Each composition was prepared to have a total mass of 50 grams.

| Composition 1: | |
|---|---|
| 26.25 g | AClyn 285 |
| 8.75 g | glycerin |
| 10 g | EASTOTAC H-100R |
| 5 g | EASTOFLEX E1060 |
| Composition 2: | |
| 26.25 g | AClyn 285 |
| 8.75 g | glycerin |
| 5 g | EASTOTACH-100R |
| 10 g | EASTOFLEX E1060 |
| Composition 3: | |
| 26.25 g | AClyn 285 |
| 8.75 g | glycerin |
| 7.5 g | EASTOTAC H-100R |
| 7.5 g | EASTOFLEX E1060 |
| Composition 4: | |
| 22.5 g | AClyn 285 |
| 7.5 g | glycerin |
| 10 g | EASTOTAC H-100R |
| 10 g | EASTOFLEX E1060 |
| Composition 5: | |
| 30 g | AClyn 285 |
| 10 g | glycerin |
| 5 g | EASTOTAC H-100R |
| 5 g | EASTOFLEX E1060 |

Evaluation of RF-heating Rate

Each composition was evaluated for the rate of RF heating, by preparing several specimens and RF-heating each specimen for a different amount of time while holding all other conditions constant, to determine the minimum amount of time required to result in a given degree of melting and fusing in a specimen produced from the composition.

Specimens were produced as five-layer sandwiches, as described below and in FIG. 63.

For each composition, several specimens were prepared. Each specimen was comprised of a five-layer sandwich of materials, as described below and in FIG. 63.

Layer 1 (6301). Bottom Layer. A 1 inch×4 inch×0.0035 inch thick piece of acetate (3M PP2500 Transparency Film).

Layer 2 (6302). A 1 inch×1 inch×0.003 inch thick layer of the test composition, applied as a hot melt to the first layer, and allowed to cool to room temperature before forming the sandwich.

Layer 3 (6303). A 4 inch×4 inch×0.0035 inch thick piece of acetate (PP2500 Transparency Film; 3M).

Layer 4 (6304). A 1 inch×4 inch×0.005 inch thick piece of Parafilm (Parafilm "M" Laboratory Film; American National Can; Chicago, Ill.).

Layer 5 (6305). Top layer. A 1 inch×4 inch×0.005 inch thick piece of Parafilm (Parafilm "MN" Laboratory Film; American National Can; Chicago, Ill.).

Each specimen was heated by placing the 5-layer sandwich in the field of a pair of RF probes 6404 (FIG. 64), applying even pressure to the sandwich between blocks of TEFLON (6401 and 6402), and exposing the sandwich to RF energy (500 watts at about 15 MHz) for a variable amount of time, as shown in FIG. 64, with all other conditions held constant.

The RF Time was determined as the minimum period of time that was required to uniformly RF heat and fuse the two layers of Parafilm, 6304 and 6305 to a given extent.

The Normalized RF Heating Rate was calculated as the reciprocal of the normalized RF Time of each composition, where the RF Time data was normalized with respect to the neat ionomer of the composition.

Evaluation of Peel Strength

Each composition was evaluated for the Peel Strength that would result from RF heating, by preparing several specimens and RF-heating each specimen for a set amount of time (280 ms) and varying the power level (200, 400, 600 and 800 watts). The RF-heated specimens were pulled in a T-Peel test.

Specimens were produced as five-layer sandwiches, as described below and in FIG. 63:

For each composition, several specimens were prepared. Each specimen was comprised of a three-layer sandwich of materials, as described below.

Layer 1. Bottom Layer. A 1 inch×4 inch×0.0035 inch thick piece of acetate (3M PP2500 Transparency Film).

Layer 2. A 1 inch×1 inch×0.003 inch thick layer of the test composition, applied as a hot melt to the middle of the first layer, and allowed to cool to room temperature before forming the sandwich.

Layer 3. A 1 inch×4 inch×0.0035 inch thick piece of acetate (PP2500 Transparency Film; 3M).

Each specimen was RF-heated by placing the 3-layer sandwich in the field of a pair of RF probes (6404), applying even pressure to the sandwich between blocks of TEFLON (6401 and 6402), and exposing the sandwich to RF energy.

Peel Strength was determined as the maximum peel force that was measured for each specimen by the T-peel test. Peel Strength is taken as an average of three runs under a given set of RF-heating conditions, for a given composition.

Results

FIG. 70 is a scatter plot of Peel Strength vs. RF Power for the five compositions. Peel strength is shown to be a function of RF-power for each composition. Composition 3 is capable of achieving the highest peel strengths, as the RF power is swept.

Each composition had Normalized RF-Heating Rates as shown below. The Normalized RF-Heating Rates of the compositions did not tend to be as strongly influenced by the ratio of H-100R resin to E1060 Copolymer, as by the overall level of the base composition of 25% glycerin to 75% AClyn 285. The Normalized RF-Heating Rates tended to be positively correlated to the overall level of the base composition of 25% glycerin to 75% AClyn 285. F. or range of component levels tested, there was a strong positive correlation of 0.89 between the level of E1060 and the viscosity, a very small positive correlation of 0.1 between the level of H-100R resin and the viscosity.

| Composition: | Normalized RF Heating Rate: |
|---|---|
| neat AClyn 285 | 1 |
| 1 | 31 |
| 2 | 30 |
| 3 | 30 |
| 4 | 21 |
| 5 | 34 |

Each composition had 300 F. Brookfield melt viscosities as shown below. Viscosities were measured using an S27 spindle.

| Composition: | 300 F Brookfield Viscosity, using an S27 Spindle (cP): |
|---|---|
| 1 | 5450 |
| 2 | 6925 |
| 3 | 6050 |
| 4 | 7800 |
| 5 | 5950 |

The invention relates to compositions comprising about 45–60 weight percent of an 80% sodium-neutralized random copolymer of ethylene acrylic acid, about 15–20 weight percent glycerin, about 10–20 weight percent amorphous propylene-ethylene copolymer, and about 10–20 weight percent hydrocarbon takifying resin. From the results of this example, Composition 3 is a preferred hot-melt composition for the RF-bonding of thin layer polyolefins. Thus, the invention relates in particular to compositions comprising about 52 weight percent of an 80% sodium-neutralized random copolymer of ethylene acrylic acid, about 16 weight percent glycerin, about 15 weight percent amorphous propylene-ethylene copolymer, and about 15 weight percent hydrocarbon takifying resin.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. Additionally, all patents, patent applications and publications mentioned above are incorporated by reference herein.

What is claimed is:

1. A system for bonding or adhering a first substrate to a second substrate, comprising:

a susceptor composition interposed between the first and second substrates, said composition comprising one or more ionomers and one or more polar carriers, wherein said polar carrier(s) comprise about 13 to about 25 weight percent of the composition with respect to the combined weight of the polar carrier(s) and the ionomer(s); and a radio frequency (RF) heating system for producing a fringe RF field that is used to heat the composition, said RF heating apparatus comprising:

a power supply; and an RF energy applicator electrically coupled to said power supply, wherein said RF energy applicator comprises a first elongated electrode and a second elongated electrode, wherein a first end of said first elongated electrode is electrically connected to said power supply and a first end of said second elongated electrode is electrically connected to said power supply, wherein said first and second elongated electrodes are used to create said fringe RF field.

2. The system of claim 1, wherein said first elongated electrode and said second elongated electrode are positioned such at least a first portion of the first elongated electrode is substantially parallel with a first portion of the second elongated electrode.

3. The system of claim 2, wherein a second portion of the first electrode is angled in a direction away from the second electrode, said second portion of the first electrode being between said first portion and an end of the first electrode, and a second portion of the second electrode is angled in a direction away from the first electrode, said second portion of the second electrode being between said first portion and an end of the second electrode.

4. The system of claim 2, wherein a distal end of the first electrode is bent away from the second electrode and a distal end of the second electrode is bent away from the first electrode.

5. The system of claim 1, wherein said composition is placed in a region adjacent to the space between the elongated electrodes when it is desired to heat the composition using said fringe field so that said composition is exposed to said fringe field.

6. The system of claim 5, further comprising a low dielectric material, the material covering at least a portion of the first electrode and at least a portion of the second electrode so that when the composition is placed in the region the material is between the electrodes and the composition.

7. The system of claim 1, wherein the one or more ionomer(s) and the one or more polar carriers are substantially blended with one another and form a mixture.

8. The system of claim 1, wherein the ionomer and the polar carrier are disposed on one another.

9. The system of claim 1, wherein The polar carrier has a dielectric constant of 13–63 (25° C.).

10. The system of claim 1, comprising one ionomer and one polar carrier.

11. The system of claim 1, wherein said one or more ionomer(s) is a sulfonated polyester.

12. The system of claim 11, wherein said sulfonated polyester is the salt of a sulfonated polyester.

13. The system of claim 11, wherein the sulfonated polyester is a linear polyester with a high Tg.

14. The system of claim 1, wherein said one or more ionomer(s) is an acrylic acid copolymer, or a salt thereof.

15. The system of claim 1, wherein said one or more ionomer(s) is a protein.

16. The system of claim 15, wherein said protein is gelatin.

17. The system of claim 16, wherein said gelatin has a pH of about 8 to 12.

18. The system of claim 16, wherein said gelatin has a pH of about 1 to about 6.

19. The system of to claim 1, wherein said one or more polar carrier(s) is a polyol.

20. The system of claim 1, wherein said RF energy applicator further comprises an electrically conductive coil, wherein said coil is connected between said first and said second elongated electrodes.

21. The system of claim 1, wherein each of the first and second elongated electrodes is a conductive tube.

22. The system of claim 1, wherein the first electrode has a diameter or width between about one-eighth of an inch and one-half of an inch.

23. The system of claim 1, wherein said power supply comprises an amplifier and an impedance matching circuit connected to an output of said amplifier, the amplifier being operable to amplify a radio frequency (RF) signal.

24. The system of claim 23, wherein the impedance matching circuit comprises an inductor, and the first electrode, the second electrode, and the inductor are connected in series such that the inductor is connected between the first electrode and the second electrode.

25. The system of claim 1, wherein said elongated electrodes include a portion that is curvilinear.

26. The system of claim 25, wherein said curvilinear portion is sinusoidally shaped.

27. A system for bonding or adhering a first substrate to a second substrate, comprising:
   a susceptor composition interposed between the first and second substrates, said composition comprising one or more ionomers and one or more polar carriers, wherein said polar carrier(s) comprise about 13 to about 25 weight percent of the composition with respect to the combined weight of the polar carrier(s) and the ionomer(s); and
   a radio frequency (RF) heating system for producing a fringe RF field that is used to heat the composition, said RF heating system comprising:
   a power supply; and
   an RF energy applicator electrically coupled to said power supply, wherein
   said RF energy applicator comprises a first elongated electrode, a second elongated electrode, a first electrically conductive coil, and a second electrically conductive coil;
   a first connector connects said power supply to a point on said first elongated electrode that is midway or about midway between the ends of said first elongated electrode,
   a second connector connects said power supply to a point on said second elongated electrode that is midway or about midway between the ends of said second elongated electrode, and
   said first coil and said second coil are connected in parallel by said first and second elongated electrodes, wherein said first and second elongated electrodes are used to create said fringe RF field.

28. The system of claim 27, wherein said first elongated electrode and said second elongated electrode are positioned such at least a first portion of the first elongated electrode is substantially parallel with a first portion of the second elongated electrode.

29. The system of claim 27, wherein said composition is placed in a region adjacent to the space between the elongated electrodes when it is desired to heat the composition using said fringe field so that said composition is exposed to said fringe field.

30. The system of claim 29, further comprising a low dielectric material, the material covering the first and second electrode so that when the composition is placed in the region the material is between the electrodes and the composition.

31. The system of claim 27, wherein the one or more ionomer(s) and the one or more polar carriers are substantially blended with one another and form a mixture.

32. The system of claim 27, wherein the ionomer and the polar carrier are disposed on one another.

33. The system of claim 27, wherein the polar carrier has a dielectric constant of 13–63 (25° C.).

34. The system of claim 27, comprising one ionomer and one polar carrier.

35. The system of claim 27, wherein said one or more ionomer(s) is a sulfonated polyester.

36. The system of claim 35, wherein said sulfonated polyester is the salt of a sulfonated polyester.

37. The system of claim 35, wherein the sulfonated polyester is a linear polyester with a high Tg.

38. The system of claim 27, wherein said one or more ionomer(s) is an acrylic acid copolymer, or a salt thereof.

39. The system of claim 27, wherein said one or more ionomer(s) is a protein.

40. The system of claim 39, wherein said protein is gelatin.

41. The system of claim 40, wherein said gelatin has a pH of about 8 to 12.

42. The system of claim 40, wherein said gelatin has a pH of about 1 to about 6.

43. The system of to claim 27, wherein said one or more polar carrier(s) is a polyol.

44. The system of claim 27, wherein said power supply comprises an amplifier and an impedance matching circuit connected to an output of said amplifier, the amplifier being operable to amplify a radio frequency (RF) signal.

45. The system of claim 27, wherein each of the first and second elongated electrodes is a conductive tube.

46. The system of claim 27, wherein the first electrode has a diameter or width between about one-eighth of an inch and one-half of an inch.

* * * * *